United States Patent
Yanagisawa et al.

(10) Patent No.: US 7,127,413 B1
(45) Date of Patent: Oct. 24, 2006

(54) CHARGE PROCESSING DEVICE CHARGE PROCESSING SYSTEM AND CHARGE PROCESSING CARD

(75) Inventors: Takashi Yanagisawa, Aichi-ken (JP);
Masaki Kakihara, Aichi-ken (JP);
Yasuyuki Furuta, Aichi-ken (JP);
Haruhiko Terada, Aichi-ken (JP);
Yasuyuki Aoki, Aichi-ken (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/600,779

(22) PCT Filed: Jan. 22, 1999

(86) PCT No.: PCT/JP99/00246

§ 371 (c)(1),
(2), (4) Date: Sep. 13, 2000

(87) PCT Pub. No.: WO99/38123

PCT Pub. Date: Jul. 29, 1999

(30) Foreign Application Priority Data

| Jan. 23, 1998 | (JP) | ............... 10-010937 |
| Jan. 28, 1998 | (JP) | ............... 10-016137 |
| Feb. 13, 1998 | (JP) | ............... 10-031737 |
| Feb. 19, 1998 | (JP) | ............... 10-037711 |
| Feb. 19, 1998 | (JP) | ............... 10-037712 |
| Feb. 19, 1998 | (JP) | ............... 10-037713 |
| Feb. 19, 1998 | (JP) | ............... 10-037714 |
| Oct. 15, 1998 | (JP) | ............... 10-294309 |

(51) Int. Cl.
*G06Q 99/00* (2006.01)

(52) U.S. Cl. ........................................ 705/13

(58) Field of Classification Search ................. 705/13, 705/417, 418; 340/928, 932.2, 993; 701/213–217; 342/357.08, 357.12, 357.13
See application file for complete search history.

(56) References Cited

U.S. PATENT DOCUMENTS

| 5,483,457 | A |   | 1/1996  | Shibata et al. |
| 5,490,079 | A |   | 2/1996  | Sharpe et al. |
| 5,563,608 | A |   | 10/1996 | Tachita et al. |
| 5,694,322 | A | * | 12/1997 | Westerlage et al. ......... 705/417 |
| 5,721,678 | A | * | 2/1998  | Widl .......................... 701/213 |
| 5,745,868 | A |   | 4/1998  | Geier |
| 5,751,973 | A | * | 5/1998  | Hassett ....................... 705/13 |

(Continued)

FOREIGN PATENT DOCUMENTS

DE   43 44 433   7/1995

(Continued)

OTHER PUBLICATIONS

U.S. Appl. No. 09/984,071, filed Oct. 26, 2002, Kakihara.

(Continued)

Primary Examiner—Susanna M. Diaz
(74) Attorney, Agent, or Firm—Pillsbury Winthrop Shaw Pittman, LLP

(57) ABSTRACT

A system for charge processing tolls and the like. A vehicle mounted device detects the position of a vehicle 32 using GPS, and transmits position information via a wireless channel to a central station. The central station performs charge processing (calculation) for an area in which a charge is applied based on the position of the vehicle, and transmits the charge to the vehicle mounted device. The vehicle mounted device collects a toll from a prepaid card or IC card or the like on the basis of the received charge processing result.

9 Claims, 92 Drawing Sheets

U.S. PATENT DOCUMENTS

| | | | |
|---|---|---|---|
| 5,767,505 A | 6/1998 | Mertens et al. | |
| 5,796,178 A | 8/1998 | Onuma | |
| 5,926,546 A * | 7/1999 | Maeda et al. | 705/65 |
| 6,002,981 A | 12/1999 | Kreft | |
| 6,246,932 B1 | 6/2001 | Kageyama et al. | |
| 6,252,523 B1 * | 6/2001 | Mostrom | 340/928 |
| 6,653,946 B1 * | 11/2003 | Hassett | 340/928 |
| 2002/0105440 A1 * | 8/2002 | Bostrom et al. | 340/928 |

FOREIGN PATENT DOCUMENTS

| | | |
|---|---|---|
| GB | 2 295 476 | 5/1996 |
| JP | 7-253330 | 10/1995 |
| JP | 7-311045 | 11/1995 |
| JP | 8-7131 | 1/1996 |
| JP | 08-007138 | 1/1996 |
| JP | 8-96181 | 4/1996 |
| JP | 8-185550 | 7/1996 |
| JP | 8-221617 | 8/1996 |
| JP | 8-508357 | 9/1996 |
| JP | 8-293049 | 11/1996 |
| JP | 9-7011 | 1/1997 |
| JP | 9-128572 | 5/1997 |
| JP | 9-153156 | 6/1997 |
| JP | 9-212794 | 8/1997 |
| JP | 9-269236 | 10/1997 |
| JP | 9-319904 | 12/1997 |
| JP | 9-319906 A * | 12/1997 |
| JP | 9-326058 | 12/1997 |
| JP | 10-162185 A * | 6/1998 |
| JP | 10-222708 A * | 8/1998 |
| WO | WO 97/04421 | 2/1997 |

OTHER PUBLICATIONS

U.S. Appl. No. 09/984,071, filed Oct. 26, 2001, Furuta.

Japanese Office Action dated Feb. 28, 2006 for Appl. No.: 2002-533224.

European Search Report dated Mar. 23, 2006 for Appl. No. 99901144.8-2211.

\* cited by examiner

DEVICE MOUNTED IN VEHICLE PROCESSING FLOW

| Time t | | | | | Latitude and Longitude P (t) | | Area | Charge |
|---|---|---|---|---|---|---|---|---|
| Year | Month | Date | Hour | Minute | Longitude | Latitude | A (t) | |
| 1997 | 11 | 05 | 08 | 13 | E135-30-25 | N35-20-13 | G | * |
| 1997 | 11 | 05 | 08 | 14 | E135-30-49 | N35-19-58 | G | * |
| 1997 | 11 | 05 | 08 | 15 | E135-30-55 | N35-19-32 | F | * |
| 1997 | 11 | 05 | 08 | 16 | E135-31-01 | N35-19-25 | F | |
| ⋮ | ⋮ | ⋮ | ⋮ | ⋮ | ⋮ | ⋮ | ⋮ | |
| 1997 | 11 | 05 | 11 | 24 | E135-39-25 | N35-15-18 | B | |
| 1997 | 11 | 05 | 11 | 25 | E135-39-50 | N35-15-25 | B | |
| ⋮ | ⋮ | ⋮ | ⋮ | ⋮ | ⋮ | ⋮ | ⋮ | |

| Time t | | | | | Latitude and Longitude P (t) | | Area A (t) | Zone | Charge |
|---|---|---|---|---|---|---|---|---|---|
| Year | Month | Date | Hour | Minute | Longitude | Latitude | | | |
| 1997 | 11 | 05 | 08 | 13 | E135-30-25 | N35-20-13 | G | | * |
| 1997 | 11 | 05 | 08 | 14 | E135-30-49 | N35-19-58 | G | | * |
| 1997 | 11 | 05 | 08 | 15 | E135-30-55 | N35-19-32 | F | L1 | * |
| 1997 | 11 | 05 | 08 | 16 | E135-31-01 | N35-19-25 | F | L1 | |
| ⋮ | ⋮ | ⋮ | ⋮ | ⋮ | ⋮ | ⋮ | ⋮ | | |
| 1997 | 11 | 05 | 11 | 24 | E135-39-25 | N35-15-18 | B | Reserve | |
| 1997 | 11 | 05 | 11 | 25 | E135-39-50 | N35-15-25 | B | Reserve | |
| ⋮ | | | | | | | ⋮ | | |

Figure 72

| Position | Display Panel IC card | | Observation Lamp IC card | |
|---|---|---|---|---|
| | Not loaded | Loaded | Not loaded | Loaded |
| STP | | Balance ¥000 (Charge area) | All flashing | All on |
| PS1 | | (Approaching charge area) | All flashing | Lamp corresponding to vehicle classification flashes for predetermined time |
| PS2 | | (Entered charge area) | All flashing | Lamp corresponding to vehicle classification flashes for predetermined time |
| PS3 PS4 | | Charge amount: ¥00/entry Charge amount: ¥00/minute | All flashing | Lamp corresponding to vehicle classification turned on or flashing in pattern |
| PS5 EDP | | Outside charge area | All flashing | ·Charging begins normally (lamp corresponding to vehicle classification flashes for predetermined time) ·Charging ends normally (all off) ·Balance insufficient (all flashing until new card is loaded) |

| Time t | | | | | Latitude and Longitude P (t) | | Area | Charge |
|---|---|---|---|---|---|---|---|---|
| Year | Month | Date | Hour | Minute | Longitude | Latitude | A(t) | |
| 1997 | 11 | 05 | 08 | 13 | E135-30-25 | N35-20-13 | G | * |
| 1997 | 11 | 05 | 08 | 14 | E135-30-49 | N35-19-58 | G | * |
| 1997 | 11 | 05 | 08 | 15 | E135-30-55 | N35-19-32 | F | * |
| 1997 | 11 | 05 | 08 | 16 | E135-31-01 | N35-19-25 | F | |
| ⋮ | ⋮ | ⋮ | ⋮ | ⋮ | ⋮ | ⋮ | ⋮ | |
| 1997 | 11 | 05 | 11 | 24 | E135-39-25 | N35-15-18 | B | |
| 1997 | 11 | 05 | 11 | 25 | E135-39-50 | N35-15-25 | B | |
| ⋮ | ⋮ | ⋮ | ⋮ | ⋮ | ⋮ | ⋮ | ⋮ | |

| Item of information | Content of information | | |
|---|---|---|---|
| Charge Area Information | [N350000, E1360000] (First point) [N345900, E1360100] (Second point) | | |
| Toll information /entry | Heavy vehicle | Medium vehicle | Light vehicle |
| Time spot: 7:00 – 9:00 | ¥500 | ¥300 | ¥200 |
| Time spot: 17:00 – 19:00 | ¥500 | ¥300 | ¥200 |
| Time spot: other | ¥400 | ¥200 | ¥100 |
| Table valid period | 10 – 11 October, 1997 | | |
| Table valid area information | … (First point)   … (Second point) | | |

Figure 75

| Information Item | Information Content |   |   |   |   |   |   |
|---|---|---|---|---|---|---|---|
| Charge area information | [N350000, E1360000] (First point) | | | [N345900, E1360100] (Second point) | | | |
| Toll information /1 hour | Heavy vehicle | | Medium vehicle | | Light vehicle | | |
| | First hour | After first hour | First hour | After first hour | First hour | After first hour | |
| Time spot: 7:00 – 9:00 | ¥500 | ¥450 | ¥300 | ¥250 | ¥200 | ¥150 | |
| Time spot: 17:00 – 19:00 | ¥500 | ¥450 | ¥300 | ¥250 | ¥200 | ¥150 | |
| Time spot: other | ¥400 | ¥350 | ¥200 | ¥150 | ¥100 | ¥50 | |
| Table valid period | 10 – 11 October 1997 | | | | | | |
| Table valid area information | … (First point) | | | … (Second point) | | | |

Figure 76

| Information Item | Information Content | | | | | | |
|---|---|---|---|---|---|---|---|
| Charge area information | [N350000, E1360000] (First point) | | | [N345900, E1360100] (Second point) | | | |
| Toll information /1 hour | Heavy vehicle | | Medium vehicle | | Light vehicle | | |
| | First kilometer | After first kilometer | First kilometer | After first kilometer | First kilometer | After first kilometer | |
| Time spot: 7:00 – 9:00 | ¥500 | ¥450 | ¥300 | ¥250 | ¥200 | ¥150 | |
| Time spot: 17:00 – 19:00 | ¥500 | ¥450 | ¥300 | ¥250 | ¥200 | ¥150 | |
| Time spot: other | ¥400 | ¥350 | ¥200 | ¥150 | ¥100 | ¥50 | |
| Table valid period | 10 – 11 October 1997 | | | | | | |
| Table valid area information | … (First point)      … (Second point) | | | | | | |

Figure 77

| Item of information | Content of information | | |
|---|---|---|---|
| Charge Area Information | [N350000, E1360000] (First point) <br> [N345900, E1360100] (Second point) | | |
| Toll information /entry | Heavy vehicle | Medium vehicle | Light vehicle |
| Time spot: 7:00 – 9:00 | ¥500 | ¥300 | ¥200 |
| Time spot: 17:00 – 19:00 | ¥500 | ¥300 | ¥200 |
| Time spot: other | ¥400 | ¥200 | ¥100 |
| Table valid period | 10 – 11 October, 1997 | | |
| Table valid area information | … (First point) … (Second point) | | |

Figure 78

| Information Item | Information Content | | | | | | | |
|---|---|---|---|---|---|---|---|---|
| Charge area information | [N345900, E1360100] (Second point) [N350000, E1360000] (First point) | | | | | | | |
| Toll information /1 hour | Heavy vehicle | | Medium vehicle | | Light vehicle | | | |
| | First hour | After first hour | First hour | After first hour | First hour | After first hour | | |
| Time spot: 7:00 – 9:00 | ¥500 | ¥450 | ¥300 | ¥250 | ¥200 | ¥150 | | |
| Time spot: 17:00 – 19:00 | ¥500 | ¥450 | ¥300 | ¥250 | ¥200 | ¥150 | | |
| Time spot: other | ¥400 | ¥350 | ¥200 | ¥150 | ¥100 | ¥50 | | |
| Table valid period | 10 – 11 October 1997 | | | | | | | |
| Table valid area information | … (First point) … (Second point) | | | | | | | |

Figure 79

| Information Item | Information Content | | | | | | | | |
|---|---|---|---|---|---|---|---|---|---|
| Charge area information | [N350000, E1360000] (First point) | | | | [N345900, E1360100] (Second point) | | | | |
| Toll information / 1 hour | Heavy vehicle | | Medium vehicle | | | Light vehicle | | | |
| | First kilometer | After first kilometer | First kilometer | | After first kilometer | First kilometer | | After first kilometer | |
| Time spot: 7:00 – 9:00 | ¥500 | ¥450 | ¥300 | | ¥250 | ¥200 | | ¥150 | |
| Time spot: 17:00 – 19:00 | ¥500 | ¥450 | ¥300 | | ¥250 | ¥200 | | ¥150 | |
| Time spot: other | ¥400 | ¥350 | ¥200 | | ¥150 | ¥100 | | ¥50 | |
| Table valid period | 10 – 11 October 1997 | | | | | | | | |
| Table valid area information | … (First point) | | | | … (Second point) | | | | |

Figure 80

Charge table when charging per entry

| Item of information | Content of information | | | |
|---|---|---|---|---|
| Charge Area Information | [N350000, E1360000] (First point)<br>[N345900, E1360100] (Second point) | | | |
| Toll information /entry | Heavy vehicle | Medium vehicle | Light vehicle | |
| Time spot: 7:00 – 9:00 | ¥500 | ¥300 | ¥200 | |
| Time spot: 17:00 – 19:00 | ¥500 | ¥300 | ¥200 | |
| Time spot: other | ¥400 | ¥200 | ¥100 | |
| Table valid period | 10 – 11 October, 1997 | | | |
| Table valid area information | … (First point) … (Second point) | | | |

Figure 81

| Date and time | Balance | Position | Distance traveled | Length of stay | Card reader | Card | GPS |
|---|---|---|---|---|---|---|---|
| 01/01/1998 10:10 | 09750 | N350000, E1370000 | XX | XX | Normal | Present | Normal |
| 01/01/1998 10:11 | 09750 | N350000, E1370001 | XX | XX | Normal | Present | Normal |
| 01/01/1998 10:12 | 09750 | N350000, E1370002 | XX | XX | Normal | Present | Normal |

End of Appendix

CHARGE PROCESSING DEVICE CHARGE PROCESSING SYSTEM AND CHARGE PROCESSING CARD

BACKGROUND

The inventions described herein relate in general to a charge processing device, a charge processing system, and a charge processing card. More specifically, the inventions relate to a charge processing device, a charge processing system, and a charge processing card for collecting tolls and the like using position information wirelessly between a moving body such as a vehicle and the ground, and for processing charges to easily collect fees that are due.

A moving body such as a vehicle travels along a road or the like. A vehicle that travels on a toll paying installation such as a toll road is charged in accordance with the type of the vehicle as well as the distance traveled on the toll road. In order to automatically collect the toll at an entry gate or exit gate of the toll road, a road—vehicle intercommunication system for performing wireless information transfer between an in-vehicle device and an on-road device is used. In this system, a communication device having an antenna for sending and receiving electrical waves (i.e. the on-road device) is provided on the road as an interrogator for seeking information on the relevant vehicle. In addition, a communication device having an antenna (i.e. the in-vehicle device) is provided in the vehicle as a responder for responding to the sought information.

Technology is proposed in, for example, Japanese Patent Application Laid-Open (JP-A) No. 9-212794, in which a toll is collected from a vehicle based on the location where the vehicle entered the toll road, the location where the vehicle exited from the toll road, and the history of the route traveled by the vehicle.

However, when this type of road—vehicle intercommunication system is used to transfer information, it is necessary to install an on-road device at the entries and exits of the area for which a toll is to be charged, such as the entry gates and exit gates of a toll road. If the area for which a toll is to be charged, such as a toll road, is one-dimensional, the installation of the on-road devices is easy, however, if the area in which a charge is applied is set as a zone or the like covering a wide range, it is necessary to install on-road devices at all of the entries and exits, so consequently, the cost increases in accordance with the number of entry and exit locations.

road—vehicle intercommunication system also exists in which charge processing is performed by the wireless transfer of information between an in-vehicle device and an on-road device. In this system, balance information is stored in advance in a prepaid card or IC card or the like, and the charge processing is performed by subtracting the toll to be collected from this balance information.

When the toll collection is performed automatically in this way, if the vehicle user does not possess a prepaid card or IC card or the like, or if the balance of the card is insufficient, it is not possible for the toll collection to be properly performed. Therefore, technology is proposed in which an external notification lamp is provided inside the vehicle, and when it is not possible for the proper toll to be collected from a vehicle this fact is notified to the exterior of the vehicle by the external notification lamp (see JP-A No. 8-7131). In this technology, when the proper toll cannot be collected from a vehicle that is fitted with the above road—vehicle intercommunication system and the vehicle passes over an entry gate or exit gate, the exterior facing lamp of the in-vehicle device is either turned on or turned off, thereby enabling an observer to easily observe that the proper toll has not been collected.

However, in this road-vehicle intercommunication system, although information is transferred by installing on-road devices at entries and exits of the area in which a charge is applied such as at the entry gates and exit gates of a toll road, when the area in which a charge is applied is set as a zone or the like covering a wide range where the entry and exit points cannot be specified, it is necessary to install on-road devices at all of the foreseeable entry and exit locations, and to establish a large number of observers.

A further example of a road—vehicle intercommunication system for performing charge processing by the wireless transfer of information between an in-vehicle device and an on-road device is proposed in JP-A No. 8-221617. In this technology, a toll is collected from a vehicle that passes over the communication area of an on-road antenna installed on the road.

However, in this road—vehicle intercommunication system, although information is transferred by installing on-road devices at entries and exits of the area in which a charge is applied such as at the entry gates and exit gates of a toll road, when the area in which a charge is applied is set as a zone or the like covering a wide range where the entry and exit points cannot be specified, it is necessary to install on-road devices at all of the foreseeable entry and exit locations.

Moreover, a charge processing system is proposed in JP-A No. 9-153156 in order for the charge processing to be more easily performed. In this system, balance information is stored in advance in an IC card or the like and the charge is processed by subtracting the toll to be collected from this balance information.

However, in this system, although information is transferred by installing on-road devices at entries and exits of the area in which a charge is applied such as at the entry gates and exit gates of a toll road, when the area in which a charge is applied is set as a zone or the like covering a wide range where the entry and exit points cannot be specified, it is necessary to install on-road devices at all of the foreseeable entry and exit locations. Moreover, this system cannot be applied when the area in which a charge is applied varies.

A further system is proposed in which vehicle transit determining devices are installed on a plurality of routes, and the charge is made by determining which route of the plurality of routes the vehicle traveled over. An example of this system is given in JP-A No. 9-212794. The system installation of this system is simple on toll roads network on which there are a few branch routes or entries and exits (interchanges) and having comparatively long distances between interchanges as only a few vehicle transit determining devices need to be installed.

However, if the toll road network is one having many branch routes and entries and exits (interchanges), and is one in which, although there are many sections with short distances between interchanges, the total distance of the road network as a whole is large, in cases such as this, the number of vehicle transit determining devices installed increases and the installation costs and maintenance costs are great. Moreover, in the above cases, it is only possible to obtain charge information of the toll road network within the area of control of the toll road network or directly in front of the entries thereto. Thus, it is difficult in the area a sufficient distance before the interchange for allowing such a detour route selection to be made to obtain information for deciding whether to use a toll road (i.e. to enter the toll gate) or whether to make a detour and use a surface non-toll road.

It is also possible to consider charges or traffic regulations in a specific area as a means of easing traffic congestion, reducing atmospheric pollution, reducing noise, obtaining regional revenue, or the like. In this case, if the road network of the subject area is complex and intricate, in the above charge system, it is necessary to install vehicle transit determining devices on a large number of the roads within the area. Consequently, the resulting high density installation is high in cost while the physical installation may be difficult depending on the location. Furthermore, if a charge is made or not made depending on the season (or month or day) or the time of day, or if the amount charged is changed, this information needs to be made known throughout the large number of roads running in and out of the area.

Conventionally, notification is made using a notice board or an electric sign board, however, in order to make the notification as wide as possible so as to enable a driver to avoid the area and choose a detour route, it is necessary to provide the notice board or the like some distance outside of the relevant area, which becomes a colossal undertaking. Moreover, the expense required for the work involved when tolls are revised or an area is altered is also great. To this can be added the burden of accurately informing a driver at the proper time the notification information of the notice board or the like.

When a driver exits a toll road using a balance renewable prepaid card, information indicating the route traveled is transmitted from the vehicle to an antenna terminal. The antenna terminal then calculates the toll for the traveled route and transmits the toll to the vehicle, where the vehicle subtracts the toll from the prepaid card. There is accordingly no need to stop the vehicle in order to pay the toll.

However, if the toll road is one having many branch routes and entries and exits (interchanges), and is one in which, although there are many sections with short distances between interchanges, the total distance of the road network as a whole is large, in cases such as this, the number of vehicle transit determining devices installed increases and the installation costs and maintenance costs are great. Consideration may also be given to exacting charges in a specific area as a means of easing traffic congestion, reducing atmospheric pollution, reducing noise, obtaining regional revenue, or the like. In contrast to a charge area in which the highway network is a narrow continuous distribution, the charge area for a specific area such as that described above is an isolated area covering a large surface area. In this case, there is a high probability that the road network within the area will be complex, and the establishment of tollbooths for stopping a vehicle to collect charges is not feasible. Instead, the employing of an automatic charge processing system that uses a communication device and a prepaid card or some other electronic information storage medium is desirable.

The possibility of the prepaid card being illegally used needs to be considered, however. In fact, not only when prepaid cards are used, but when charge processing is performed using a storage medium or by telecommunication, the possibility exists that information on the storage medium will be illegally altered, or that illegal communication information will be sent, or that the storage medium will be used illegally or intentionally not used. Thus, it can be seen that there is a need for measures against illegalities in automatic charge processing in a non-stop automatic charge processing system in which it is not practically possible for the controller to observe or examine the storage medium or communication device.

The inventions described herein were conceived in view of the above, and they provide a charge processing device, a charge processing system, and a charge processing card which have a simple structure and which enable the processing of a charge to the user of a moving body such as a vehicle or the like to be performed with ease.

The inventions also provide a charge processing device, a charge processing system, and a charge processing card which enable confirmation of the charge condition, for example, whether or not a toll has been collected, in a area in which a charge is applied to be made with ease.

The claimed inventions allow the following to be performed. Namely, the automatic notification to a person of control information for a specific area and of that person's positional relationship relative to that specific area; the simplification of the transmission of information of the specific area and the altering of that information; the comparative simplification of the installation of system elements and the enhancement of the reliability of the control information notification; and the simplification of the charge processing of a vehicle that has entered into the area in which a charge is applied and of the charge information control.

The claimed inventions also allow the following to be performed. Namely, doing away with the need for the large scale installation of a fixed facility without causing any problems in the toll payment; the simplification of the transmission of information of the specific area and the altering of that information; and the simplification of the charge processing of a vehicle that has entered into the area in which a charge is applied and of the charge information control.

The claimed inventions also allow the following to be performed. Namely, the simplification of the automatic observation of an intentional attempt to render inoperable a device carried by a user or mounted on a vehicle in order to allow illegal use or to enable a charge to be avoided; the simplification of the data collection for that purpose; the doing away with the need for the large scale installation of a fixed facility without causing any problems in the toll payment; the simplification of the transmission of information of the specific area and the altering of that information; and the simplification of the charge processing of a vehicle that has entered into the area in which a charge is applied and of the charge information control.

SUMMARY

The charge processing device, the charge processing method, and the charge processing card having the structures described below were invented in order to overcome various operational inadequacies of known systems and arrangements.

According to one aspect of the inventions, there is provided a charge processing device including: detecting means for detecting position information indicating the position where a moving body is located; matching means for matching the position information with predetermined map information; setting means for, based on the map information, setting an area where a charge is applied which area corresponds to a predetermined area in the map information; deciding means for, based on a result of the matching by the matching means, deciding an entry state indicating whether or not the moving body has at least entered into the area where a charge is applied which area corresponds to a predetermined area in the map information; and generating means for generating, based on a result of the deciding by the deciding means, charge information for the moving body.

A detecting means detects position information representing the current position of a moving body. A navigation system for mounting in a vehicle serving as the moving body which enables the display of a map for aiding traveling and providing instructions on a route to a destination can be used as this detecting means. As is commonly known, this navigation system can use a GPS system to easily detect the position of the moving body in which it is mounted (i.e. the host moving body), for example, a position determined by latitude and longitude. It is also possible to provide in the moving body a sending means such as a sender unit or the like for sending a signal that contains identifying data for identifying the moving body, and receiving on the ground side the sent signal so that the host position information is detected on the ground side.

The matching means matches the position information detected by the detecting means with preset map information. Namely, because the position where the moving body is located can be pinpointed from the position information, at this position, for example, a position set as a latitude and longitude, the moving body is able to be matched with predetermined map information such as a map of a predetermined area from among maps of Japan or maps of the Tokyo area.

The deciding means decides, on the basis of the result of the matching by the matching means, an entry state representing at least whether or not the moving body has entered into an area where a charge is applied that corresponds to a predetermined area set in advance in the map information. The current position of the moving body is matched with map information by the matching means. A predetermined area corresponding to a area in which a charge is applied that is set in advance is set on the map information. As a result, by determining whether or not the current position of the moving body matched to the map information is within the area in which a charge is applied, it is possible to determine whether or not the moving body has at least entered into the area in which a charge is applied. Consequently, the deciding means decides the representation of whether or not the moving body has at least entered into the area in which a charge is applied as an entry state. Further, on the basis of the map information, the setting means sets the area where a charge is applied which area corresponds to a predetermined region in the map information.

The generating means generates charge information for a moving body based on the result of the deciding by the deciding means. For example, the toll that should be collected from a moving body within the area in which a charge is applied is determined in advance. Accordingly, because a predetermined toll should be charged when a moving body enters into the area in which a charge is applied, the toll that should be charged on the moving body that has entered into the area in which a charge is applied is generated as charge information at a predetermined period.

In this way, in the charge processing device of the present invention, because the position of a moving body detected by a detecting means is matched with map information, and the state of entry representing whether or not the moving body has entered into an area in which a charge is applied is decided, and charge information for the moving body is generated in accordance with the state of entry, it is possible to perform charge processing for the user of a moving body using a simple structure simply by generating charge information for a moving body in accordance with the entry state thereof, without having to install on-road devices in all the entry and exit locations such as entry and exit gates.

According to another aspect of the inventions, there is provided a further comprising location information detecting means for detecting, based on the position information, location information indicating date and time the moving body is located in the area in which a charge is applied, wherein the deciding means decides, based on the result of the matching by the matching means and a result of a detection by the location information detecting means, the entry state including a location state of the moving body within the area in which a charge is applied.

A constant charge is not applied in the area in which a charge is applied. Instead, the charge application depends on a predetermined time or time zone, the date or week, or a combination of these. Therefore, the charge processing device further comprises presence information detecting means for detecting, based on the position information, presence information representing the date and time the moving body is present in the area in which a charge is applied. It is possible to detect presence information representing the date and time the moving body is present within the area in which a charge is applied using the presence information detecting means. The deciding means decides, based on a result of a matching by the matching means and a result of a detection by the presence information detecting means, an entry state including a present state of the moving body within the area in which a charge is applied. As a result, it is possible to generate charge information for a moving body that only enters into the area in which a charge is applied when the charge is for the predetermined time or time period, the date or week, or combination of these.

In some cases, the driver is unaware that the area in which the moving body is currently traveling is a area in which a charge is applied or that the moving body is approaching and about to enter a area in which a charge is applied. Therefore, in the charge processing device, it is possible to further provide a notification means for giving advance information, when the moving body is approaching or has entered a area in which a charge is applied, expressing that the moving body is approaching a area in which a charge is applied or has entered a area in which a charge is applied based on the above position information. By further providing in this way a notification means for giving advance information, when the moving body is approaching or has entered a area in which a charge is applied, expressing that the moving body is approaching a area in which a charge is applied or has entered a area in which a charge is applied based on the above position information, it is possible to notify the driver when the moving body has entered a area in which a charge is applied or is approaching and is about to enter a area in which a charge is applied, thereby making it easy for the driver to decide on a course of action relating to their entry into a area in which a charge is applied or the like.

Moreover, in some cases, a constant charge is not applied in the area in which a charge is applied. Instead, the charge application depends on a predetermined time or time zone, the date or week, or a combination of these. Therefore, in the charge processing device, the notification means is able to give advance information including the time for which a charge is to be applied in the area in which a charge is applied when the moving body is approaching or has entered a area in which a charge is applied. If the notification means is able in this way to give advance information including the charge applicable time in the area in which a charge is applied when the moving body is approaching or has entered a area in which a charge is applied, it is possible to notify the driver of information including the charge applicable time in the area in which a charge is applied when the moving body has entered a area in which a charge is applied or is approaching and is about to enter a area in which a charge is applied, thereby making it easy for the driver to be aware that they have entered into a area in which a charge is applied or the like having times for which charges are applied.

According to another aspect of the inventions, there is provided a charge processing device wherein the generating means decides the entry state including a congestion state caused by moving bodies located in the area in which a charge is applied.

In some cases, the charge application of the area in which a charge is applied is set in accordance with the largeness of number of moving bodies that have entered the area in which a charge is applied, namely, in accordance with the state of congestion. In other words, the charge application of the area in which a charge is applied is set in accordance with when a predetermined state of congestion has been exceeded. Therefore, the generating means decides a state of entry including a state of congestion caused by moving bodies present in the area in which a charge is applied. If the state of entry is decided in this way with the state of congestion included therein, then even when the toll differs in accordance with the state of congestion of the area in which a charge is applied, because the state of congestion is included in the state of entry, it is possible to easily generate charge information for a moving body in accordance with the state of congestion. This can also apply when the toll differs for a predetermined time or time zone, the date or week, or a combination of these.

According to another aspect of the inventions, there is provided a charge processing device wherein the generating means is further provided with storage means in which predetermined toll data corresponding to the entry state is stored in advance, and the generating means generates the charge information using the toll data in the storage means.

The toll for the charge processing is determined in advance. Therefore, the generating means is further provided with storage means in which predetermined toll data corresponding to the state of entry is stored in advance, and by generating the charge information using the toll data in the storage means, the generating means is able to generate the simplest and most appropriate charge information.

According to another aspect of the inventions, there is provided a charge processing device including: host position detecting means for detecting a position of a host moving body; transceiving means for, by wireless communication, transmitting position information of a host moving body to the ground and receiving charge data relating to an area where a charge is applied which area is set based on predetermined map information in correspondence with a predetermined area in the map information; and charge processing means for performing charge processing relating to the area in which a charge is applied, at a predetermined period and based on a result of a transmission and reception by the transceiving means, wherein the host position detecting means, the transceiving means, and the charge processing means are able to be mounted on a moving body.

According to another aspect of the inventions, the position of the host moving body is housed is detected by the host moving body detecting means. As a result, it is possible to detect in the moving body the position of the host moving body side. The aforementioned navigation system or the like, for example, can be employed for the host moving body detecting means. By wireless communication, the transceiving means transmits position information of a host moving body to the ground, and receives charge data relating to the area where a charge is applied which area is set based on predetermined map information in correspondence with a predetermined area in the map information. Namely, the detected position of host moving body is transmitted to the ground by a transceiving means, while the charge data obtained on the ground, namely, predetermined charge data relating to the area in which a charge is applied is received. Data expressing the toll to be collected can be used for this charge data. The charge processing means performs, at a predetermined period, charge processing relating to the area in which a charge is applied based on the results of transmissions and receptions by the transceiving means. Namely, charge processing is performed using charge data such as the toll to be collected and the like determined on the ground.

According to another aspect of the inventions, the charge processing means processes a charge using an IC card on which balance information is stored.

Namely, an IC card on which balance information is stored can be used by the charge processing means.

According to another aspect of the inventions there is provided a charge processing device comprising: detecting means for detecting position information representing the position where a vehicle is located; charge means for, based on a result of a detection by the detecting means, executing charge processing for the vehicle when the vehicle has entered into an area where a charge is applied which area is set based on predetermined map information in correspondence with a predetermined area in the map information; notification means which is mounted on the vehicle and which notifies the outside of the vehicle of a processing state of the charge processing in a notifying state corresponding to the processing state; and continuing means for continuing a notification by the notification means during the vehicle is located inside the area in which a charge is applied, based on a result of the detection by the detecting means.

Detecting means detects position information representing the position where a moving body is present. A navigation system mounted in a vehicle that enables the display of a map for aiding traveling or indicating a route to a destination can be used for this detecting means. As is commonly known, this navigation system can use a GPS system to easily detect the position of the vehicle in which it is mounted, for example, a position determined by latitude and longitude. It is also possible that in the vehicle side, a sending means such as a sender unit or the like for sending a signal that contains identifying data for identifying the host vehicle is provided, and in the ground side, the sent signal is received so that the position information is detected on the ground side.

Because it is possible to detect the position of the presence of a vehicle from the position information, the vehicle can be matched with this position, for example, with a position determined by latitude and longitude, on map information determined in advance, such as a map of a predetermined region from among maps of Japan or maps of the Tokyo area.

The charge means executes charge processing for a vehicle when the vehicle has entered into a predetermined area in which a charge is applied, based on a result of a detection by the detecting means. For example, when a predetermined area in which a charge is applied is determined in advance on map information, by making a determination as to whether or not the position of the presence of a vehicle that has been matched to the map information is within the area in which a charge is applied, it is possible to determine whether or not the vehicle has at least entered into the area in which a charge is applied. Moreover, for example, the toll to be collected from a vehicle that is present within the area in which a charge is applied is determined in advance. Accordingly, when a vehicle enters the area in which a charge is applied, because a predetermined toll should be charged, the toll that should be charged for the vehicle that has entered the area in which a charge is applied is collected. The charge, namely, the collection of the toll is performed by settling the toll from a settlement account such as a card containing balance information such as a prepaid card or an IC card or the like, a bank account or credit card associated with the vehicle user, or the like.

The notification means mounted in the vehicle notifies the outside of the vehicle of the processing state of the charge processing in a notifying state corresponding to the processing state. The processing state may be at least a proper state that represents a state where a charge is properly made, or an improper state that represent a state where a charge is not made. If notification of one of these states is made, it is possible to confirm whether or not the charge has been properly made from outside the vehicle. Therefore, for example, by corresponding a notification state where notification is being made with the processing state being a proper state, and by corresponding a notification state where no notification is being made with the processing state being an improper state, it is possible to confirm that a charge has been properly made from outside the vehicle simply by determining whether notification is being made or not being made. It is not always certain that this notification for confirming the processing state will be made at a location where an observer or the like is stationed. Therefore, the continuing means continues a notification by the notification means while the vehicle is present inside the area in which a charge is applied, based on a result of a detection by the detecting means.

Thus, in the charge state notification device for a vehicle of the present invention, because the processing state of the charge processing performed when a vehicle has entered a area in which a charge is applied, which is known from the position of the vehicle detected by the detecting means, can be notified continuously within the area in which a charge is applied, the processing state can be confirmed from an arbitrary position within the area in which a charge is applied without installing on-road devices at every likely location of entry and exit such as entry and exit gates.

The notification means can be a radiation means for radiating electromagnetic waves towards the outside of a vehicle.

A radiation means for radiating electromagnetic waves towards the outside of a vehicle can be used as the notification means. These electromagnetic waves may be light in the visible wavelength band or infrared light, microwaves or radio waves including faint waves. By using electromagnetic waves in this way, the notification state can be expressed using predetermined frequencies and cycles, and amplitude waveforms.

The notification means can be constructed as a light source disposed on the detecting means, or on a number plate of a vehicle, or in an area around a number plate of a vehicle.

If the notification means is disposed at a location inside the vehicle that is difficult to observe from the outside, the confirmation of the processing state of the charge processing, namely, the confirmation of the notification state is difficult from outside the vehicle. Therefore, the notification means is formed from a light source disposed on the detecting means, or on a number plate of a vehicle, or in an area around a number plate of a vehicle. As a result, it is easy for an observer or the like to visually confirm the processing state of the charge processing.

The notification means performs notification in a predetermined operating pattern in which the notification state is altered as in a time series.

When notification of either one of a proper state expressing a state where a charge has been properly made, and an improper state representing a state where a charge has not been made is made by the notification means, in some cases the notification, namely, the radiation of electromagnetic waves or the turning on of a light source, of a single notification state may be recognized by a third party other than the observer. Therefore, as described in claim 10, the notification means performs notification in a predetermined operating pattern in which the notification state is altered in the manner of a time series. This operating pattern may be a pattern formed from a combination of a plurality of operating states, with the notification states indicated by predetermined electromagnetic wave frequencies, predetermined radiation intensities, and turning on or off of the light source at a predetermined timing and the like. By making a notification in a predetermined operating pattern in this way, it is possible to make it difficult for a third party to recognize the notification.

The notification means can be further provided with receiving means for receiving a pattern signal representing the operating pattern, and notification of the processing state is made to the outside of a vehicle based on the pattern signal.

When the operating pattern is set inside the vehicle, it is possible for the operating pattern to be analyzed by a third party using reverse engineering or the like. Therefore, as described in claim 11, the notification means is further provided with receiving means for receiving a pattern signal representing the operating pattern. The operating pattern is set in advance outside the vehicle and is transmitted to the vehicle. The notification means then notifies the outside of the vehicle as to the processing state, based on the received pattern signal. As a result, analysis or recognition of the it by a third party is made difficult.

The notification means can be structured from a vehicle exterior notification means for notifying the outside of the vehicle of the processing state, and a vehicle interior notification means for notifying the inside of the vehicle of the processing state, and notification of the processing state is made to the interior and exterior of the vehicle.

Confirmation of the processing state of the charge processing is easy from the outside of the vehicle, however, it is not possible for a driver who is inside the vehicle to be aware of the processing state of the charge processing. Therefore, the notification means can be structured from a vehicle exterior notification means for notifying the outside of the vehicle of the processing state, and a vehicle interior notification means for notifying the inside of the vehicle of the processing state. By notifying the interior and exterior of the vehicle of the processing state, it is possible to notify both an observer outside the vehicle and the driver inside the vehicle as to the processing state. Note that, when the notification mean is structured using lamps or the like which emit light, if the lamps are housed in predetermined housings and light is irradiated in directions opposite each other of the vehicle exterior notification means and the vehicle interior notification means, it is possible to easily notify the observer outside the vehicle and the driver inside the vehicle as to the processing state.

An observation means can be provided for observing a notification from the notification means provided in the charge processing device.

It is necessary to observe from outside the vehicle the processing state that has been notified to the outside of the vehicle. Therefore, in the charge state observation device, there can be provided observation means for observing a notification from the notification means provided in the charge state notification device for a vehicle. As described above, a device for detecting electromagnetic waves can be employed for this observation means. As a result, it is possible to easily observe the notification from outside the vehicle.

The observation means observes a notification by detecting at least brightness.

Notification of the processing state to the outside is often made by electromagnetic waves, however, it is preferable if a light source is used and the notification is made using changes in the amount of light or by flashing the light. Therefore, as described in claim 14, a notification is observed by the observation means detecting at least brightness. As a result, it is possible to make an observation corresponding to the processing state notified by changes in the amount of light or by flashing the light when a light source is used.

The observation means is an image pickup means capable of picking up either one or a plurality of images having at least brightness.

It is possible to use an image pickup means capable of picking up either one or a plurality of images having at least brightness as the observation means. For example, an apparatus having an image pickup element such as a TV camera or an image sensor or the like can be used. If this image pickup means is used, it is possible to easily detect the notification state when notification is made using variations in brightness.

The observation means observes a notification by detecting at least brightness in synchronization with an observation pattern determined in advance that varies in the manner of a time series.

In order to prevent a processing state notified to the outside of a vehicle from being recognized by, for example, a third party other than the observer, in some cases, the processing state is notified in a predetermined operating pattern in which the notification state is altered in the manner of a time series. Therefore, as was described in claim 16, the observation means observes a notification by detecting at least brightness in synchronization with an observation pattern determined in advance that varies in the manner of a time series. As a result, because it is made in synchronization with the pattern of the notified processing state, the observation of the notification state can be simplified.

Namely, when an image pickup means is used, as is described above, the observation means is able to observe a notification by detecting at least brightness in synchronization with an observation pattern determined in advance that varies in the manner of a time series. For example, in a notification state in which a lamp is flashed on and off for the proper state, if an image is picked up coinciding with this flashing on and off, it can be easily determined that the notification state is proper only when the obtained brightness is constantly bright. Moreover, when the flashing is not in synchronization with this flashing, the notification state includes dark moments, therefore, it can be easily determined that the notification state is not a proper state.

The observation means can be further provided with reception means for receiving a pattern signal indicating an observation pattern, and the observation means observes a notification in synchronization with an observation pattern based on the pattern signal.

When the observation is synchronized with an observation pattern, if the same pattern is constantly used, it is possible that it will be recognized by a third party. Therefore, by further providing the observation means with reception means for receiving a pattern signal indicating an observation pattern, and the observation means observing a notification in synchronization with an observation pattern based on the pattern signal, it is possible to provide a degree of confidentiality to the observation pattern, and to easily increase the reliability of the observation of the processing state of the charge processing from outside the vehicle.

The charge processing device being further provided with deciding means for deciding the charge processing state based the result on an observation by the observation means.

If the result of an observation by the observation means is used, the processing state can be easily decided automatically. Therefore, the charge processing device is further provided with deciding means for deciding the processing state of the charge processing based the result on an observation by the observation means. As a result, it is possible to easily decide the processing state of the charge processing automatically from outside the vehicle, simplifying the observation.

The deciding means can be provided with comparing means for comparing the state of a notification obtained by the observation means with a predetermined notification state, and processing deciding means for deciding the state of the charge processing based on the result of a comparison by the comparing means.

In order for a distinction to be made between a normal state and an abnormal state, the notification states are able to be distinguished between a predetermined notification state and notification states other than the predetermined notification state. Therefore, by providing the deciding means with comparing means for comparing the state of a notification obtained by the observation means with a predetermined notification state, and with processing deciding means for deciding the processing state of the charge processing based on the result of a comparison by the comparing means, the distinguishing of the notification state is simplified and it is possible to observe processing state of the charge processing easily from outside the vehicle.

According to another aspect of the inventions, there is provided a charge processing device comprising: receiving means for receiving a pattern signal indicating an observation pattern altered in the manner of a time series in order to observe a notification from a notification means provided in the charge processing device; and display means for displaying notification information corresponding to the observation pattern in synchronization with the observation pattern based on the pattern signal, wherein each of the above receiving means and display means is portable.

It is difficult to observe at an arbitrary location on an irregular basis a charge state observation device when the device itself is large and has little mobility. Therefore, as described in claim 20, a portable charge state observation device is formed comprising: receiving means for receiving a pattern signal indicating an observation pattern altered in the manner of a time series in order to observe a notification from a notification means provided in the charge processing device; and display means for displaying notification information corresponding to the observation pattern in synchronization with the observation pattern based on the pattern signal. As a result, the convenience and mobility of the charge state observation is improved.

In claim 21 of the present invention, in the charge processing device according to claim 20 of the present invention, the display means displays observation information via at least one of sound and light.

By displaying notification information via at least one of sound and light, the display means is easily able to display observation information corresponding to an observation pattern.

According to another aspect of the inventions, there is provided a charge processing device comprising: detecting means for detecting position information indicating the position where a vehicle is located; matching means for matching the position information with predetermined map information; setting means for, based on the map information, setting an area where a charge is applied which area corresponds to a predetermined area in the map information; deciding means for, based on a result of the matching by the matching means, deciding an entry state indicating whether or not the moving body has at least entered into the area where a charge is applied; and making means for, based on a result of a decision by the deciding means, generating charge information for the moving body in the area where a charge is applied, as well as preparing, at a predetermined period, a charge history of the generated charge information; and transmitting means for transmitting a charge history of charge information generated by the generating means to the ground.

In the charge processing device according to claim 22 of the present invention, detecting means detects position information indicating the position where a vehicle is located. A navigation system for a vehicle capable of displaying a map for assisting driving and giving instructions on a route to a destination can be used for this detection means. The making means creates charge information for the vehicle in a predetermined area where a charge is applied, and also makes a charge history of the created charge information based on a result of a detection by the detecting means. For example, the toll that should be collected from a vehicle located in a area in which a charge is applied is determined such that the amount of the charge is determined from the number of times the vehicle entered the area in which a charge is applied and the length of time the vehicle was in the area in which a charge is applied. Consequently, the number of entries into the area in which a charge is applied and the length of stay in the area in which a charge is applied are generated as charge information. Because the charge is made in relation to the charge information from the entry and length of stay and the like of the vehicle in the area in which a charge is applied, the charge history of the charge information generated by the generating means is transmitted to the ground side by transmitting means. As a result, at the ground side, it is possible to collect the toll that should be charged to the vehicle that entered or stayed in the area in which a charge is applied. The collection of this charge, namely, of the toll can be performed by approving the toll from an approved account such as a bank account or credit card or the like associated with the user of the vehicle, or from a card on which balance information is stored such as a prepaid card or IC card or the like.

The vehicle travels on the ground, and almost every position thereof can be specified by a map. Thus, the making means further comprises matching means for matching the predetermined map information and the position information; and deciding means for, based on a result of the matching by the matching means, deciding an entry state indicating whether or not the vehicle has at least entered into the predetermined area where a charge is applied which is in the map information. The position where the vehicle is located can be specified from the position information. Thus, the matching means can match the vehicle to this position, for example, to a position determined by latitude and longitude, on map information determined in advance, such as a map of a predetermined region from among maps of Japan, or maps of the Tokyo area.

Based on a result of the matching by the matching means, the deciding means decides an entry state indicating whether or not the vehicle has at least entered into the predetermined area where a charge is applied which is in the map information. The position where the vehicle exists on the map information is matched by the matching means. The area where a charge is applied is determined on the map information. Accordingly, if it is determined whether the position where the vehicle is located, which has been matched on the map information, is included in the area where a charge is applied, it can be determined whether the vehicle has at least entered into the area where a charge is applied.

In this way, the deciding means decides, as the entry state, whether or not the vehicle has at least entered into the area where a charge is applied. The generating means generates the charge information for the vehicle, based on the result of the deciding by the deciding means. For example, the toll to be collected for a vehicle which is located in an area where a charge is applied is determined in advance. Accordingly, when the vehicle enters into the area where a charge is applied, the toll determined in advance should be charged, and thus, the toll which should be charged for the vehicle which has entered therein is generated as the charge information.

The making means can be formed from generating means for generating charge information for each of a plurality of existing area in which a charge is applieds, and accumulating means for accumulating in sequence the created charge information as charge history.

The making means can be formed from generating means for generating charge information for each of a plurality of existing area in which a charge is applied, and accumulating means for accumulating in sequence the generated charge information as charge history. By using this construction, even when a plurality of area in which a charge is applied are scattered around or are grouped together, because the charge information of each area in which a charge is applied is accumulated as charge history in the accumulating means, the entry into or length stay or the like of a vehicle in a plurality of area in which a charge is applied can be easily ascertained.

The detecting means detects the position information using satellite signals from satellites.

In the detection of a vehicle, it is possible to provide in the vehicle a transmitting means such as a transmitter or the like for transmitting a signal that contains identification data for identifying the host vehicle, and to receive this transmitted signal on the ground so as to detect the position information on the ground, or to detect the position information in the vehicle via a navigation system. As is widely known, a navigation system uses a GPS system that uses satellite signals from satellites to easily detect the position of the host vehicle, for example, a position determined by latitude and longitude. Therefore, as described in claim 24, the detecting means is formed so as to be able to detect the position information using satellite signals from satellites. As a result of this, the position of a vehicle can be pinpointed in that host vehicle.

The charge processing system can be provided with: in-vehicle communication means which is provided with the charge processing device and in which the transmission means transmits charge history in accordance with an input transmission request: and on-road communication means having requesting means for performing the transmission request and processing means for performing charge settlement processing in a predetermined processing area and based on a transmitted charge history.

The charge processing system provided with in-vehicle communication means which is provided with the charge processing device can be provided with transmission means for transmitting charge history in accordance with an input transmission request. As a result, as was described above, if a transmission request is made from the ground side, the charge history is able to be transmitted from the vehicle side. This transmission request is performed by the requesting means of the transmission means on the ground side. In addition, the processing means performs charge settlement processing based on a predetermined processing area and a transmitted charge history. As a result, the charge history is held on the vehicle side and charge settlement processing can be performed in the processing area from the held charge history, and the area for the charge processing is not limited to being established within the area in which a charge is applied.

On-road communication means can be provided with altering means for altering the amount of the charge settlement based on a time until an arrival in the processing area.

In the in-vehicle device, even if the charge history is held or accumulated, it is not possible to collect the actual toll if the charge processing is not performed. Therefore, the on-road communication means is further provided with altering means for altering the amount of the charge settlement based on a time until an arrival in the processing area. For example, for a set time, the toll collection of the charge amount corresponds to the above charge history, however, when the set time is exceeded and as the time becomes longer, it is possible to increase the charge amount, as is the case with arrears payments and the like. As a result, it is possible to do away with the loss that is incurred until the actual toll collection depending on the length of time involved.

According to another aspect of the inventions, there is provided a charge processing device comprising: detecting means for detecting position information indicating a position where a vehicle is located; storage means capable of being inserted and removed for storing an area in which a charge is applied which area is set based on predetermined map information in correspondence with a predetermined area in the map information; and generating means for, at a predetermined period, generating charge information for the vehicle based on a result of a detection by the detecting means and an area in which a charge is applied stored in the loaded storage means.

The detecting means detects position information indicating the position where a vehicle is located. A navigation system for a vehicle capable of displaying maps to assist with driving and instruct as to a route to a destination can be used as the detecting means. Area in which a charge is applied, which are set based on predetermined map information in correspondence with predetermined regions in the map information, are stored in the storage means capable of being inserted and removed, and the generating means generates, at a predetermined period, charge information for the vehicle based on the result of the detection by the detecting means and the area in which a charge is applied stored in the storage means. For example, the toll that should be collected from a vehicle located in a area in which a charge is applied is determined such that the amount of the charge is determined from the number of times the vehicle entered the area in which a charge is applied and the length of time the vehicle was in the area in which a charge is applied. Consequently, the generating means generates the number of entries into and the length of stay in the area in which a charge is applied as charge information. The storage means is capable of being inserted and removed, therefore, when the area in which a charge is applied varies, it is possible to correctly collect the toll that should be charged for the vehicle that has entered or stayed in the area in which a charge is applied and the like simply by altering the area in which a charge is applied that should be stored in the storage means.

The generating means can be provided with a reading means for reading a result of a detection by the detecting means and an area where a charge is applied stored in the storage means, and generates charge information from the read position information and area where a charge is applied.

The generating means can be provided with a reading means for reading a result of a detection by the detecting means and an area where a charge is applied stored in the storage means, and generates charge information from the read position information and area where a charge is applied. Because it is possible to read the result of a detection by the detecting means and the area in which a charge is applieds stored in the storage means in this way using a reading means, the charge information can be easily generated.

The storage means can be a toll card on which is stored an area in which a charge is applied for generating at least charge information.

Because the storage means is capable of being inserted and removed, as is described in claim 30, it is possible to use a toll card on which is stored an area in which a charge is applied for generating at least charge information as the storage means. An IC card or prepaid card can be used for this toll card.

According to another aspect of the inventions, there is provided a charge processing card including: a loading portion for loading in an in-vehicle device that detects position information indicating the position where a vehicle is located, and generates charge information from the position information and from an area where a charge is applied which area is set based on predetermined map information in correspondence with a predetermined area in the map information; an area storage portion for storing the area where a charge is applied; and a balance storage section for storing balance information.

The charge processing card can be used as the toll card. This charge processing card is provided with: a loading portion for loading in an in-vehicle device that detects position information indicating the position where a moving body is located, and generates charge information from the position information and a predetermined area where a charge is applied; an area storage portion for storing the area where a charge is applied, which area is set based on predetermined map information in correspondence with a predetermined area in the map information; and a balance storage section for storing balance information. Consequently, the charge processing card is loaded in the in-vehicle device via the loading portion so that a area in which a charge is applied can be read from the area storage portion and balance information can be read from the balance storage portion. It is thus possible to correctly collect the fare that should be charged to a vehicle that has entered into or stayed in the area in which a charge is applied.

A charge processing device (701) carried by a user or mounted on a moving body comprising: means for detecting a ground position (ANTg, 720–726); storage means (CRD) for storing area specifying information, which is set based on predetermined map information in correspondence with a predetermined area in the map information, and control information for inside an area; notification control means (702) for generating position relation information in a charge processing device for an area indicated by area specifying information, based on a ground position detected by the ground position detecting means (ANTg, 720–726) and area specifying information of the storage means; and notification means (710, 711, SP, 704, 724) for notifying a user as to information expressed by the position relation information, the area specifying information, and the area control information.

Note that, in order to make comprehension easier, symbols of corresponding elements shown in the drawings of the embodiments corresponding to the present invention are added for reference inside the brackets.

Consequently, the notification control means (702) generates position relation information in a charge processing device (701) that functions as a notification device for an area (charge area) expressed by area specifying information (charge area information) of the storage means (CRD). The notification means (710, 711, SP, 704, 724) reports this position relation information as well as information (area and charge amount) indicating control information within an area and area specifying information of the storage means (CRD). As a result, a user of this charge processing device is easily able to be aware of the existence and position of a specific area as well as what type of area the area is by the time the user enters into the area represented by the area specifying information. The user is thus able to easily decide in good time whether to enter the area or to alter their route.

According to another aspect of the inventions, there is provided a charge processing device (701) carried by a user or mounted on a moving body comprising: means for detecting a ground position (ANTg, 720–726); storage means (CRD) for storing charge area specifying information which is set based on predetermined map information in correspondence with a predetermined area in the map information, charge information for inside an area, and credit information; notification control means (702) for generating position relation information in a charge processing device for a charge area indicated by charge area specifying information, based on a ground position detected by the ground position detecting means (ANTg, 720–726) and charge area specifying information of the storage means, and updating credit information in the storage means in response to changes outside and inside a ground position relative to the charge area; and notification means (710, 711, SP, 704, 724) for notifying a user as to information expressed by the position relation information, the charge area specifying information, the charge information inside the area, and the credit information.

Consequently, the notification control means (702) generates position relation information in a charge processing device (701) that functions as a notification device for a charge area expressed by charge area specifying information (charge area information) of the storage means (CRD). The notification means (710, 711, SP, 704, 724) reports this position relation information as well as information (charge area and charge amount) indicating charge information within an area and charge area specifying information of the storage means (CRD). As a result, a user of this charge processing device is easily able to be aware of the existence and position of a charge area as well as the charge amount by the time the user enters into the charge area. The user is thus able to easily decide in good time whether to enter the charge area or to select a detour route.

Moreover, when a vehicle leaves a charge area after entering the area, the notification control means (702) updates the credit information in the storage means when the vehicle enters the charge area or departs from the charge area, and the notification means (710, 711, SP, 704, 724) reports information (balance information) indicating the credit information to the user, therefore, there is no manual involvement in the charge processing and the user is easily made aware of the balance.

According to another aspect of the inventions, there is provided a charge processing system including: a notification device that is a charge processing device carried by a user or mounted on a moving body and includes a means for detecting a ground position, communication means for receiving area specifying information which is set based on predetermined map information in correspondence with a predetermined area in the map information, storage means for storing received area specifying information, notification control means for generating position relation information in a charge processing device for an area indicated by area specifying information based on a ground position detected by the ground position detecting means and area specifying information of the storage means, and notification means for notifying a user as to the position relation information; and a transmitting station comprising public notification information storage means for storing area specifying information, and transmitting means for transmitting area specifying information of the public notification information storage means.

Consequently, the notification control means (702) generates position relation information in a charge processing device (701) that functions as a notification device for an area represented by area specifying information (charge area information) of the storage means (CRD). The notification means (710, 711, SP, 704, 724) reports this position relation information. As a result, a user of this charge processing device is easily able to be aware of the existence and position of a specified area by the time the user enters into the area represented by the area specifying information. The user is thus able to easily decide in good time whether to enter the charge area or to alter the route.

Moreover, the transmission means (740, 741, 732) of the transmitting station (730) transmits area specifying information of the public information storage means (FDB), and the communication means (ANTt, 708, 706) of the charge processing device (701) that is functioning as a public notification device receives the area specifying information, which is then stored by the storage means (CRD, 702). As a result, if the transmitting station (30) alters the area specifying information of the public notification information storage means (FDB) in order to alter the position or size of the area, the area specifying information of the charge processing device (701) also automatically changes to altered information. The transmission of the area specifying information is simple and the altering of the information is also simple. Because it is possible to transmit area specifying information to all charge processing devices (701) that might possibly enter the area from a single transmitting station (730) covering the area and its environs, the installation of the system elements is comparatively simple and the reliability of the information notification is increased.

According to another aspect of the inventions, there is provided a charge processing system including: a notification device that is a charge processing device carried by a user or mounted on a moving body and includes means for detecting a ground position, communication means for receiving charge area specifying information, which is set based on predetermined map information in correspondence with a predetermined area in the map information, and charge information for inside an area, storage means for storing received charge area specifying information (CRD, 702), and credit information, notification control means (702) for generating position relation information in a charge processing device for a charge area, based on a ground position detected by the ground position detecting means (ANTg, 720–726) and charge area specifying information of the storage means, and updating credit information in the storage means in response to changes outside and inside a ground position relative to the charge area, and notification means (710,711,704,724) for notifying a user as to information expressed by the charge area specifying information, the charge information for inside the area, and the credit information and the position relation information; and a transmitting station (30) comprising public notification information storage means (FDB,TDB) for storing area specifying information and inside-area charge information, and transmitting means (740,731,732) for transmitting area specifying information and inside-area charge information of the public notification information storage means.

Consequently, the notification control means (702) generates position relation information in a charge processing device (701) that functions as a notification device for a charge area represented by charge area specifying information (charge area information) of the storage means (CRD). The notification means (710, 711, SP, 704, 724) reports this position relation information as well as information (charge area and charge amount) indicating charge information within an area and charge area specifying information of the storage means (CRD). As a result, a user of this charge processing device is easily able to be aware of the existence and position of a charge area as well as the charge amount by the time the user enters into the charge area. The user is thus able to easily decide in good time whether to enter the charge area or to select a detour route.

Moreover, when a vehicle leaves a charge area after entering the area, the notification control means (702) updates the credit information in the storage means when the vehicle enters the charge area or departs from the charge area, and the notification means (710, 711, SP, 704, 724) reports information (balance information) indicating the credit information to the user, therefore, there is no manual involvement in the charge processing and the user is easily made aware of the balance.

Moreover, the transmission means (740, 741, 732) of the transmitting station (730) transmits inside-area charge information area and area specifying information of the public information storage means (FDB), and the communication means (ANTt, 708, 706) of the charge processing device (701) that is functioning as a public notification device receives this information, which is then stored by the storage means (CRD, 702). As a result, if the transmitting station (730) alters the charge amount and the area specifying information of the public notification information storage means (FDB) in order to alter the position, size and/or the charge amount of the area, the information of the charge processing device (701) also automatically changes to altered information. The transmission of the area specifying information and the inside-area charge information is simple and the altering of the information is also simple. Because it is possible to transmit area specifying information and charge information for within the area to all charge processing devices (701) that might possibly enter the area from a single transmitting station (730) covering the area and its environs, the installation of the system elements is comparatively simple and the reliability of the information notification is increased.

The notification control means (702) transmits the updated credit card information as well as an ID of the charge processing device (701) that is functioning as a notification device to the transmission station (730) via the communication means (ANTt, 708, 706). The communication station (730) includes unpaid data storage means (CDB), and the information control means (732) of the transmission station (730) is able to make a record in accumulation manner of insufficient payment credit information, for received ID address, in the unpaid data storage means (CDB).

Consequently, on the basis of the total recorded (unpaid) data of the unpaid data storage means (CDB), the area controller is able to issue a warning that an insufficient amount has been collected and/or to perform the collection of the outstanding debt. Thus, the task of controlling the area is simplified and made more economical.

The charge processing system, as item 35B, the notification control means (702) transmits the fact that an entry has been made into a charge area, when the ground position changes from outside the charge area to inside the charge area, to the transmission station (730) via the communication means (ANTt, 708, 706). The transmission station (730) includes accumulation storage means (TDB), and the information control means (732) of the transmission station (730) is able to update the data for the accumulated number of entries in the accumulation storage means (TDB) to data of a larger value, every time it receives a transmission to the fact that an entry has been made into a charge area.

Consequently, on the basis of the data stored in accumulation storage means (TDB), the area controller is able to calculate the number of entries (number of vehicles/time) into an area, estimates traffic volume parameters such as the congestion or changes in the congestion, and use this for traffic volume information collection and traffic control.

In the charge processing system of the above item 35B, when the ground position changes from inside the charge area to outside the charge area, the notification control means (702) transmits this departure from the charge area to the transmission station (730) via the communication means (NTt, 708, 706). Each time the information control means (732) of the transmission station (730) receives a transmission about the departure from the charge area, the information control means (732) is able to update the data for the accumulated number of departures in the accumulation storage means (TDB) to data of a larger value, every time it receives a transmission to the effect that a departure has been made from a charge area.

Consequently, the balance when the data for the accumulated number of departures in the accumulation storage means (TDB) is subtracted from the data for the accumulated number of entries in the accumulation storage means (TDB) shows the retention volume (or the volume of congestion when traffic is congested), inside the charge area, of vehicles in which the charge processing device (701) that is functioning as a notification device is mounted. The time differential value thereof shows the speed of change (i.e. a tendency towards congestion and a tendency towards easing of congestion) in the retention volume. Based on the data stored in the entry accumulation storage means (TDB), the area controller is able to estimate traffic volume parameters such as congestion within the area or changes in the congestion, and use this for traffic volume information collection and traffic control.

Note that instead of counting the number of entries into an area and the number of departures from an area separately, it is also possible to increment the retention volume data for an entry and decrement the retention volume data for a departure. In this case, the retention volume data shows the retention volume within an area directly, and the time differential value thereof shows the speed of change (i.e. a tendency towards congestion and a tendency towards easing of congestion) in the retention volume.

According to another aspect of the inventions, there is provided a charge processing device carried by a user or mounted on a moving body comprising: means (ANTg, 720–726) for detecting a ground position; storage means (CRD, 702) for storing area specifying information, which is set based on predetermined map information in correspondence with a predetermined area in the map information, and credit information; relative position determining means (702) for calculating whether a ground position detected by the ground position detecting means is inside or outside an area represented by area specifying information in the storage means; interruption instruction means (IGsw); time measuring means (702) for measuring the time elapsed inside an area during a period in which there is no (Si=H) interruption instruction (Si=L) from the interruption instruction means; and charge processing means (702) for updating the credit information based on a value of a time measured by the time measuring means.

Note that, in order to make comprehension easier, symbols of corresponding elements shown in the drawings of the embodiments corresponding to the present invention are added for reference inside the brackets.

Consequently, because the toll payment medium is the storage means (CRD, 702), and the toll payment processing is performed by updating the credit information, the toll payment is not a complicated matter. Even if the road network inside the charge area is complicated, there is no need to provide tollbooths or vehicle transit determining devices on a plurality of routes within the area or at the entries and exits to the area, and neither there is any need for a large installation of a charge processing system fixed facility.

For example, if a simple charge is applied to a vehicle in which a charge processing device is mounted, when the charge is applied in proportion to the length of time the vehicle remained inside charge area, the charge is also increased for residents of the charge area, people working inside the charge area, and when vehicles are parked in locations where they have no effect on road congestion such as in a car park, which is unreasonable when the charge is supposed to be applied to a vehicle driving in the area. To counter this, a method in which the charge to residents of a charge area or people working inside the charge area is reduced by a fixed discount ratio may be considered, however, there are various relative ratios of parking time and traveling time depending on the person, and a person who parks for an extremely short time, for example, is treated extremely advantageously.

There can be provided interruption instruction means (IGsw), and time measuring means (2) for measuring the time elapsed inside an area during a period in which there is no (Si=H) interruption instruction (Si=L) from the interruption instruction means. In the case of a vehicle, the interruption instruction means (IGsw) generates an interruption instruction ((SI=L)) when the vehicle is parked and measures the elapsed time when the vehicle is not parked (Si=H). As a result, when the purpose is to charge for traveling on a road, a reasonable relationship is created between use of the road network and the amount of the toll to be paid.

According to another aspect of the inventions, there is provided a charge processing device carried by a user or mounted on a moving body comprising: means (ANTg, 720–726) for detecting a ground position; storage means (CRD, 702) for storing area specifying information, which is set based on predetermined map information in correspondence with a predetermined area in the map information, and credit information; relative position determining means (702) for calculating whether a ground position detected by the ground position detecting means is inside or outside an area represented by area specifying information in the storage means; distance measuring means (702) for measuring a distance moved within an area; and charge processing means (702) for updating the credit information based on a distance measured by the distance measuring means.

Consequently, because the toll payment medium is the storage means (CRD, 702), and the toll payment processing is performed by updating the credit information, the toll payment is not a complicated matter. Even if the road network inside the charge area is complicated, there is no need to provide tollbooths or vehicle transit determining devices on a plurality of routes within the area or at the entries and exits to the area, and neither there is any need for a large installation of a charge processing system fixed facility.

When a charge processing device is used in a vehicle charge system for charging in accordance with the distance traveled inside a charge area, the charge is made on the distance traveled inside the charge area and the increase in the charge amount is automatically stopped when the vehicle is parked. Consequently, there are no inconsistencies between residents of the charge area or people working in the charge area and other people.

The charge processing device can further comprise notification means (710, 711, SP, 704, 724) for notifying a user about information representing area specifying information and credit information. A user of the charge processing system can be made aware of the existence of a charge area before entering the area as well as of the credit information, simplifying the user's choice as to whether or not to enter the charge area.

The charge processing device can further comprise: notification control means (702) for generating approach information that a charge processing device is approaching an area represented by area specifying information based on a ground position detected by the ground position detecting means and area specifying information of the storage means; and notification means (710, 711, SP, 704, 724) for notifying a user about information representing the approach information, the area specifying information, and the credit information. Because a notification is made to the effect that a vehicle is approaching the charge area, a user is able to choose more reliably and with more leeway whether or not to enter the charge area.

The system can further be provided with communication means (ANTt, 708, 706) for receiving area specifying information, wherein storage means (CRD, 702) stores received area specifying information; and a transmitting station (730)

that includes public notification information storage means ((FDB, TDB) for storing area specifying information, and communication means (740, 731, 732) for transmitting area specifying information of the public notification information storage means.

Consequently, the transmitting means (740, 731, 732) of the transmitting station (730) transmits area specifying information of the public notification information storage means (FDB). The communication means (NTt, 708, 706) of the charge processing device (701) receives the area specifying information which is then stored by the storage means (CRD, 702). As a result, if the transmitting station (730) alters the area specifying information of the public notification information storage means (FDB) in order to alter the position and/or size of the area, the area specifying information of the charge processing device also automatically changes to altered information. The transmission of the area specifying information is simple and the altering of the information is also simple. Because it is possible to transmit area specifying information to all charge processing devices (701) that might possibly enter the area from a single transmitting station (730) covering the area and its environs, the installation of the system elements is comparatively simple and the reliability of the information notification is increased.

The charge device can be mounted in a vehicle, and the interruption instruction means performs an interruption instruction by being interconnected with the off operation of the ignition (IGsw) of the vehicle.

Consequently, because an interruption instruction (Si=L) is generated when the car is parked, and the time lapse is suspended, there is no charge for the length of time that the vehicle is parked and, when the purpose is to charge for traveling on a road, a reasonable relationship is created between use of the road network and the amount of the toll to be paid.

The system can be provided with communication means (ANTt, 708, 706) for receiving area specifying information which is set based on predetermined map information in correspondence with a predetermined area in the map information, wherein storage means (CRD, 702) stores received area specifying information; and a transmitting station (730) that includes public notification information storage means (FDB, TDB) for storing area specifying information, and communication means (740, 731, 732) for transmitting area specifying information of the public notification information storage means. Consequently, the same operation and effects as in the above fortieth embodiment are obtained.

In the above-described charge processing system, as item 38A, the notification control means (702) transmits the updated credit information together with the ID of the charge processing device (701) to the transmission station (730) via the communication means (ANTt, 708, 706). The transmission station (730) includes unpaid data storage means (CDB), and the information control means (732) of the transmission station (730) makes a record of accumulated insufficient payment credit information that it has received at the ID address received in the unpaid data storage means (CDB).

Consequently, on the basis of the total recorded (unpaid) data of the unpaid data storage means (CDB), the area controller is able to issue a warning that an insufficient amount has been collected and/or to perform the collection of the outstanding debt. Thus, the task of controlling the area is simplified and made more economical.

In the charge processing system, as item 38B, the notification control means (702) transmits the fact that an entry has been made into a charge area when the ground position changes from outside the charge area to inside the charge area to the transmission station (730) via the communication means (ANTt, 708, 706). The communication station (730) includes accumulation storage means (TDB), and the information control means (732) of the transmission station (730) is able to update the data for the total number of entries in the accumulation storage means (TDB) to data showing a larger value, every time it receives a transmission to the effect that an entry has been made into a charge area.

Consequently, on the basis of the data stored in accumulation storage means, the area controller is able to calculate the number of entries (number of vehicles/time) into an area, estimates traffic volume parameters such as the congestion or changes in the congestion, and use this for traffic volume information collection and traffic control.

In the charge processing system, as above item 38C, when the ground position changes from inside the charge area to outside the charge area, the notification control means (702) transmits this departure from the charge area to the transmission station (730) via the communication means (ANTt, 708, 706). Each time the information control means (732) of the transmission station (730) receives a transmission about a departure from the charge area, the information control means (732) is able to update the data for the total number of departures in the accumulation storage means (TDB) to data showing a larger value, every time it receives a transmission to the effect that a departure has been made from a charge area.

Consequently, the balance when the data in the accumulation storage means (TDB) for the total number of departures is subtracted from the data for the total number of entries shows the retention volume (or the volume of congestion when traffic is congested) inside the charge area of vehicles in which the charge processing device (701) that is functioning as a notification device is mounted. The time differential value thereof shows the speed of change (i.e. a tendency towards congestion and a tendency towards easing of congestion) in the retention volume. Based on the data stored in the entry accumulation storage means (TDB), the area controller is able to estimate traffic volume parameters such as congestion within the area or changes in the congestion, and use this for traffic volume information collection and traffic control.

Note that instead of counting the number of entries into an area and the number of departures from an area separately, it is also possible to increment the retention volume data for an entry and decrement the retention volume data for a departure. In this case, the retention volume data shows the retention volume within an area directly, and the time differential value thereof shows the speed of change (i.e. a tendency towards congestion and a tendency towards easing of congestion) in the retention volume.

According to another aspect of the inventions, there is provided a charge processing device comprising: storage means (CRD) for storing credit information; read/write means (705) for reading credit information from the storage means (CRD) and writing credit information to the storage means (CRD); entry detecting means (720–726, 702) for detecting an entry into a charge area which is set based on predetermined map information in correspondence with a predetermined area in the map information; charge processing means (702) for updating, in accordance with a charge toll, credit information in the storage means (CRD) via the read/write means (705) in response to traffic in a charge area; and communication means (2, ANTt, 708, 706) for transmitting information on a state of a charge device (i.e. card reader is normal, card is present) including whether or not reading and writing of the credit information in the storage means is possible while in a charge area.

Note that, in order to make comprehension easier, symbols of corresponding elements shown in the drawings of the embodiments of the inventions are added for reference inside the brackets.

Consequently, because the toll payment medium is the storage means (CRD), and the toll payment processing is performed by updating the credit information, the toll payment is not a complicated matter. The charge control station collects the charge device state information transmitted by the communication means (702, ANTt, 708, 706), and is able to know whether or not reading and writing by the storage means (CRD) is possible, namely, whether or not charge processing is possible, and it is possible to automatically avoid deductions caused by destruction or removal of the storage means (CRD) or read/write means (705) in order to avoid charge deductions and, naturally, charge errors caused by a breakdown in the charge device.

According to another aspect of the inventions, there is provided a charge processing device comprising: means (ANTg, 720–726) for detecting a ground position; storage means (CRD, 702) for storing credit information (a balance), charge areas which are set based on predetermined map information in correspondence with predetermined areas in the map information, and charge tolls; charge processing means (702) for detecting whether a ground position detected by the ground position detecting means is within a charge processing area, and updating, in accordance with the charge toll, credit information in the storage means in response to the traffic in a charge area; and communication means (702, ANTt, 708, 706) for transmitting information on a state of a charge device including whether or not ground position detection by the ground position detecting means (ANTg, 720–726) is possible while in a charge area.

Consequently, even if the road network inside the charge area is complicated, there is no need to provide tollbooths or vehicle transit determining devices on a plurality of routes within the area or at the entries and exits to the area, and neither there is any need for a large installation of a charge processing system fixed facility. The charge control station collects the charge device state information transmitted by the communication means (702, ANTt, 708, 706), and is able to know whether or not recognizing the position of the charge device by the ground position detecting means (ANTg, 720–726) is possible, and it is possible to automatically avoid deductions caused by a halting in the operation or removal of the ground position detecting means (ANTg, 720–726) in order to avoid charge deductions and, naturally, charge errors caused by irregularities in the ground position detecting means (ANTg, 720–726).

According to another aspect of the inventions, there is provided a charge processing system comprising: a charge processing device (701) that includes storage means (CRD) for storing credit information, read/write means (705) for reading credit information from the storage means (CRD) and writing credit information to the storage means (CRD), entry detecting means (720–726, 702) for detecting an entry into a charge area which is set based on predetermined map information in correspondence with a predetermined area in the map information, charge processing means (702) for updating, in accordance with the charge toll, credit information in the storage means (CRD) via the read/write means (705), in response to a traffic in the charge area, and first communication means (702, ANTt, 708, 706) for receiving a data request and transmitting charge device state information (card reader normal, card present) including whether or not reading and writing of credit information in the storage means (CRD) is possible while in a charge area; and a control station (730) that includes second communication means (740, 731, 733) for transmitting a data request to the charge processing device and receiving charge state information from the charge processing device, and searching means (733) for checking for erroneous use of a charge processing device based on received data.

Consequently, because the toll payment medium is the storage means (CRD), and the toll payment processing is performed by updating the credit information, the toll payment is not a complicated matter. The control station (730) collects the charge device state information transmitted by the first communication means (702, ANTt, 708, 706) of the charge device (701) via the second communication means (740*m* 731, 733), and is able to know whether or not reading and writing by the storage means is possible (CRD), namely, whether or not charge processing is possible, and it is possible to automatically check deductions caused by destruction or removal of the storage means (CRD) or read/write means (705) in order to avoid charge deductions and, naturally, charge errors caused by a breakdown in the charge device.

Note that the control station (730) transmits a charge request to the charge processing device (701) via the second communication means (740, 731, 733), and the charge processing means (702) of the charge processing device (701) is able to update the credit information in the storage means (CRD) in accordance with the charge toll. The following should also be noted.

It is possible for the charge device state information to include the ground position.

It is possible for the charge device state information to include the time.

It is possible for the charge device state information to include the credit information.

It is possible for the charge device state information to include the distance traveled inside the charge area.

It is possible for the charge device state information to include the length of time stayed in the charge area.

It is possible for the charge processing device to include interruption instruction means (IGsw) for interrupting the accumulation of the length of the time in a charge area (integral or fractional time) when the vehicle is not traveling.

Because the position of a vehicle detected by detecting means is matched with map information, and a state of entry which indicates whether or not a vehicle has entered into an area in which a charge is applied is decided, and charge information for the vehicle is generated in accordance with the state of entry, the effect is achieved that it is possible to perform charge processing for the user of a vehicle using a simple structure simply by generating charge information for a vehicle in accordance with the entry state thereof, without having to install on-road devices in all the entry and exit locations such as entry and exit gates.

Because location information indicating the date and time a vehicle was present inside a area in which a charge is applied is further detected, and an entry state that includes the state of the location of the vehicle inside the area in which a charge is applied is decided, the effect is achieved that it is possible to generate charge information for a vehicle that has only entered into the area in which a charge is applied when the charge was for the predetermined time or time period, the date or week, or combination of these.

Because the state of entry is decided with the state of congestion caused by vehicles located within a area in which a charge is applied included therein, the effect is achieved that it is possible to easily generate charge information for a vehicle in accordance with the state of congestion even when the toll differs depending on the state of congestion in the area in which a charge is applied.

Because predetermined toll data corresponding to the state of entry is stored in advance in the storage means, the effect is achieved that simple and appropriate charge information is able to be generated.

Because the processing state of the charge processing performed when a vehicle has entered a area in which a charge is applied, which is known from the position of the vehicle detected by the detecting means, can be notified continuously within the area in which a charge is applied, the effect is achieved that the processing state can be confirmed from an arbitrary position within the area in which a charge is applied without installing on-road devices at every likely location of entry and exit such as entry and exit gates.

Because a radiation means which radiates electromagnetic waves is used, the effect is achieved that the manufacturing of the device is simplified.

Because the notification means is formed from a light source disposed on the detecting means, or on a number plate of a vehicle, the effect is achieved that it is possible for an observer or the like to visually confirm the processing state of the charge processing with ease.

Because notification is made to a vehicle in a predetermined operating pattern in which the notification state is altered in the manner of a time series, the effect is achieved that it is possible to make it difficult for a third party to recognize the notification.

The outside of the vehicle is notified as to the processing state based on a received pattern signal, the effect is achieved that it is possible to make it difficult for a third party to analyze or recognize the operating pattern.

Because it is possible to for the outside and inside of a vehicle to be notified as to the processing state, the effect is achieved that it is possible for an observer outside the vehicle and the driver of the vehicle to be notified as to the processing state.

Because it is possible for a notification from the notification means to be observed by observation means, the effect is achieved that it is possible to observe the processing state of the charge processing from outside the vehicle with ease.

Because, as the observation means, it is possible to observe a notification by detecting brightness, the effect is achieved that, when a notification is made based on a variation in the brightness, that notification state can be easily detected.

If an image pickup means is used, the effect is achieved that it is possible to observe a notification by detecting at least brightness in synchronization with a predetermined observation pattern that is altered in the manner of a time series, and it is possible to easily distinguish the processing state.

Because a pattern signal indicating an observation pattern is received, and a notification is observed by detecting at least brightness in synchronization with an observation pattern based on the pattern signal, the effect is achieved that it is possible to provide a degree of confidentiality to the observation pattern, and to easily increase the reliability of the observation of the processing state of the charge processing from outside the vehicle.

Because deciding means decides the processing state of the charge processing based on the result of an observation by the observation means, the effect is achieved that it is possible to observe the processing state of the charge processing from outside the vehicle with ease.

Because the deciding means compares the state of a notification obtained by the observation means with a predetermined notification state, and decides the processing state of the charge processing based on the results of the comparison, the effect is achieved that the distinguishing of the notification state is simplified and it is possible to observe the processing state of the charge processing from outside the vehicle with ease.

Because charge information for a vehicle in a area in which a charge is applied is generated by generating means from information on the position of the vehicle detected by the detecting means, and a charge history of the charge information is also generated, and these are transmitted to the ground by transmission means, the effect is achieved that it is possible on the ground to collect with ease a toll that should be charged to a vehicle that has entered or stayed in a area in which a charge is applied.

Because the making means can be formed from generating means for generating charge information for each of a plurality of existing area in which a charge is applied, and accumulating means for accumulating in sequence the charge information as charge history, the effect is achieved that, even when a plurality of area in which a charge is applied are scattered around or are grouped together, by using the charge history of the charge information of each area in which a charge is applied accumulated in the accumulating means, the entry into or stay of a vehicle in a plurality of area in which a charge is applied can be easily ascertained.

Because it is possible to detect position information using satellite signals from satellites, the effect is achieved that it is possible to pinpoint the position of a vehicle inside that same vehicle.

Because, in response to a transmission request from the ground side, a charge history is transmitted from an in-vehicle communication means provided with transmitting means for transmitting a charge history in response to an input transmission request, the effect is achieved that a charge settlement can be processed from the charge history held in the vehicle in a processing area that is not limited to being inside an area in which a charge is applied.

Because the amount of the charge settlement is altered in the on-road communication means based on the time until arriving in the processing area, the effect is achieved that it is possible to do away with the loss that is incurred until the actual toll collection depending on the length of time involved.

Because the storage means is capable of being inserted and removed, the effect is achieved that when the area in which a charge is applied varies, it is possible to collect the proper toll that should be charged for the vehicle that has entered or stayed or the like in the area in which a charge is applied simply by altering the area in which a charge is applied that should be stored in the storage means.

Because a reading means is able to read the result of a detection by the detecting means and the area in which a charge is applied stored in the storage means in this way using a reading means, the effect is achieved that the charge information can be easily generated.

Because a charge processing card can be loaded in the in-vehicle device via the loading portion so that area in which a charge is applied can be read from the area storage portion and balance information can be read from the balance storage portion, the effect is achieved that is possible to collect the proper toll that should be charged to a vehicle that has entered into or stayed in the area in which a charge is applied.

Because notification control means generates position relation information in a charge processing device that functions as a notification device for an area (charge area) expressed by area specifying information (charge area information) of the storage means, and notification means reports this position relation information as well as information (area and charge amount) indicating control information within an area and area specifying information of the storage means, a user of this charge processing device is easily able to be aware of the existence and position of a specific area as well as what type of area the area is by the time the user enters into the area represented by the area specifying information, and is thus able to easily decide in good time whether to enter the area or to alter their route.

Because the notification control means generates position relation information in a charge processing device for a charge area expressed by charge area specifying information (charge area information) of the storage means, and the notification means reports this position relation information as well as information (charge area and charge amount) indicating charge information within an area and charge area specifying information of the storage means, a user of this charge processing device is easily able to be aware of the existence and position of a charge area as well as the charge amount by the time the user enters into the charge area. The user is thus able to easily decide in good time whether to enter the charge area or to select a detour route.

Because the notification control means generates position relation information in a charge processing device for an area represented by area specifying information (charge area information) of the storage means, and the notification means reports this position relation information, a user of this charge processing device is easily able to be aware of the existence and position of a specified area by the time the user enters into the area represented by the area specifying information, and is thus able to easily decide in good time whether to enter the charge area or to alter the route.

The notification control means generates position relation information in a charge processing device for a charge area represented by charge area specifying information (charge area information) of the storage means, and the notification means reports this position relation information as well as information (charge area and charge amount) indicating charge information within an area and charge area specifying information of the storage means, a user of this charge processing device is easily able to be aware of the existence and position of a charge area as well as the charge amount by the time the user enters into the charge area, and the user is thus able to easily decide in good time whether to enter the charge area or to select a detour route.

According to claim 36 of the present invention, because the toll payment medium is the storage means, and the toll payment processing is performed by updating the credit information, the toll payment is not a complicated matter. Even if the road network inside the charge area is complicated, there is no need to provide toll booths or vehicle transit determining devices on a plurality of routes within the area or at the entries and exits to the area, and neither there is any need for a large installation of a charge processing system fixed facility.

Because the toll payment medium is the storage means, and the toll payment processing is performed by updating the credit information, the toll payment is not a complicated matter. Even if the road network inside the charge area is complicated, there is no need to provide toll booths or vehicle transit determining devices on a plurality of routes within the area or at the entries and exits to the area, and neither there is any need for a large installation of a charge processing system fixed facility.

Because the charge processing device further comprises notification means for notifying a user about information representing area specifying information and credit information, a user of the charge processing system can be made aware of the existence of a charge area before entering the area as well as of the credit information, simplifying the user's choice as to whether or not to enter the charge area.

Because the charge processing device further comprises: notification control means for generating approach information that a charge processing device is approaching an area represented by area specifying information based on a ground position detected by the ground position detecting means and area specifying information of the storage means; and notification means for notifying a user about information representing the approach information, the area specifying information, and the credit information, and because a notification is made to the effect that a vehicle is approaching the charge area, a user is able to choose more reliably and with more leeway whether or not to enter the charge area.

Because the transmitting means of the transmitting station transmits area specifying information of the public notification information storage means, and the communication means of the charge processing device receives the area specifying information which is then stored by the storage means, if the transmitting station alters the area specifying information of the public notification information storage means in order to alter the position and/or size of the area, the area specifying information of the charge processing device also automatically changes to altered information. The transmission of the area specifying information is simple and the altering of the information is also simple. Because it is possible to transmit area specifying information to all charge processing devices that might possibly enter the area from a single transmitting station covering the area and its environs, the installation of the system elements is comparatively simple and the reliability of the information notification is increased.

Because an interruption instruction is generated when the car is parked and the time lapse is suspended, there is no charge for the length of time that the vehicle is parked and, when the purpose is to charge for traveling on a road, a reasonable relationship is created between use of the road network and the amount of the toll to be paid.

Because there is a charge processing system comprising: a charge processing device further provided with communication means receiving area specifying information, wherein storage means stores received area specifying information; and a transmitting station that includes public notification information storage means for storing area specifying information, and communication means for transmitting area specifying information of the public notification information storage means, the installation of the system elements is comparatively simple and the reliability of the information notification is increased.

Because the toll payment medium is the storage means, and the toll payment processing is performed by updating the credit information, the toll payment is not a complicated matter. The charge control station collects the charge device state information transmitted by the communication means, and is able to know whether or not reading and writing by the storage means is possible, namely, whether or not charge processing is possible, and it is possible to automatically check deductions caused by destruction or removal of the storage means or read/write means in order to avoid charge deductions and, naturally, charge errors caused by a breakdown in the charge device.

Even if the road network inside the charge area is complicated, there is no need to provide toll booths or vehicle transit determining devices on a plurality of routes within the area or at the entries and exits to the area, and neither there is any need for a large installation of a charge processing system fixed facility. The charge control station collects the charge device state information transmitted by the communication means, and is able to know whether or not recognizing the position of the charge device by the ground position detecting means is possible, and it is possible to automatically check deductions caused by a halting in the operation or removal of the ground position detecting means in order to avoid charge deductions and, naturally, charge errors caused by a irregularities in the ground position detecting means.

Because the toll payment medium is the storage means, and the toll payment processing is performed by updating the credit information, the toll payment is not a complicated matter. The control station collects the charge device state information transmitted by the first communication means of the charge device via the second communication means, and is able to know whether or not reading and writing by the storage means is possible, namely, whether or not charge processing is possible, and it is possible to automatically check deductions caused by destruction or removal of the storage means or read/write means in order to avoid charge deductions and, naturally, charge errors caused by a breakdown in the charge device.

BRIEF DESCRIPTION OF THE DRAWINGS

FIG. 18A shows the front surface while FIG. 18B shows the rear surface.

FIG. 36A shows a state where the lamp is on, while FIG. 36B shows a state where the lamp is off.

FIG. 38A shows a display screen when the observation lamp is turned on in a normal pattern; FIG. 38B shows an example of a display screen when the observation lamp is turned on in a non-normal pattern; FIG. 38C shows another example of a display screen when the observation lamp is turned on in a non-normal pattern; and FIG. 38D shows yet a further example of a display screen when the observation lamp is turned on in a non-normal pattern.

FIG. 48A shows a magnetic storage type card having a magnetic storage area, while FIG. 48B shows an IC storage type card having an IC storage portion.

FIG. 49A shows the front surface, FIG. 49B shows the rear surface, and FIG. 49C shows a front surface formed from a plurality of lamps.

FIG. 70 is Table 3.
FIG. 71 is Table 5.
FIG. 72 is Table 6.
FIG. 73 is Table 9.
FIG. 74 is Table 11.
FIG. 75 is Table 13.
FIG. 76 is Table 14.
FIG. 77 is Table 15.
FIG. 78 is Table 17.
FIG. 79 is Table 18.
FIG. 80 is Table 19.
FIG. 81 is Table 20.

DETAILED DESCRIPTION

Various embodiments of the inventions will now be described in detail with reference made to the drawings. These embodiments are examples of implementations of the claimed inventions. They do not represent the only ways to practice the claimed inventions but rather are the preferred arrangements and contemplated at the time the application for this patent was filed.

First Embodiment

In the first embodiment, the present invention is applied to an automatic charge system for performing charge processing automatically for a vehicle that has entered (i.e. driven into) a toll facility (i.e. an area in which a charge is applied) using road—vehicle intercommunication carried out between an in-vehicle device and an on-road device. Note that the automatic charge system used in the present embodiment is a system for settling a toll or the like through communication between an in-vehicle device mounted in a vehicle and an on-road device installed on the road.

Figure 1:
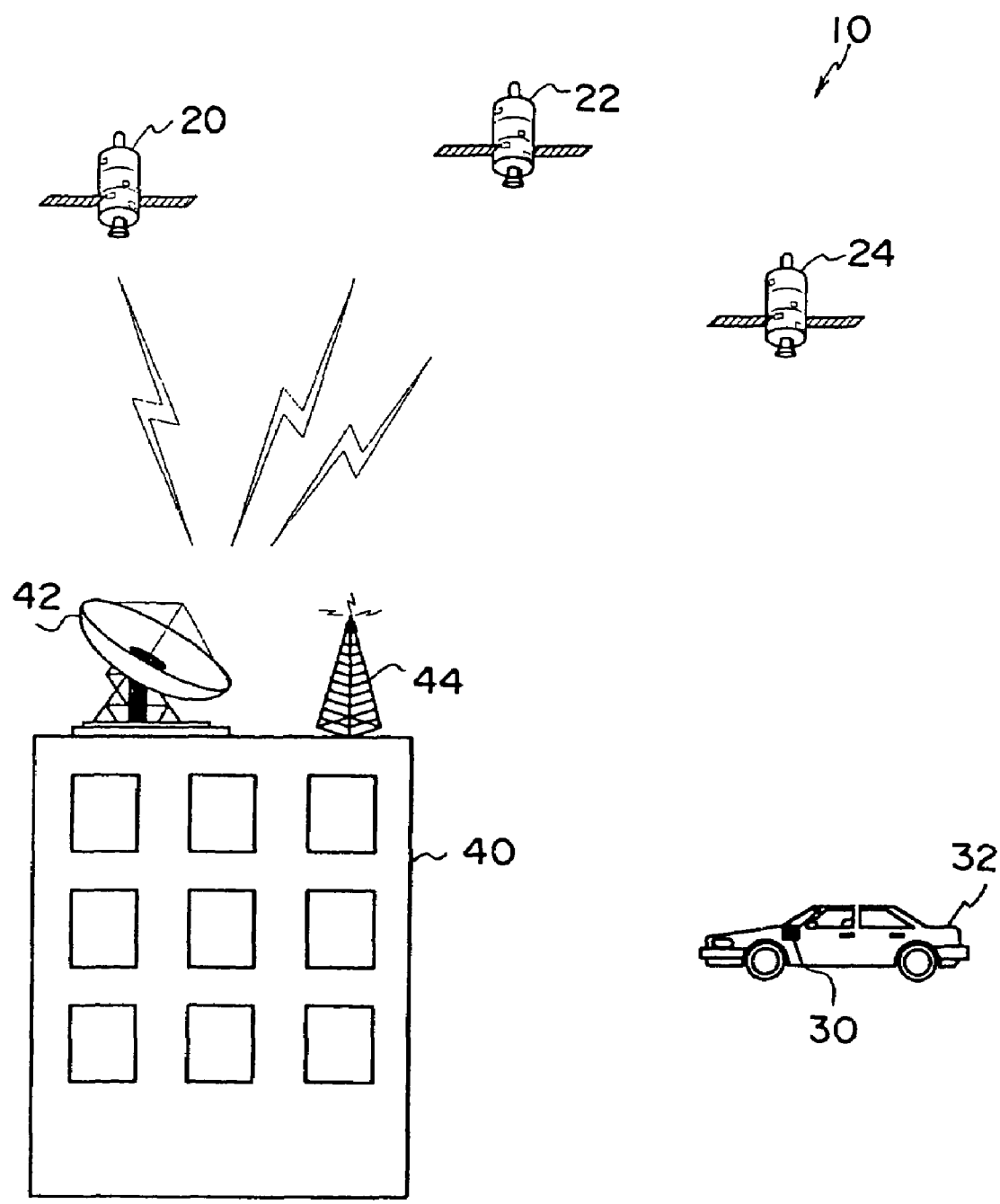
FIG. 1 is a block diagram showing the conceptual structure of an automatic charge system 10 according to an embodiment of the present invention.

FIG. 1 shows the concept of the structure of an automatic charge system 10 of the present embodiment. The automatic charge system 10 of the present embodiment comprises: an in-vehicle device 30 mounted in a vehicle 32 and provided with a GPS antenna for receiving signals from GPS satellites 20, 22, and 24, and a ground wave antenna for ground wave communication (described below in detail); and a general center 40 serving as an on-road device that is fixed on the ground and is provided with a GPS antenna 42 for receiving GPS signals from the GPS satellites 20, 22, and 24. The general center 40 also has a ground wave antenna 44 for ground wave communication.

The in-vehicle device 30 detects the position of the vehicle 32 in which it is mounted using GPS signals from the GPS satellites 20, 22, and 24, and transmits this by ground wave communication to the general center. The general center 40 performs the charge processing (calculations) for the area in which a charge is applied based on the received position of the vehicle 32, and transmits the result thereof to the in-vehicle device 30. The in-vehicle device 30 performs toll PR based on the received result of the charge processing. Note that it is also possible for the toll PR to be performed at the general center, and only the result of the toll PR transmitted.

Figure 2:
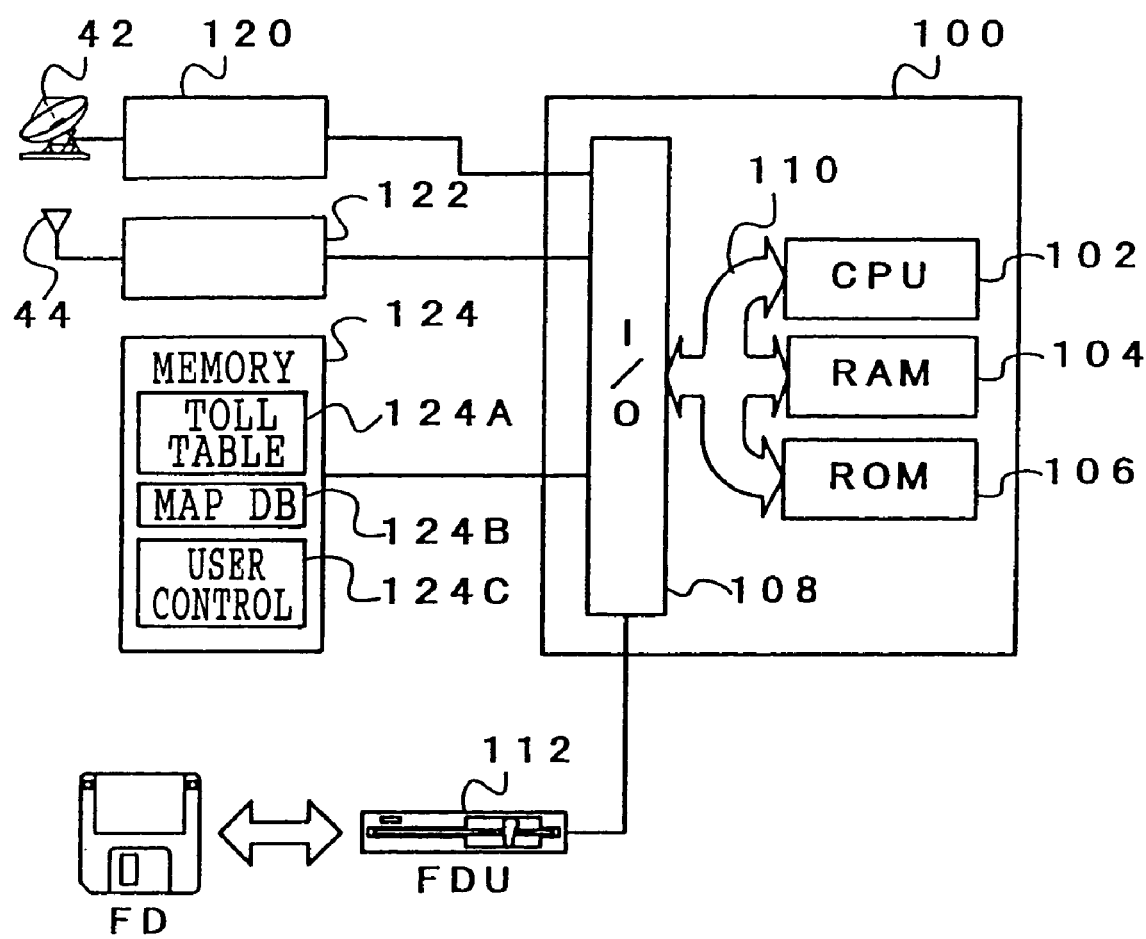
FIG. 2 is a block diagram showing the schematic structure of a general center established on the ground in the automatic charge system of the first embodiment.

As is shown in FIG. 2, the general center 40 established on the ground has a center control device 100. The center control device 100 is structured from a microcomputer comprising a CPU 102, RAM 104, ROM 106, and an input/output port (I/O) 108. Each of these is connected together by a bus 110 so that commands and data can be transferred between each. Note that a processing routine that is described below is stored in the ROM 106.

A GPS communication device 120 having a GPS antenna 42 is connected to the input/output port 108, as is a ground wave communication device 122 having a ground wave antenna 44. The GPS communication device 120 is intended to detect its own position, namely, the position of the general center 40 using the GPS signals from the GPS satellites 20, 22, and 24. The ground wave communication device 122 is intended to exchange signals or to provide information by communicating with the in-vehicle device 30 mounted in the vehicle, and employs a wireless communication device. Note that an example of this wireless communication device is an FM broadcast or an FM character broadcast, a known wave communication, and telephone circuit communication such as in a moving body communication device.

Memory 124 is also connected to the input/output port 108. This memory 124 includes a toll table 124A in which toll information representing tolls of the area in which a charge is applied is stored, a map database 124B in which map information for determining the area in which a charge is applied is stored, and a user control database 124C which is connectable to the general center and in which individual information of the user to be controlled is stored.

Note that, a floppy disk unit (FDU) 112 into which a floppy disk (referred to below as FD) can be inserted as a recording medium and also removed is connected to the center control device 100. Note also that the processing routine described below is able to be written to or read from an FD using the FDU 112. Accordingly, it is also possible to record in advance the processing routine described below on an FD without storing it inside the center control device 100, and to execute the processing program recorded on the FD via the FDU 112. Alternatively, it is also possible to connect an (unillustrated) large volume storage device such as a hard disk to the center control device 100, and to store (install) a processing program recorded on the FD on the (unillustrated) large volume storage device and then execute the processing program. There are also optical disks such as CD-ROMs and the like, and magnetooptical disks such as MD, MO and the like as a recording medium, and if these are used, a CD-ROM device, an MD device, an MO device or the like may be used instead of or in conjunction with the above FDU.

Next, the in-vehicle device 30 will be described. The in-vehicle device 30 used in the present embodiment is one in which the present invention has been applied to a navigation system for providing route assistance information using images and sound to a driver. The in-vehicle device 30 including a navigation system is mounted on the instrument panel of the vehicle 32 in order to exchange signals with the on-road device.

Figure 3:
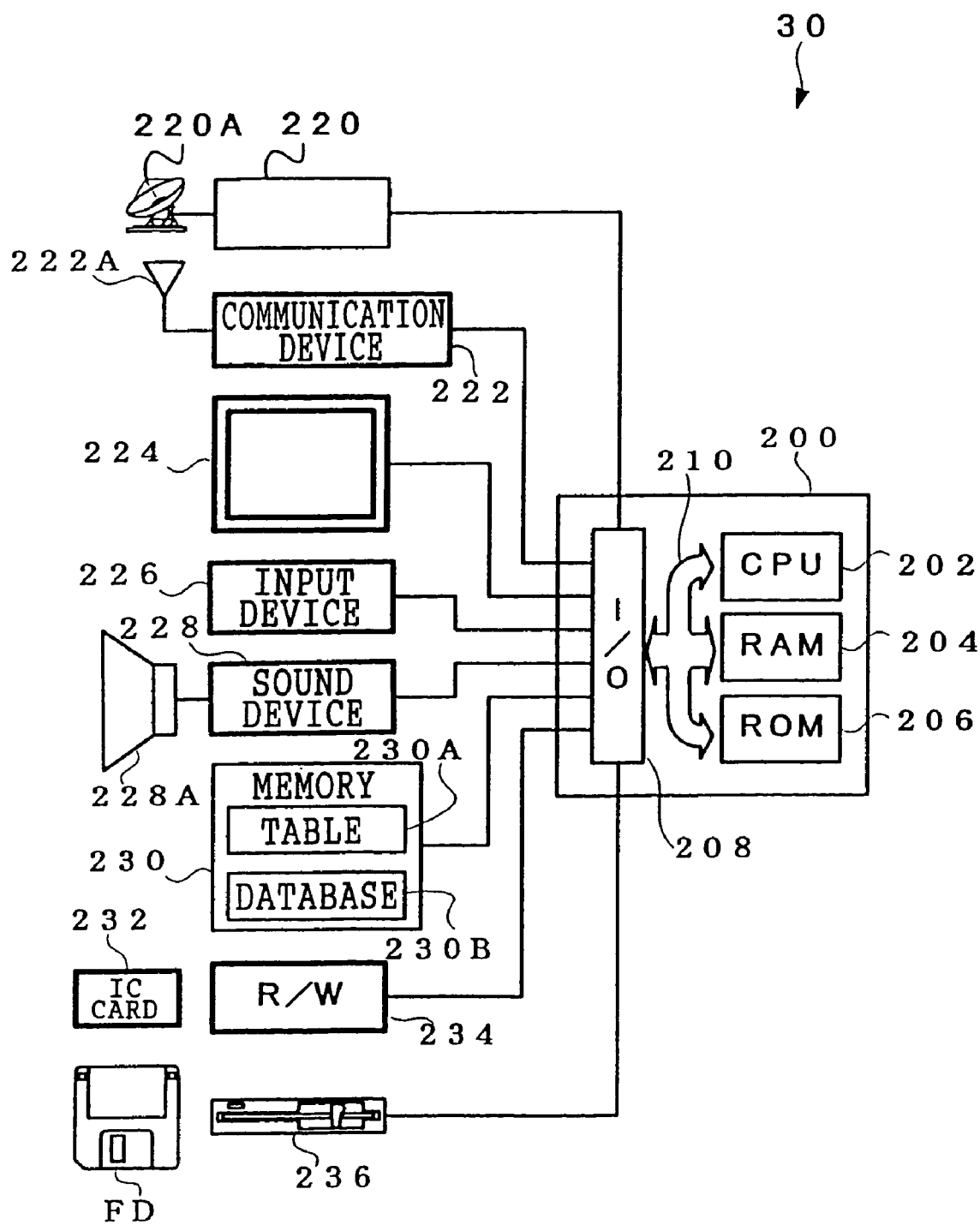
FIG. 3 is a block diagram showing the schematic structure of an in-vehicle device in the automatic charge system of the first embodiment.

As is shown in FIG. 3, the in-vehicle device 30 including a navigation system of the present embodiment is provided with a device main body 200 formed from a microcomputer comprising a CPU 202, RAM 204, ROM 206, and an input/output (I/O) port 208 each of which is connected together by a bus 210 such that commands and data can be transferred between each. Note that the RAM 204 is backup RAM so that, even if the power supply thereto is cut, the contents of the information stored therein are backed up (stored). A floppy disk unit 236 (FD device) into which a floppy disk (FD) can be inserted and also removed is connected to the input/output port 208. Note that the processing routine described below and various image data are stored in the ROM 206.

This various data and the processing routine described below are able to be written to or read from an FD using the FD device 236. Accordingly, it is also possible to record in advance the processing routine described below on an FD without storing it ROM 206, and to execute the processing program recorded on the floppy disk FD via the FD device 236. Alternatively, it is also possible to connect an (unillustrated) large volume storage device such as a hard disk to the control main body 200, and to store (install) a processing program recorded on the floppy disk FD on the (unillustrated) large volume storage device and then execute the processing program. There are also optical disks such as CD-ROMs and the like, and magnetooptical disks such as MD, MO and the like as a recording medium, and if these are used, a CD-ROM device, an MD device, an MO device or the like may be used instead of or in conjunction with the above FD device 236.

Note that the in-vehicle device 30 including a navigation system of the present embodiment can be connected via an input/output port to (unillustrated) a local area network for vehicle.

A GPS device 220 for being mounted on a vehicle having a GPS antenna 220A mounted on the vehicle is connected to the input/output port 208, as is a ground wave communication device 222 having a ground wave antenna 222A. The GPS device 220 for being mounted on a vehicle is intended to detect the position of the vehicle 32 in which it is mounted using GPS signals from the GPS satellites 20, 22, and 24. The ground wave communication device 222 is intended to exchange signals or to provide information by communicating with the ground, and employs a wireless communication device. Note that an example of this wireless communication device is an FM broadcast or an FM character broadcast, a known wave communication, and telephone circuit communication such as in a moving body communication device. Accordingly, a communication device for a moving body such as a portable telephone or a car phone or the like may be used as the ground wave communication device 222, so that wireless communication (conversation via a telephone circuit) can be made possible via the in-vehicle device 30 between the vehicle and a telephone device outside the vehicle.

Memory 230 is also connected to the input/output port 208. This memory 230 includes a toll table 230A in which toll information representing tolls of the area in which a charge is applied is stored, and a map database 230B in which map information for providing route assistance information is stored.

Also connected to the above input/output port 208 are a display device 224 for providing route assistance information images to the driver, a speaker device comprising a sound device 228 provided with a speaker 228A for providing sound information to the driver, and an input device 226 such as a keyboard or switch device. The display device 224 can display map information. The sound device 228 converts either a digital or analog sound signal output from the device main body 12 into a drive signal for the speaker 228A.

Note that the data and the like to be stored in the above memory 230 may also be stored on a storage medium such as a floppy disk using the floppy disk device 236 or on a hard disk device.

In addition to these, an IC card read/write device 234 capable of inserting and detaching an IC card on which toll balance information and the like is stored is provided for the input/output port 208. In the in-vehicle device 30, an ID code comprising a vehicle number and the like as well as fixed data such as information on the vehicle model and the like is stored in advance in the RAM 204 and ROM 206. The in-vehicle device 30 refers to the toll balance information on the IC card 232 loaded into the IC card read/write device 234, and writes toll balance information on the IC card 232. As the IC card, prepaid card or credit card is applied.

Note that the mounting position (attachment position) of the in-vehicle device 30 is not limited to being on the vehicle instrument panel as described above, and it is sufficient if it is in a position where it is able to exchange signals with the ground using the antenna. For example, it may be mounted inside the vehicle at the rear seat or the like. Moreover, the in-vehicle device 30 may be formed with separate structures comprising an in-vehicle device main body and an antenna. If the in-vehicle device is structured in this way with a separate in-vehicle device main body and antenna, it is possible to install the antenna only on the instrument panel or at a position towards the rear seat or the like, as described above, and the position where the antenna has been mounted is registered as the mounting position information.

Moreover, when the ignition is on, power is supplied at all times from the vehicle battery to the in-vehicle device. It is also possible to enable the in-vehicle device to acquire date and time information such as the year, month, date, as well as the current time from an unillustrated clock built into the vehicle 32.

Note that, in the above description, toll tables are stored in memory in both the in-vehicle device 30 and the general center 40, however, it is also possible for the toll tables to be stored in the device that performs the calculation of the toll to be charged or to be stored in another device when toll information is obtained by communication, namely, the toll tables may be stored in the memory of one of the in-vehicle device 30 and the general center 40.

The operation of the present embodiment will now be described.

Firstly, the operation of the ground side, namely, of the general center will be described in detail. In the present embodiment, the general center 40 transmits information for charge processing to the in-vehicle device 30 mounted on a vehicle 32.

Figure 4:
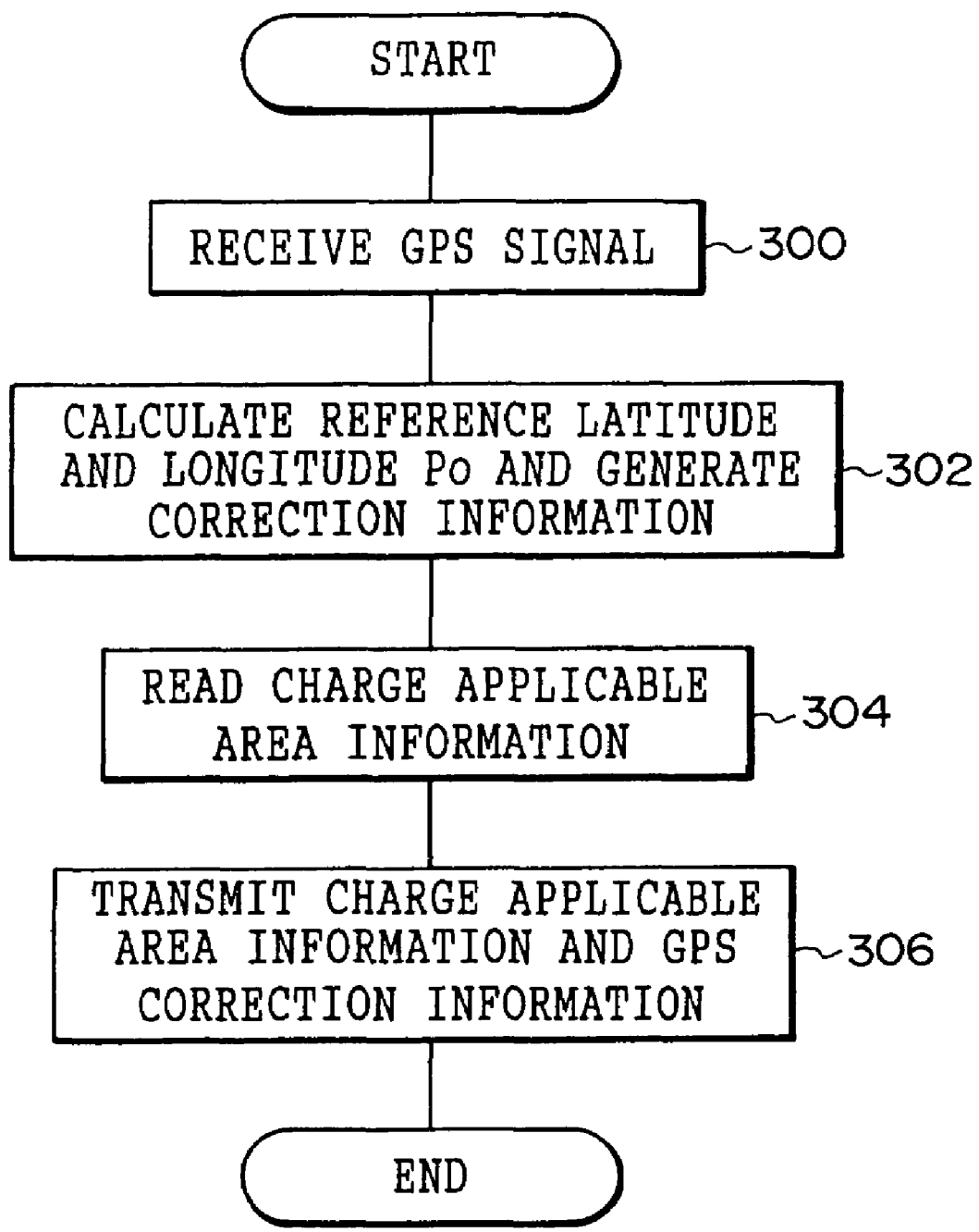
FIG. 4 is a flow chart showing the flow of information transmission processing executed in the general center in the first embodiment.

As is shown in FIG. 4, in step 300, the general center 40 receives GPS signals from GPS satellites 20, 22, and 24. In the next step 302, the general center 40 determines its own reference position (a reference latitude and longitude Po), and generates GPS correction information. When the size of an error in the GPS signals from the GPS satellites 20, 22, and 24 is large, the GPS correction information is used to correct the error. Because the general center 40 is fixed in place, the GPS correction information is able to detect any variation in the GPS signals of the GPS satellites 20, 22, and 24.

In the next step 304, information of a predetermined area in which a charge is applied (area in which a charge is applied) is read, and the GPS correction information is transmitted together with the area in which a charge is applied information in the next step 306. This transmission can be performed by FM broadcast or by a telephone circuit.

Figure 7:
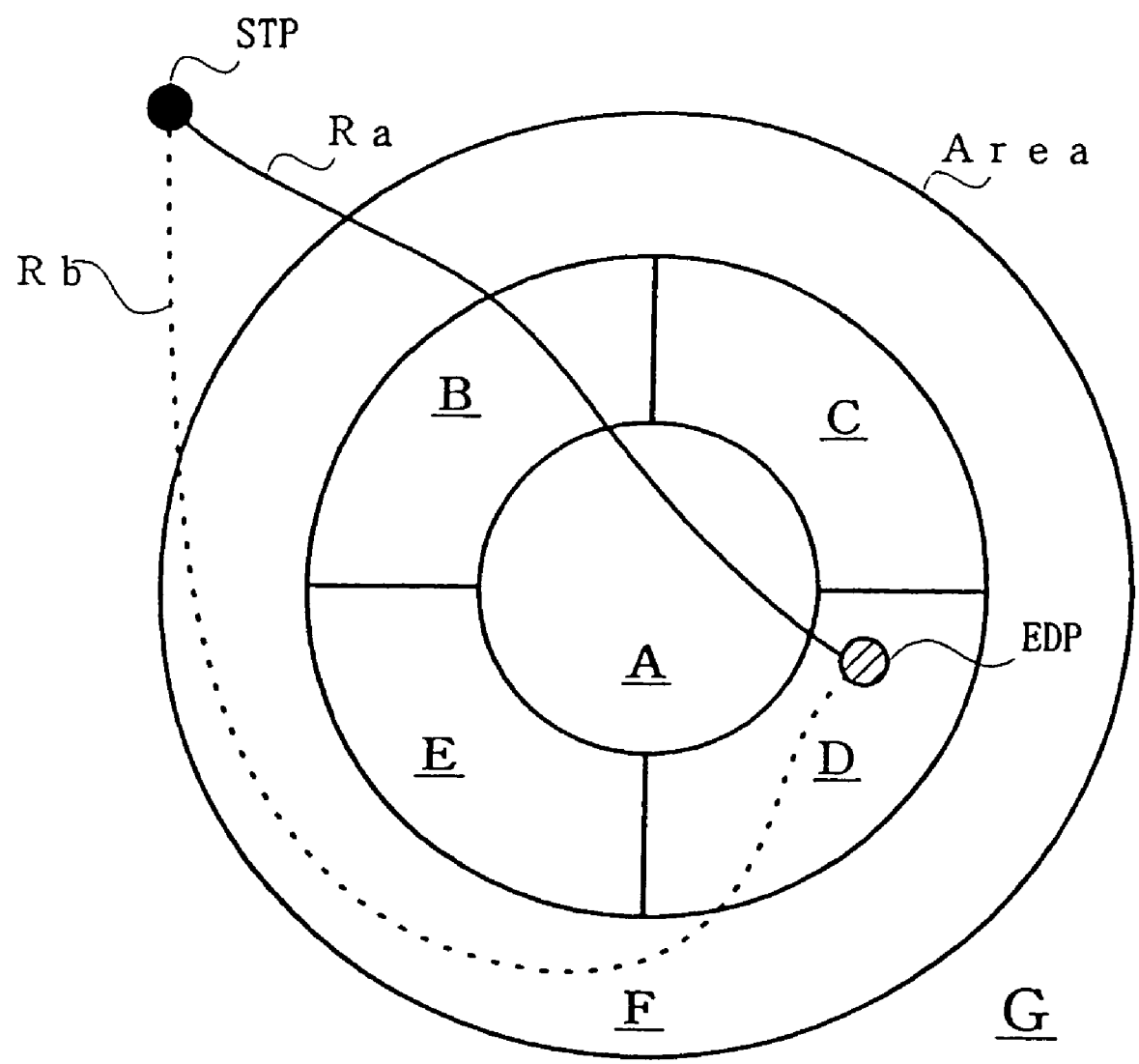
FIG. 7 is an image diagram showing a area in which a charge is applied.

The area in which a charge is applied information is set for a area in which a charge is applied (Area) formed from a plurality of predetermined areas. For example, areas might be formed between a city center area and the suburbs and these areas become smaller the closer they are to the city center area. An example of area in which a charge is applied (Area) of this type is shown in FIG. 7. The ground is divided into 7 areas. In the center portion is a circular area A. Next are areas B, C, D, and E, into which substantially donut shaped circle concentric around and adjacent to the outer periphery of the area A is divided 4 areas. Next is a substantially donut shaped circle F concentric around and adjacent to the outer periphery of the areas B, C, D, and E. Last is the area G which is an area other than the areas A, B, C, D, E, and F. These areas can be specified by their latitude and longitude as well as by their shape.

Figure 8:
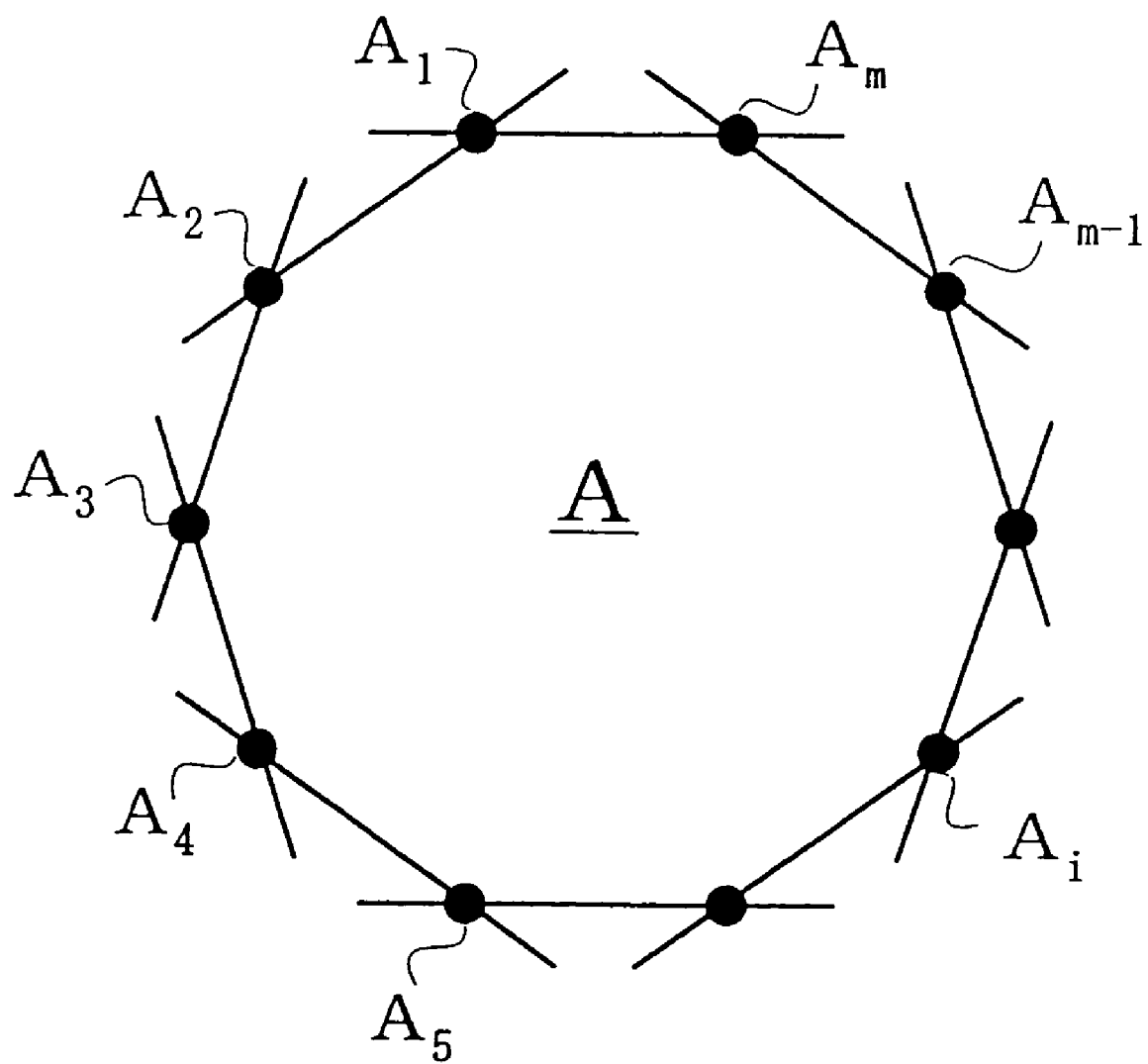
FIG. 8 is an explanatory diagram for explaining an example for determining a area in which a charge is applied.

As is shown in FIG. 8, the area A can be determined by forming a closed space by setting a plurality of positions on the boundaries of the area A with the areas B. C, D, and E, and setting a straight line passing through adjacent point positions. Specifically, if an position on a boundary line of the area A with the areas B, C, D, and E is defined as $A_i$ ($a_{Xi}$, $a_{Yi}$), then a straight line passing through the points $A_i$ and $A_{i+1}$ can be expressed using the following formula.

$$(y-a_{Yi})/(x-a_{Xi})=(a_{Yi+1}-a_{Yi})/(a_{Xi+1}-a_{Xi}) \qquad (1)$$

Accordingly, it is sufficient if the area A fulfills the following conditions $$(y-a_{Yi})/(x-a_{Xi})=(a_{Yi+1}-a_{Yi})/(a_{Xi+1}-a_{Xi})<0$$

wherein, i=1~(m−1)

m: a number representing a point of the last position on the boundary line.

Moreover, the area in which a charge is applied information is set for a area in which a charge is applied (Area) formed from a plurality of areas, however, it is possible to set a different charge amount for each area. For example, it is possible to increase the charge amount in accordance with the proximity to the city center, or to alter the charge amount in accordance with the number of times of use, or to alter the charge amount in accordance with the level of congestion, or to alter the charge amount in accordance with the length of time of use. In the description given below, these conditions for setting the charge amount are called calculation conditions for a charge (charge calculation conditions).

The first charge calculation condition is the number of entries into an area shown in a table indicating the tolls for each area in Table 1.

TABLE 1

| Area | Charge Amount |
| --- | --- |
| A | ¥300/entry |
| B | ¥100/entry |
| C | ¥100/entry |
| D | ¥100/entry |
| E | ¥100/entry |
| F | ¥10/entry |
| G | ¥0/entry |

If the charge condition is set in this way, the charge amount increases as the number of entries into the central portion of the area in which a charge is applied increases.

The second charge calculation condition is the length of time staying in an area shown in a table indicating the tolls for each area in table 2.

TABLE 2

| Area | Charge Amount |
| --- | --- |
| A | ¥150/entry |
| B | ¥90/entry |
| C | ¥90/entry |
| D | ¥90/entry |
| E | ¥90/entry |
| F | ¥10/entry |
| G | ¥5/entry |

If the charge condition is set in this way, the charge amount increases as the length of time staying in central portion of the area in which a charge is applied increases.

The third charge calculation condition is the level of congestion shown in a table indicating the tolls for each area, while the fourth charge calculation condition is the speed at which a vehicle traveled inside an area (alternatively, the average speed within the area) shown in a table indicating the tolls for each area, and the fifth charge calculation condition is the total distance traveled inside an area when traveling inside an area shown in a table indicating the tolls for each area.

By including tables based on the above charge calculation conditions in the area in which a charge is applied information, it is possible to specify both the area and the toll for the area in which a charge is applied.

Next the operation of the in-vehicle device 30 will be described.

Figure 5:
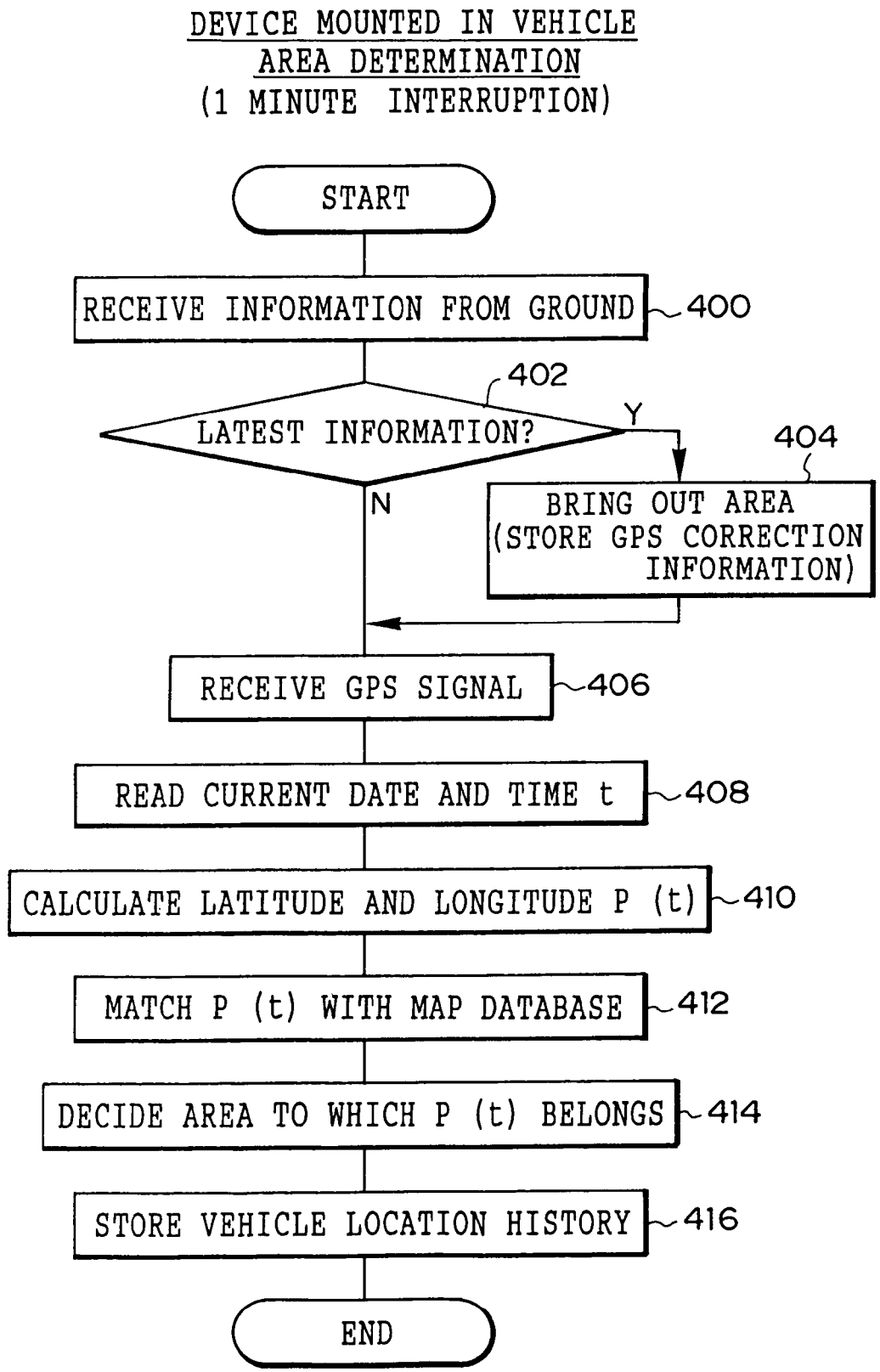
FIG. 5 is a flow chart showing the flow of processing to decide a area in which a charge is applied executed in the in-vehicle device of the first embodiment.

As is shown in FIG. 5, the following interrupt processing is performed at predetermined times (every 1 minute in the present embodiment) in the in-vehicle device 30 mounted in a vehicle. In step 400, information is received from the ground side, namely, from the general center 40. As was described above, the information from the general center 40 is area in which a charge is applied information and GPS correction information, and in step 402, a determination is made as to whether or not the received information is the most recent information. If the received information is the most recent information, the determination in step 402 is affirmative and, in the next step 404, the area in which a charge is applied (Area) is brought out and the GPS correction data is stored. If, however, the received information is not the most recent information, the determination in step 402 is negative and, in the next step 406, GPS signals from the GPS satellites 20, 22, and 24 are received. In the next step 408, the current date and time (year, month, date, time) are read and, in step 410, the in-vehicle device's own position, namely, the position of the vehicle 32 (latitude and longitude P (t)) is determined. Note that the when determining the latitude and longitude P (t), the stored GPS correction information can be used.

In the next step 412, the determined latitude and longitude P (t) is matched with a map database stored in advance and, in the next step 414, the area to which the latitude and longitude P (t) belongs is decided. Next, in step 416, the latitude and longitude p (t), the time (t), and the area are stored as vehicle location history. In table 3, shown in FIG. 70, an example of a vehicle location history list is shown.

Note that the "charge" column in the above table is for identification data representing whether or not the charge processing described below has been performed. The [*] symbol indicates that the charge processing has been performed.

In this way, the area in which the vehicle 32 was present every predetermined time is stored together with the date and time as history.

Next, the charge processing in the in-vehicle device 30 will be described. The charge processing is performed at predetermined times. The predetermined times when the processing may be performed include every hour, a predetermined day of every week, a predetermined date and time of every month, or a predetermined year, month, date, and time. Note that the execution of this charge processing may also be performed in response to an instruction from the general center 40.

Figure 6:
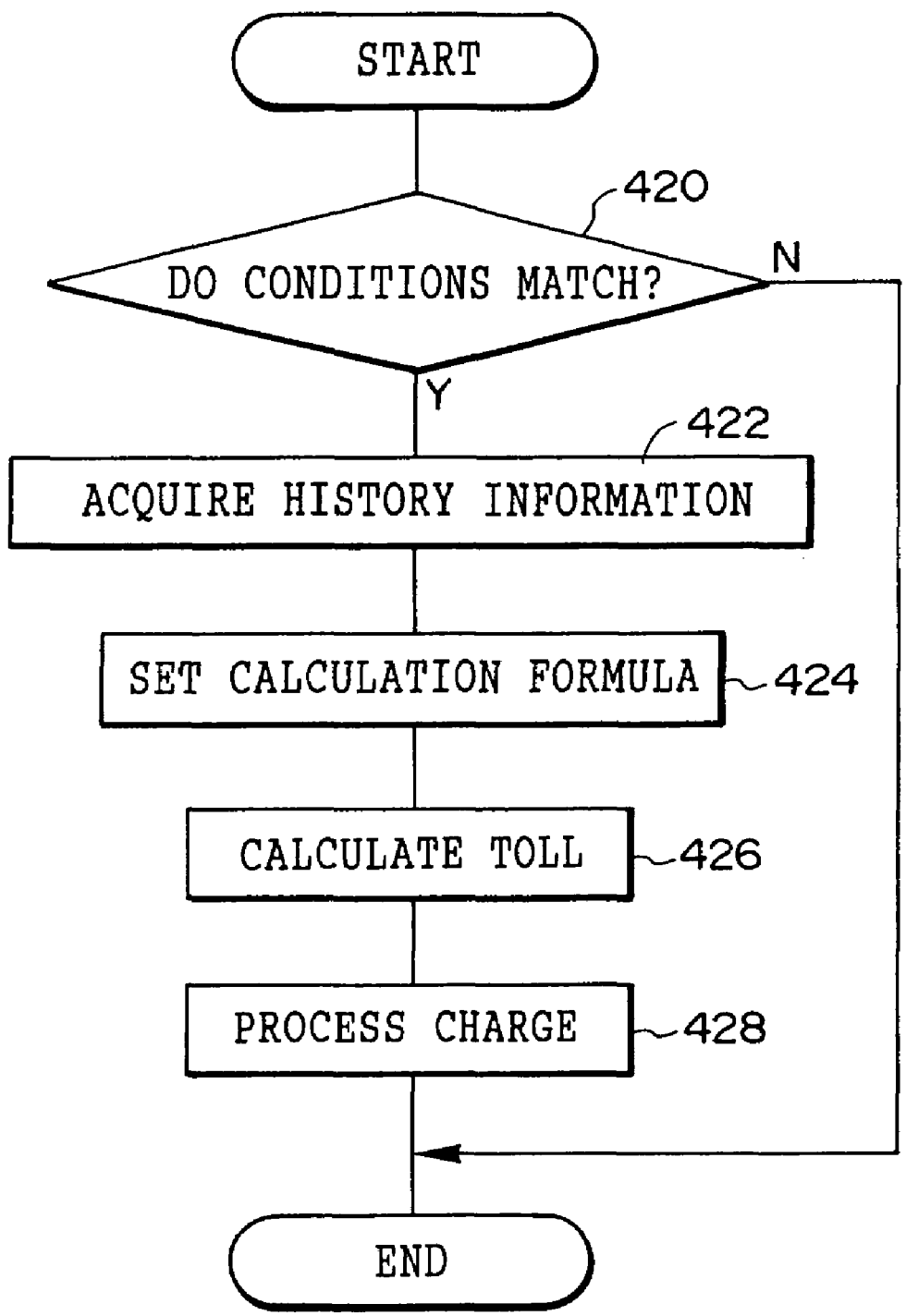
FIG. 6 is a flow chart showing the flow of charge processing executed in the in-vehicle device of the first embodiment.

As is shown in FIG. 6, in step 420, by making a determination as to whether or not it is the above predetermined time or whether or not an instruction has been given by the general center 40, it is possible to determine whether or not the conditions are matched. If the conditions do not match, the determination in step 420 is negative, and the routine is ended.

If, however, the conditions do match, the determination in step 420 is affirmative and, in the next step 422, the history information is acquired. This history information is the vehicle location history list (Table 3) stored in step 416 in FIG. 5. In the next step 424, a calculation formula (charge calculation formula) is set. The charge calculation formula is determined by the above calculation conditions. These calculation conditions are conditions for determining a charge amount (charge calculation conditions) and may be made up of the number of entries into an area, the length of time staying in an area, or the like. The charge calculation formula is determined by the calculation conditions. In formula (2) below, a charge calculation formula is shown as a general formula considering areas.

$$\text{(charge amount)} = f(N_A, N_B, N_C, N_D, N_E, N_F, N_G, N_H, N_I, N_J, t) \quad (2)$$

wherein, $N_A$, $N_B$, $N_C$, $N_D$, $N_E$, $N_F$, $N_G$: the evaluation of the areas A–G (i.e. the number of entries and length of stay for each area determined by the charge calculation conditions)

$N_H$: the level of congestion $N_I$: the speed (average speed)

$N_J$: the total distance traveled within the area t: the date and time

In the next step 426, the charge is calculated using the calculation formula set above and the history information. When the charge calculation is ended, the routine proceeds to step 428 where the charge processing is performed. This charge processing is processing to subtract the charge amount determined above from the balance of the IC card 232.

For example, when the calculation condition is only the number of entries into an area and the history information is from the start point STP to the end point EDP, as shown in FIG. 7, the charge amount is found as shown below for the two routes Ra and Rb.

Ra charge amount=300×1+100×1+100×0+100×1+100×0+10×1+0×1=¥510

Rb charge amount=300×0+100×0+100×0+100×1+100×0+10×1+0×1=¥110

Thus, a route that avoids the central portion has a cheaper charge amount.

If the calculation condition is the only length of time staying in an area and the history information is from the start point STP to the end point EDP, as shown in FIG. 7, the charge amount is found as shown below for the two routes Ra and Rb.

Ra charge amount=150×2+90×4+90×0+90×2+90×0+10×2+5×2=¥870

Rb charge amount=150×0+90×0+90×0+90×2+90×0+10×7+5×2=¥260

Thus, a route that avoids the central portion has a cheaper charge amount.

Second Embodiment

Next, the second embodiment will be described. Note that, because the present embodiment has substantially the same structure as the above embodiment, the same descriptive symbols are used for the same portions and a detailed description thereof is omitted.

In the above embodiment a description was given of charge processing for a vehicle that has entered into a area in which a charge is applied, however, in some cases, a vehicle does not move after making an entry but is parked instead. In some cases, the toll on such a parked vehicle is increased. For example, it is necessary to increase the charge to a car that has parked in a no-parking zone. Moreover, if the toll on all vehicles is increased, because the increase is applied to vehicles that should not properly have had the increase applied to them, such as vehicles belonging to residents of the neighborhood, or vehicles in company car parks or independent fee system car parks, there needs to be some relief available in cases such as these. In the present embodiment, the toll is increased on parked vehicles and relief is given to vehicles whose toll should not be increased.

In the present embodiment, charge applicable zone information for charging a parking toll is set for a charge applicable zone formed from a plurality of predetermined zones.

Figure 9:
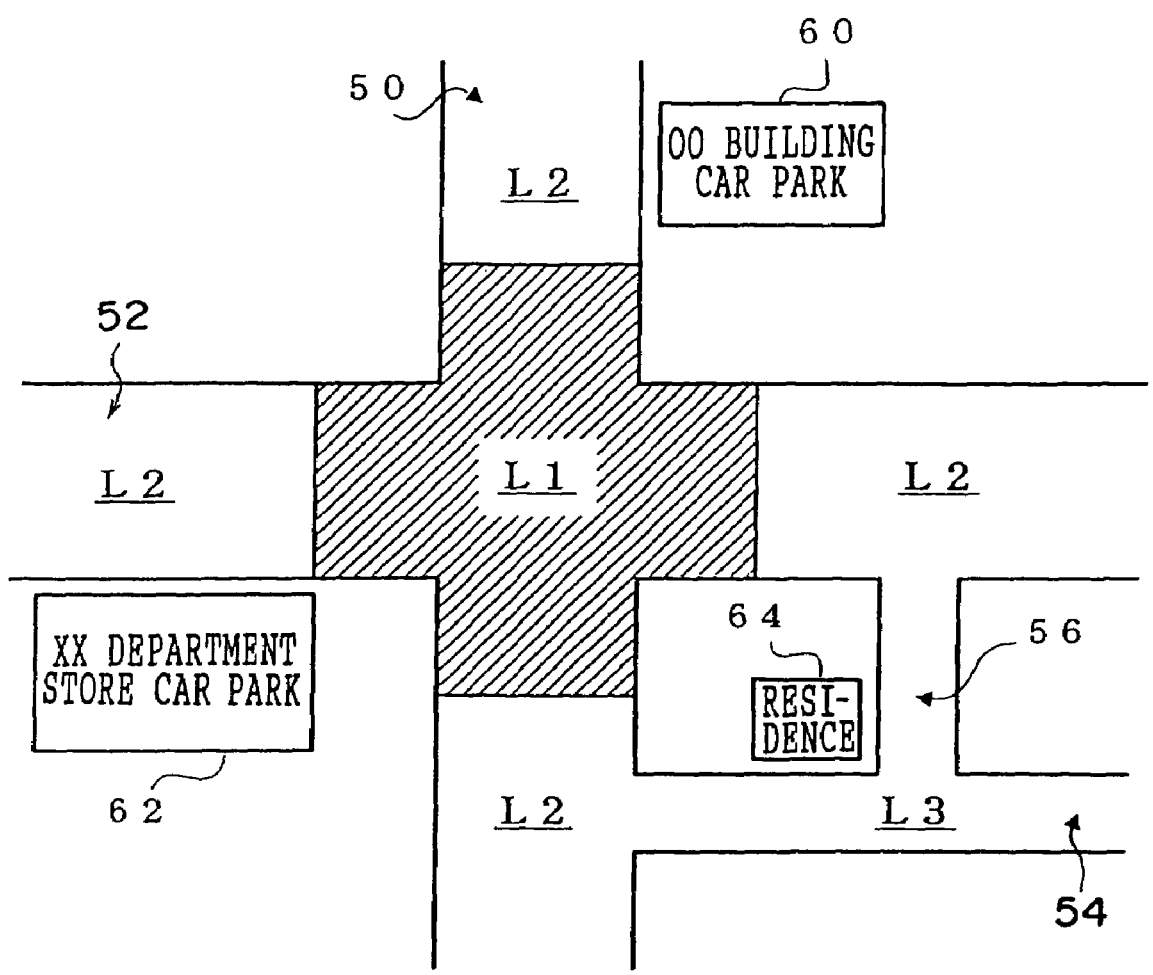
FIG. 9 is an image diagram showing an example of a charge applicable zone of the second embodiment.

FIG. 9 shows an example of a charge applicable zone. This charge applicable zone is made up of a rank 1 zone L1 in the area in the vicinity of the intersection of the intersecting roads 51 and 53 (the area indicated by the diagonal lines in FIG. 9), a rank 2 zone L2 in the areas around the roads 51 and 53 adjacent to the outer periphery of the zone L1, a rank 3 zone L3 in the area of the alley 54 that connects with the road 51 and is also substantially parallel with the road 53, and a rank 3 zone L3 in the area of the alley 56 that connects with the road 53 and also connects with the alley 54 and is also substantially parallel with the road 51. Each of these zones can be specified by their latitude and longitude and also by their shape.

A residential area 64 which is a reserved zone removed from the charge application zone is located in the area surrounded by the roads 51 and 53 and the alleys 54 and 56. An area 64 of the parking lot of the OO building which is a reserved zone is located on the opposite side across the road 53 from the residential area 64. There is also an area 62 of the parking lot of the XX department store which is also a reserved zone which is on the opposite side across the intersection from the residential area 64. The area 62 of the department store parking lot implements a charge independently and is exempted from the charge application. Note that there are also additional public car parks, contract car parks, store car parks, leisure area car parks, and the like. Moreover, the area 64 of the OO building car park and the residential area 64 are matched with a user ID and the parked vehicles can be specified in advance. In addition to these, there are residential car parks, office car parks, and the like.

The charge applicable zone information is set for a charge applicable zone formed from a plurality of zones, however, it is also possible to set a different charge amount for each zone. For example, it is possible to increase the charge amount in accordance with the volume of traffic. In the present embodiment, these conditions for setting the charge amount are called parking conditions for a charge.

An example of the parking conditions is the ranking shown in a table indicating the toll for each zone in Table 4 below.

TABLE 4

| Rank | Charge Amount | Zone |
|---|---|---|
| 1 | ¥500/minute | L1 |
| 2 | ¥100/minute | L2 |
| 3 | ¥50/minute | L3 |

If the charge condition is set in this way, the charge amount increases as the number of times the vehicle parks in a high volume traffic zone increases.

The operation of the present embodiment will now be described.

Firstly, the operation of the general center will be described in detail. The general center 40 transmits information for charge processing to the in-vehicle device 30 mounted on a vehicle 32. Note that, in the present embodiment, when the area in which a charge is applied information determined in advance in the above embodiments is read (step 304 in FIG. 4), and the GPS correction information is transmitted together with this area in which a charge is applied information (step 306 in FIG. 4), the charge applicable zone information is used in addition to these. The rest of the structure is the same as in the above embodiment and a detailed description thereof is omitted.

The operation of the in-vehicle device 30 will now be described.

Because the processing is the same as far as the processing of step 414 in FIG. 5, a detailed description thereof is omitted.

Figure 10:
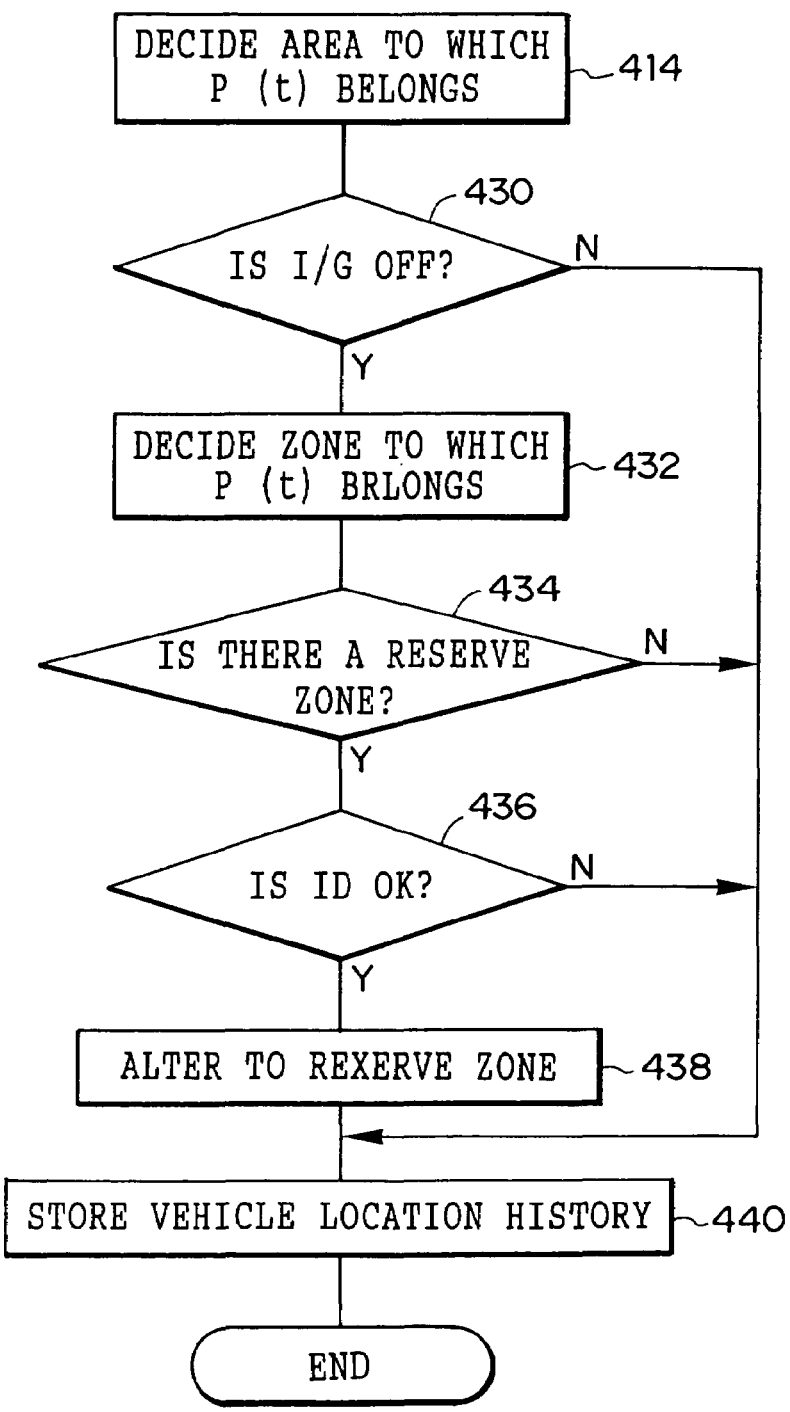
FIG. 10 is a flow chart showing the flow of processing to decide a charge applicable zone executed in the in-vehicle device of the second embodiment.

As is shown in FIG. 10, when it is decided to which area the current latitude and longitude P (t) belong (step 414 of FIG. 5), then, in the next step 430, a determination is made as to whether or not the vehicle ignition switch is off. This determination is made because the definition of the vehicle 32 being parked is assumed as being when the engine is stopped. When the ignition switch is on, because it is possible for the vehicle to move, it is determined that the vehicle is not parked and the determination in step 430 is negative. The routine then proceeds to step 440 where the latitude and longitude P (t), the date and time t, and the area are stored as vehicle location history in the same way as in the above embodiment (step 416 of FIG. 5).

If, however, the vehicle ignition switch is off, it is determined that the vehicle is parked, and the determination in step 430 is affirmative. In the next step 432, the latitude and longitude P (t) determined above are matched with a map database that has already been stored in the in-vehicle device, and to which zone the latitude and longitude P (t) belong is decided. In the next step 434, a determination is made as to whether or not a reserve zone is contained in the decided zone and whether or not the latitude and longitude P (t) are contained within the reserve zone. If the latitude and longitude P (t) are not contained within a reserve zone, there is no need to reserve the parking toll. Therefore, the determination in step 434 is negative and the routine proceeds to step 440 where together with the decided zone, the latitude and longitude P (t), the date and time t, and the area are stored as vehicle location history. Table 5, shown in FIG. 71, shows an example of a vehicle location history list.

Note that the rank of the zone and the word "reserve" (when the zone is reserved as described below) is entered in the zone column in the above table.

If, however, the latitude and longitude P (t) are included in a reserve zone, the determination in step 434 is affirmative and, in the next step 436, a determination is made as to whether or not the ID of the vehicle 32 (or the user ID) is an ID intended for the reserve zone. If the ID of the vehicle 32 is not an ID intended for the reserve zone, there is no need to reserve the parking toll. Therefore, the determination in step 436 is negative and the routine proceeds to step 440 where the vehicle location history is stored in the same way as described above. If the ID of the vehicle 32 is an ID intended for the reserve zone, it is necessary to reserve the charge toll. Therefore, the determination in step 436 is affirmative and, in the next step 438, the zone decided above (step 432) is altered to information indicating a reserve zone and the routine proceeds to step 440 where the vehicle location history is stored in the same way as described above.

As described above, the areas and zones where the vehicle 32 is located at predetermined times are stored as history together with the date and time.

Next, the charge processing in the in-vehicle device 30 will be described. The charge processing is performed at predetermined times. The processing may be performed at predetermined times such as every hour, a predetermined day of every week, a predetermined date and time of every month, or a predetermined year, month, date, and time. Note that the execution of this charge processing may also be performed in response to an instruction from the general center 40. Because the charge processing of the present embodiment is substantially the same as the charge processing of FIG. 6, those portions that are the same are omitted.

Figure 11:
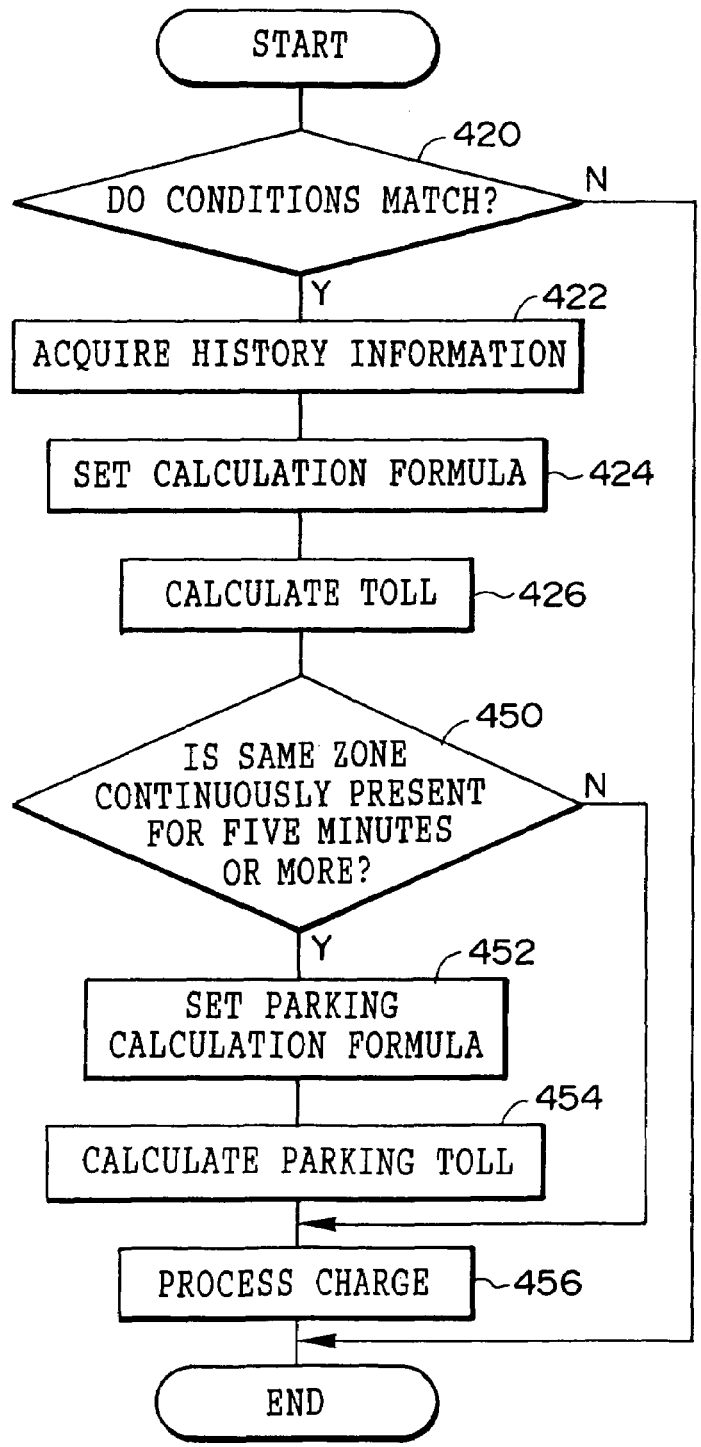
FIG. 11 is a flow chart showing the flow of charge processing executed in the in-vehicle device of the second embodiment.

As is shown in FIG. 11, a determination is made as to whether or not the conditions match (step 420) and if the conditions do not match, the current routine is ended. If the conditions do match, the history information is acquired (step 422). This history information is the list of the vehicle location history (Table 5) including the zone stored in step 440 of FIG. 10 above. Next, the charge calculation formula is set (step 424, formula (2)), and the toll for the area is calculated using the calculation formula and the history information (step 426).

In the next step 450, a determination is made as to whether or not a rank of the same zone is continuously present for a predetermined time (5 minutes in the present embodiment) as history (i.e. continues in the manner of a time series). If a rank of the same zone is not continuously present as history, the determination in step 450 is negative and the routine proceeds to step 456 without the parking toll being calculated. In step 456, the charge is processed using only the toll obtained from the calculation formula for the area (step 428 of FIG. 6), in the same way as in the above embodiment.

If, however, a rank of the same zone is continuously present as history, the determination in step 450 is affirmative and the routine proceeds to step 452 where the parking calculation formula is set. In the following formula (3), the parking calculation formula is shown as a general formula considering the area.

$$(\text{parking toll amount}) = g\ (W_1, W_2, W_3, \ldots, W_z, t) \quad (3)$$

wherein, $W_1, W_2, W_3, \ldots, W_z$: an evaluation for the zones L1 to Lz (z: maximum number of zones)

(namely, a value that is a number existing continuously as history from which ⌈5⌋ has been subtracted)

Note that the reserve zones have been removed from this parking calculation formula.

Moreover, the parking toll amount may also be altered in the above parking calculation formula in accordance with the level of congestion or in accordance with the date and time t.

In the next step 454, the parking toll is calculated using the parking calculation formula set above and the values in the zone column of the history information. When the toll calculation has ended, the routine proceeds to step 456 where charge processing is performed for the parking toll and the entry toll into the area. This toll processing is processing to subtract the above determined charge amount from the balance of the IC card 232.

In this way, it is possible, in the present embodiment, to charge a parking toll for each predetermined zone. Moreover, the parking toll is not increased for all vehicles and it is possible to provide relief for vehicles whose toll should not be increased, such as the vehicles of residents, vehicles in company car parks, vehicles in independent fee system car parks and the like, by reserving the increase for such vehicles.

Note that, in the present embodiment, it is desirable that the user is informed by images and sound or the like, when the vehicle has entered a area in which a charge is applied, when the vehicle is approaching a area in which a charge is applied, when the vehicle has entered a parking toll charge applicable zone, and when the vehicle is approaching a parking toll charge applicable zone. By informing the user in this way, it is possible to prevent a charge being processed for the user without the user being aware of the fact. It is also preferable that the user is informed before or after the charge processing of the estimated charge amount or of the charged amount.

Third Embodiment

The third embodiment of the present invention will now be described.

In the above embodiments, a description was given of when processing is performed in the in-vehicle device, however, in the present embodiment, the charge processing is performed at the general center. Note that, because the structure of the present embodiment is substantially the same as that of the above embodiments, the same portions are given the same descriptive symbols and a detailed description thereof is omitted.

In the present embodiment, because the processing associated with charge processing is performed at the general center, there is no need to generate area in which a charge is applied information in the in-vehicle device. Namely, the in-vehicle device is used for storing and transmitting the latitude and longitude P (t) and the date and time t as history information.

Figure 12:
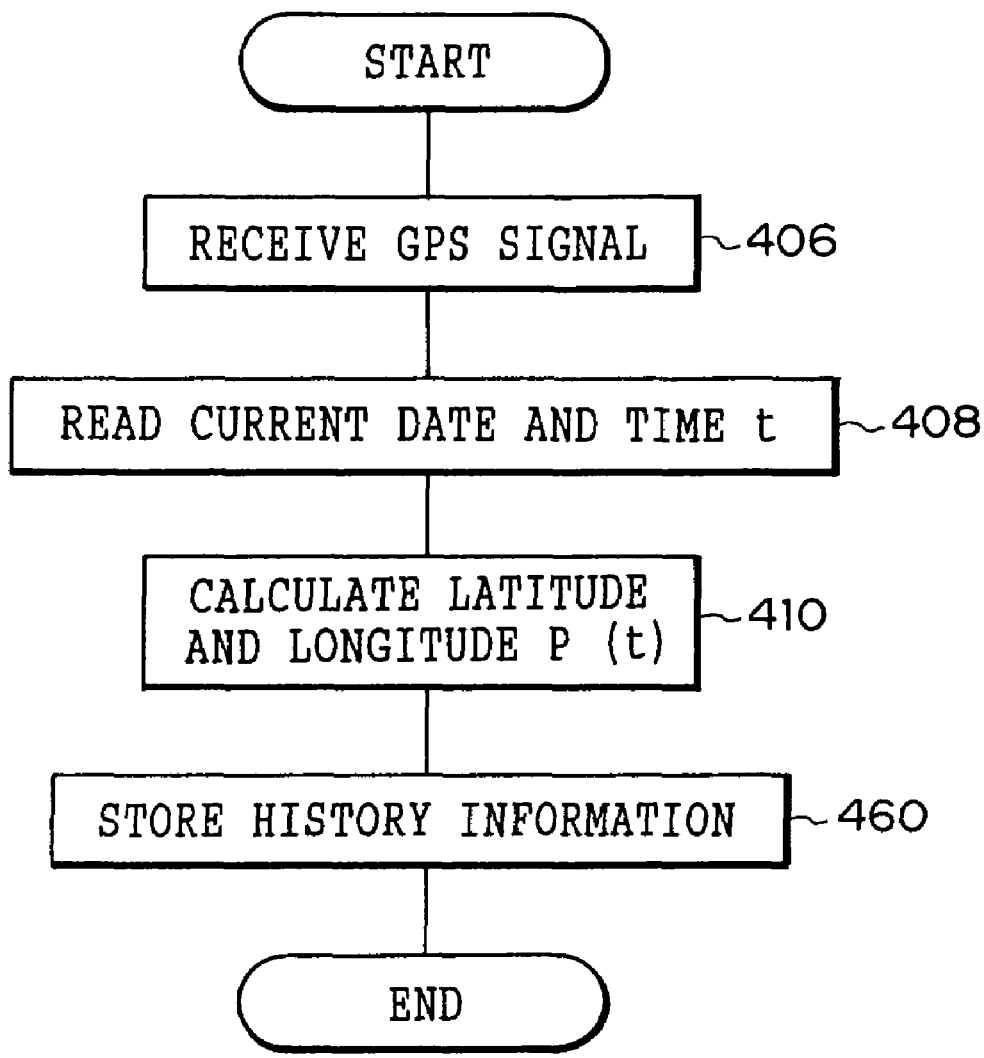
FIG. 12 is a flow chart showing the flow of information storage processing executed in the in-vehicle device of the third embodiment.

As is shown in FIG. 12, the following interrupt processing is performed at predetermined times (every 1 minute in the present embodiment) in the in-vehicle device 30. GPS signals are received from GPS satellites 20, 22, and 24 (step 406), the current date and time (year, month, date, and time) are read (step 408), and the position of the in-vehicle device, namely, the position (latitude and longitude P (t)) of the vehicle 32 is determined. Note that when determining this latitude and longitude P (t), it is also possible to acquire and use GPS correction information from the general center.

In the next step 460, the date and time t and the latitude and longitude P (t) are stored as history information. Note that the information history corresponds to the vehicle location history shown in FIG. 3 with the area and charge columns removed therefrom.

The communication processing of the in-vehicle device 30 will now be described.

Figure 14:
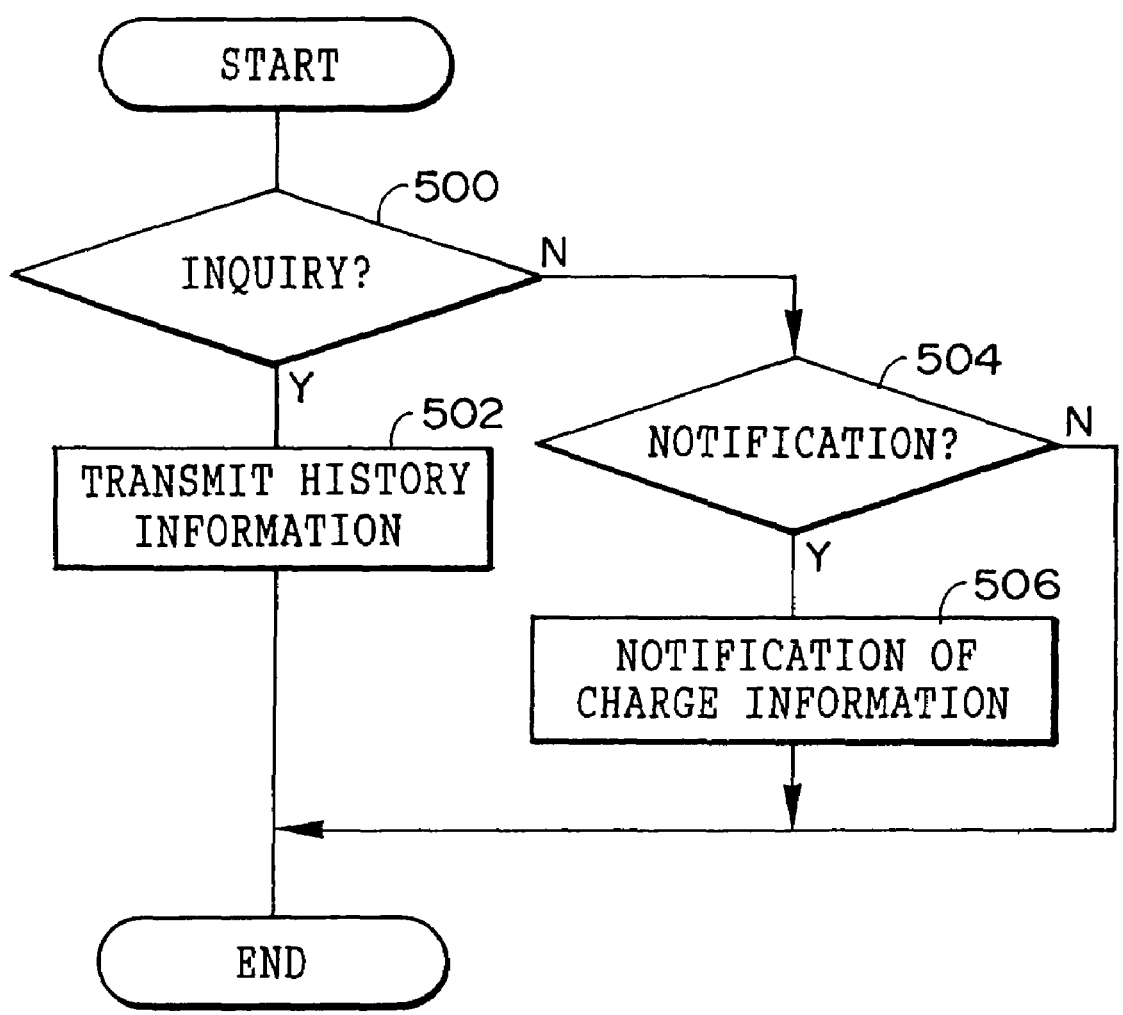
FIG. 14 is a flow chart showing the flow of communication processing of the in-vehicle device of the third embodiment.

As is shown in FIG. 14, the communication processing routine shown in FIG. 14 is executed at predetermined times in the in-vehicle device. In step 500, a determination is made as to whether or not there has been an inquiry from the general center. If there has been an inquiry from the general center, the determination in step 500 is affirmative and, in the next step 502, the history information stored above is transmitted and the current routine is ended. When the history information is transmitted, signal includes an ID code or the like which is an identification code that includes vehicle model information specifying this vehicle.

If however, there has been no inquiry from the general center, the determination in step 500 is negative and, in the next step 504, a determination is made as to whether or not there has been a charge information notification instruction (described below in detail) from the general center. If there has been a notification instruction, the determination in step 504 is affirmative and, in the next step 506, notification is made of the charge information from the general center.

The processing at the general center will now be described.

Figure 13:
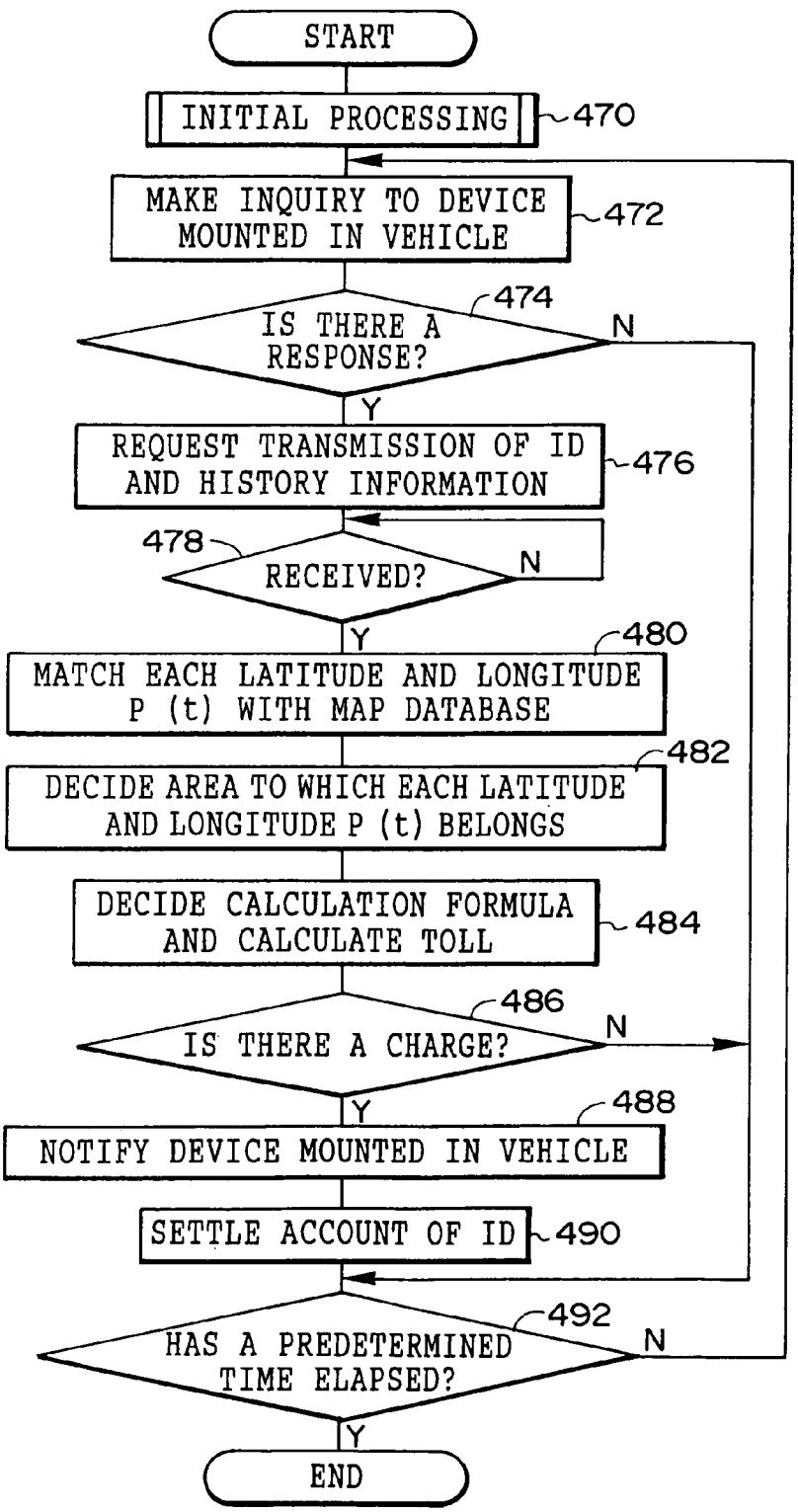
FIG. 13 is a flow chart showing the flow of charge processing executed in the general center of the third embodiment.

As is shown in FIG. 13, in step 470, the general center 40 receives GPS signals from GPS satellites 20, 22, and 24 and determines the reference position of the general center 40 (a reference latitude and longitude Po). After GPS correction information has been generated, initial processing to read the area in which a charge is applied information is performed (steps 300 to 304 in FIG. 4).

In the next step 472, an inquiry is made to obtain a response from the in-vehicle device and a determination is made in the next step 474 as to whether or not the in-vehicle device 30 has responded. If there has been no response, the routine proceeds to step 492 where the inquiry is repeatedly performed until a predetermined time has passed.

When the in-vehicle device 30 responds, the determination in step 474 is affirmative and, in step 476, a request is made to transmit history information including the ID code. The determination of step 478 is repeated until the history information including the ID code is transmitted by the in-vehicle device 30 and is received by the general center 40. Once this information is received, the routine proceeds to step 480. In step 480, each of the latitudes and longitudes P (t) included in the history information is matched with a map database stored in advance and, in the next step 482, the areas to which the latitudes and longitudes P (t) belong are determined. Next, in step 484, the calculation formula (charge calculation formula) is set and the charge is calculated using the set calculation formula, in the same way as above.

In the next step 486, a determination is made from the result of the calculation in step 484 as to whether or not there is a charge. If no charge is generated, the routine proceeds to step 492. If, however, a charge is generated, then, in the next step 488, the generated charge, namely, the toll is transmitted to the in-vehicle device as charge information. By this action, an instruction is given to the in-vehicle device to notify the charge information. In the next step 490, the toll is settled from an settled account such as a bank account or credit card or the like associated with the user of the vehicle determined by the ID code.

Thus, in the present embodiment, because the area and the like are determined at the general center, it is possible to reduce the calculation load on the in-vehicle device. Moreover, because the in-vehicle device only has to transmit the position of its host vehicle, it is also possible to lighten the transmission load.

Note that, in the above embodiments, when a card or bank account for which charge processing can be performed automatically is determined, because it is possible to make a notification before a toll is deducted from this toll deductible card or bank account, it is possible for the user to easily determine whether or not the card or bank account they possess is able to be used for the payment of the charge of the car park for which a charge is applicable and is generated.

Fourth Embodiment

In the present embodiment, the present invention is applied to an automatic charge system for automatically performing charge processing for a vehicle that has entered (i.e. been driven into) into a toll facility (i.e. a area in which a charge is applied). Note that, the automatic charge system used in the present embodiment is a system for settling a toll charge (a driving toll) based on information transfer between an in-vehicle device installed in a vehicle and an on-road device installed on the ground. Note also that the structure of the present embodiment is substantially the same as the structure and identical portions are given the same descriptive symbols and a detailed description thereof is omitted.

Figure 15:
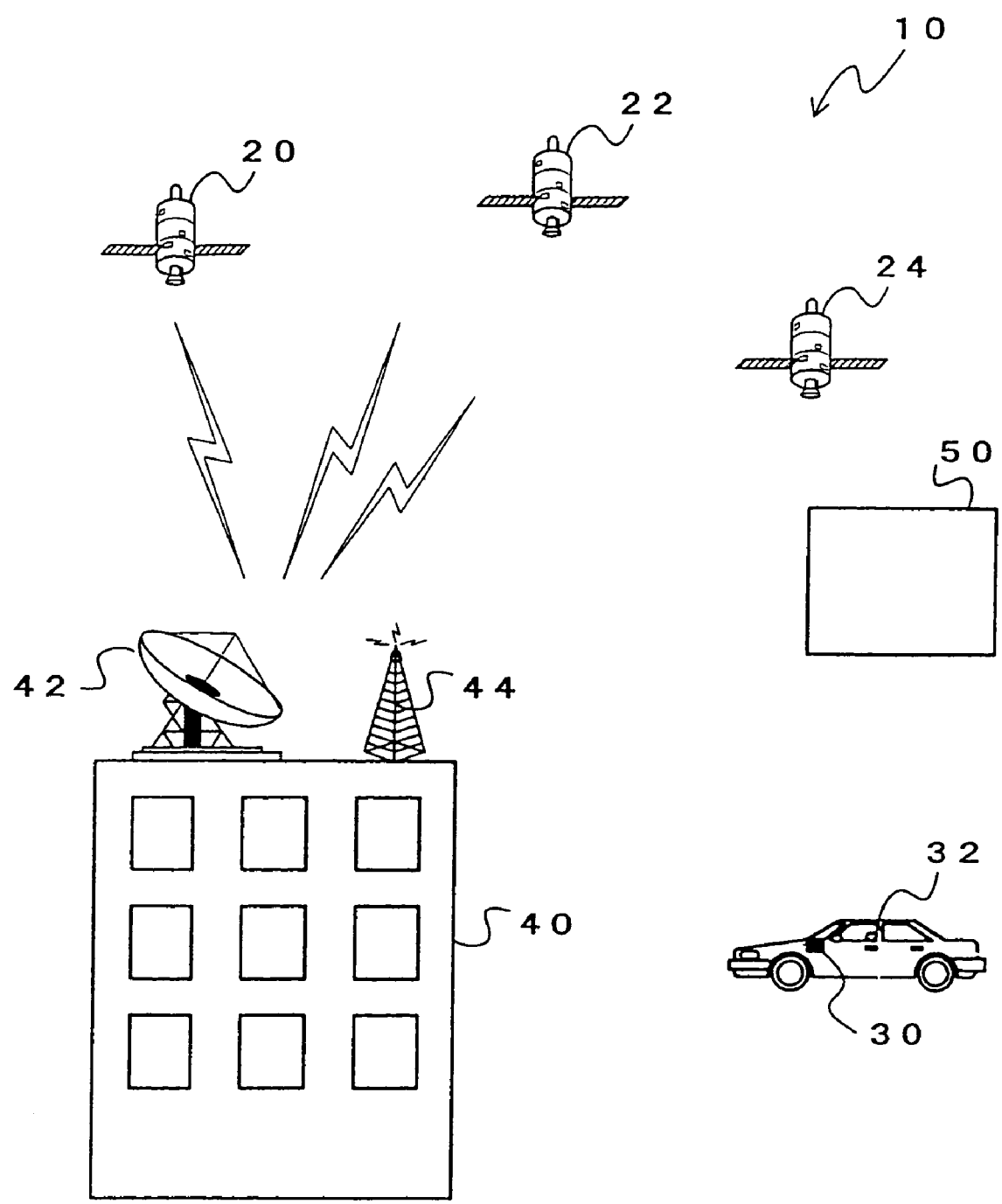
FIG. 15 is a block diagram showing the conceptual structure of an automatic charge system according to the fourth embodiment of the present invention.

The concept of the structure of the automatic charge system 10 of the present embodiment is shown in FIG. 15. The automatic charge system 10 of the present embodiment comprises: an in-vehicle device 30 mounted in a vehicle 32 and provided with a GPS antenna for receiving signals from GPS satellites 20, 22, and 24, and a ground wave antenna for ground wave communication (described below in detail); and a general center 40 serving as an on-road device that is fixed on the ground and is provided with a GPS antenna 42 for receiving GPS signals from the GPS satellites 20, 22, and 24. The general center 40 also has a ground wave antenna 44 for ground wave communication.

Note that one or a plurality of relay devices 50 that work in cooperation with the general center 40 are included in the structure of the present embodiment. A detailed description thereof is given below, however, in short, the relay device 50 is structured in substantially the same way as the general center 40 and governs various types of processing including charge related processing for the in-vehicle device 30.

The in-vehicle device 30 detects the position of the host vehicle 32 using GPS signals from the GPS satellites 20, 22, and 24, and transmits this via ground wave communication to the general center. The general center 40 performs the charge processing (calculations) for the area in which a charge is applied based on the received position of the vehicle 32, and transmits the result thereof to the in-vehicle device 30. The in-vehicle device 30 performs toll collection based on the received result of the charge processing. Note that it is also possible for the toll collection to be performed at the general center, and only the result of the toll collection transmitted.

The general center 40 according to the present embodiment that is established on the ground has the same structure as in the above embodiments and a description thereof is omitted (see FIG. 2).

A description will next be given of a relay device 50. The relay device 50 has substantially the same structure as the general center 40, however, it has the function of an observation device for observing that the charge has been properly made.

Figure 16:
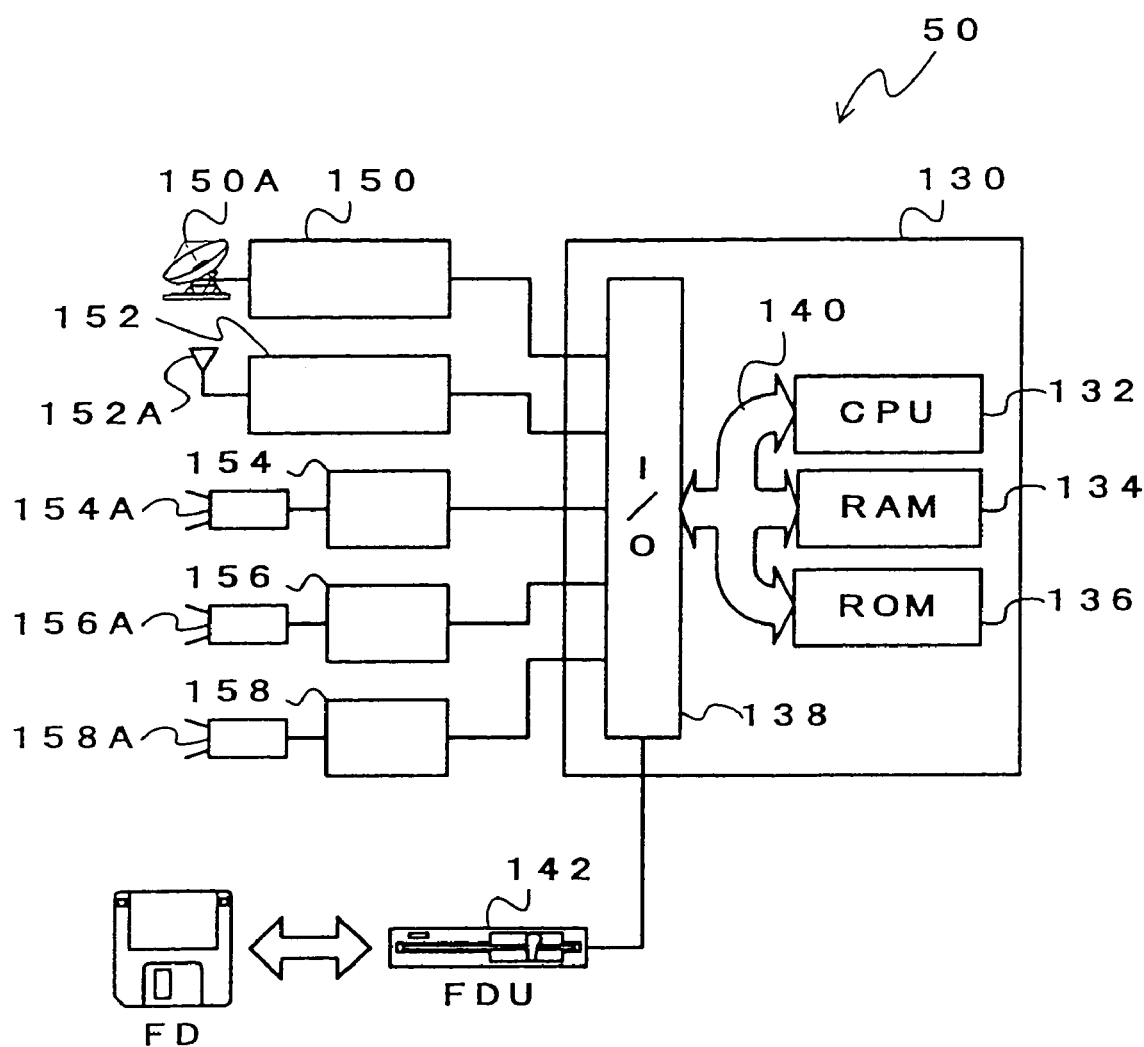
FIG. 16 is a block diagram showing the schematic structure of a relay device established on the ground in the automatic charge system of the fourth embodiment of the present invention.

As is shown in FIG. 16, the relay device 50 has a relay control device 130. The relay control device 130 is structured from a microcomputer comprising a CPU 132, RAM 134, ROM 136, and an input/output port (I/O) 138. Each of these is connected together by a bus 140 so that commands and data can be transferred between each. Note that a processing routine that is described below is stored in the ROM 136.

A GPS communication device 150 having a GPS antenna 150A is connected to the input/output port 138, as is a ground wave communication device 152 having a ground wave antenna 152A. The GPS communication device 150 is intended to pinpoint its own position, namely, the position of the general center 40 using the GPS signals from the GPS satellites 20, 22, and 24. The ground wave communication device 152 is intended to exchange signals or to provide information by communicating with the in-vehicle device 30 mounted in the vehicle, and employs a wireless communication device. Note that an example of this wireless communication device is an FM broadcast or an FM character broadcast, a known wave communication, and telephone circuit communication such as in a moving body communication device.

A vehicle measuring device 154 provided with an image pickup device 154A, a vehicle number image pickup device 156 provided with an image pickup device 156A, and a lamp image pickup device provided with an image pickup device 158A are also connected to the input/output port 108. TV cameras or image processors or the like can be used for the image pickup devices 154A to 158A.

Note that, a floppy disk unit (FDU) 142 into which a floppy disk (referred to below as FD) can be inserted as a recording medium and also removed is connected to the relay control device 130. Note also that the processing routine described below is able to be written to or read from an FD using the FDU 142. Accordingly, it is also possible to record in advance the processing routine described below on an FD without storing it inside the relay control device 130, and to execute the processing program recorded on the FD via the FDU 142. Alternatively, it is also possible to connect an (unillustrated) large volume storage device such as a hard disk to the relay control device 130, and to store (install) a processing program recorded on the FD on the (unillustrated) large volume storage device and then execute the processing program. There are also optical disks such as CD-ROMs and the like, and magnetooptical disks such as MD, MO and the like as a recording medium, and if these are used, a CD-ROM device, an MD device, an MO device or the like may be used instead of or in conjunction with the above FDU.

Next, the in-vehicle device 30 will be described. Note that the in-vehicle device 30 used in the present embodiment has a structure in which an observation lamp 227 is further connected to the in-vehicle device of the above embodiments (see FIG. 3).

Figure 17:
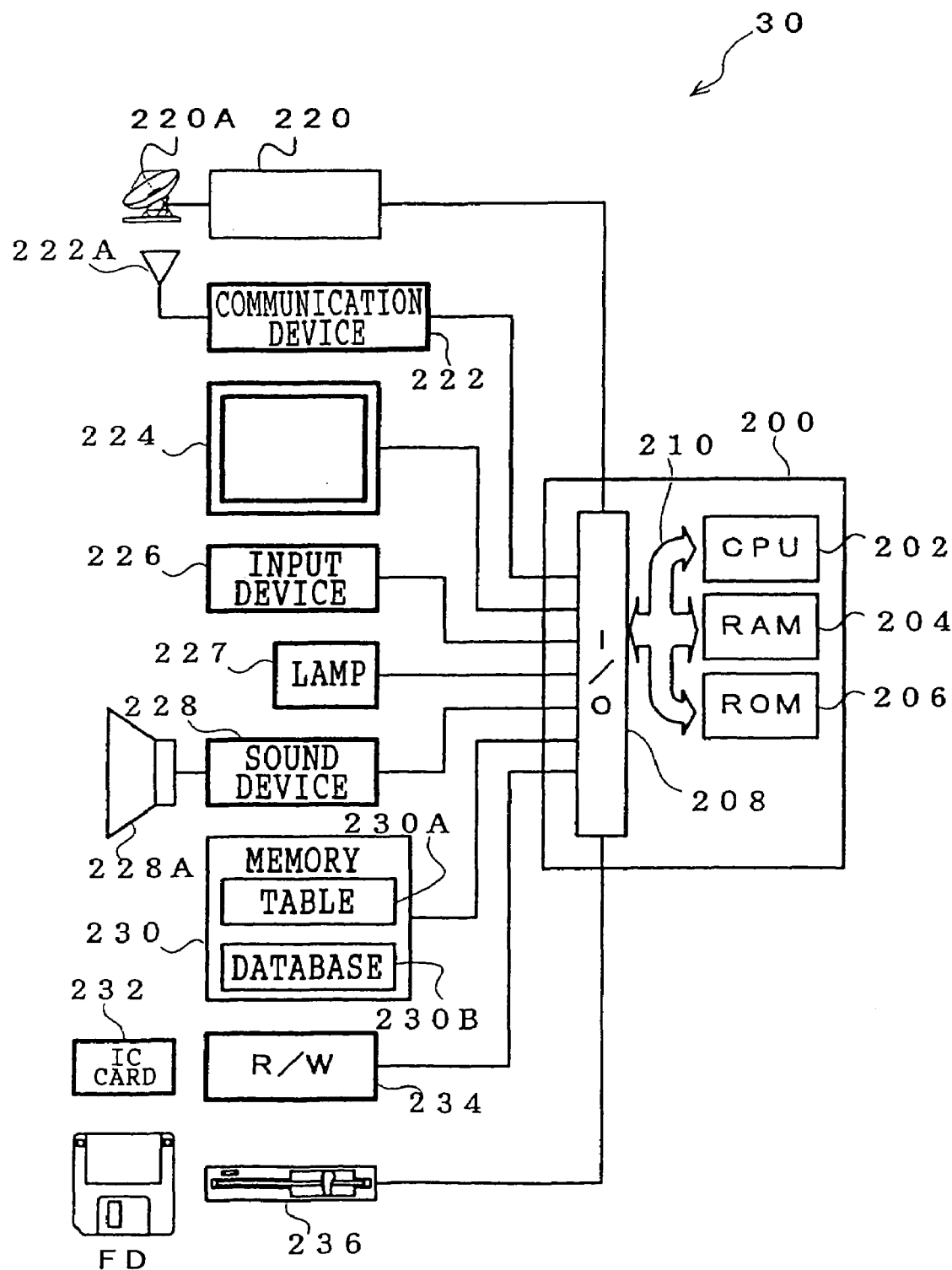
FIG. 17 is a block diagram showing the schematic structure of an in-vehicle device in the automatic charge system of the fourth embodiment of the present invention.

As is shown in FIG. 17, the observation lamp 227 is connected to the input/output port 208 of the in-vehicle device 30 of the present embodiment. The observation lamp 227 is intended to notify the outside of the vehicle as to the charge processing state.

Figure 18A:
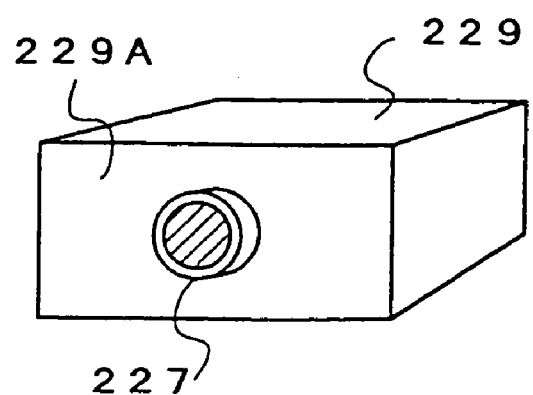
FIGS. 18A and 18B are perspective views showing examples of the installation housing of a lamp used for observation.

As is shown in FIG. 18A, the observation lamp 227 is provided in a front surface portion 229A of a housing 229 which can be positioned such that it is on the dashboard of a vehicle, and light from the observation lamp 227 is emitted towards the outside of the vehicle. By using this type of structure, it is a simple matter to confirm that the observation lamp 227 is flashing from outside the vehicle.

Figure 18B:
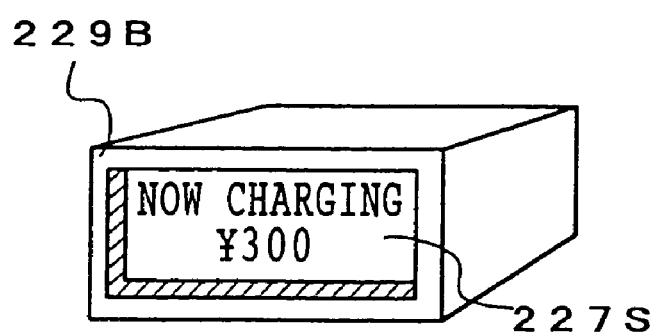

Note that, by providing a display lamp that flashes in synchronization with the observation lamp 227 at a different position to the observation lamp 227, for example, at a position opposite the observation lamp 227 (i.e. at the rear surface portion 229B of the housing 229), it is possible for the driver inside the vehicle to confirm the flashing of the observation lamp 227 by the flashing of the display lamp. For example, as is shown in FIG. 18B, it is possible to install a display panel 227S in the rear surface portion 229B of the housing 229 thus providing a structure in which it is an easy matter for the driver of the vehicle to confirm the current state of the charge processing. In this case, it is possible to display the following on the display panel 227S as the current state, namely, that the vehicle is approaching a area in which a charge is applied, a standard charge amount for the area in which a charge is applied, the amount of the current charge processing, that charge processing has begun, that charge processing has ended, that charge processing has not been performed (i.e. that a violation has been committed), and the like.

The operation of the present embodiment will now be described.

Firstly, the operation of the on-ground device (in this case, the general center 40) will be described in detail. In the present embodiment, the general center 40 is intended to perform the same processing as in FIG. 4, and transmits information for charge processing to an in-vehicle device 30 mounted on a vehicle 32.

The general center 40 receives GPS signals from GPS satellites 20, 22, and 24 (step 300 of FIG. 4). The general center 40 then determines its own, namely, the general center reference position (a reference latitude and longitude Po), and generates GPS correction information (step 302). Next, predetermined area in which a charge is applied information is read (step 304), and GPS correction information is transmitted together with area in which a charge is applied information by FM broadcast or telephone circuit or the like (step 306).

Figure 19:
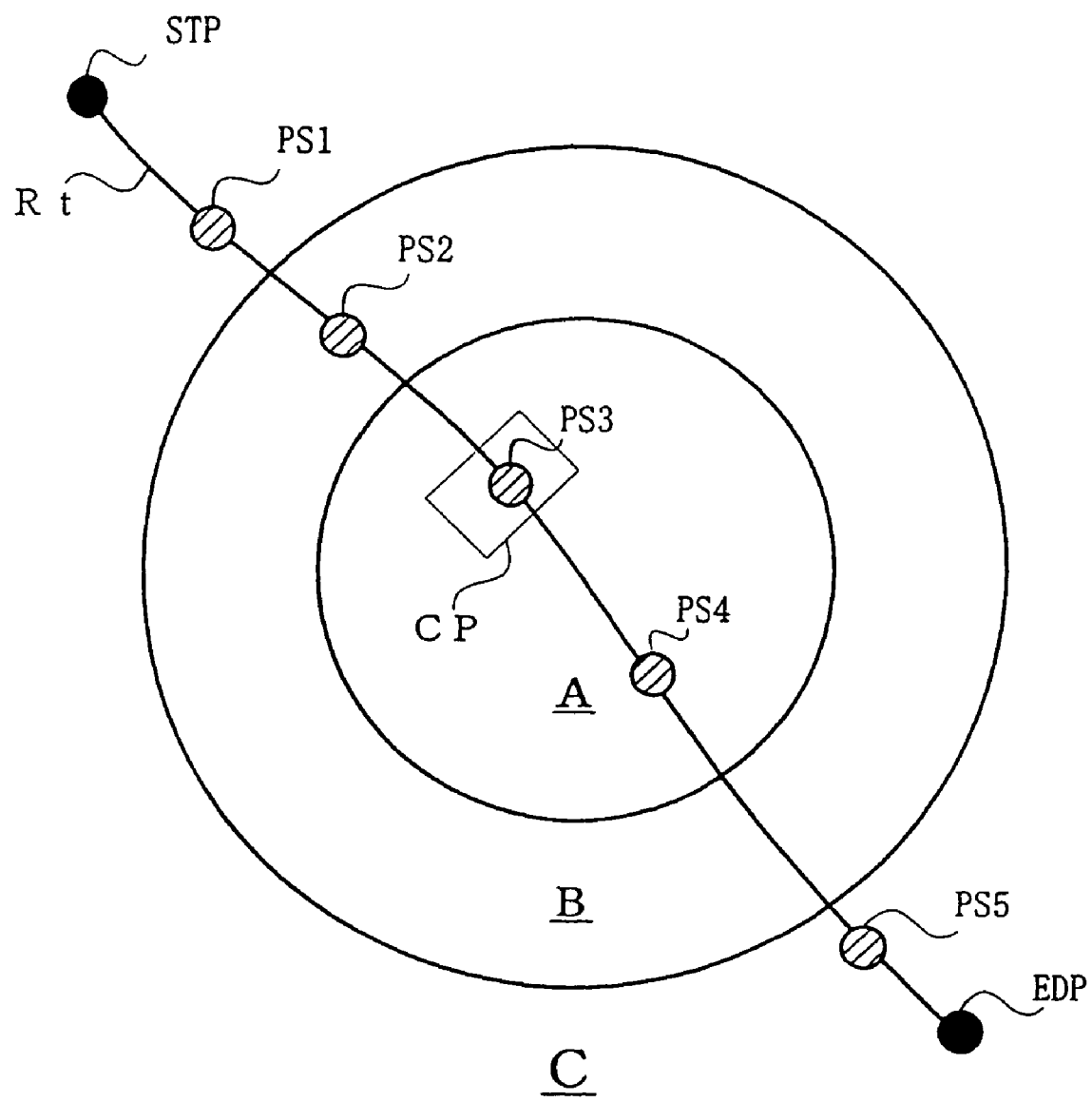
FIG. 19 is an image diagram showing a area in which a charge is applied.

As described above, the area in which a charge is applied information is set for a area in which a charge is applied formed from a predetermined plurality of areas. An example of a structure is one in which the size of the areas between the city center and the suburbs becomes smaller the closer to the city center. An example of area in which a charge is applied according to the present embodiment is shown in FIG. 19. The ground is divided into three areas, namely, a circular central area A, a donut shaped area B that is substantially concentric around and adjacent to the outer periphery of the area A, and an area C outside the areas A and B. It is possible to specify these areas by latitude and longitude as well as by their shape.

Moreover, the area in which a charge is applied information is set for the area in which a charge is applied A formed from a plurality of areas, however, it is possible to set a different charge amount for each area. For example, it is possible to increase the charge amount in accordance with the proximity to the city center, or to alter the charge amount in accordance with the number of times of use, or to alter the charge amount in accordance with the level of congestion, or to alter the charge amount in accordance with the time of use. These are determined by the charge calculation conditions.

The charge calculation conditions have been described in the above embodiments and a detailed description thereof is omitted, however, the first charge calculation condition is the number of entries into an area, shown in the table indicating the tolls for each area. The second charge calculation condition is the length of stay in an area, shown in the table indicating the tolls for each area. The third condition is the level of congestion in the area, shown in the table indicating the tolls for each area. The fourth condition is speed when traveling inside an area (or, alternatively, the average speed inside an area), shown in the table indicating the tolls for each area. The fifth condition is total area travel distance traveled inside an area, shown in the table indicating the tolls for each area.

By including these tables based on the charge calculation conditions in the area in which a charge is applied information, it is possible to specify the area in which a charge is applied and the toll for that area.

Note that, in the present embodiment, the area A is set as the area in which a charge is applied (the charge area), and the area B surrounding the area A is set as an area for canceling out any error of the area in which a charge is applied (a buffer area). The reason for this is to counter any errors caused by the GPS system when the position of the vehicle is detected using a GPS system. The area C outside the areas A and B is outside area in which a charge is applied.

Next, the operation of the in-vehicle device 30 will be described. In the present embodiment, the in-vehicle device 30 is intended to perform identical to that in FIG. 5.

Namely, information is received from the ground, i.e. the general center 40 (or relay device 50) at predetermined times (for example every one minute) by the in-vehicle device 30 mounted on the vehicle (step 400). A determination is then made as to whether or not the received information is the latest information (step 402) and, if the received information is the latest information (if the determination in step 402 is affirmative), the area in which a charge is applied is led out while the GPS correction information is stored (step 404). If, however, the received information is not the latest information (i.e. the determination in step 402 is negative), GPS signals from the GPS satellites 20, 22, and 24 are received (step 406), the current date and time (year, month, date, and time) are read, and the current position (latitude and longitude P (t)) of the in-vehicle device, namely of the host vehicle thereof, is determined (step 410). The determined latitude and longitude P (t) are then matched with a map database stored in advance (step 412), the area to which the latitude and longitude P (t) belong are then decided (step 414), and the latitude and longitude P (t), the date and time t, and the area are then stored as vehicle location history (step 416). As a result, the area in which the vehicle 32 is present at predetermined times is stored with a date and time as history.

The charge processing in the in-vehicle device 30 will next be described. This charge processing is performed at predetermined times. The processing may be performed at predetermined times such as every hour, a predetermined day of every week, a predetermined date and time of every month, or a predetermined year, month, date, and time. Note that, in the present embodiment, the execution of the charge processing may also be performed in response to an instruction from the general center 40 (or relay device 50), instead of at a predetermined time.

Figure 20:
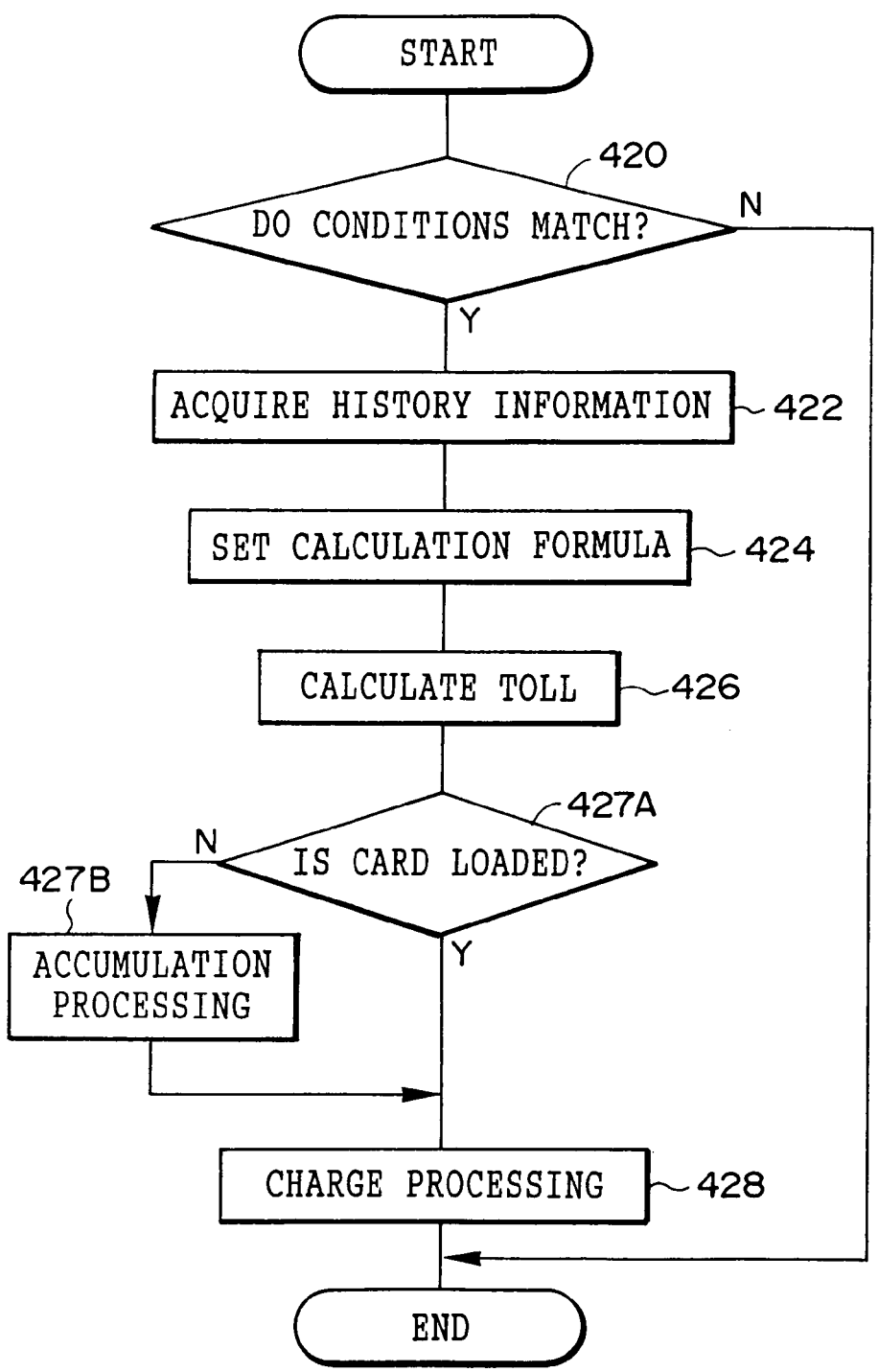
FIG. 20 is a flow chart showing the flow of charge processing executed in the in-vehicle device of the fourth embodiment of the present invention.

As is shown in FIG. 20, in step 420, at a predetermined date and time, or, by making a determination as to whether or not there has been an instruction from the general center 40 (or relay device 50), a determination is made as to whether or not the conditions match. If the conditions do not match, the determination in step 420 is negative and the current routine is ended.

If, however, the conditions do match, the determination in step 420 is affirmative and, in step 422, the history information is acquired. This history information is the list of the vehicle location history stored in step 416 of FIG. 8 above. In the next step 424, the calculation formula (charge calculation formula) is set. The calculation formula is determined by the above calculation conditions. These calculation conditions are conditions for determining the charge amount (charge calculation conditions) and comprise the number of entries into an area, the time of length of stay in an area or the like. The charge calculation formula is determined by the calculation conditions. In formula (4) below, a charge calculation formula is shown as a general formula considering an area.

$$\text{(charge amount)} = f(N_A, N_H, N_I, N_J, t) \tag{4}$$

wherein, $N_A$: the evaluation of the area (i.e. the number of entries and the time of length of stay for each area determined by the charge calculation conditions) note that the area may comprise a plurality of areas $N_H$: the level of congestion $N_I$: the speed (average speed)

$N_J$: the total distance traveled within the area

T the date and time

In the next step 426, the charge is calculated using the calculation formula set above and the history information. When the charge calculation is ended, the routine proceeds to step 427A where a determination is made as to whether or not an IC card 232, on which toll balance information and the like is stored, is loaded in a card read/write device 234. When there is no IC card 232 loaded in the IC card read/write device 234, the charge processing cannot be accomplished, therefore, the determination in step 427A is negative. The routine then proceeds to step 427B where the charge calculated above is stored in memory. Because it is possible that previous unpaid tolls are included therein, the storing of the toll is a cumulative processing. If, however, an IC card 232 is loaded in the IC card read/write device 234, the charge processing can be accomplished. Therefore, the determination in step 427A is affirmative and the charge processing in step 428 is carried out. This charge processing is a processing to subtract the above determined charge from the balance of the IC card 232.

Next, the operation of the ground installation and the in-vehicle device while the vehicle is running is described further. Note that the description below is of when the toll varies in accordance with the number of times the vehicle enters into the area in which a charge is applied. Furthermore, the vehicle is taken as traveling along a route Rt from a start point STP to an end point EDP in the area comprising the areas A to C in FIG. 19.

Note that, in the present embodiment, a relay device 50 is installed in an area, in which a vehicle traveling in the vicinity of a midway point PS3 on the route Rt in FIG. 19 can be photographed, as a checkpoint CP. The description given below is of when the operation of the ground installation is performed by the relay device 50.

Figure 21:
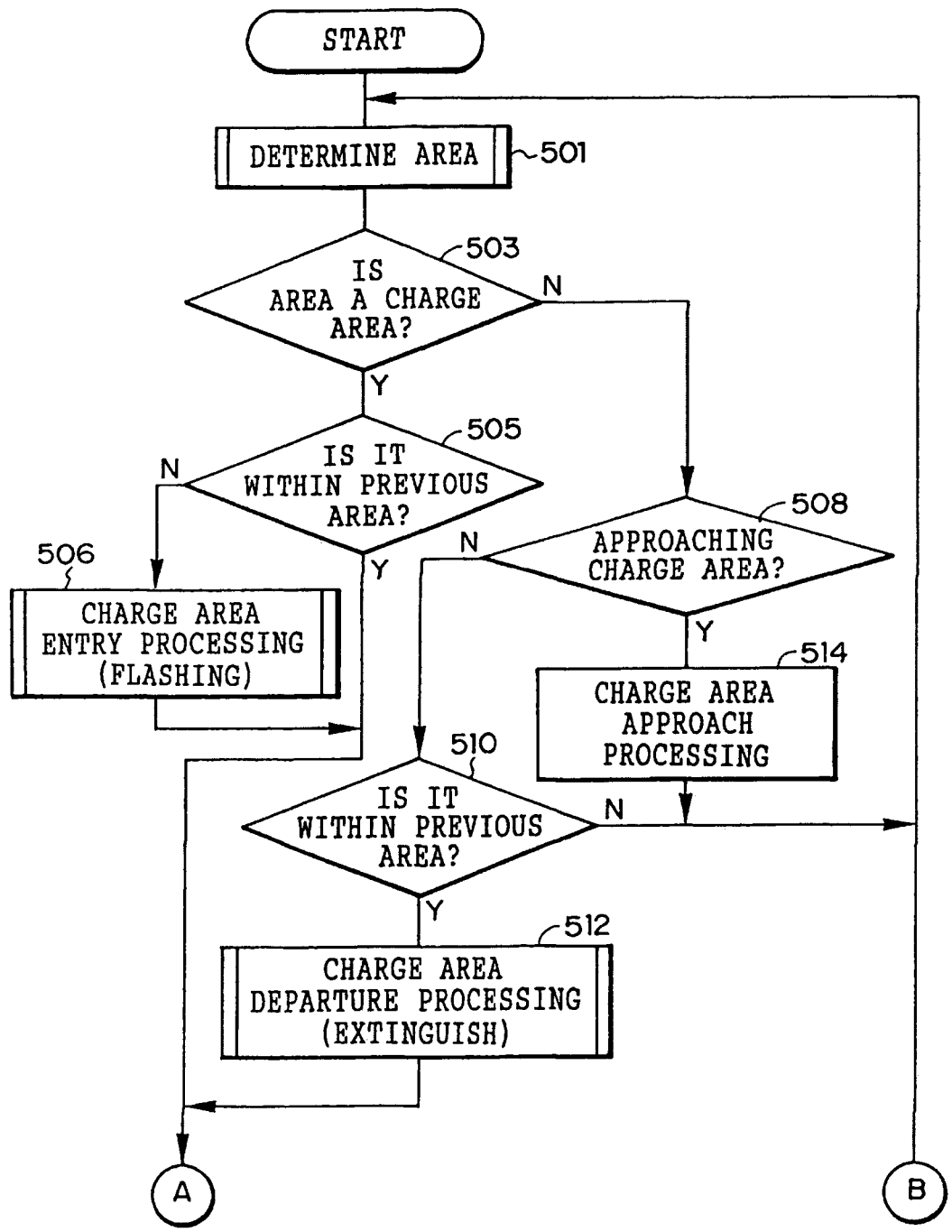
FIGS. 21 A and 21 B are a flow chart of the showing the flow of the in-vehicle device operation processing.
Figure 21:
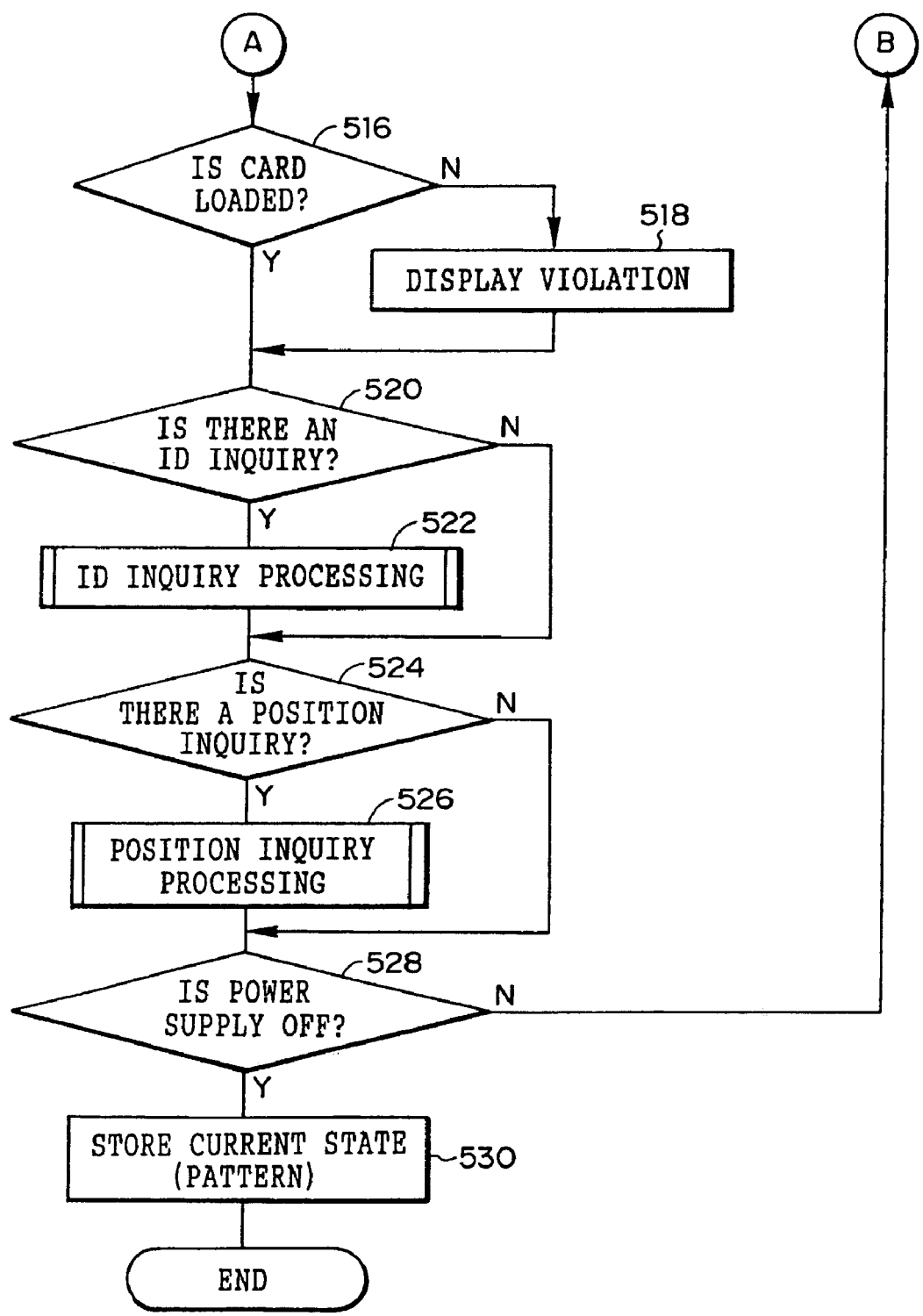

As is shown in FIGS. 21 A and 21 B, when power is on for the in-vehicle device, the routine proceeds to step 501 where a determination is made as to the area in which the vehicle is currently located. In this step 501, the above described area determination processing is performed (see FIG. 5). In the next step 503, a determination is made as to whether or not the area determined in step 501 is a area in which a charge is applied. When it is a area in which a charge is applied, the determination in step 503 is affirmative and, in the next step 505, a determination is made as to whether or not the previous area (the area determined at the previous time this routine was executed) was a area in which a charge is applied. If the previous area was not a area in which a charge is applied, the current instance is the first time the vehicle has entered a area in which a charge is applied, therefore, the determination in step 505 is negative. In the next step 506, as is described below, charge area entry processing is executed and the routine proceeds to step 516. If, however, the previous area was a area in which a charge is applied, the determination in step 505 is affirmative and the routine proceeds, without any change, to step 516.

If the current area is not a area in which a charge is applied and the determination in step 503 is negative, the routine proceeds to step 508 where a determination is made as to whether or not the distance to the area in which a charge is applied is equal to or less than a predetermined distance which enables a determination to be made as to whether or not the vehicle is approaching the area in which a charge is applied. If the distance to the area in which a charge is applied is equal to or less than a predetermined distance, the determination in step 508 is affirmative and, in the next step 514, information indicating that the vehicle is approaching the area in which a charge is applied is provided by images and sound, and the routine returns to step 501. For example, it is possible for a fixed time to display information such as "approaching area in which a charge is applied" on the display panel 227S (see FIG. 18B), or to provide this vocally from the sound device 228, or to display it on the display of the navigation system via the display device 224.

If the determination in step 508 is negative, the routine advances to step 510 where a determination is made as to whether or not the previous area was a area in which a charge is applied. If the previous area was not a area in which a charge is applied, the routine returns to step 501. If, however, the previous area was a area in which a charge is applied, then currently, the vehicle has departed from a area in which a charge is applied and the determination in step 510 is affirmative. In the next step 512, as described below, the charge area departure processing is executed and the routine proceeds to step 516.

Accordingly, at the point PS1 partway on the route Rt in FIG. 19, the information that the vehicle is approaching a area in which a charge is applied is provided. At the partway point PS2, the charge area entry processing for when a vehicle first enters a area in which a charge is applied is performed. At the partway points PS3 and PS4, because the previous area was a area in which a charge is applied, the routine proceeds to the next step without any change. At the partway point PS5, charge area departure processing for when a vehicle departs from a area in which a charge is applied is performed.

In step 516, a determination is made as to whether or not an IC card 232 is loaded into the IC card read/write device 234. If there is no IC card 232 loaded in the IC card read/write device 234, the charge processing cannot be accomplished. Therefore, the determination in step 516 is negative, and the routine proceeds to step 518 where a violation is displayed. This violation display is performed by flashing the observation lamp 227 on and off in a predetermined violation pattern (for example, at a timing where the lamp is turned on for a fixed time and then off for a fixed time repeatedly). If, however, an IC card 232 is loaded in the IC card read/write device 234, it is possible to accomplish the charge processing. Therefore, there is no violation display, the determination in step 516 is affirmative, and the routine proceeds without any change to step 520. Note that a pattern stored in advance in-vehicle device may be used for the violation pattern, or a pattern received from the ground side may be used for the violation pattern.

In step 520, a determination is made as to whether or not there has been an inquiry from the ground side about fixed data such as the ID, namely, the ID code made up of the vehicle number and the like and the vehicle model information and the like. If this determination is affirmative, then, in the next step 522, the ID inquiry processing (described below in detail) is executed and the routine then proceeds to step 524. If the determination is negative, the routine proceeds without any change to step 524. In step 524, a determination is made as to whether or not there has been an inquiry from the ground side about the position of the vehicle. If this determination is affirmative, then, in the next step 526, position inquiry processing (described below in detail) is executed and the routine proceeds to step 528. If the determination is negative, the routine proceeds without any change to step 528.

In the next step 528, a determination is made as to whether or not the power supply to the vehicle has been cut. If power is being supplied, the determination in step 528 is negative, and the routine returns to step 500. If, however, the power supply has been cut, the determination in step 528 is affirmative and, in the next step 530, the current status is stored and then the present routine is ended. In the storing of the current status in step 530, at the least, whether or not a violation was displayed in the above processing is stored.

Note that when the observation lamp 227 is flashing in a violation pattern, it continues to flash until the power supply to the in-vehicle device is cut off. In addition, even if the power supply is cut off, because that state is stored, it is possible to confirm whether or not the violation state existed previously.

Figure 22:
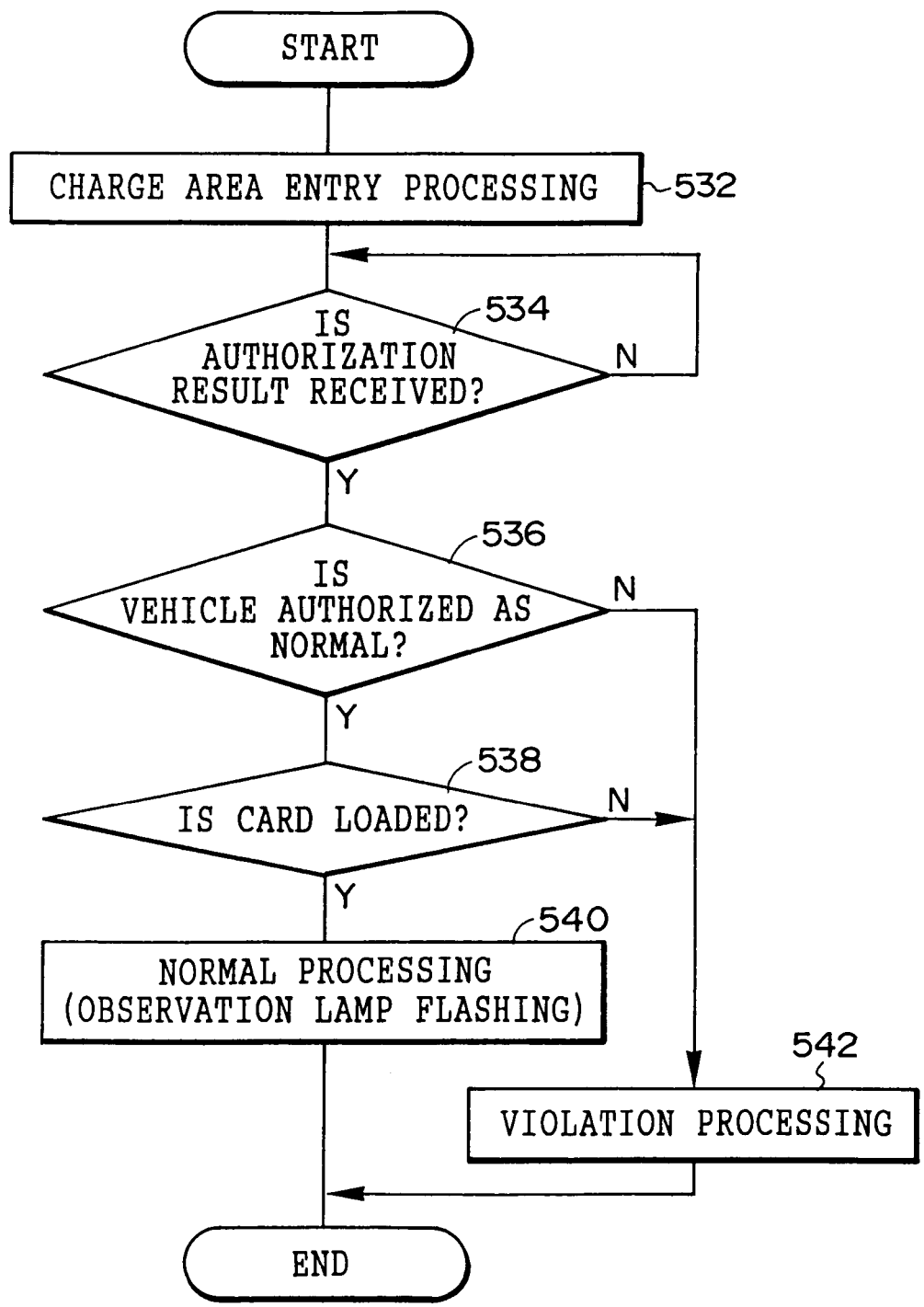
FIG. 22 is a flow chart showing the flow of charge area entry processing of the in-vehicle device.

Next, a detailed description will be given of the charge area entry processing of the above step 506. This charge area entry processing is processing performed when a vehicle has entered a area in which a charge is applied. For example, at the point PS2 partway along the route Rt (FIG. 19), a vehicle will have entered the area in which a charge is applied for the first time, therefore the charge area entry processing of FIG. 22 is executed.

Firstly, in step 532, notification is made that the vehicle has entered a area in which a charge is applied by transmitting the ID code and current position. Note that, it is also possible to add entry information indicating that the vehicle has entered a area in which a charge is applied to the transmission of the ID code and current position. Because it is possible to determine that a vehicle has entered into a area in which a charge is applied from the current position and the previous position of the vehicle, therefore, it is also possible to make the determination on the ground side using the history information.

In the next step 534, a determination as to the receipt of an authorization result is repeated until a result of the authorization of the entry is received. When an authorization result is received, then, in the next step 536, a determination is made from the received authorization result as to whether or not the host vehicle is authorized as a normal vehicle. Note that, in this step 534, the information below is received from the ground side. When the result of the authorization is that the vehicle is a normal vehicle, the latest charge table and the first normal pattern, which is a flashing pattern of the observation lamp 227 indicating that the vehicle is a normal vehicle, are received (are transmitted from the ground side). When the result of the authorization is that the vehicle is in violation, information for performing a violation notification is received.

Figure 23:
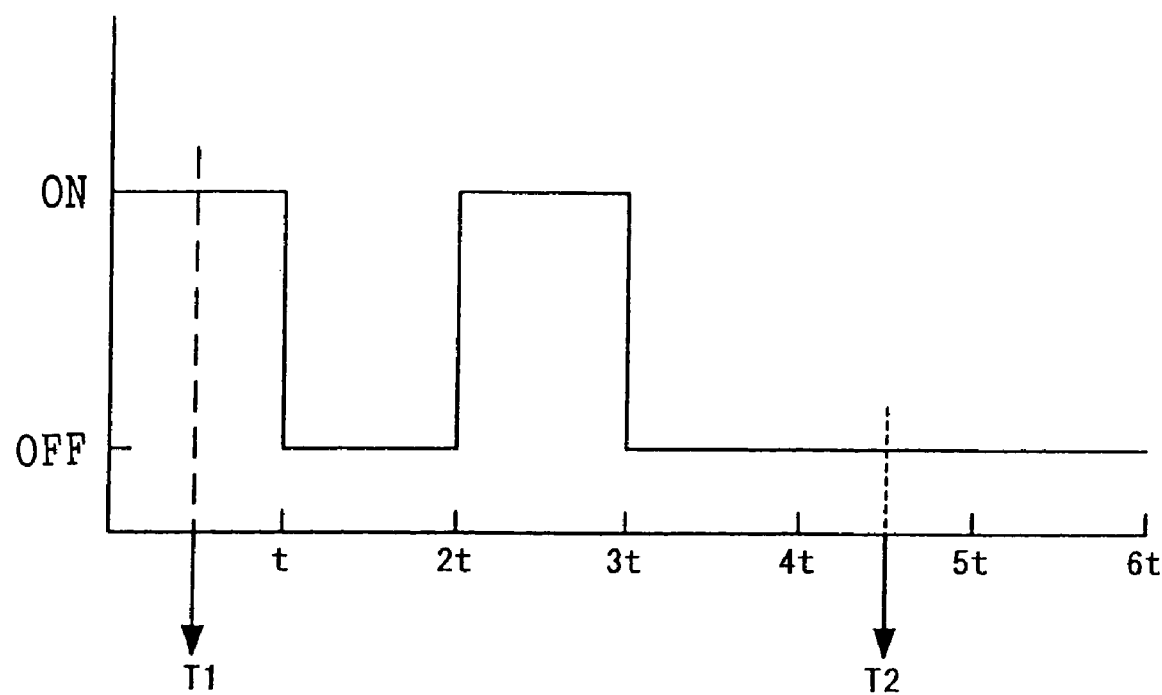
FIG. 23 is a line diagram showing an example of a normal pattern.

The first normal pattern is intended to allow confirmation from outside a vehicle that the host vehicle is a normal vehicle for which a charge can be processed. Therefore, the first normal pattern is a pattern for being flashed at the observation lamp 227 at a predetermined timing (for example a timing where the lamp is turned on and off repeatedly for predetermined time lengths). For example, as is shown in FIG. 23, a pattern is set that includes two pulses of pulse width t, with 6t set as one cycle in which the lamp is turned on for one time t, off for one time t, on for one time t, and off for 3 times t. If this pattern is used, it is possible to confirm the cyclic flashing from outside the vehicle, and confirm that the vehicle is a normal vehicle.

When an authorization result that the in-vehicle device is not in a normal vehicle is received, the determination in step 536 is negative and the routine proceeds to step 542 where violation processing is performed. This violation processing is intended to allow confirmation from outside a vehicle that the vehicle is in violation, and is performed by flashing the observation lamp 227 on and off in a predetermined violation pattern that is different from the above first normal pattern (for example, by repeatedly turning on and off the lamp for a time t, namely, continuously flashing).

If, however, result of the received authorization is that the vehicle is a normal vehicle, then the determination in step 536 is affirmative and, in the next step 538, a determination is made as to whether or not the IC card 232 is loaded in the IC card read/write device 234. If the IC card 232 is not loaded, the charge processing cannot be performed. Therefore, the routine proceeds to step 542 where violation processing is performed. If, however, the IC card 232 is loaded, the charge processing can be accomplished. Therefore, the determination in step 538 is affirmative and the routine proceeds, as it is, to step 540 where normal processing is performed without performing the violation processing. This normal processing is intended to allow confirmation from outside the vehicle that the IC card 232 is loaded and the vehicle is a normal vehicle capable of undergoing charge processing, and is performed by flashing the observation lamp 227 on and off in the first normal pattern.

Next, the processing on the ground side corresponding to charge area entry processing in the in-vehicle device will be described.

Figure 24:
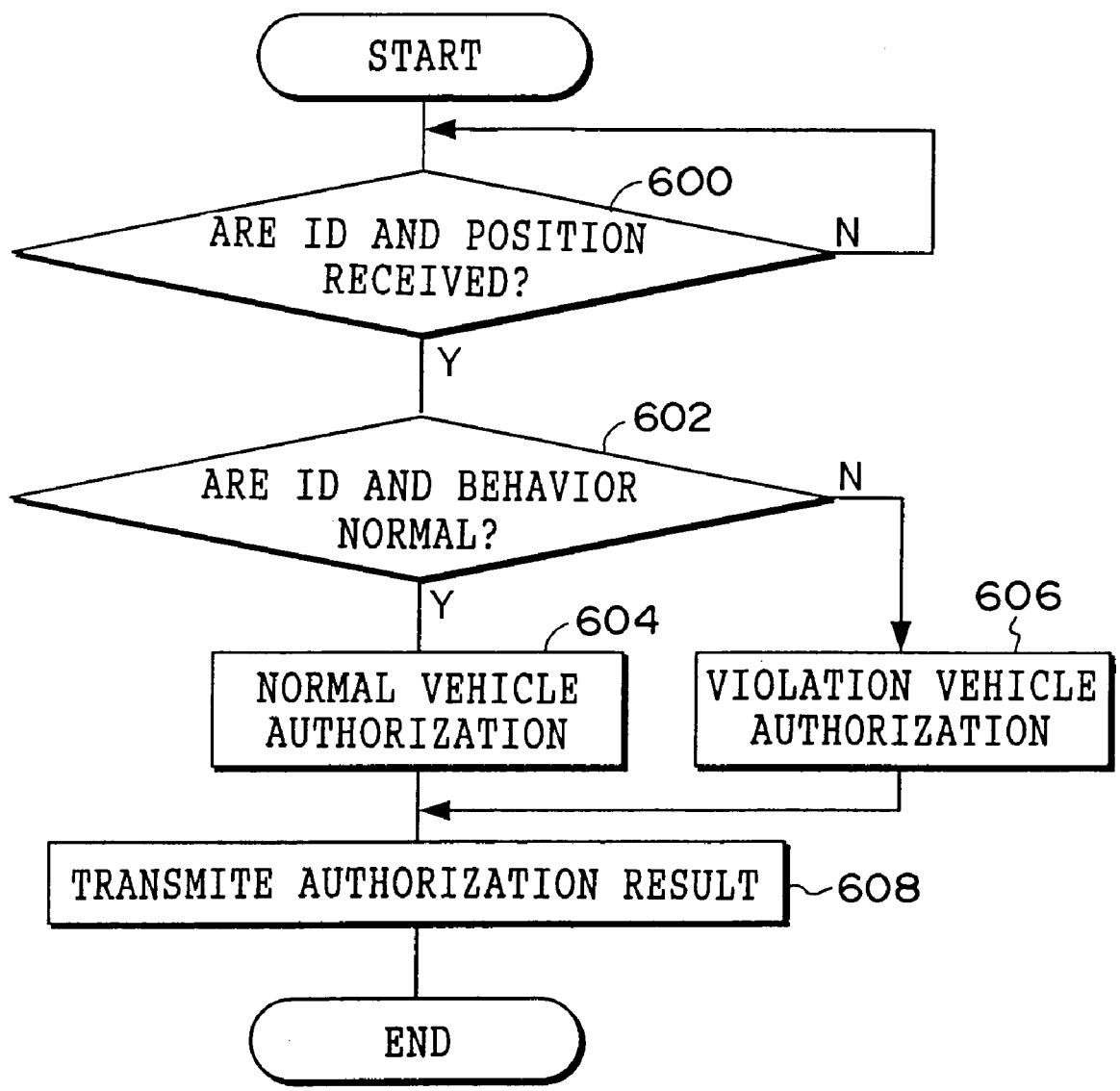
FIG. 24 is a flow chart showing the flow of charge area entry processing in the on-ground installation.

As is shown in FIG. 24, in step 600, repeated attempts are made to receive from the ground a notification (ID code and vehicle position) including an ID, namely, an ID code comprising the vehicle number and the like until this notification is received. The vehicle position in this notification includes at least the current vehicle position and may also include the vehicle location history which comprises the positions of the vehicle up until the current position. When this notification is received from the in-vehicle device, the routine proceeds to step 602, where the received ID code and vehicle position are used to check the ID code and the behavior of vehicle. A determination is made as to whether or not the ID code and the behavior of the vehicle are normal. Note that the checking of the ID code can be performed by referring to the recorded ID code if a normal ID code is recorded. The checking of the vehicle behavior can be performed by matching the received vehicle positions with a map or the like and then determining whether or not that position is an appropriate position.

When the ID code and the like are normal, the determination in step 602 is affirmative and, in the next step 604, the vehicle is authorized as a normal vehicle. When the ID code and the like are not normal, the determination in step 602 is negative and the routine proceeds to step 606, the authorization is that the vehicle is in violation. In the next step 608, the authorization result for the vehicle which is authorized in step 604 or step 606 is transmitted to the vehicle (i.e. to the in-vehicle device).

In this way, because the observation lamp 227 is flashed in either a first normal pattern or in a violation pattern in accordance with the authorization result from the ground side indicating whether or not a vehicle is a normal vehicle, it is a simple matter to confirm from outside the vehicle whether the vehicle is a normal vehicle for which charge processing can be accomplished or a vehicle that is in violation for which charge processing cannot be accomplished.

Figure 25:
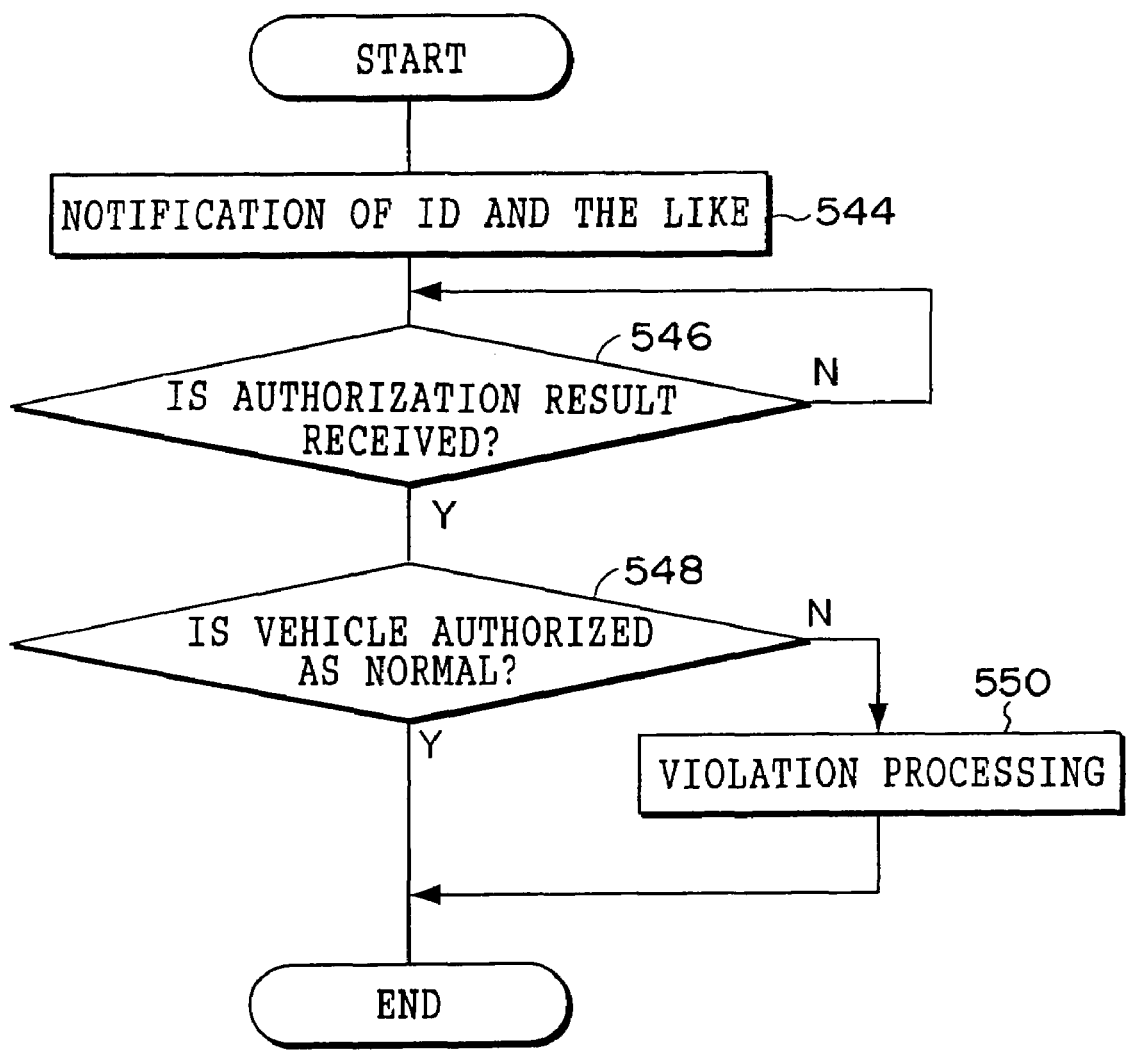
FIG. 25 is a flow chart showing the flow of ID inquiry processing of the in-vehicle device.

Next, the ID inquiry processing of step 522 will be described in detail. This ID inquiry processing is carried out when a vehicle is within a checkpoint. For example, the processing of FIG. 25 is performed at the point PS3 partway on the route Rt (see FIG. 19) which is within the checkpoint.

Firstly, in step 544, information relating to the ID code is notified by transmitting fixed data such as the ID code and the vehicle model information. Note that it is also possible to include information indicating whether the IC card is loaded or is not loaded.

Next, when an authorization result is received for the above notification (i.e. the determination in step 456 is affirmative), a determination is made from the received authorization result as to whether or not the host vehicle has been authorized as a normal vehicle (step 548). If the host vehicle has been authorized as a normal vehicle, the present routine ends at that point with no further change. If, however, the host vehicle is not authorized as a normal vehicle, violation processing is performed to cause the observation lamp 227 to flash on and off in a predetermined violation pattern (step 550).

Next, the processing of the ground side, namely, of the relay device 50 in response to the ID inquiry processing of the in-vehicle device will be described.

Figure 26:
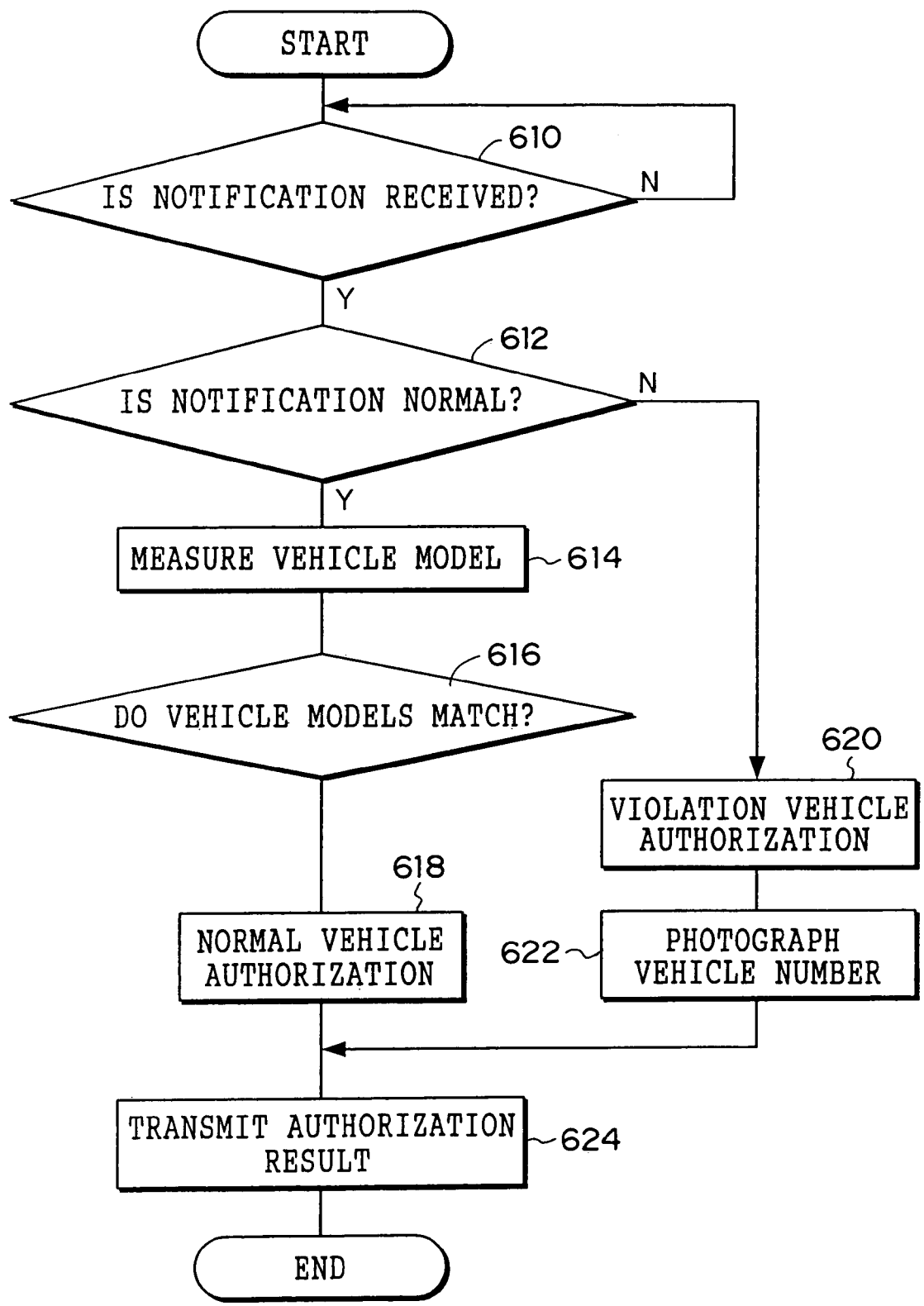
FIG. 26 is a flow chart showing the flow of ID inquiry processing (checkpoint processing) in the on-ground device.

As is shown in FIG. 26, in step 610 repeated processing is performed until notification is received from the in-vehicle device. This notification includes information made up of the ID code, the vehicle model, and the existence or otherwise of an IC card. When the notification is received from the in-vehicle device, the routine proceeds to step 612 where a determination is made as to whether or not the received notification is normal. This determination is performed using all of the ID code, the vehicle model, and the existence or otherwise of an IC card in the received notification as well as a determination as to whether or not the ID code and the vehicle behavior are normal.

When the notification (The ID code and the like) is normal, the determination in step 612 is affirmative and, in the next step 614, vehicle model measurement processing is performed. In this vehicle model measurement processing, the size and height of the vehicle as well as the existence or otherwise of traction is determined using image pickup information picked up by the image pickup device 154A of the vehicle measuring device 154. In the next step 616, a determination is made as to whether or not the vehicle model measured in step 614 matches the vehicle model in the notification received in step 610. If the models do not match, the determination is negative, and the routine proceeds to step 620. If the models do match, the determination is affirmative and the routine proceeds to step 618. Next, in step 618, the vehicle for which the notification is received is authorized to be a normal vehicle. If, however, the notification is not normal, or if the vehicle models do not match, the determination in step 612 is negative and, in the next step 620, the vehicle is authorized as being in violation. In the next step 622, the vehicle number is photographed and then the routine proceeds to step 624. In step 624, the authorization result of the vehicle authorized in step 618 or step 620 is transmitted to the vehicle (i.e. to the in-vehicle device).

In this way, because the observation lamp 227 is flashed on and off in either a first normal pattern or in a violation pattern in accordance with an authorization result from the ground indicating whether or not a vehicle is a normal vehicle, it is easy to confirm from outside the vehicle whether the vehicle is a normal vehicle or is in violation.

Figure 27:
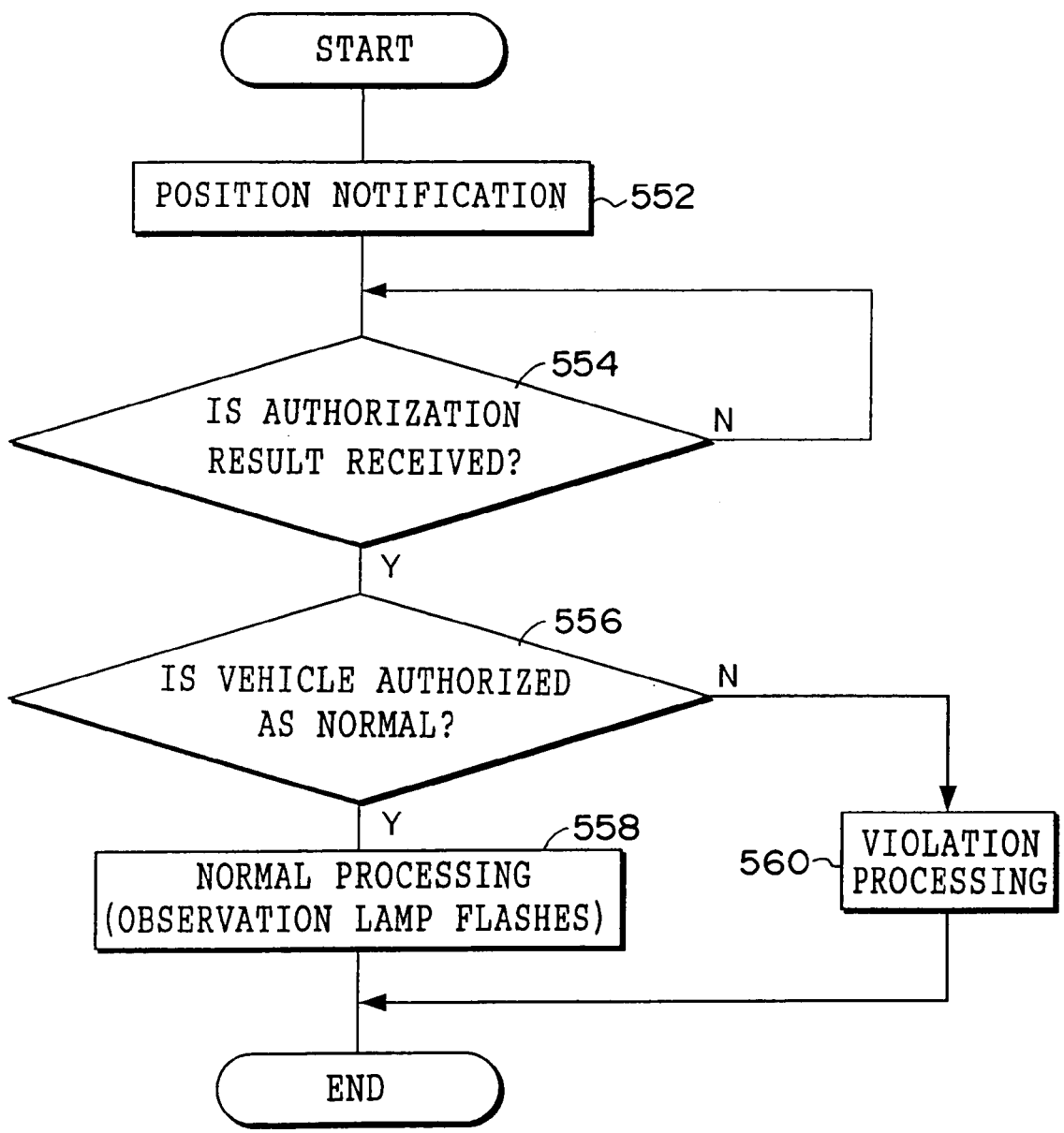
FIG. 27 is a flow chart showing the flow of position inquiry processing in the in-vehicle device.

Next, the position inquiry processing of the above step 526 will be described in detail. This position inquiry processing is processing to inquire as to the position in which a vehicle is located to the vehicle. For example, at the point PS4 partway along the route Rt in FIG. 19, a vehicle is inside a area in which a charge is applied. Therefore, in order to carry out the charge processing, it is necessary to be able to confirm that the position of the vehicle is within the area in which a charge is applied. Therefore, the position inquiry processing shown in FIG. 27 is performed.

Firstly, in step 552, a notification is made as to the ID code and current position. Next, in step 554, a determination as to the receipt of the authorization result is repeated until the authorization result is received. When the authorization result has been received, then, in the next step 556, a determination is made from the received authorization result as to whether or not the host vehicle is a normal vehicle. Note that, in the step 554, the information below is received from the ground side. When the result of the authorization is that the vehicle is a normal vehicle, the latest charge table as well as a second normal pattern which is a flashing pattern for the observation 227 indicating the fact that the vehicle is a normal vehicle are received (i.e. are transmitted from the ground side). Moreover, when the authorization result is that the vehicle is in violation, information for performing the violation notification is received.

When an authorization result to the effect that the vehicle is not a normal vehicle is received, the determination in step 556 is negative and the routine proceeds to step 560 where violation processing is performed. This violation processing is carried out by flashing the observation lamp on and off in a predetermined violation pattern (for example, by repeatedly turning the lamp on for a predetermined time and then off for a predetermined time) in order to allow confirmation outside the vehicle, in the same way as described above, that the host vehicle is in violation.

If, however, an authorization result is received to the effect that the vehicle is a normal vehicle, the determination in step 556 is affirmative and, in the next step 558, normal processing is carried out. This normal processing is processing to turn on the observation lamp 227 so as to switch it to a second normal pattern indicating that the vehicle is a normal vehicle, and so that it can be confirmed from outside the vehicle that the charge processing is being carried out.

Next, the processing on the ground in response to the position inquiry processing of the in-vehicle device will be described.

Figure 28:
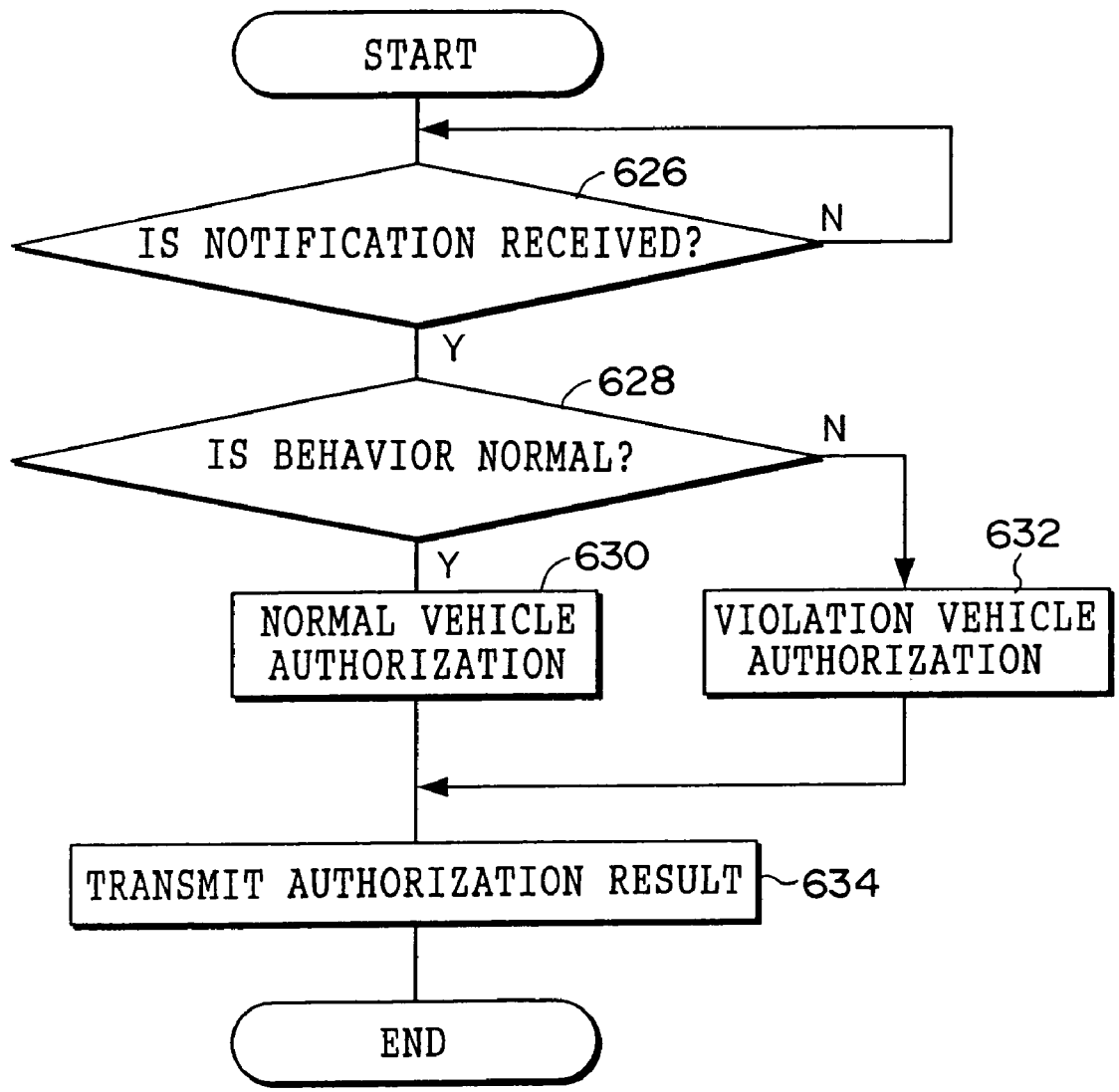
FIG. 28 is a flow chart showing the flow of position inquiry processing in the on-ground device.

As is shown in FIG. 28, in step 626, a determination is repeatedly performed until a notification (ID code and vehicle position) including an ID code comprising an ID, i.e. the vehicle number and the like, is received from the ground side. The vehicle position in this notification is at least the current position of the vehicle and may include the vehicle location history up until the current position. Once the notification is received from the in-vehicle device, the routine proceeds to step 628 where, using the received vehicle position, the behavior of the vehicle is checked and a determination is also made as to whether or not the behavior of the vehicle is normal.

When the behavior of the vehicle is normal, the determination in step 628 is affirmative and, in the next step 630, the vehicle is authorized as a normal vehicle. If the behavior of the vehicle is not normal, the determination in step 628 is negative and, in the next step 632, the vehicle is authorized as being in violation. In the next step 634, the result of the authorization of the vehicle authorized in step 630 or step 632 is transmitted to the vehicle (i.e. to the in-vehicle device). Note that, in step 634, either the above second normal pattern or information is sent.

In this way, because the observation lamp 227 is flashed on and off in either a second normal pattern or in a violation pattern in accordance with an authorization result from the ground indicating whether or not a vehicle is a normal vehicle, it is easy to confirm from outside the vehicle whether the vehicle is a normal vehicle or is in violation.

Moreover, because the lamp changes from a first normal pattern to a second normal pattern different from the first normal pattern, it is easy to confirm the state of a normal vehicle on the ground.

Figure 29:
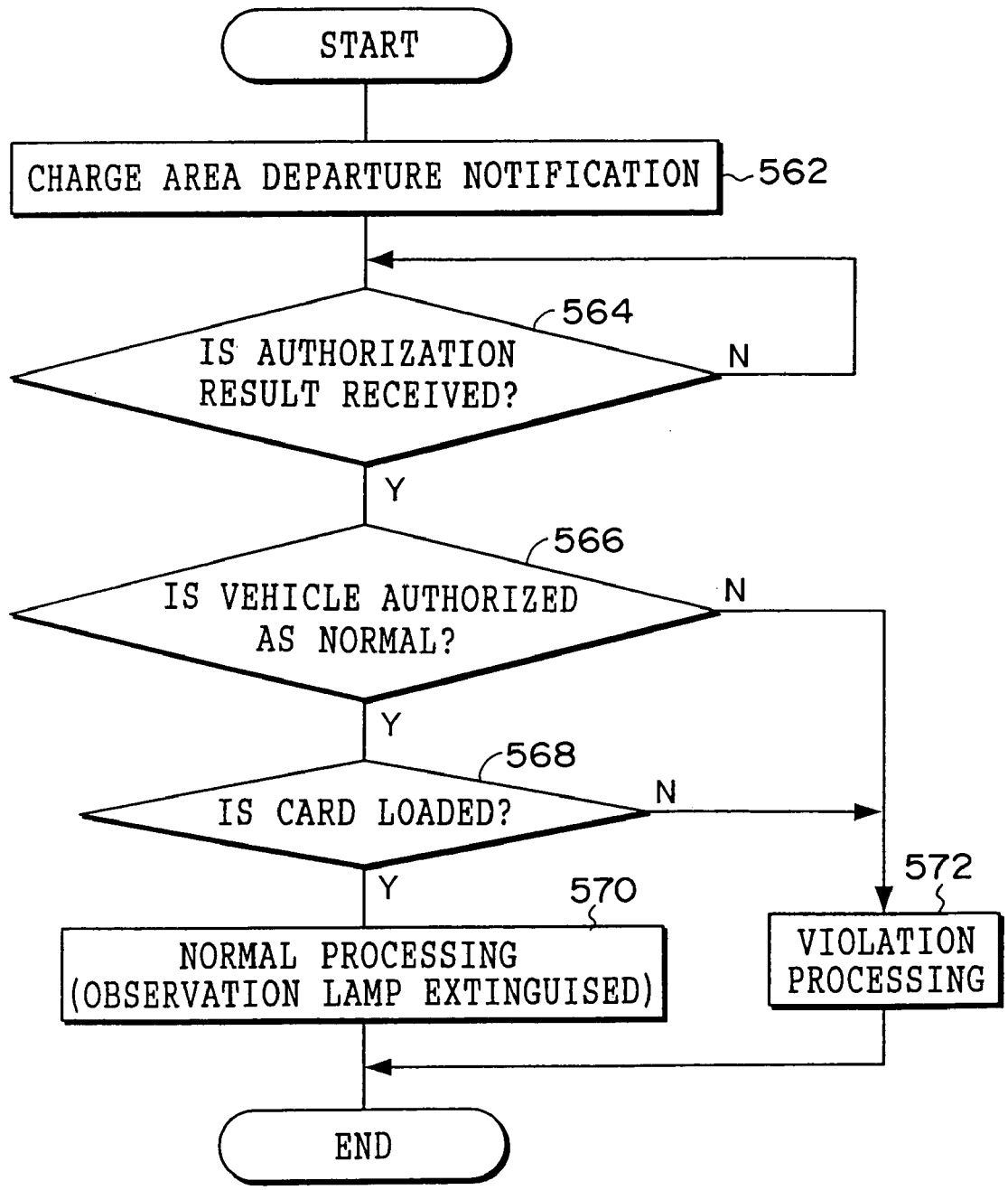
FIG. 29 is a flow chart showing the flow of charge area departure processing in the in-vehicle device.

Next, the charge area departure processing of step 512 will be described in detail. This charge area departure processing is processing carried out when a vehicle has left from a area in which a charge is applied. For example, because a vehicle has departed from the area in which a charge is applied at the point PS5 partway along the route Rt in FIG. 19, the charge area departure processing of FIG. 29 is performed.

Firstly, in step 562, a notification is made that the vehicle has left the area in which a charge is applied by the transmission of the ID code and current position. Note that, because the fact the vehicle has left the area in which a charge is applied can be determined from the current position of the vehicle and the previous position of the vehicle, it may also be determined on the ground side form this history information.

In the next step 564, a determination as to whether the authorization result has been received is repeatedly performed until authorization that the vehicle has departed is received. When the authorization result is received, in the next step 566, a determination is made from the authorization result as to whether or not the host vehicle has been authorized as a normal vehicle. Note that, in step 564, the information below is received from the ground. When the authorization result is that the vehicle is a normal vehicle, extinguish permission information indicating permission to extinguish the observation lamp 227 in order to end the notification to the outside of the vehicle because the vehicle is a normal vehicle is received (i.e. is transmitted from the ground side). If the authorization result is that the vehicle is in violation, information for performing the violation notification is received.

When the in-vehicle device receives an authorization result to the effect that the vehicle is not a normal vehicle, then determination in step 566 is negative and the routine proceeds to step 572 where, in the same way as described above, violation processing is performed to flash the observation light 227 on and off in a predetermined violation pattern. When, however, the in-vehicle device receives an authorization result to the effect that the vehicle is a normal vehicle, the determination in step 566 is affirmative and, in the next step 568, a determination is made as to whether or not an IC card 232 is loaded in the IC card read/write device 234. If an IC card 232 is not loaded, the charge processing cannot be performed so the routine proceeds to step 572 where violation processing is performed. If, however, an IC card 232 is loaded, the charge processing can be carried out so the determination in step 568 is affirmative. The routine then proceeds to step 570 where normal processing is performed without the violation processing being carried out. This normal processing is processing to extinguish the observation lamp 227 using the above received extinguish permission information.

Next, the processing on the ground side in response to charge area departure processing of the in-vehicle device will be described.

Figure 30:
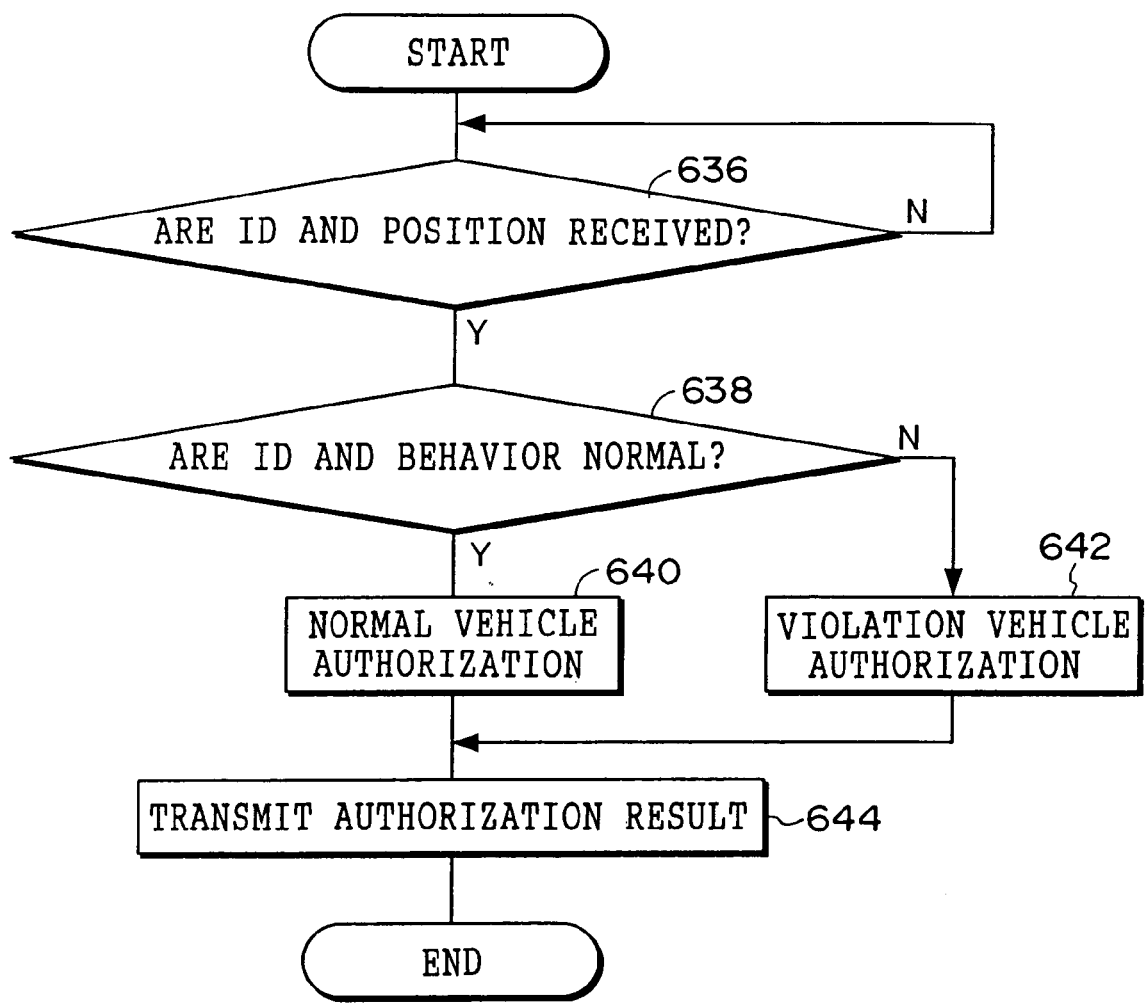
FIG. 30 is a flow chart showing the flow of charge area departure processing in the on-ground device.

As is shown in FIG. 30, in step 636, a determination is repeatedly performed until a notification (ID code and vehicle position) including an ID code comprising an ID, i.e. the vehicle number or the like, is received from the ground side. Once the notification is received from the in-vehicle device, the routine proceeds to the next step 638 where, using the received ID code and vehicle position, the ID code and vehicle behavior are checked and a determination is made as to whether or not the ID code and vehicle behavior are normal.

If the ID code and the like are normal, the determination in step 638 is affirmative and, in the next step 640, the vehicle is authorized as normal. If the ID code and the like are not normal. The determination in step 638 is negative and, in the next step 642, the vehicle is authorized as being in violation. In the next step 644, the above authorized vehicle authorization result is transmitted to the vehicle (i.e. the in-vehicle device). Note that, in step 644, information that includes a charge processing start instruction indicating the start of charge processing is transmitted.

In this way, because the observation lamp 227 is flashed on and off in either a second normal pattern or in a violation pattern in accordance with an authorization result from the ground indicating whether or not a vehicle is a normal vehicle, it is easy to confirm from outside the vehicle whether the vehicle is a normal vehicle or is in violation.

When the vehicle has departed from the area in which a charge is applied, if the vehicle is a normal vehicle, the observation lamp is extinguished allowing easy confirmation from the outside of the vehicle that the vehicle is normal. If the departed vehicle is in violation, because the observation lamp 227 is turned on or is flashed on and off in a violation pattern, it is a simple matter to confirm from outside the vehicle that charge processing has not been accomplished and the vehicle is in violation.

Note that the above violation pattern may comprise the lamp being turned on continuously or the lamp being flashed on and off continuously. If this is so, the determination is easy when confirming the state of the observation lamp from outside the vehicle.

In the above embodiment, a description was given of when one observation lamp was used, however, this embodiment is not limited to one lamp and a combination of a plurality of lamps may be used.

Figure 31:
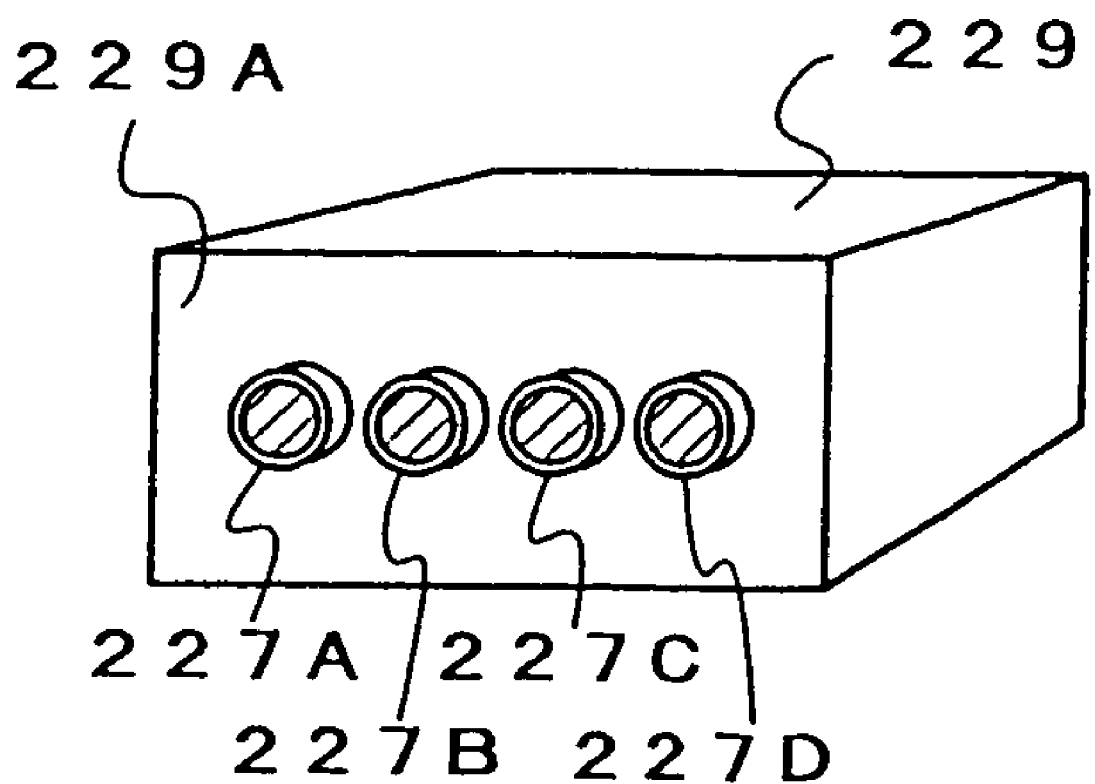
FIG. 31 is a perspective view showing another example of the installation housing of an observation lamp.

As is shown in FIG. 31, for example, an observation lamp 227 can be formed from a plurality of observation lamps 227A, 227B, 227C, and 227D. In this case, it is possible to make normal pattern more intricate thereby increasing the secrecy level. Moreover, it is also possible to use as vehicle type determining lamps indicating the type of the vehicle in which the observation lamps are installed, such as heavy, medium, light, and two-wheeled vehicles. Furthermore, Table 6, shown in FIG. 72, shows a corresponding of the driver of the vehicle on the route Rt with an observation lamp.

In the above embodiment a description was given of when an observation lamp 227 was installed on the dashboard of a vehicle, however, the installation of the lamp is not limited to the dashboard and it may be installed on the outside of the vehicle.

Figure 32:
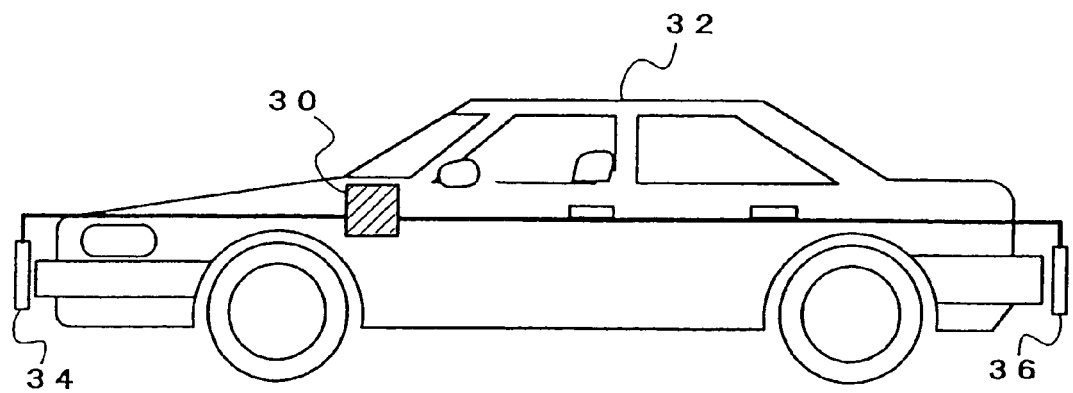
FIG. 32 is an explanatory view showing an example in which the observation lamp is installed on a vehicle number plate outside the vehicle compartment.
Figure 33:
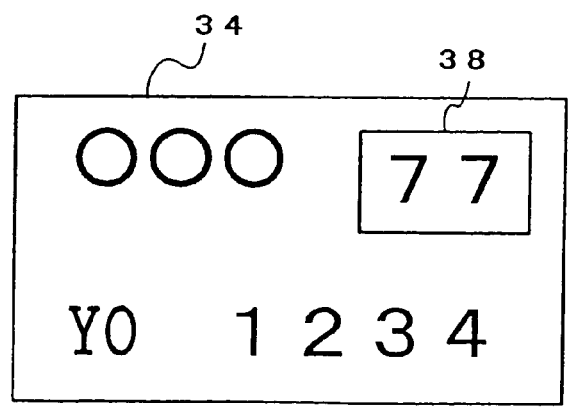
FIG. 33 is an explanatory for explaining an observation lamp on a vehicle number plate.

As is shown in FIG. 32, number plates 34 and 36 are normally attached to a vehicle. If observation lamps 38 are installed on the number plates 34 and 36 and connected to the in-vehicle device 38, display for observation is made on the number plates 34 and 36, confirmation from outside the vehicle becomes a simple matter. For example, as shown in FIG. 33, an observation lamp 38 capable of displaying numbers and symbols is installed on the number plates 34 and 36. It is possible to display the current state (for example, to indicate that the vehicle is in violation) of the vehicle in numbers or symbols on this observation lamp 38. As a result, confirmation becomes easy at a position away from the vehicle.

Next, processing to automatically determine from outside the vehicle, namely, on the ground side, a normal vehicle or vehicle in violation determined in the present embodiment. Note that, this processing is performed here in the relay device 50 and is described together with the processing routine. Further, it is possible to set the relay device 50 and the processing below as an observation device.

Figure 34:
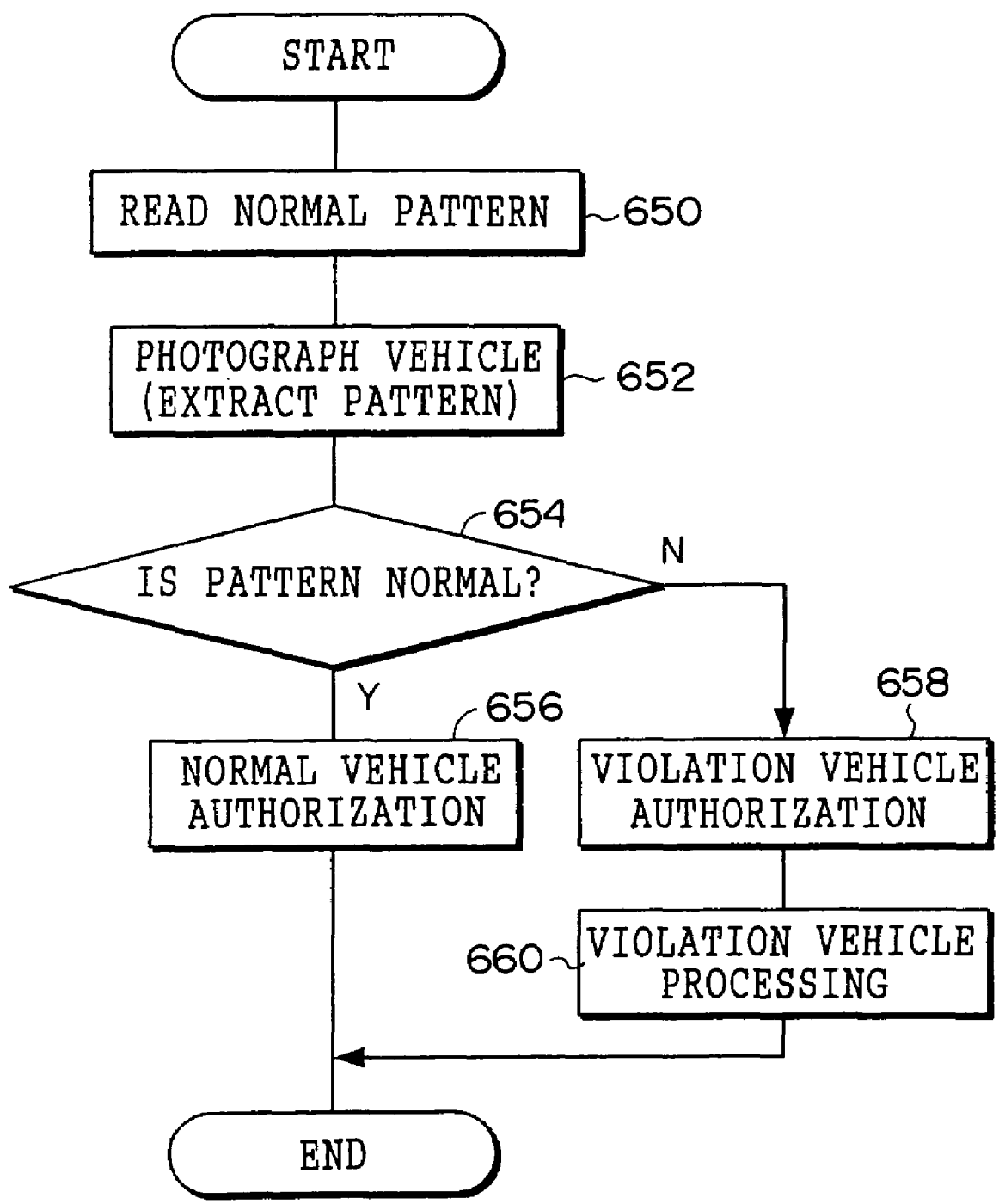
FIG. 34 is a flow chart showing the flow of violation detection processing in the on-ground installation.

As is shown in FIG. 34, when the violation detection processing is executed, the above normal pattern is read in step 650. All set normal patterns are read. It is preferable if a normal pattern generated by a signal received in the relay device 50 from the general center 40 is used for this normal pattern. By using this normal pattern generated from a received signal, the latest normal pattern can be used and the secrecy of the normal pattern can be improved.

In the next step 652, the vehicle is photographed for a set time. This photography may be performed such that at least the observation lamp is photographed. In step 652, the flash pattern is extracted from the flash time of the observation lamp of the photographed vehicle. This extraction can be performed by measuring the time intervals when the lamp is on or off.

The vehicle photography of step 652 is not limited to the above set time photography. For example, if an electronic shutter is provided in an image pickup device and the electronic shutter either opened or closed in synchronization with the above normal pattern, the electronic shutter can be synchronized with the observation lamp. As a result, it is also possible to pick up an image only during the time the lamp is on in synchronization with the flashing of the normal pattern.

In the next step 654, a determination is made as to whether or not the normal pattern read in step 650 matches the pattern extracted in step 652. If they do match, the determination in step 652 is affirmative and, in the next step 656, the photographed vehicle the vehicle is authorized as a normal vehicle and the routine is ended.

In the determination in step 654, when an electronic shutter is provided in the image pickup device and the electronic shutter is made either opened or closed in synchronization with the normal pattern, the electronic shutter can be synchronized with the flashing of the observation lamp. As a result, it is possible to determine that the patterns match by picking up an image only during the time the lamp is on in synchronization with the flashing of the normal pattern.

For example, when the observation lamp 227 is flashed on and off in the pattern shown in FIG. 23, if the detection times are set as the times T1 and T2, the time when the pattern is normal is when the lamp is on at the time T1 and the lamp is off at the time T2. If, however, at least one of the lamp being off at the time T1 or the lamp being on at the time T2 occurs, the lamp is not turned on in a normal pattern and it can be determined that the patterns do not match.

If the patterns do not match, then determination in step 654 is negative and the routine proceeds to the next step 658 where it is authorized that the photographed vehicle is in violation. In the next step 660, processing for a vehicle in violation is carried out. Examples of processing for a vehicle in violation include photographing the vehicle number (number plate), photographing the driver, notifying the observer and the like.

By photographing the flashing of an observation lamp in a normal pattern in this way, it is possible to easily an automatically determine whether a vehicle is a normal vehicle or is in violation.

Note that the above description was for the detection of a normal pattern, however, it is also possible to detect a violation pattern. In this case, it is possible to detect a specific violation pattern and perform an observation corresponding to the type of violation. Further, in the above, a description was given for that the flashing of an observation lamp was observed, however, the observation is not limited to the flashing of light, and it is also possible to perform an observation of notification by radio waves. In this case, the cycle and frequency of the waves as well as the waveform, the amplitude and the like can be set for a normal pattern.

In the above embodiment, a description was given for when the charge was made by deducting the toll from an IC card on which toll balance information and the like was stored, however, the charge processing is not limited to charge processing using an IC card, and it is also possible to approve the toll from an settled account such as a credit card or bank account associated with the user of the vehicle determined by an ID code. In this case, when a card or account that allows charge processing to be processed automatically is determined, by notifying the in-vehicle device as to the toll deduction from the deductible card or bank account before the deduction, the user can confirm beforehand the payment of a toll that has been created because of a charge.

Fifth Embodiment

The present embodiment enables the determination of a vehicle that is in violation or a normal vehicle described in the above embodiments to be made easily and using a simple structure from outside the vehicle. Note that, in the present embodiment, the structure is the same as in the above embodiments, therefore, the same portions are given the same descriptive symbols and a detailed description thereof is omitted. Note also that, the structure of a portion of the relay device 50 of the above embodiments is used to form the observation device 52. In addition, the present embodiment has a simple structure to allow easy determination of whether a vehicle is a normal vehicle or is in violation.

Figure 35:
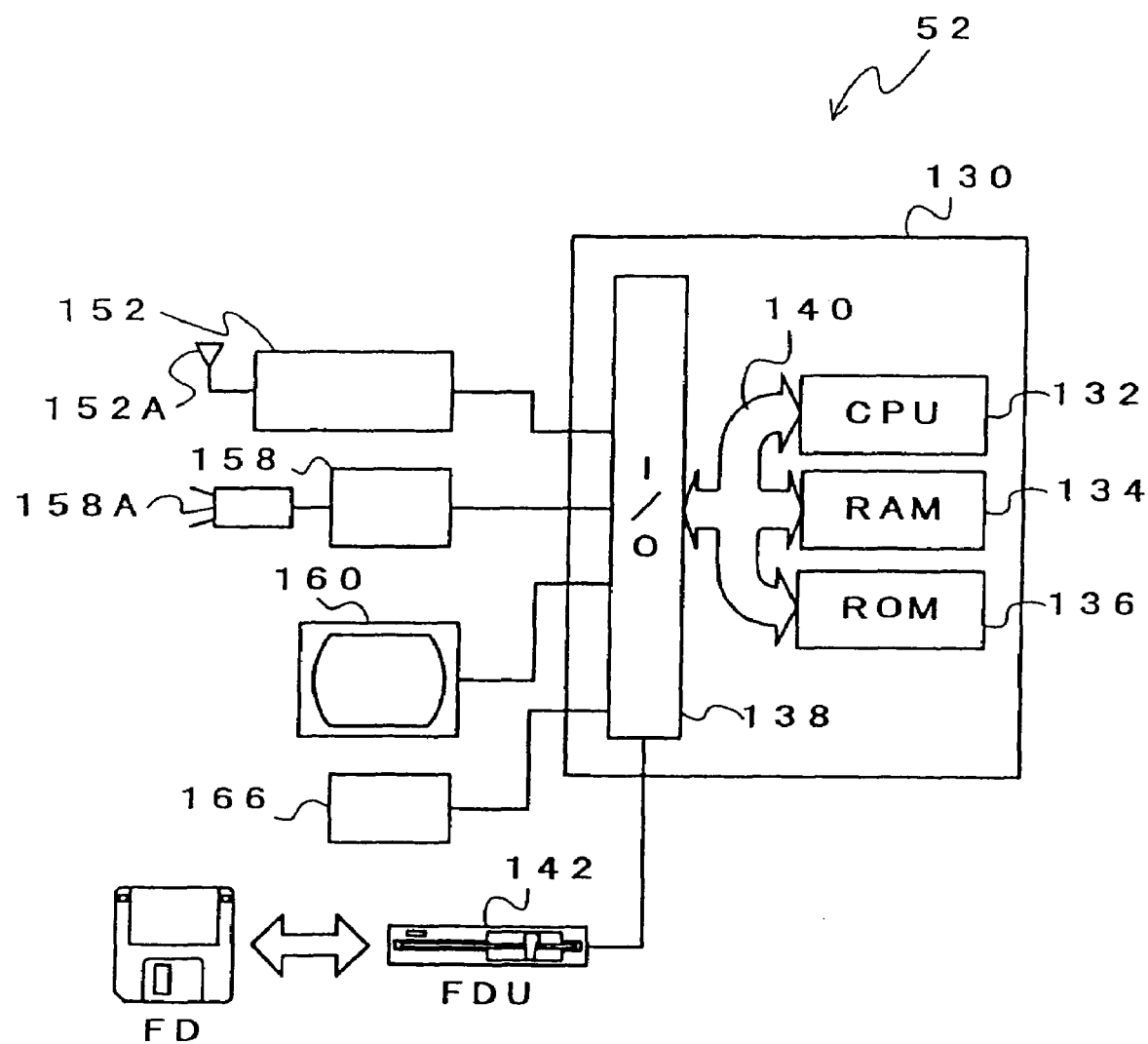
FIG. 35 is a block diagram showing the schematic structure of an observation device of the fifth embodiment.

As is shown in FIG. 35, in the observation device 52 of the present embodiment, a ground wave communication device 152 having a ground wave antenna 152A, and a lamp photographing device 158 provided with an image pickup device 158A such as a TV camera or an image sensor or the like are connected to an input/output port (I/O) 138 of a relay control device 130 constructed from a microcomputer. A display device 160 for displaying images photographed by the lamp photographing device 158 provided with the image pickup device 158A is also connected to the input/output port (I/O) 138. Furthermore, a printing apparatus 166 used for printing photographed images and the like is also connected to the input/output port (I/O) 138.

Figure 36A:
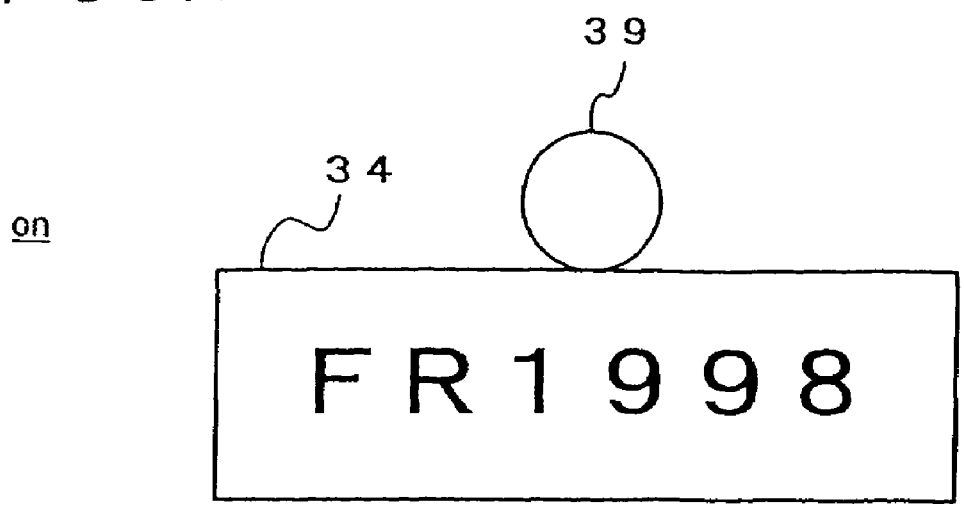
FIGS. 36A and 36B are line drawings showing an observation lamp.
Figure 36B:
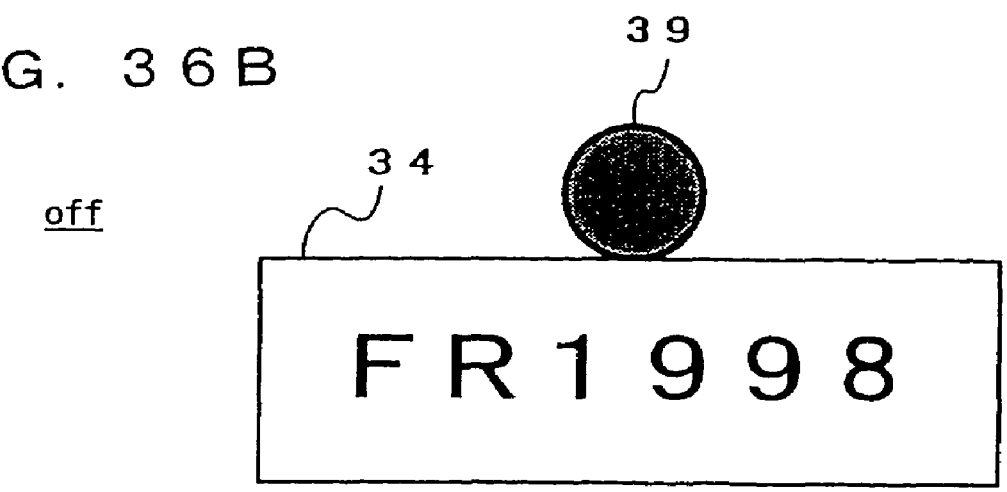

As shown in FIG. 36, in the present embodiment, an observation lamp 39 is provided in the vicinity of the number plate 34 (or 36). FIGS. 36A and 36B show states where the observation lamp 39 is flashing on and off. FIG. 36A shows a state where the observation lamp 39 is on and FIG. 36B shows a state where the observation lamp 39 is off. By providing an observation lamp 39 in the vicinity of the number plate 34 attached to a vehicle and connecting it to the in-vehicle device 30 in this way, a display for observation is made on the number plate 34. As a result, confirmation can be easily performed from outside the vehicle.

Next, a description will be given of the processing for determining a normal vehicle or a vehicle in violation from outside the vehicle, namely, on the ground side.

Figure 37:
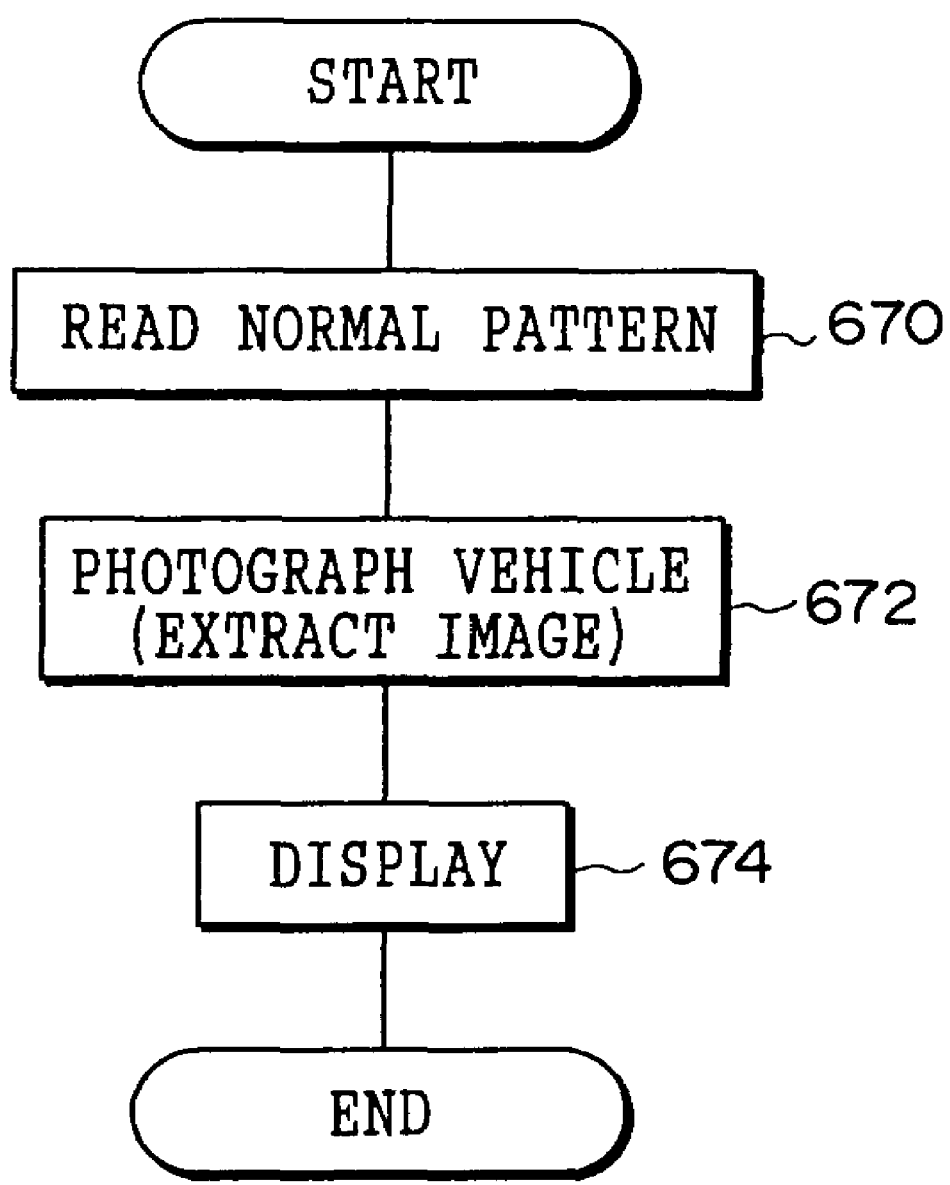
FIG. 37 is a flow chart showing the flow of observation device processing.
Figure 38A:
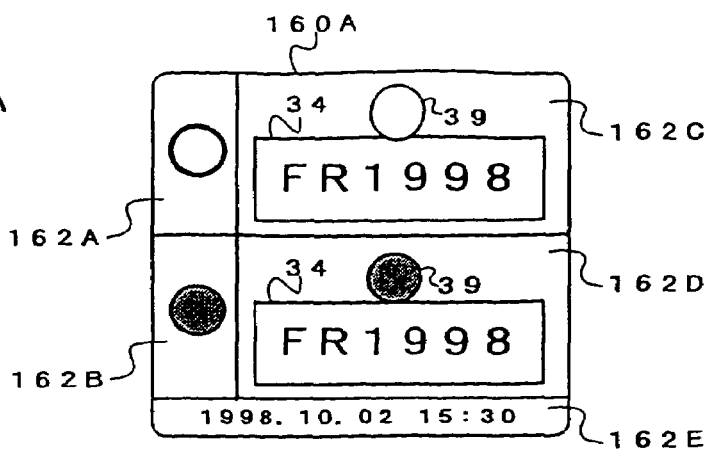
FIGS. 38A, 38B, 38C, and 38D are line drawings showing an observation device display screen.
Figure 38B:
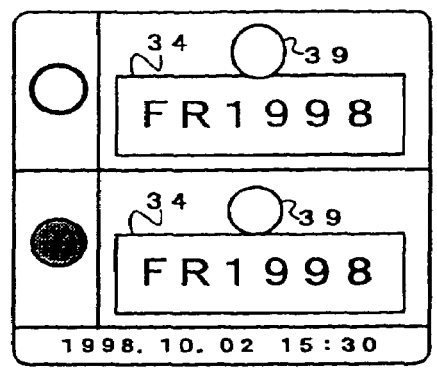
Figure 38C:
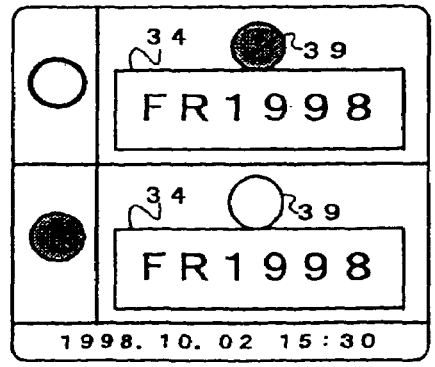
Figure 38D:
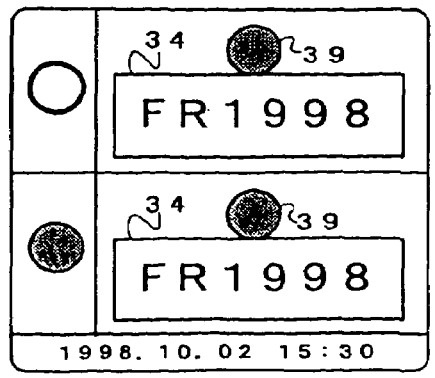

As is shown in FIG. 37, in the observation device 52 of the present embodiment, firstly, in step 670, the above normal pattern is read. Note that, it is preferable if a normal pattern generated by the latest signal received in the observation device 52 from the general center 40 is used for this normal pattern. By using this normal pattern generated from a received signal, the latest normal pattern can be used and the secrecy of the normal pattern can be improved. Note also that it is also possible to store the normal pattern information on a floppy disk and to use the information read from the floppy disk.

In the next step 672, the vicinity of the number plate 34 or 36 is photographed for a predetermined time. This photography needs at least to include the observation lamp 39. In step 672, at least two images in synchronization with the normal pattern are extracted from a plurality of images photographed for the set time. Namely, the images in synchronization with the on time of the normal pattern or the off time of the normal pattern are extracted in synchronization with the flashing of the normal pattern.

For example, if the observation lamp 39 is flashed on and off in the pattern shown in FIG. 23, if the images are extracted at times T1 and T2, images where the lamp is on at the time T1 and the lamp is off at the time T2 are obtained.

Note that the vehicle photography in step 672 is not limited to being performed for a set time. For example, if an electronic shutter is provided in an image pickup device and the electronic shutter either opened or closed in synchronization with the above normal pattern (the detection timing), the image picking up in synchronization with the flashing of the observation lamp can be possible. As a result, it is also possible to pick up an image only during the time the lamp is on in synchronization with the flashing of the normal pattern.

In the next step 674, the turning on and turning off images at the predetermined timing using the normal pattern read in the above step 670 are displayed together with the images extracted in step 672 on the display unit 160. If an observer observes the images displayed on the display unit 160, it can be easily determined whether the vehicle is a normal vehicle or is in violation.

FIG. 38 shows the display screen of the display device 160 for both normal states and violation states when the observation lamp 39 is flashing in a normal pattern (see FIG. 23). When the observation lamp 39 is flashing in a normal pattern (see FIG. 23), then, as is shown in FIG. 38A, the display screen is divided into four sections with the following being displayed. Namely, the top portion (the portion comprising the sections 162A and 162C) is related to the time T1 of the detection timing. The center portion (the portion comprising the sections 162B and 162D) is related to the time T2 of the detection timing. In addition, the bottom of the screen (the section 162E) is related to the photographed image and displays the year, month, date, and time of the photography. The left side portion (the portion comprising the sections 162A and 162B) displays a state in which the observation lamp 39 ought to be in a normal pattern, while the right side portion (the portion comprising the sections 162C and 162D) displays the actual photographed image. When the observation lamp 39 is turned on in a state other than the normal pattern, that state is one of those shown in FIGS. 38B, 38C, or 38D.

By displaying the state in which the observation lamp 39 should be turned on or off in a normal pattern, and by displaying the actual photographed image, it is possible for an observer to easily determine whether a vehicle is a normal vehicle or is in violation.

The year, month, date, and time of the photography of the photographed image is also displayed on the display device 160A. Moreover, because it is possible to specify a vehicle from the number plate, if this screen is printed using the printing apparatus 166, it is possible to preserve as an output form the suitability or otherwise of the turning on of the observation lamp 39 in the normal pattern.

Note that, in the above embodiment, the use of the observation device having the above structure enables a determination of whether a vehicle is a normal vehicle or is in violation from outside the vehicle using a simple structure, however, it is also possible to form an even simpler device to support this determination. The structure of this supporting device is described below.

Figure 39:
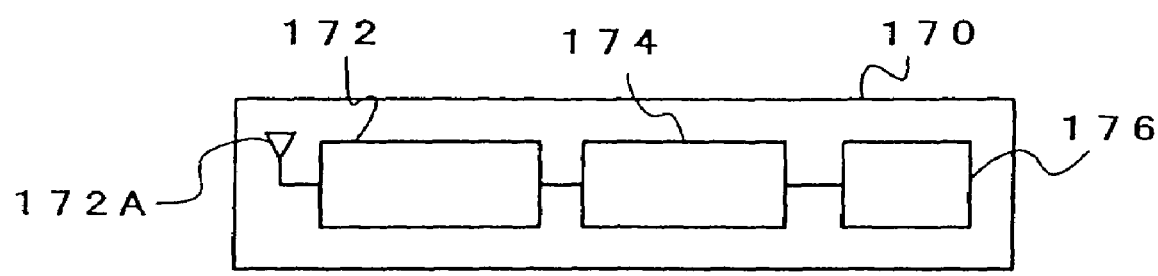
FIG. 39 is a block diagram showing the schematic structure of a supporting device.

As is shown in FIG. 39, the supporting device 170 for supporting the determination of a normal vehicle is constructed from receiver 172 provided with an antenna 172A, a control device 174, and a notification device 176. The receiver 172 and the notification device 176 are connected to the control device 174. In the same way as the above ground wave communication device 152, the receiver 172 is intended to receive a normal pattern. Note that the receiver 152 only needs to receive the normal pattern and may be constructed from a simple receiver.

The control device 174 is a device for converting a signal representing a normal pattern received by the receiver 172 into a drive signal for a notification in the notification device 176. The notification device 176 is formed from at least one of a sound emitting device such as a speaker or a buzzer and a lamp, and notifies a normal pattern as a sound pattern or light pattern that corresponds with the normal pattern using the drive signal from the control device 174.

As described above, because the supporting device 170 can be formed with a simple structure, it is possible to construct it in a portable size. As a result, it is also possible for an observer to perform an observation while carrying the device.

Note that, in the above description, an example was described in which a receiver was used for support, however, it is also possible to attach a card read/write device instead of a receiver. It is also possible to store a normal pattern in an IC card and, by reading this card, even in areas of poor reception and the like, the observation pattern read from the IC card can be used for support.

Sixth Embodiment

In the present embodiment, the present invention is applied to an automatic charge system for performing charge processing automatically for a vehicle that has entered (i.e. driven into) a toll facility (i.e. an area in which a charge is applied). Note that the automatic charge system used in the present embodiment is a system for settling a usage toll (fare for travelling) based on information transfer using communication between an in-vehicle device mounted in a vehicle and an on-road device installed on the road. Moreover, because the present embodiment has substantially the same structure as the above embodiments, the same portions are given the same descriptive symbols and a detailed description thereof is omitted.

The concept of the structure of the automatic charge system 10 of the present embodiment is the same as in the structure shown in FIG. 15. The general center 40 established on the ground side of the structure according to the present embodiment is the same as the general center 40 shown in FIG. 2, and therefore a description thereof is omitted. Furthermore, the relay device has the same structure as the relay device 50 shown in FIG. 15, the in-vehicle device has the same structure as the in-vehicle device 30 shown in FIG. 17, and the observation lamp has the same structure as the observation lamp 227 shown in FIG. 18, therefore descriptions of these are omitted.

The operation of the present embodiment will now be described.

Firstly, the operation of the ground side apparatus (in this case, the general center 40) will be described in detail. In the present embodiment, the general center 40 performs the same processing as the processing in FIG. 4, and transmits information for charge processing to an in-vehicle device 30 mounted on the vehicle 32.

In the general center 40, GPS signals are received from GPS satellites 20, 22, and 24 (step 300 in FIG. 4). The general center 40 then determines its own, reference position i.e. that of the general center 40 (a reference latitude and longitude Po), and generates GPS correction information (step 302). Next, predetermined area in which a charge is applied information is read (step 304), and GPS correction information is transmitted together with area in which a charge is applied information is transmitted by FM broadcast or telephone circuit or the like (step 306).

Figure 40:
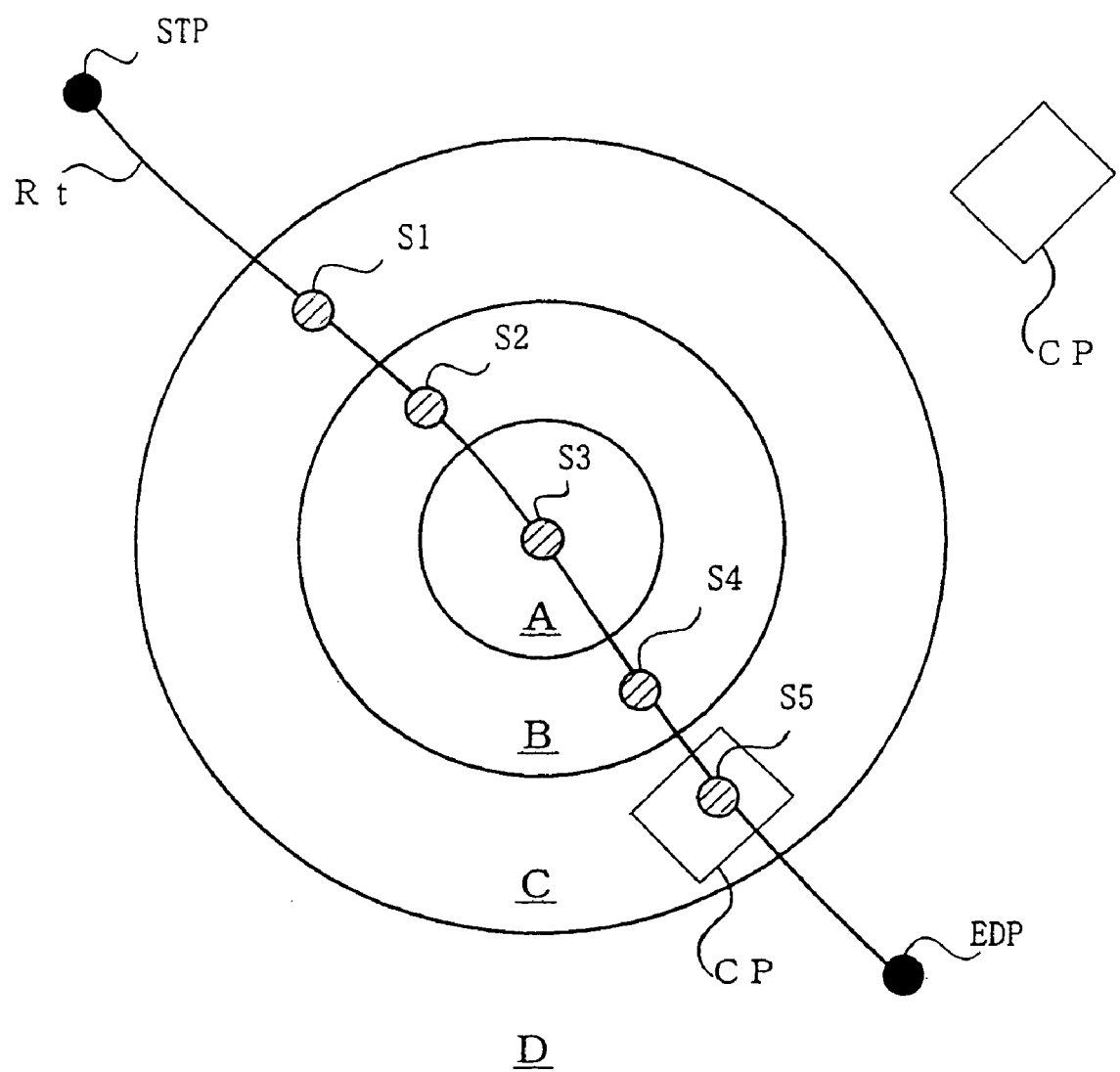
FIG. 40 is an image diagram showing a area in which a charge is applied according to the sixth embodiment of the present invention.

As described above, the area in which a charge is applied information is set for a area in which a charge is applied formed from a predetermined plurality of areas. An example of a structure is one in which the size of the areas between the city center and the suburbs becomes smaller the closer to the city center. An example of area in which a charge is applied according to the present embodiment is shown in FIG. 40. The ground is divided into three areas, namely, a circular central area A, a donut shaped area B that is substantially concentric around and adjacent to the outer periphery of the area A, and an area C outside the areas A and B. It is possible to specify these areas by latitude and longitude as well as by their shape.

Note that, in the present embodiment, checkpoints CP for performing charge processing are provided at predetermined positions in the area D and inside the area C.

Moreover, the charge processing area information is set for the area in which a charge is applied A formed from a plurality of areas, however, it is possible to set a different charge amount for each area. For example, it is possible to increase the charge amount in accordance with the proximity to the city center, or to alter the charge amount in accordance with the number of times of use, or to alter the charge amount in accordance with the level of congestion, or to alter the charge amount in accordance with the length of time of use. These are determined by the charge calculation conditions.

The charge calculation conditions have been described in the above embodiments and a detailed description thereof is omitted, however, the first charge calculation condition is the number of entries into an area, shown in the table indicating the tolls for each area. The second charge calculation condition is the time length of stay in an area, shown in the table indicating the tolls for each area. The third condition is the level of congestion in the area, shown in the table indicating the tolls for each area. The fourth condition is speed when traveling inside an area (or, alternatively, the average speed inside an area), shown in the table indicating the tolls for each area. The fifth condition is total area travel distance traveled inside an area, shown in the table indicating the tolls for each area.

By including these tables based on the charge calculation conditions in the area in which a charge is applied information, it is possible to specify, for the area in which a charge is applied, the area and the toll.

The area in which a charge is applied information is set for a area in which a charge is applied formed from a plurality of predetermined areas. For example, areas might be formed between an inner city area and the suburbs and these areas become smaller the closer they are to the inner city area. An example of area in which a charge is applied of this type is shown in FIG. 40. The ground is divided into 4 areas. In the center portion is a circular area A. Donut shaped circular areas B and C which are substantially concentric around and adjacent to the outer periphery of the area A. Last is the area D which is the area other than the areas A, B, C. These areas can each be specified by their latitude and longitude as well as by their shape. In the present embodiment, the areas A, B, and C are each area in which a charge is applied, while the area D is outside the area in which a charge is applied.

Next, the operation of the in-vehicle device 30 will be described. In the present embodiment, the in-vehicle device 30 is intended to perform identical to that in FIG. 5.

Namely, information is received from the ground, i.e. the general center 40 (or relay device 50) at predetermined times (for example every one minute) by the in-vehicle device 30 mounted on the vehicle (step 400). A determination is then made as to whether or not the received information is the latest information (step 402), and, if the received information is the latest information (i.e. if the determination in step 402 is affirmative), the area in which a charge is applied is led out while the GPS correction information is stored (step 404). If, however, the received information is not the latest information (i.e. the determination in step 402 is negative), GPS signals from the GPS satellites 20, 22, and 24 are received (step 406), the current date and time (year, month, date, and time) are read, and the current position (latitude and longitude P (t)) of the in-vehicle device, namely of the host vehicle thereof, is determined (step 410). The determined latitude and longitude P (t) are then matched with a map database stored in advance (step 412), the area to which the latitude and longitude P (t) belong are then decided (step 414), and the latitude and longitude P (t), the date and time t, and the area are then stored as vehicle location history (step 416). As a result, the area in which the vehicle 32 is present at predetermined times is stored with a date and time as history.

Accordingly, taking as an example a case in which the toll varies according to the number of times a vehicle enters into a area in which a charge is applied, as is shown in FIG. 40, if a vehicle travels through the area comprising the areas A to D along the route Rt from the start point STP to the end point EDP, because the start point STP and the end point EDP are outside the area in which a charge is applied, no charge is applied, however, because each of the partway points S1, S2, S3, and S4 are inside the area in which a charge is applied, a charge is applied, at each between the start point STP and the end point EDP. Namely, history information (charge history) in the sequence of areas C, B, A, B, C is stored.

Next, the charge processing in the in-vehicle device 30 will be described. This charge processing is processing to transmit history information after the receipt of a request for the transmission of the charge history (history information) from the ground side (checkpoint CP), and is described in detail below.

Figure 41:
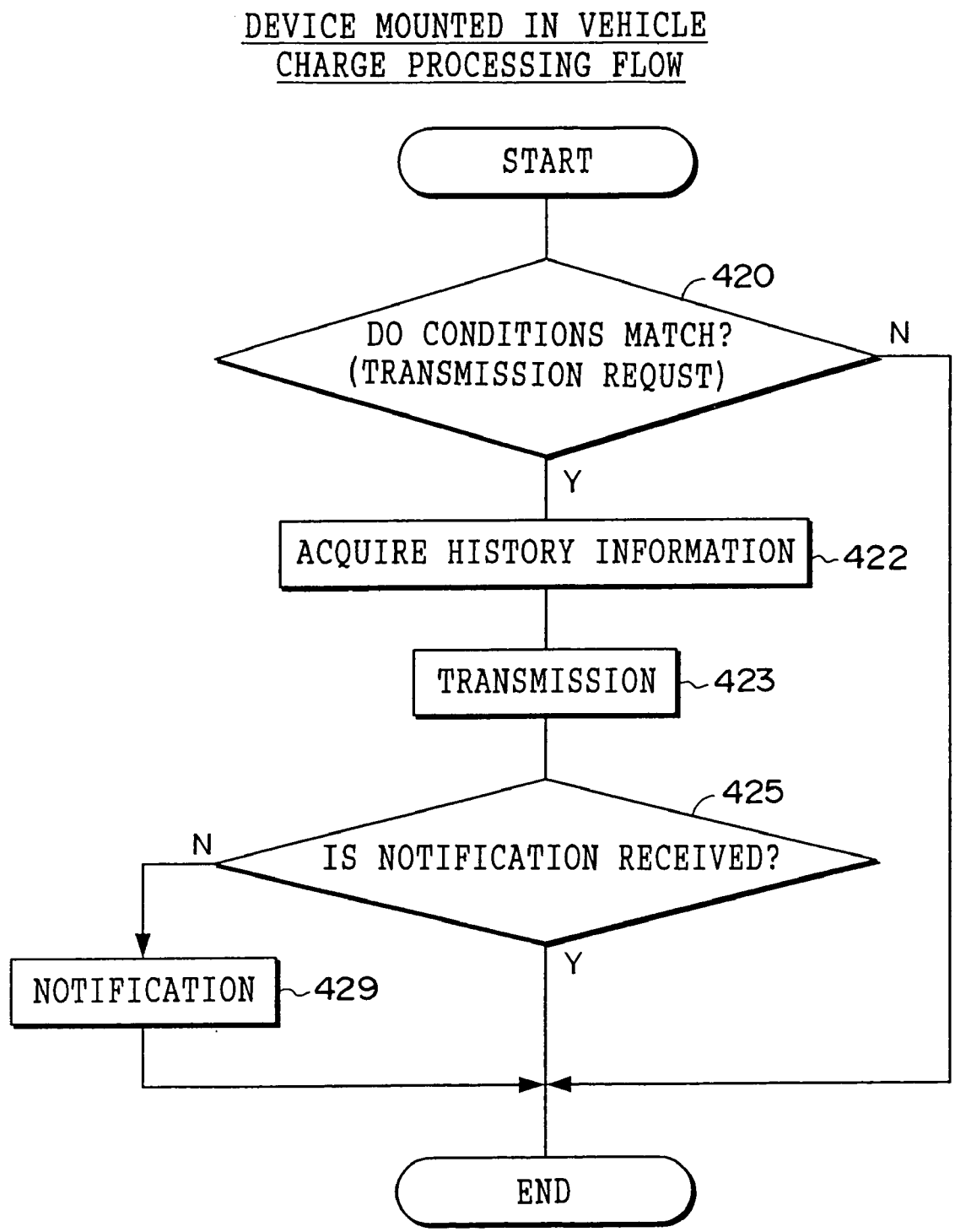
FIG. 41 is a flow chart showing the flow of charge processing executed in an in-vehicle device of the sixth embodiment of the present invention.

As is shown in FIG. 41, in step 420, by making a determination as to whether or not there has been a transmission request from the general center 40 (or relay device 50), a determination is made as to whether or not the conditions match. If the conditions do not match, the determination in step 420 is negative and the current routine is ended. If, however, the conditions do match, the determination in step 420 is affirmative and, in step 422, the history information is acquired. This history information is the list of the vehicle location history stored above (i.e. in a process corresponding to step 416 of FIG. 5). In the next step 423, the acquired history information is transmitted to the relay device 50. In the next step 425, a determination is made as to whether or not notification has been received from the relay device 50. If notification has been received, the determination is affirmative and the notification is performed. If notification has not been received, the determination is negative and the routine is ended.

Next, the operation of the ground facility and the in-vehicle device at the checkpoint CP will be described further.

Figure 42:
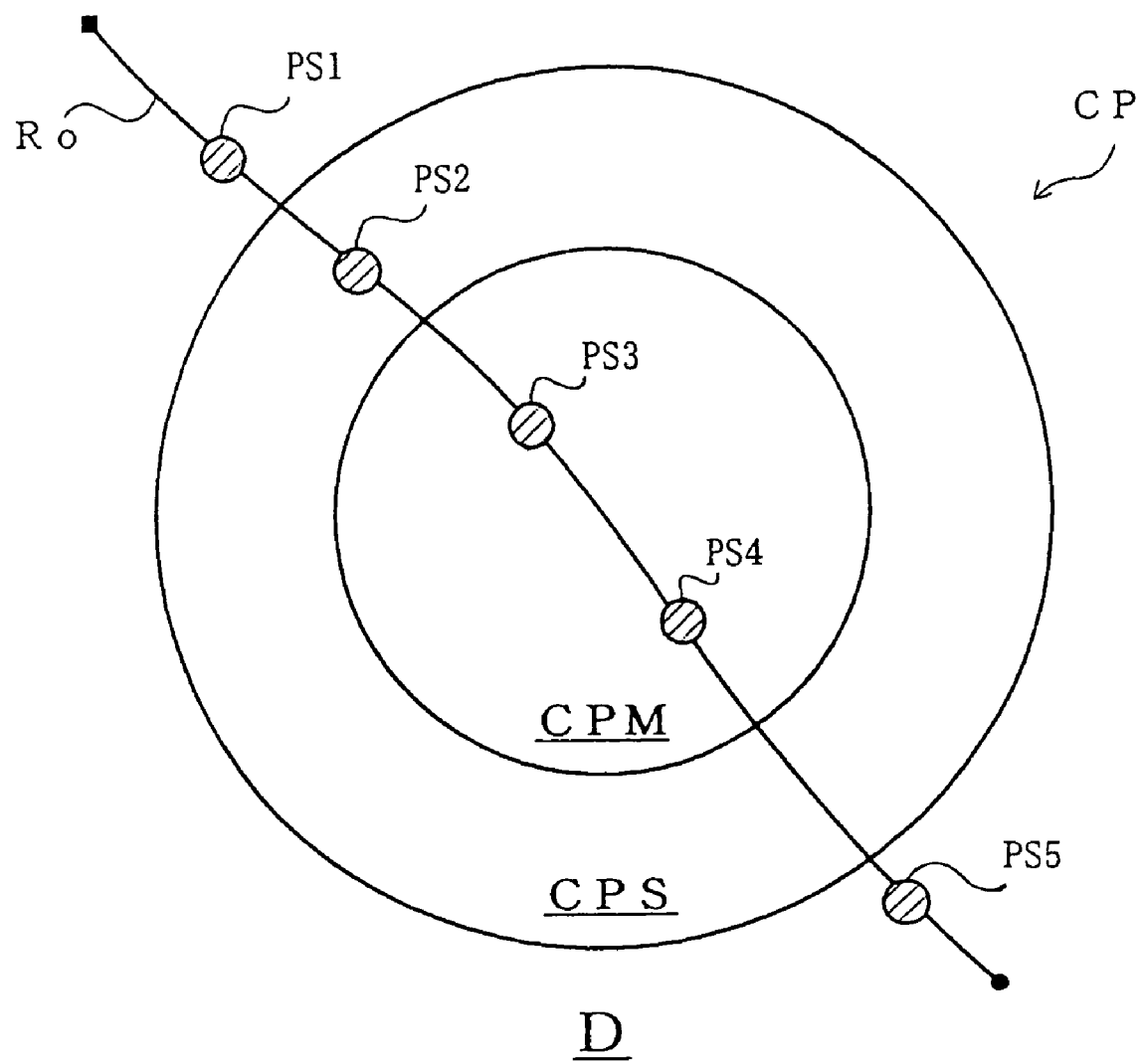
FIG. 42 is an explanatory diagram for explaining the area of a checkpoint.

Note that, in the present embodiment, the checkpoints CP are set as predetermined areas and, as is shown in FIG. 42, comprise the areas CPM and CPS. The area CPM is an area for performing tasks related substantially to the charge processing while the area CPS surrounding the area CPM is set as an area for canceling error for specifying the area CPM (buffer area). The reason for this is to counter any errors caused by the GPS system when the position of the vehicle is detected using a GPS system. The area D outside the areas CPM and CPS is outside area in which a charge is applied (FIG. 42) or is in the area in which a charge is applied (FIG. 40).

Figure 43:
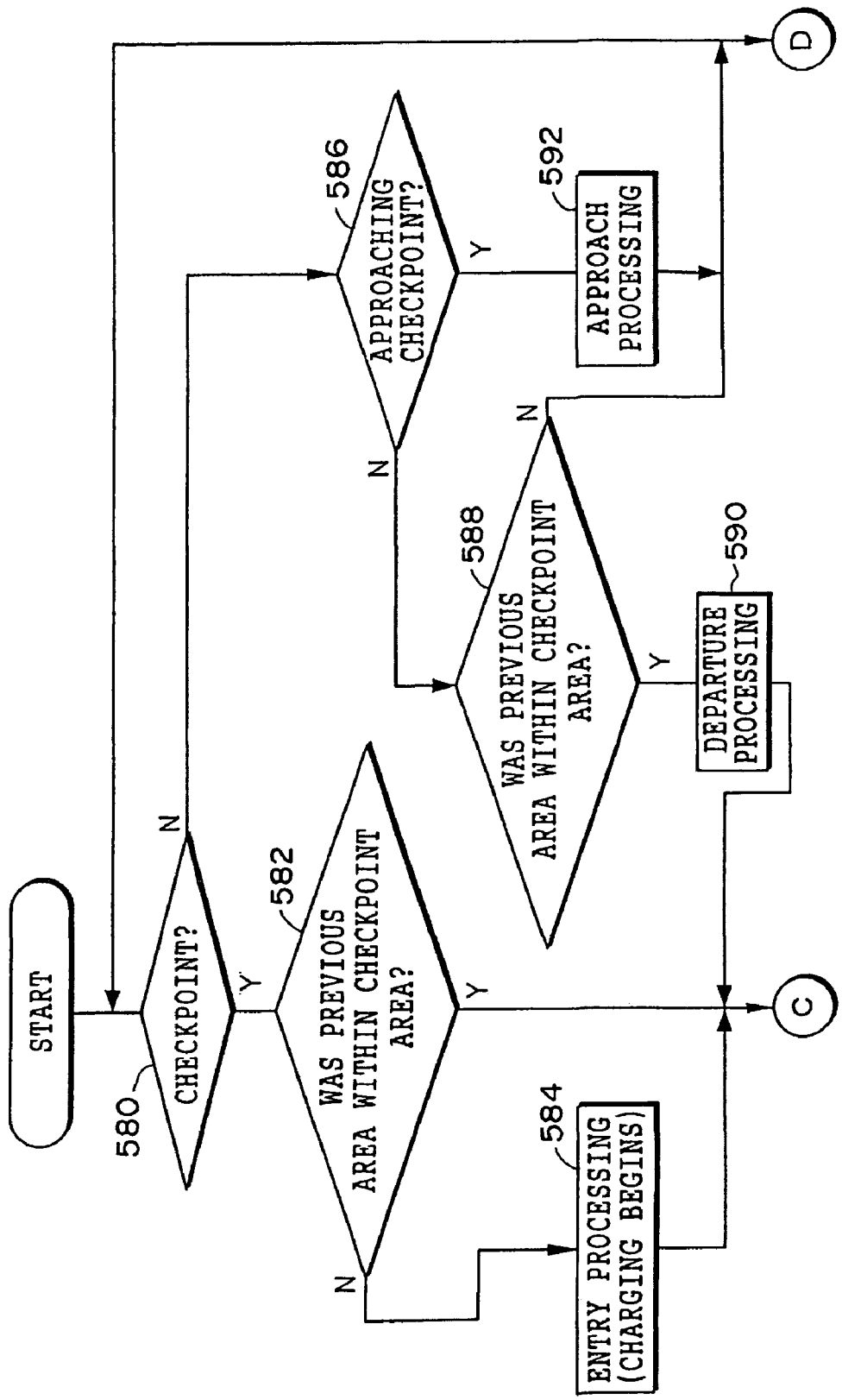
FIGS. 43 A and 43 B are a flow chart showing the flow of processing to operate an in-vehicle device.
Figure 43:
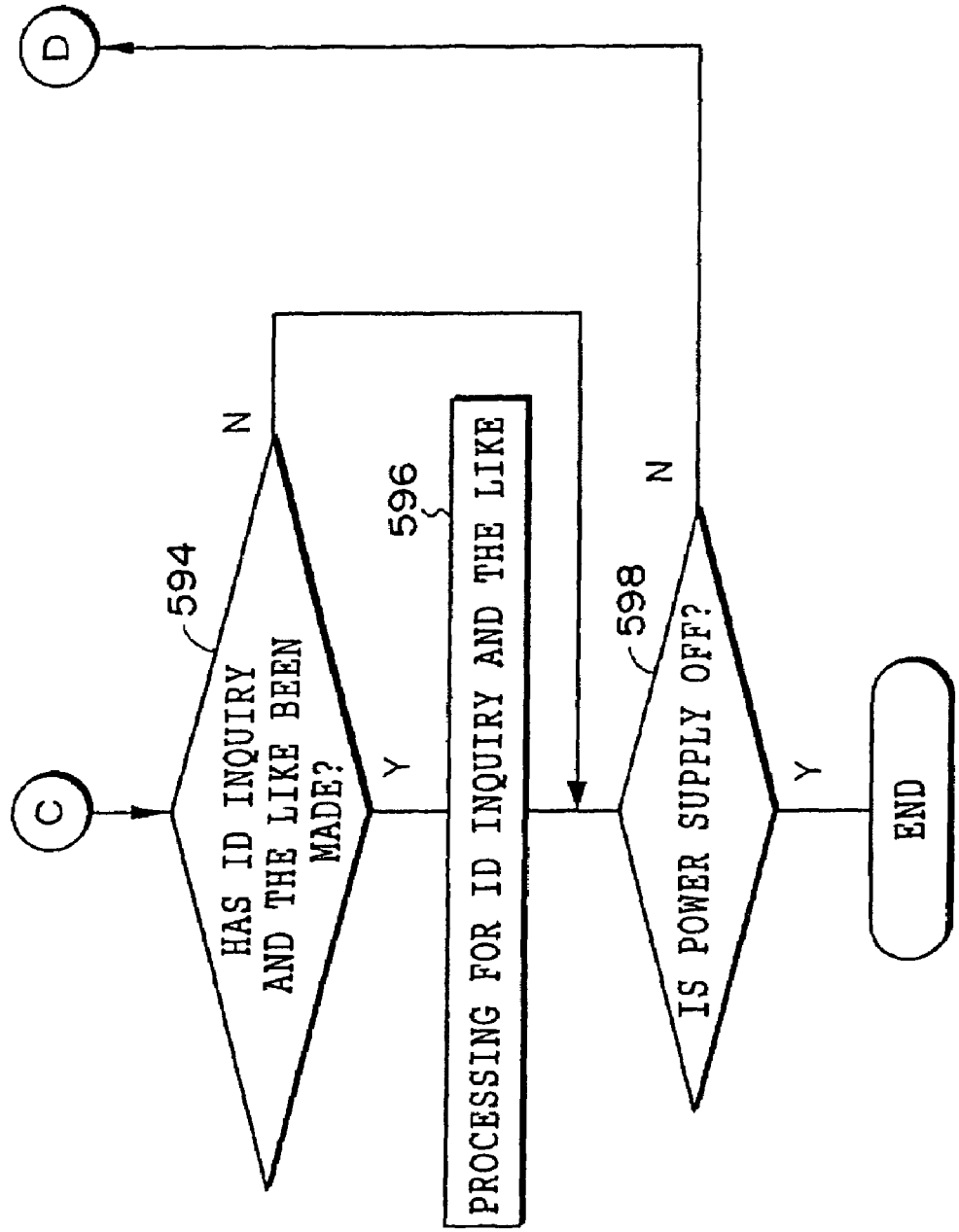

As is shown in FIGS. 43 A and 43 B, in the in-vehicle device, the routine proceeds to step 580 where a determination is made as to whether or not the current position is peripheral to the relay device 50 (the checkpoint CP). If the determination is negative, the routine proceeds to step 586, if the determination is affirmative, the routine proceeds to step 582. In step 582, a determination is made as to whether or not the previous area was a checkpoint area (the area when the current routine was last executed). If the previous area was not a checkpoint, then the vehicle has entered the checkpoint CP for the first time and, consequently, the determination in step 582 is negative. In the next step 584, area entry processing is performed and the routine proceeds to step 594. If, however, the previous area was a checkpoint area, the determination in step 582 is affirmative and the routine proceeds to step 594 with no further change.

This area entry processing is processing performed when a vehicle enters a checkpoint CP. For example, at the point PS2 partway along the route Ro (FIG. 42), a vehicle has entered the checkpoint Cp for the first time. By transmitting an ID code and the current position, for example, a notification can be made that the vehicle has entered the checkpoint CP. Due to this notification, the checkpoint CP, namely, the ground side (the relay device 50) can begin the initialization of the processing that accompanies the charge processing. Note that, in step 584, it is also possible to set the conditions for beginning the charge processing in the in-vehicle device. In the present embodiment, as described above, the charge processing can be performed at the device mounted in a vehicle in response to a transmission request from the relay device 50.

Note also that the ground side, namely, the relay device 50 is able, by the above notification, to transmit the latest charge tables as well as a normal pattern for flashing the observation lamp 227 on and off when the vehicle has been authorized as a normal vehicle. Moreover, if the vehicle is authorized as being in violation, it is possible to transmit information for performing the violation notification. The normal pattern is a pattern for causing the observation lamp 227 to flash on and off in a predetermined timing (for example, a timing in which the lamp is repeatedly switched on for a set time and then switched off for a set time) in order to enable confirmation from outside the vehicle that the host vehicle is a normal vehicle for which charge processing can be performed. If this pattern is used, the cyclic flashing can be confirmed from outside the vehicle and the vehicle can be confirmed as being a normal vehicle. In the same way, a pattern which causes the observation lamp 227 to flash on and off in a violation pattern different from the normal pattern (by flashing the observation lamp on and off repeatedly for a time t, or by leaving the lamp flashing) is used as the violation pattern in order to enable confirmation from outside the vehicle that the host vehicle is in violation.

If the determination in step 580 is negative, the routine proceeds to step 586 where a determination is made as to whether or not the distance to the checkpoint CP is less than or equal to a predetermined distance, which enables a determination to be made as to whether or not the vehicle is approaching the checkpoint CP. If the distance to the checkpoint CP is less than or equal to a predetermined distance, the determination in step 586 is affirmative and, in the next step 592, information indicating that the vehicle is approaching the checkpoint CP is provided by images and sound, and the routine returns to step 580. For example, it is possible for a fixed time to display information such as "approaching checkpoint" on the display panel 227S, or to provide this vocally from the sound device 228, or to display it on the display on the navigation system via the display device 224.

If the determination in step 586 is negative, the routine advances to step 588 where a determination is made as to whether or not the previous area was a checkpoint CP. If the previous area was not a checkpoint CP, the routine returns to step 580. In contrast, because the determination in step 588 is affirmative when the vehicle has departed from a checkpoint CP, the determination in step 588 is affirmative and, in the next step 590, the area departure processing is executed and the routine proceeds to step 594.

The above area departure processing is processing performed when a vehicle has departed to the area outside the checkpoint CP. For example, at the point PS5 partway along the route Ro (FIG. 42), a vehicle has left the checkpoint CP. In this processing, notification that the vehicle has left the checkpoint CP is made by the transmission of the ID code and current position. Note that, because it is possible to determine from the current position of a vehicle and from the previous position of a vehicle that the vehicle has left the checkpoint CP, this determination can be made from the history information at either the vehicle side or at the ground side.

Note also that, in the same way as described above, it is also possible to cause the observation lamp 227 to flash on and off or to be extinguished by a result of an authorization that the vehicle has departed.

Consequently, at the point PS1 partway along the route Ro, information is provided in step 592 that the vehicle is approaching the checkpoint CP. At the partway point PS2, area entry processing for when a vehicle first enters the checkpoint CP is performed. At the partway points PS3 and PS4, because the previous area was a checkpoint CP, the routine proceeds to the next step without change. At the partway point PS5, area departure processing for when a vehicle departs from a checkpoint CP is performed.

In step 594, a determination is made as to whether or not an inquiry for fixed data such as information on the type of vehicle and the ID code which comprises the vehicle ID and the like, namely, the vehicle number and the like has been made from the ground side. If this determination is affirmative, then, in the next step 596, ID inquiry processing is executed and then the routine proceeds to step 598. If the determination is negative, the routine proceeds without change to step 598.

This ID inquiry processing is carried out when a vehicle is within a checkpoint. For example, at the points PS3 and PS4, partway on the route Ro (see FIG. 42) a vehicle is within the checkpoint, therefore, information relating to the ID code is notified by transmitting the current position as well as fixed data such as the ID code and the vehicle model information. Note that a determination is made on the ground side as to whether or not the notification is normal or not, and the vehicle is authorized as being normal or as being in violation.

The above ID inquiry processing is processing in response to a confirmation from the relay device to the vehicle of whether or not the vehicle is a normal vehicle or is in violation.

In the next step 598, a determination is made as to whether or not the power supply has been cut. If power is being supplied, the determination is negative and the routine returns to step 580. If the power supply has been cut, the determination is affirmative and the routine is ended.

Figure 44:
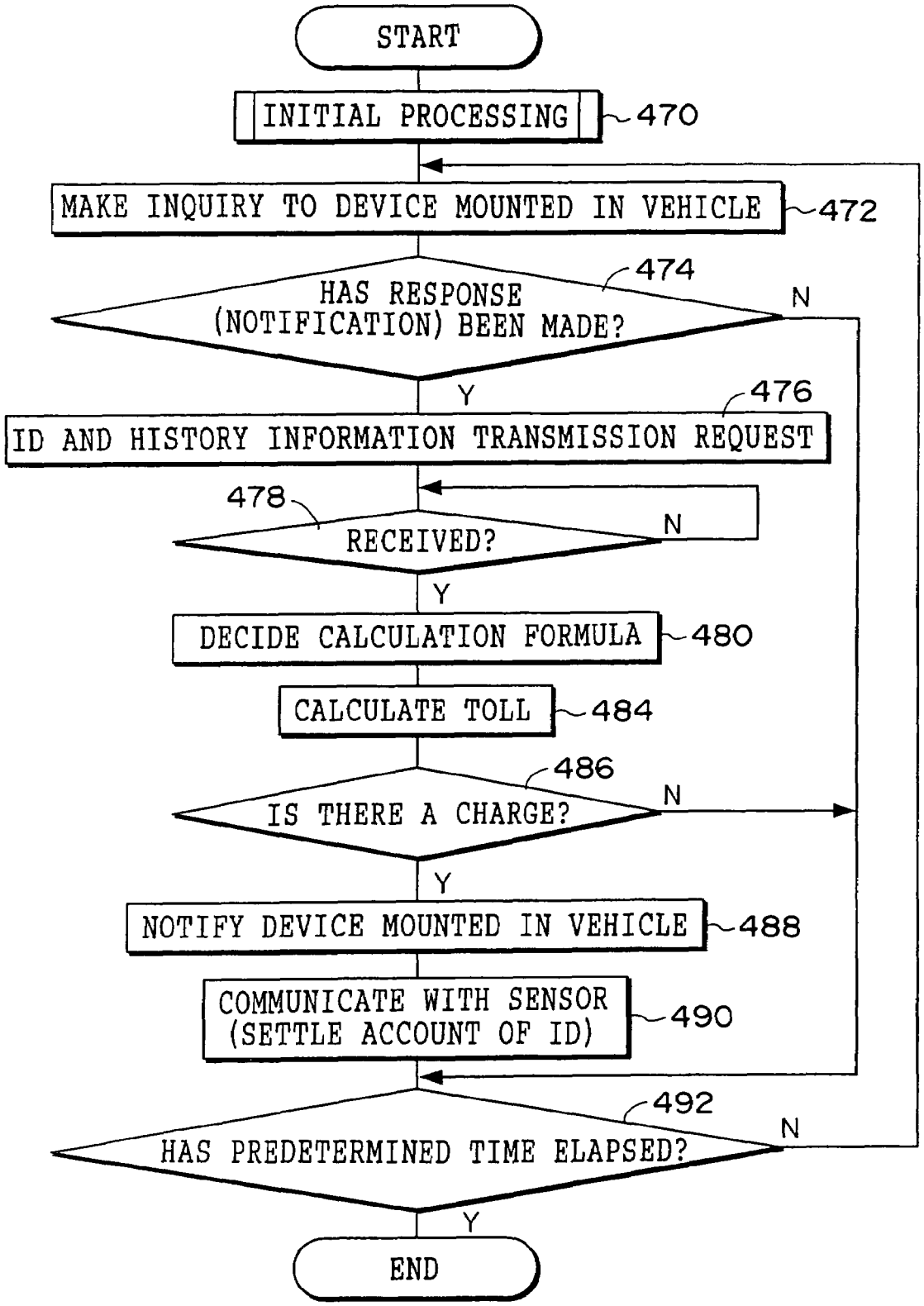
FIG. 44 is a flow chart showing the flow of processing to operate a relay device.

Next, the operation of the relay device will be described. In the relay device 50 according to the present embodiment, substantially the same processings as in FIG. 13 are carried out in FIG. 44.

Firstly, an initial processing is performed, namely, GPS signals from GPS satellites 20, 22, and 24 are received and determines the general center 40 reference position (a reference latitude and longitude Po). It then generates GPS correction information and performs processing to read the area in which a charge is applied information (step 470). It then makes an inquiry in order to obtain a response from the in-vehicle device (step 472), and then makes a determination as to whether or not the in-vehicle device 30 has responded (step 474). If there has not been a response (the determination in step 492 is negative), the inquiry is repeated until a predetermined time has elapsed.

If the in-vehicle device has responded (makes a notification) (i.e. the determination in step 474 is affirmative), a request is made for history information including the ID code and the like to be transmitted (step 476). When the in-vehicle device 30 has transmitted the history information including the ID code and it has been received (i.e. the determination in step 478 is affirmative), a calculation formula is decided based on the area included in the history information (step 480), and the toll is calculated using the set calculation formula (step 484).

The calculation formula is determined by the above calculation conditions. These calculation conditions are conditions for determining a charge amount (charge calculation conditions) and may be made up of the number of entries into an area, the length of time in an area, or the like. The charge calculation formula is determined by the calculation conditions. In formula (5) below, a charge calculation formula is shown as a general formula considering areas.

$$(\text{charge amount}) = f(N_A, N_B, N_C, N_H, N_I, N_J, t) \quad (5)$$

wherein, $N_A$, $N_B$, $N_C$: the evaluation of the areas (i.e. the number of entries and length of time of stay for the area determined by the charge calculation conditions)—note that the above area may be formed from a plurality of areas $N_H$: the level of congestion $N_I$: the speed (average speed)

$N_J$: the total distance traveled within the area

T: the date and time

Next, a determination is made from the calculation result of step 484 as to whether or not there is a charge (step 486). If no charge has been generated, a determination is made as to whether or not a predetermined time has passed (step 492). If the predetermined time has not passed (i.e. if the determination in step 492 is negative), the routine returns to step 472. If the predetermined time has passed (i.e. if the determination in step 492 is affirmative), the present routine is ended.

If, however, a charge has been generated, an instruction is given to notify the in-vehicle device of the charge information by transmitting the generated charge, namely, the toll to the in-vehicle device as charge information (step 488). The toll is then settled from an settled account such as a bank account or a credit card associated with the user of the vehicle determined by the ID code (step 490).

Thus, in the present embodiment, history information indicating the presence of a vehicle in a area in which a charge is applied is stored (accumulated) in the in-vehicle device. In addition, because this history information is transmitted is response to a transmission request from the ground side, there is no need to install antennas at entries and exits and the like and transfer information for collecting tolls (charge). Namely, it is only necessary to establish a point where information can be transferred between the ground and a vehicle, and the toll collection (the charge) can be easily performed by transferring information for collecting the toll (the charge) at that point.

Figure 45:
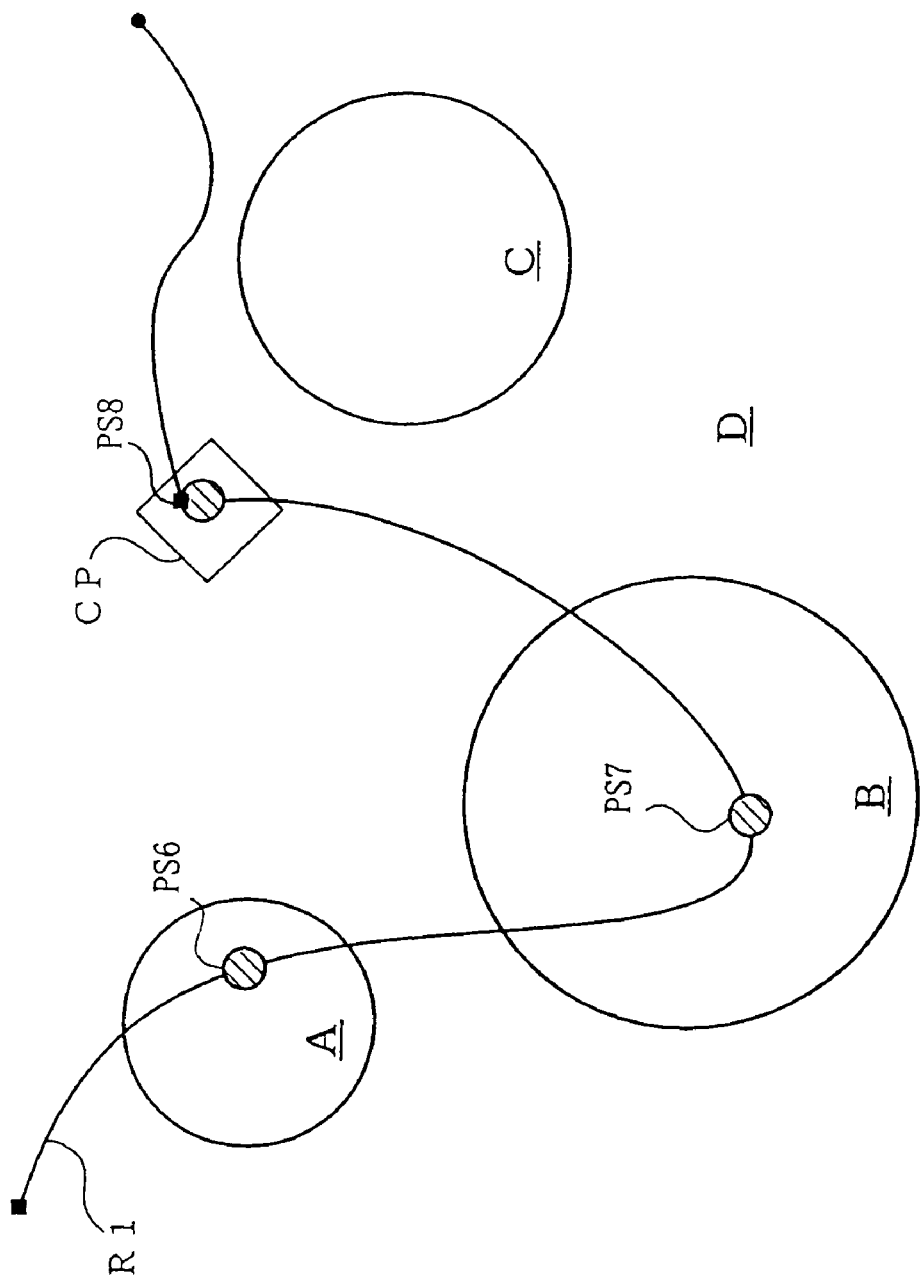
FIG. 45 is an image diagram showing separated area in which a charge is applied.

In the above embodiment, a description was given of when charge processing was performed by storing history information for one area in which a charge is applied shaped as a concentric circle, however, the present invention is not limited to this. For example, the present invention is also effective in separately existing area in which a charge is applied A, B, and C. In the example shown in FIG. 45, a checkpoint CP is present in the area D outside the area in which a charge is applied. When a vehicle travels along the route R1 through the area in which a charge is applied A and B (i.e. through the partway points PS6 and PS7), the driver only needs to pass through the checkpoint CP established in advance as the partway point PS8 for the charge. In this case, the transit through the checkpoint CP does not need to be included in the route R1. Namely, the charge processing can also be performed by the vehicle passing through the checkpoint CP after a predetermined time has passed, for example, after several hours or several days. Note that, in order to differentiate between the transit by the vehicle through the checkpoint CP in this way after a predetermined time has passed, for example, after several hours or several days, and a transit through the checkpoint CP a short time later, namely, as preferential treatment and delayed treatment, it is also possible to add an extra charge when the vehicle visits the checkpoint CP after a set time has passed, and to subtract a predetermined discount charge from the normal charge amount when the charge processing is performed within the set time.

Figure 46:
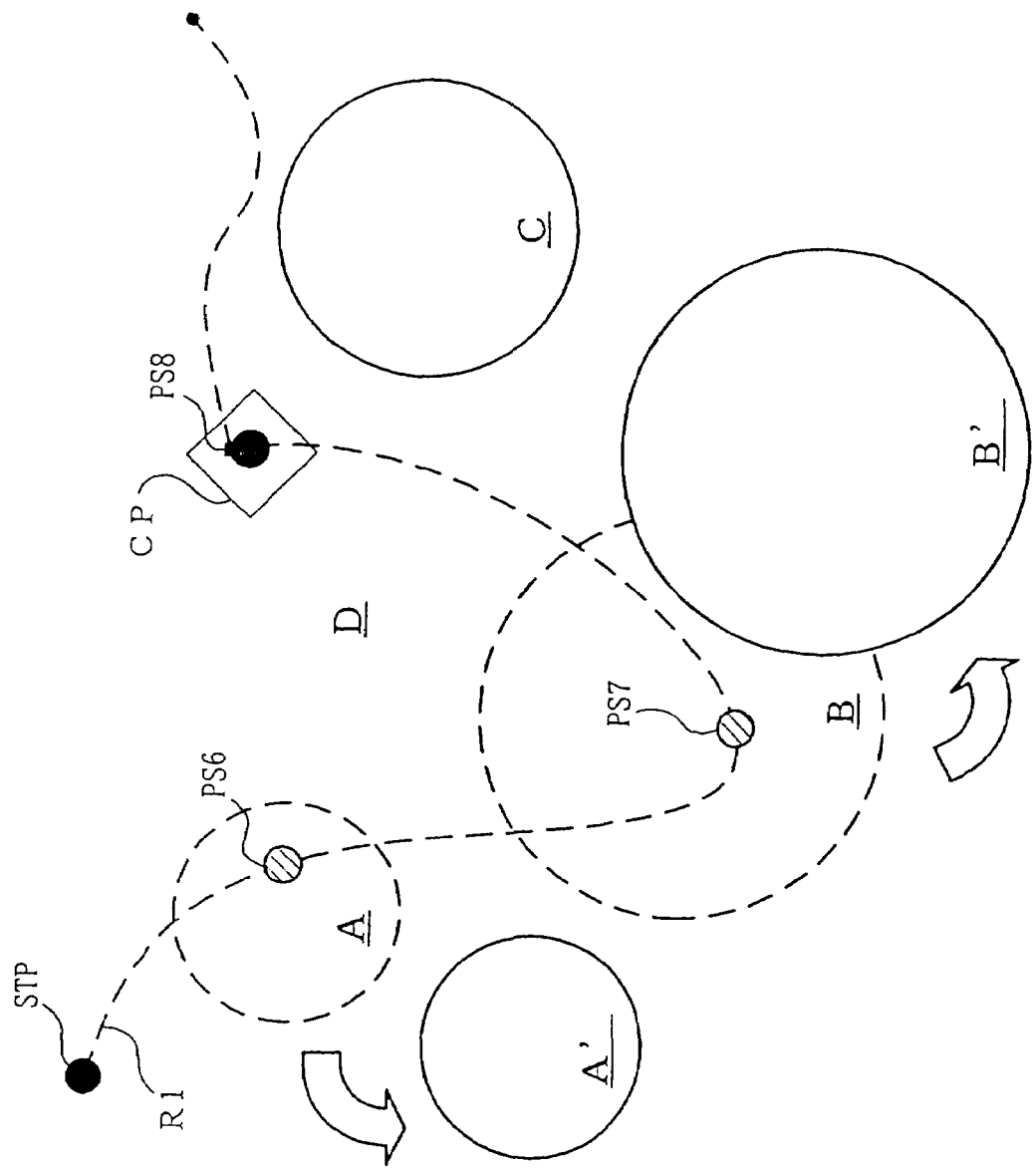
FIG. 46 is an image diagram showing a area in which a charge is applied that can be altered and moved.

Moreover, the above description was for a fixed area in which a charge is applied, however, the present invention is not limited to this, and the area in which a charge is applied may set so as to be movable. For example, as is shown in FIG. 46, the present invention is also effective when the area in which a charge is applied A and B have been altered (including the size thereof being altered) by being moved to the area in which a charge is applied A' and B'. In this case, even if the car has previously traveled along the route R1 shown in FIG. 45, the route R1 is no longer included in the area in which a charge is applied after the area in which a charge is applied have moved to A' and B'. In this case, it is preferable if information is successively provided from the ground side to the in-vehicle device to the effect that the area in which a charge is applied has moved. Furthermore, there is no need for the areas to be circular in shape.

Note that, in the present embodiment, when a bank account or card with which charge processing can be performed automatically has been determined, it is also possible to give a notification before the payment is deducted from this card or bank account. In this case, it is possible for a use to easily determine whether or not the payment of a toll generated as the result of a charge is able to be paid from a card or bank account belonging to the user.

Moreover, in the above embodiment, a description was given of when a charge was processed on the ground side, however, the present invention is also applicable to the processing of a charge by deducting the toll from an IC card on which toll balance information is stored.

Seventh Embodiment

In the present embodiment, the present invention is applied to an automatic charge system for performing charge processing automatically for a vehicle that has entered (a vehicle that has driven into) a toll facility (i.e. a area in which a charge is applied). Note that the automatic charge system used in the present embodiment is a system in which the position of a vehicle is detected using the in-vehicle device, and the usage toll (driving toll) is settled on the basis of the result of the detection. Moreover, because the present embodiment is substantially the same as the above embodiments, the same portions are given the same descriptive symbols and a detailed description thereof is omitted.

The concept of the structure of the automatic charge system 10 of the present embodiment is the same as the structure shown in FIG. 1. Note that, in the automatic charge system 10 of the present embodiment, the in-vehicle device 30 is provided if necessary with a ground wave antenna (described in detail below) for ground wave communication.

The in-vehicle device 30 detects the position of its host vehicle 32 using GPS signals from GPS satellites 20, 22, and 24. The in-vehicle device 30 then performs charge processing (calculation) based on the information of the detected position and information relating to the area in which a charge is applied and, based on the result of that processing, performs the toll collection processing. At this time, it is also possible, if necessary, for information to be transferred and received with the general center 40 via ground wave communication.

Moreover, the general center 40 established on the ground side of the structure according to the present embodiment is the same as the general center 40 shown in FIG. 2 and, therefore, a description thereof is omitted. Note that, in the present embodiment, a wireless communication device is employed as the ground wave communication device 122 that is intended to exchange information with or provide information to the in-vehicle device 30 of a vehicle in which a communication device is mounted.

Next, the in-vehicle device of the present embodiment will be described. Because the in-vehicle device has substantially the same structure as the in-vehicle device 30 shown in FIG. 3, the same portions are given the same descriptive symbols and a detailed description thereof is omitted.

Figure 47:
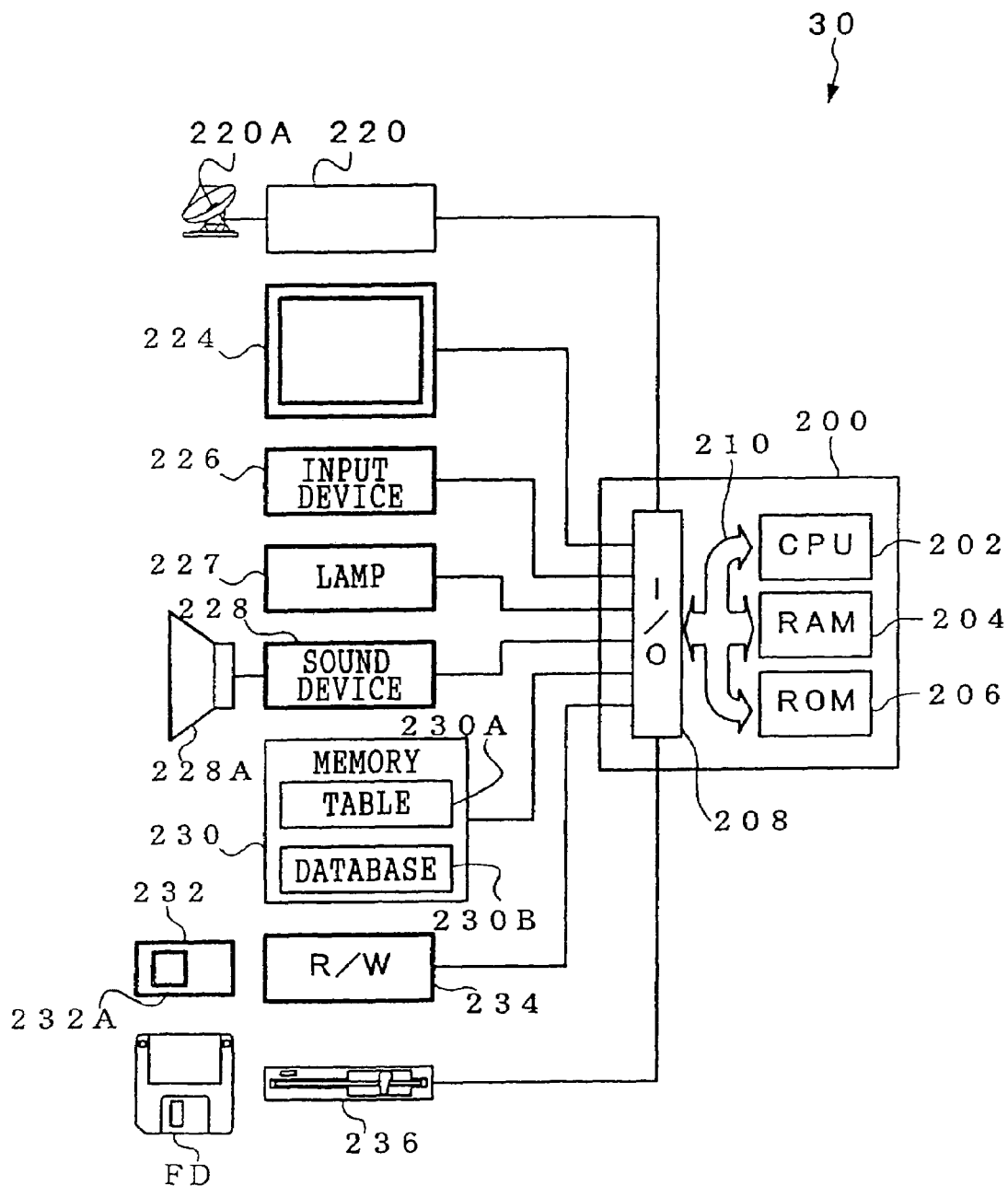
FIG. 47 is a block diagram showing the schematic structure of an in-vehicle device in an automatic charge system according to the seventh embodiment of the present invention.

As is shown in FIG. 47, an in-vehicle GPS device 220 having a GPS antenna 220A mounted on the vehicle is connected to the input/output port 208 of the in-vehicle device 30 of the present embodiment. The in-vehicle GPS device 220 is intended to detect the position of its host vehicle 32 using GPS signals from GPS satellites 20, 22, and 24.

Memory 230 is also connected to the input/output port 208. This memory 230 includes a rewritable toll data table 230A for storing toll information indicating the tolls in area in which a charge is applied, and a map database 230B in which is stored map information for providing visual route assistance information to a driver.

In addition, a display unit 224 for providing visual route assistance information to a driver, a speaker unit comprising a sound device 228 provided with a speaker 228A for providing aural information to a driver, and an input device 226 such as a keyboard or a switch device are also connected to the input/output port 208. The display device 224 is capable of displaying map information. The sound device 228 is intended to convert either digital or analog sound signals output from the device body 12 into drive signals for the speaker 228A and output these.

Note that data and the like to be stored in the memory 230 may also be stored on a storage medium such as a hard disk or floppy disk using the FD device 236.

An IC card read/write device 234 which is capable of receiving and ejecting an IC card, on which is stored toll balance information and the like, is also provided for the input/output port 208. A storage area 232A for storing area information relating to a area in which a charge is applied (described below) is set in advance on the IC card 232. Balance information and GPS correction information can also be stored on the IC card 232.

In the in-vehicle device 30, fixed data such as the model of the vehicle and an ID code comprising the vehicle number and the like is stored in advance in the RAM 204 and the ROM 206. The in-vehicle device 30 refers to the area in which a charge is applied and the toll balance information on the loaded IC card 232 via the IC card read/write device 234 and writes toll balance information to the IC card 232. Note that the IC card may includes a prepaid card or a credit card. Also, at the input/output port 208, an observation lamp 227 is connected. This observation lamp 227 is for notification the charge processing state to the outside of the vehicle.

Figure 48A:
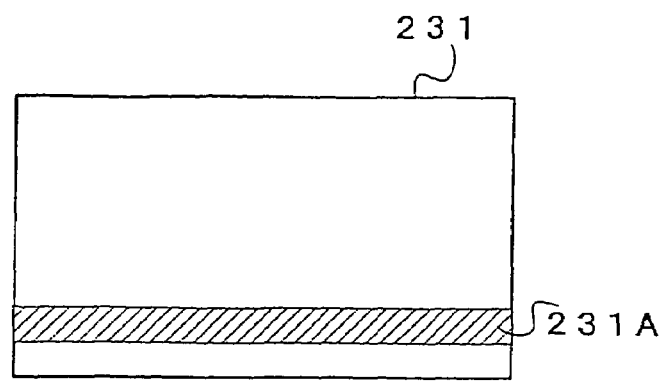
FIGS. 48A and 48B show examples of an IC card.
Figure 48B:
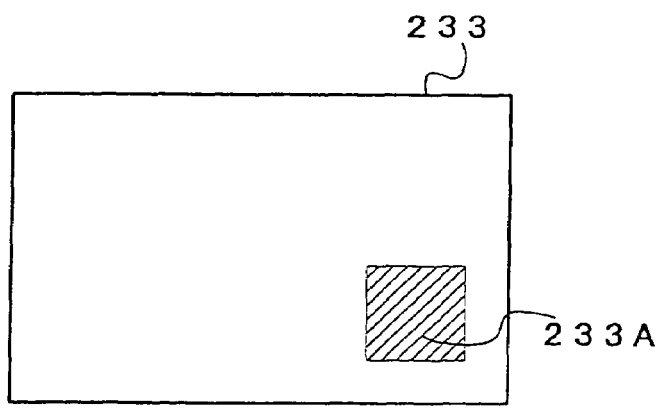

As an example of the above IC card 232, as is shown in FIG. 48A, a magnetic storage type card 231 having a bar-shaped magnetic storage area 231A for storing information corresponding to the storage area 232A, and, as is shown in FIG. 48B, an IC storage type card 233 having an IC storage section 233A for storing information corresponding to the storage area 232A may be used.

Note that, although not provided in the embodiment shown in FIG. 47, other types of in-vehicle device include an in-vehicle device provided with a wireless communication device to which ground wave communication device having a ground wave antenna is connected, and which exchanges information with the ground or provides information to the ground by communication. An example of this wireless communication device is an FM broadcast or an FM character broadcast, a known wave communication, and telephone circuit communication such as in a moving body communication device. Accordingly, a communication device for a moving body such as a portable telephone or a car phone or the like may be used as the ground wave communication device, so that wireless communication (conversation via a telephone circuit) can be made possible via the in-vehicle device 30 between the vehicle and a telephone device outside the vehicle.

Figure 49A:
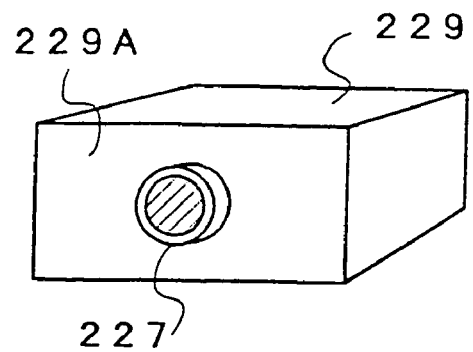
FIGS. 49A, 49B, and 49C are perspective views showing an example of the installation housing of an observation lamp.

As is shown in FIG. 49A, an observation lamp 227 is provided in the front surface portion 229A of a box housing 229. The box housing 229 can be installed on a vehicle dashboard such that light from the observation lamp 227 is emitted to the outside of the vehicle. This enables easy confirmation from outside the vehicle that the observation lamp 227 is flashing.

Figure 49B:
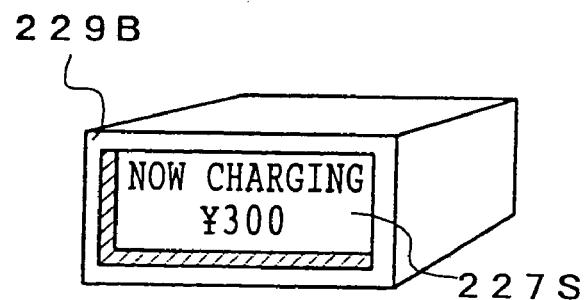
Figure 49C:
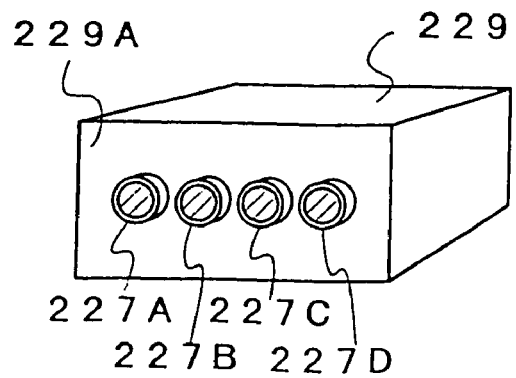

Note that, by providing a display lamp that flashes in synchronization with the observation lamp 227 at a different position to the observation lamp 227, for example, at a position opposing the observation lamp 227 (i.e. at the rear surface portion 229B of the housing 229), it is possible for the driver inside the vehicle to confirm the flashing of the observation lamp 227 by the flashing of the display lamp. For example, as is shown in FIG. 49B, it is possible to install a display panel 227S in the rear surface portion 229B of the housing 229 thus providing a structure in which it is an easy matter for the driver of the vehicle to confirm the current state of the charge processing. In this case, it is possible to display the following on the display panel 227S as the current state, namely, that the vehicle is approaching a area in which a charge is applied, a standard charge amount for the area in which a charge is applied, the current amount of the charge processing, that charge processing has begun, that charge processing has ended, that charge processing has not been performed (i.e. that a violation has been committed), and the like. Moreover, as is shown in FIG. 49C, an observation lamp 227 can be formed from a plurality of observation lamps 227A, 227B, 227C, and 227D. In this case, it is possible to use observation lamps as vehicle type determining lamps indicating the type of the vehicle in which the observation lamps are installed such as heavy, medium, light, and two-wheeled vehicles.

Note that the mounting position (attachment position) of the in-vehicle device 30 is not limited to being on the vehicle instrument panel as described above, and it is sufficient if it is in a position where it is able to exchange signals with the ground using the antenna. For example, it may be mounted inside the vehicle at the rear seat or the like. Moreover, the in-vehicle device 30 may be formed with separate structures comprising an in-vehicle device main body and an antenna. If the in-vehicle device is structured in this way with a separate in-vehicle device main body and antenna, it is possible to install the antenna only on the instrument panel or at a position towards the rear seat or the like, as described above, and the mounting position information is taken as information recording the position where the antenna has been mounted.

Moreover, when the ignition is on, power is supplied at all times from the vehicle battery to the in-vehicle device. It is also possible to enable the in-vehicle device to acquire date and time information such as the year, month, date, as well as the current time from an unillustrated clock built into the vehicle 32.

Next, the operation of the present embodiment will be described.

Firstly, the operation of the ground device (in this case, the general center 40) will be described in detail. In the present embodiment, the general center 40 performs the same processing as the processing in FIG. 4; namely, it transmits information for charge processing to an in-vehicle device 30 mounted in the vehicle 32. Note that the processing of the general center 40 is not directly related to the in-vehicle device 30 of the present embodiment, however, this processing is useful for an in-vehicle device provided with a communication device.

The general center 40 receives GPS signals from GPS satellites 20, 22, and 24 (step 300 of FIG. 4). The general center 40 then determines its own reference position, namely the reference position of the general center 40 (a reference latitude and longitude Po), and generates GPS correction information (step 302). Note that, in the present embodiment, this GPS correction information is stored on the IC card 232. Next, predetermined area in which a charge is applied information is read (step 304), and GPS correction information is transmitted together with area in which a charge is applied information is transmitted by FM broadcast or telephone circuit or the like (step 306).

The area information is set in a area in which a charge is applied formed from a predetermined plurality of areas. An example is a structure in which, between the city center and the suburbs, the areas become smaller the closer to the city center.

Figure 50:
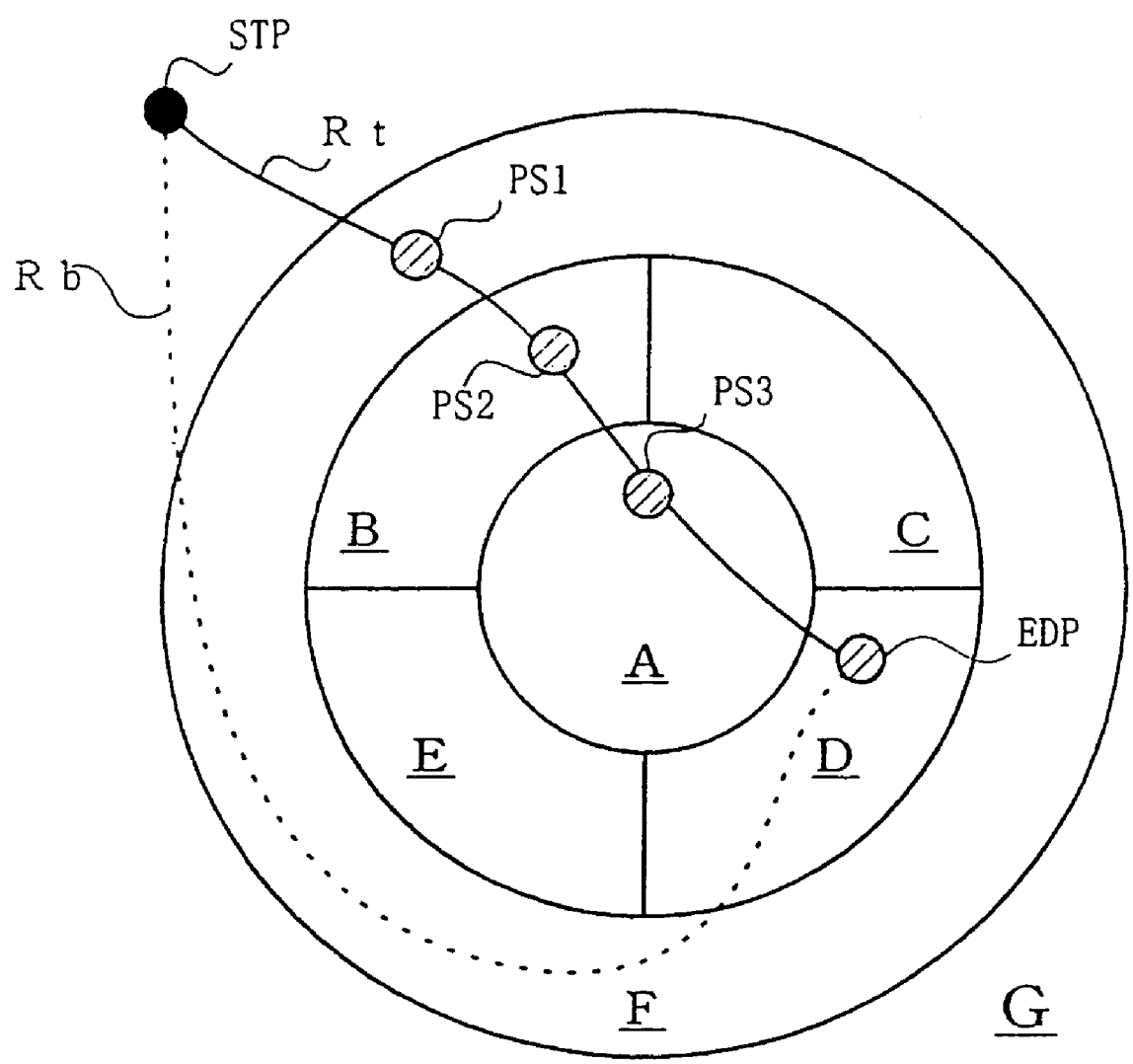
FIG. 50 is an image diagram showing a area in which a charge is applied.

An example of area in which a charge is applied (Area) of the present embodiment is shown in FIG. 50. The ground is divided into 7 areas. In the center portion is a circular area A. Next is a substantially donut shaped circle concentric around and adjacent to the outer periphery of the area A, and divided into 4 areas B, C, D, and E. Next is a substantially donut shaped circle area F concentric around and adjacent to the outer periphery of the areas B, C, D, and E. Last is the area G which is other than the above areas A, B, C, D, E, and F. These areas can be specified by their latitude and longitude as well as by their shape.

Moreover, although the area information is set in a area in which a charge is applied formed from a predetermined plurality of areas, it is possible to set a different charge amount for each area. For example, the charge amount may be increased the closer to the city center, the charge amount may be altered in accordance with the number of usages, the charge amount may be altered in accordance with the level of congestion, and the charge amount may be altered in accordance with the length of time of the use. In the above example (FIG. 50), in the present embodiment, the areas A, B, C, D, E, and F are set as area in which a charge is applied while the area G is set outside the area in which a charge is applied. As was described above, the first charge condition of the charge calculation conditions for determining these charge amounts is the number of entries into an area shown in a table indicating the charges for each area. With this type of setting, the charge amount increases as the number of entries into the central portion of the area in which a charge is applied increases. For example, an example of the first charge calculation condition (number of times an area is entered) is shown in the table indicating the tolls for each area in Table 7. This table may also be stored as area information in the IC card 232.

TABLE 7

| Area | Charge Amount |
| --- | --- |
| A | ¥300/entry |
| B | ¥100/entry |
| C | ¥100/entry |
| D | ¥100/entry |
| E | ¥100/entry |
| F | ¥10/entry |
| G | ¥0/entry |

The second charge calculation condition is the length of time in an area shown in the table indicating the tolls for each area. With this type of setting, the charge amount increases as the length of time of the stay in the central portion of the area in which a charge is applied increases. For example, an example of the second charge calculation condition (length of stay in an area) is shown in the table indicating the tolls for each area in Table 8. This table may also be stored as area information in the IC card 232.

TABLE 8

| Area | Charge Amount |
| --- | --- |
| A | ¥150/minute |
| B | ¥90/minute |

TABLE 8-continued

| Area | Charge Amount |
|---|---|
| C | ¥90/minute |
| D | ¥90/minute |
| E | ¥90/minute |
| F | ¥10/minute |
| G | ¥0/minute |

The third charge calculation condition is the level of congestion in an area shown in a table indicating the tolls for each area. The fourth charge calculation condition is the speed at which a vehicle traveled inside an area (or alternatively, average speed) shown in a table indicating the tolls for each area, and the fifth charge calculation condition is the total distance traveled inside an area when traveling inside an area shown in a table indicating the tolls for each area.

By including the tables based on the above charge calculation conditions in the area information, it is possible to specify, with respect to a area in which a charge is applied, the area and the tolls therefor.

Next, the operation of the in-vehicle device will be described.

Figure 51:
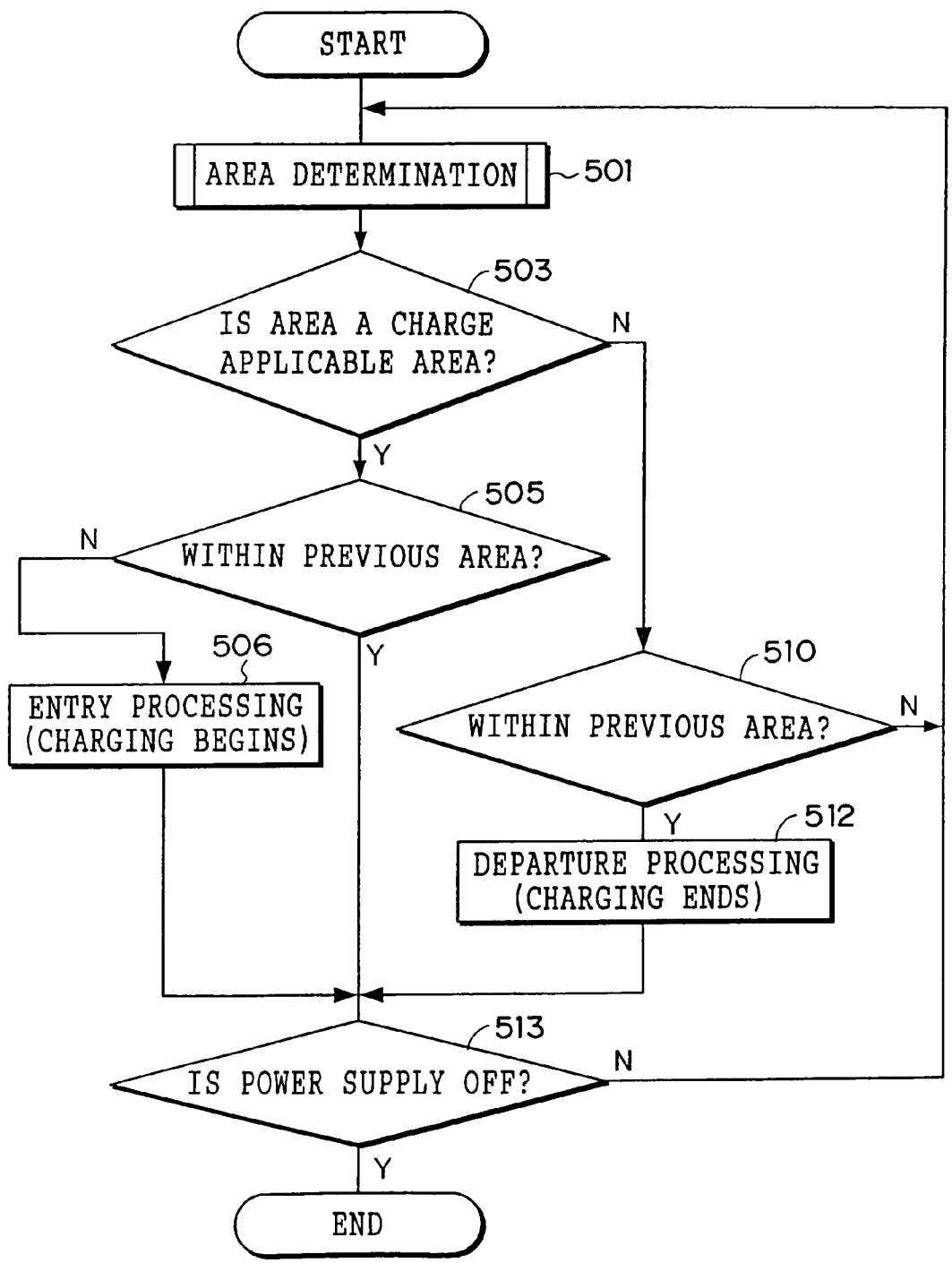
FIG. 51 is a flow chart showing the flow of processing to operate the in-vehicle device.

As is shown in FIG. 51, in step 501, an area determination is made in the in-vehicle device as to the position where the host vehicle is located. (Refer to FIG. 5) In the next step 503, a determination is made as to whether or not the area determined in step 501 is a area in which a charge is applied. If the determination is negative, the routine proceeds to step 510, if the determination is affirmative, the routine proceeds to step 505. In the next step 505, a determination is made as to whether or not the determined area is the same as the previous area (i.e. the same area as the last time the present routine was performed). If the previous area was not a area in which a charge is applied, then the vehicle has entered a area in which a charge is applied for the first time. Consequently, the determination in step 505 is negative and, in the next step 506, area entry processing is executed and the routine advances to step 513. This area entry processing is processing performed when a vehicle has entered a area in which a charge is applied such as by turning on or flashing the observation lamp 227. Note that, in this step 506, conditions are set for starting the charge processing in the in-vehicle device. On the other hand, if the previous area was a area in which a charge is applied, the determination instep 505 is affirmative and the routine advances to step 513 without further processing.

Note that, in the present embodiment, it is possible to notify the outside of the vehicle that charge processing is currently being performed by turning on or flashing on and off the observation lamp 227 when a vehicle has entered the area or when the charge processing described below has started. It is also possible to notify the outside of the vehicle that charge processing has been completed by flashing the observation lamp 227 when the charge processing is completed. Note that, when the observation lamp 227 is flashed on and off, it is preferable that a pattern for flashing the observation lamp 227 on and off in a predetermined timing (for example, a timing indicated by turning the lamp on and off repeatedly for fixed lengths of time) is determined in advance in order to enable confirmation from outside the vehicle. If this pattern is used, confirmation of cyclic flashing is possible from outside the vehicle, and it can be confirmed that the vehicle is normal. On the other hand, when it is not possible to accomplish the charge processing, a violation pattern is stored and processing may be performed to enable confirmation from outside the vehicle that the vehicle is in violation by flashing the observation lamp 227 on and off in a violation pattern that is different to the normal pattern (for example, by repeatedly turning the lamp on and off for times t, or by flashing the light continuously).

If the determination in step 503 is negative, the routine proceeds to step 510 where a determination is made as to whether or not the previous area was a area in which a charge is applied and, if the determination is negative, the routine returns to step 501. If, on the other hand, the determination in step 510 is affirmative, the vehicle has left the area in which a charge is applied and, therefore, due to the affirmative determination in step 510, the routine proceeds to step 512, where area departure processing is performed and the routine advances to step 513. This area departure processing is processing performed when a vehicle has departed from a area in which a charge is applied such as by turning off or flashing the observation lamp 227 in a violation pattern. Note that, in the same way as described above, it is also possible to cause the observation lamp 227 to flash on and off or to be extinguished based on a result of an authorization that the vehicle has departed. For example, when the charge processing is performed normally, the lamp is turned off or is caused to flash on and off in a normal pattern, and when there is a violation such as when the balance is insufficient or if there is no IC card loaded, the lamp is left on or is caused to flash in a violation pattern. This enables easy confirmation of the charge state of a vehicle from outside the vehicle.

In the next step 513, a determination is made as to whether or not the power supply has been turned off. If power is still being supplied, the determination is negative and the routine returns to step 501. If the power has been turned off, the determination is affirmative and the current routine is ended.

For example, if a vehicle has entered the area F at the point PS1 partway along the route Rt shown in FIG. 50, because the vehicle has entered the area for the first time, area entry processing is performed. Next, at the partway point PS2, the vehicle has departed from the area F and has entered the area B. Therefore, area departure processing and area entry processing are performed. In the same way, at the partway point PS3, the vehicle has departed from the area B and has entered the area A. Therefore, area departure processing and area entry processing are performed.

Next, the processing in the in-vehicle device of the present embodiment will be described. In the in-vehicle device 30 mounted on a vehicle (the processing of step 501 in FIG. 51), when area determination processing is performed, information, namely area information (tables), stored in the storage area 232A of the IC card 232 is read (this corresponds to step 400 of FIG. 5), and a determination is made as to whether or not the read area information is the latest information (step 402). When the area information is the latest information, area information (tables) including the area in which a charge is applied is stored in memory, and GPS correction information is stored (this corresponds to step 404). Note that, the GPS correction information and the balance information can also be read from the IC card 232.

If, however, the read area information is not the latest information (if the determination in step 402 is negative), because the area information (tables) already stored in the memory can be used, GPS signals are received from the GPS satellites 20, 22, and 24 (step 406), the current date and time (year, month, date, and time) are read (step 408), and the position thereof, namely, the position of the vehicle 32 (latitude and longitude P (t)) is determined (step 410). Note that, when the latitude and longitude P (t) are determined it is possible to use the stored GPS correction information.

Next, the determined latitude and longitude P (t) are matched with the map database stored in advance (step 412), and the area to which the latitude and longitude P (t) belong is decided (step 414). In the present embodiment, the latest area information read from the above IC card is used in step 414. Next, the latitude and longitude P (t), the date and time t, and the area are stored as vehicle location history (step 416). As a result, the areas in which the vehicle 32 is located with dates and times, at predetermined times, are stored as history. Table 9, shown in FIG. 73, shows an example of a list of vehicle location information.

As seen above, the areas in which the vehicle 32 is located at predetermined times are stored with dates and times, as history.

Next, the charge processing in the in-vehicle device 30 will be described. The charge processing in the present embodiment performs the same processing as the processing shown in FIG. 6. Note that, in the present embodiment, the execution of this charge processing is in a starting state together with the execution of the area entry processing.

A determination is made as to whether or not conditions match (step 420 of FIG. 6) by making a determination in the in-vehicle device, as to whether or not it is the above predetermined data and time or as to whether or not an instruction has been given (in the present embodiment, whether or not the area entry processing has been performed) by the general center 40 in the case of the device mounted in a vehicle provided with a communication device. If the conditions do not match (if the determination in step 420 is negative), the current routine is ended.

If, however, the conditions do match (if the determination in step 420 is affirmative), the history information is obtained (step 422). This history information is a list of the vehicle location history that corresponds to the stored (processed in step 416 of FIG. 5) Table 3. Next, the calculation formula (charge calculation formula) is set (step 424). The calculation formula is determined by the above calculation conditions, and the charge calculation formula (2) shown as a general formula considering the area is set.

Next, the toll is calculated (step 426) using the calculation formula set above and the history information. For example, when using the first charge calculation condition in which the charge amount of the toll is determined by the number of entries into an area, because the unit price for each area is set by the table read from the IC card, it is possible to calculate the charge amount of the toll by multiplication the number of entries to the unit price of the table read from the IC card. When the toll calculation has ended, the charge processing is executed (step 428). This charge processing is processing to deduct the charge amount determined above from the balance of the IC card 232.

For example, when the calculation condition is solely the number of entries into an area and the history information is from the start point STP to the end point EDP, as is shown in FIG. 50, the charge amounts are as shown below for the route Rt and the route Rb.

Rt charge amount=300×1+100×1+100×0+100×1+100×0+10×1+0×1=¥510

Rbt charge amount=300×0+100×0+100×0+100×1+100×0+10×1+0×1=¥250

Thus choosing a route that avoids the central portion means the charge amount is less.

If the calculation condition is solely the length of time spent an area and the history information is from the start point STP to the end point EDP, as is shown in FIG. 50, the charge amounts are as shown below for the route Rt and the route Rb.

Rt charge amount 150×2+90×4+90×0+90×2+90×0+10×2+0×2=¥860

Rb charge amount=150×0+90×0+90×0+90×2+90×0+10×7+0×2=¥250

Thus choosing a route that avoids the central portion means the charge amount is less.

In this way, in the present embodiment, because area information relating to a area in which a charge is applied can be stored in an IC card capable of being loaded in an in-vehicle device, and the area in which a charge is applied is determined using that area information so that a charge amount can be obtained, even when a communication device is not incorporated in the in-vehicle device, it is still possible to specify the area in which a charge is applied with ease and perform the correct charge processing. Moreover, even if the area in which a charge is applied varies, this can be dealt with simply by updating the area information stored in the IC card.

Note that, in the above embodiment, a description was given for when the present invention was applied to a case in which no communication device was incorporated in the in-vehicle device, however, the present invention is not limited by whether a communication device is incorporated or not incorporated and can be applied to a case in which an in-vehicle device incorporating a communication device is provided. In particular, in an in-vehicle device incorporating a communication device, when the vehicle is located in an area where communication is obstructed or is outside the communication area, it is possible to perform the correct charge processing by implementing the above processing.

Furthermore, in the above description, the area in which a charge is applied was set as a fixed area, however, the present invention is not limited to this, and the area in which a charge is applied may be able to be movably set. In this case, the term of validity of the area in which a charge is applied can be set, and the table only referred to during this term of validity.

Eighth Embodiment

Figure 52:
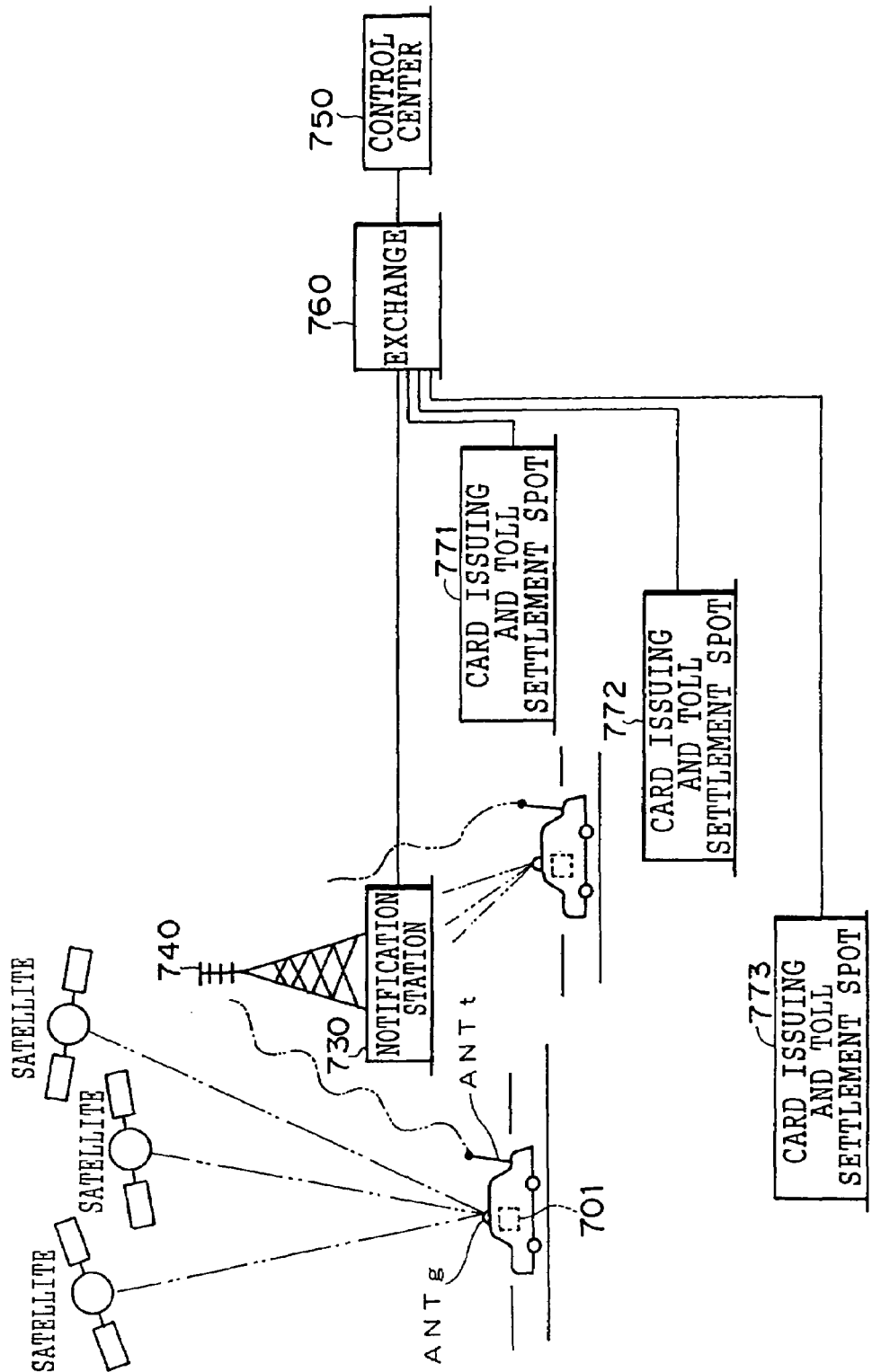
FIG. 52 is a is a block diagram showing an outline of the system structure according to the eighth embodiment of the present invention.

The system structure according to the eighth embodiment of the present invention is shown in FIG. 52. In the system of the present embodiment, there is provided a charge processing device 701. Note that, in the present embodiment, because the charge processing device 701 includes the functions of a notification device mounted in a vehicle, it is described as the 701 in the description below.

The in-vehicle notification device 701 serving as a charge processing device mounted in a vehicle communicates with a notification station 730 via an inbuilt telephone unit 708 (described below) and an antenna ANTt so that data is exchanged. Moreover, the in-vehicle notification device 701 receives radio waves from satellites via the GPS antenna ANTg, and recognizes the position and traveling direction of the vehicle using an inbuilt GPS position measuring device (720–726: described below) and displays this together with a map indicating the area through which the vehicle is traveling. When there are insufficient number of satellites whose waves are receivable or when receiving waves from the satellites are impossible, the insufficient information is supplemented by vehicle position calculation by multiplication of the traveling speed and detection of the direction using a gyro. Alternatively, vehicle position recognition can be performed.

Figure 53:
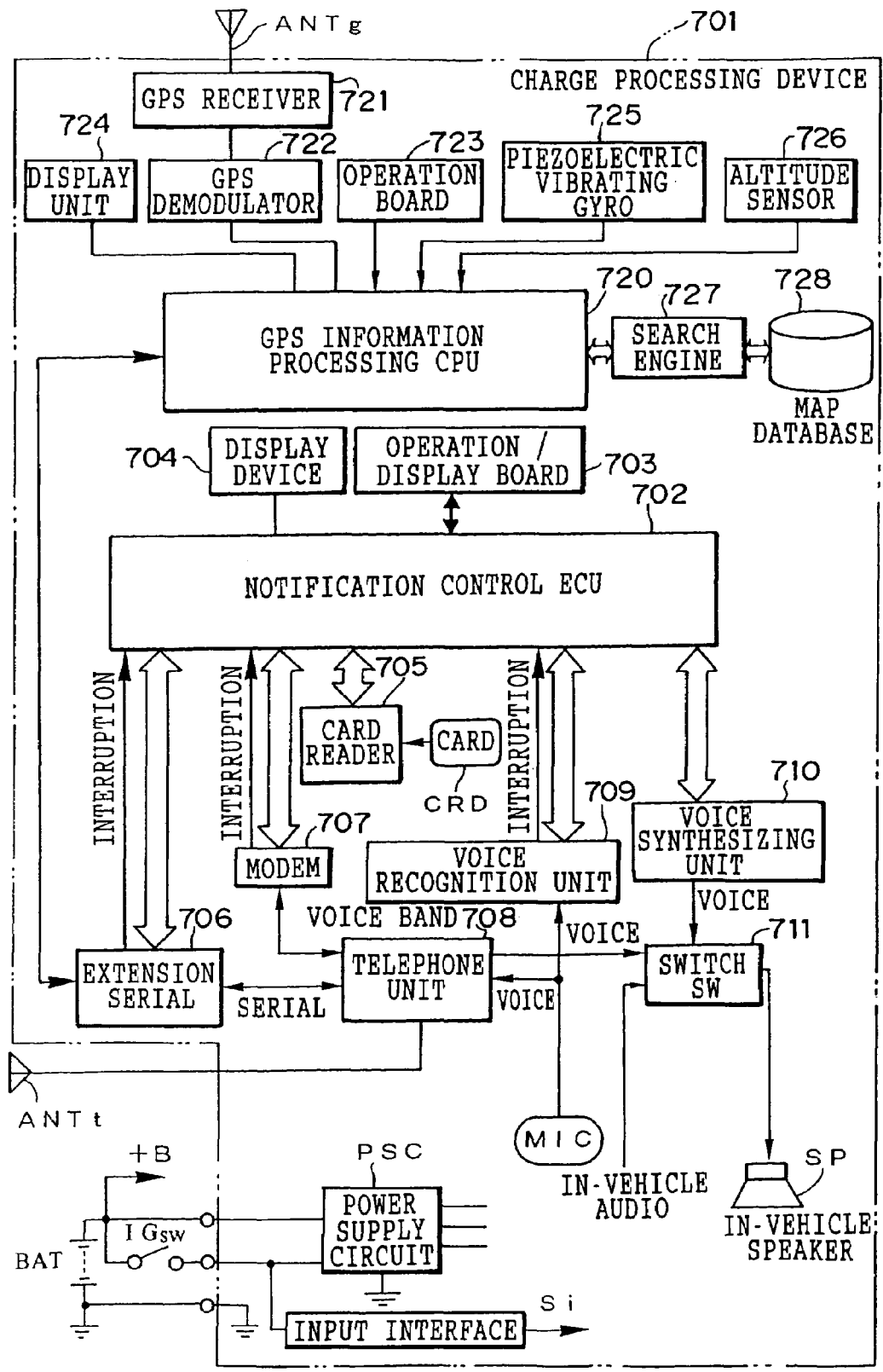
FIG. 53 is a block diagram showing the structure of the vehicle notification device shown in FIG. 52.

FIG. 53 shows the structure of the in-vehicle notification device 701. As is seen in FIG. 53, direct current voltage +B from the battery in the vehicle is constantly supplied to the in-vehicle notification device 701. A power supply circuit PSC supplies operating voltage to the CPUs of the GPS information processing RCU 720 and the notification control ECU 702. When the vehicle ignition switch IGsw is closed and the vehicle power supply is turned on, the power supply circuit PSC supplies operating voltage to all circuits of the in-vehicle notification device 701.

The GPS position measuring device (720–728) is provided with a receiving antenna ANTg, a GPS receiver 721, a GPS demodulator 722, a display device 724, a piezoelectric vibrating gyro 725, an altitude sensor 726, a GPS information processing ECU (Electronic Control Unit) 720, an operating board 723, a map search engine 727, and a map database 728. The 1.57542 GHz radio waves transmitted from each of the GPS satellites are received by the GPS receiver 721 via the receiving antenna ANTg, and the information contained in the radio waves, namely, information such as a function indicating the orbit of the satellites and the time and the like is demodulated by the GPS demodulator 722, and input into the GPS information processing ECU 720.

The GPS information processing ECU 720 is a computer system based on mainly a microprocessor (CPU) and provided with almanac data memory and memory for a data buffer as well as an input/output interface (an electric or electronic circuit). The CPU generates information indicating the position of its host vehicle (latitude, longitude, altitude) based on the information transmitted from the GPS satellites, and the search engine 727 reads map data of a page (screen) that includes the position from the map database 728 and displays this on the display device 724. The current position index that also shows the direction of travel is also displayed as well as the current position on the display device. The basic structures of the reception antenna ANTg, the GPS receiver 721, the GPS demodulator 722, and the display device 724, as well as the basic operation of the GPS information processing ECU 720 are the same as the structural elements of known devices already available on the market.

However, in order to implement the present invention, a program is added to the operating program of the GPS information processing ECU 720 that performs the following. Namely, the current position (ground position) of a vehicle (i.e. the in-vehicle notification device 701), the direction of travel, and the current time are transmitted to the notification control ECU 702 in response to a data transmission request from the notification control ECU 702. The notification control ECU 702 reads the transmitted charge area information and stores it in memory. The charge area is then displayed in superposition (as a half-tone dot meshing) in the area defined by the charge area information, namely, the charge area on the map displayed on the display device 724.

Analog signals output by the piezoelectric vibrating gyro 725 and the altitude sensor 726 are each input into the GPS information processing ECU 720, and the CPU of the ECU 720 reads the signals after converting them into digital data via an A/D converter. Information output from the GPS demodulator 722 and information for controlling the GPS demodulator 722 is input into or output from the CPU via the I/O port of the GPS information processing ECU 720. The GPS information processing ECU 720 calculates three-dimensional coordinates Ux, Uy, Uz of the position of its host vehicle with a "3 satellite position measuring calculation" or a "4 satellite position measuring calculation".

In the "3 satellite position measuring calculation", in a predetermined three dimension simultaneous equation three sets of data received from three satellites are each substituted as parameters, and by solving this simultaneous equation, any error in the clock on the receiving side, latitude and longitude of the reception point, which are unknown numbers, are determined. The altitude of the reception point is determined, in this example, by calculation from the signal output from the altitude sensor 726, and is substituted into the simultaneous equation as known data. In the "4 satellite position measuring calculation", in a predetermined four dimension simultaneous equation four sets of data received from four satellites are each substituted as parameters, and by solving this simultaneous equation, any error in the clock on the receiving side, latitude, longitude, and altitude of the reception point, which are unknown numbers, are determined. In addition, because any error in the clock on the receiving side can be determined by performing the position measuring calculation of any of these, the time of the internal clock can be corrected based on this error information.

When the ground position information is calculated by GPS position measurement, the GPS information processing ECU 720 calculates the direction in which the vehicle is traveling by a comparison with the previously calculated ground position. On the basis of this time calculated ground position, map data of the one page (one screen) that includes the current position is read from the map data memory 728 and is displayed on the display device 724. A current position index that also shows direction of travel is displayed at the current position on the display. In addition, when at least a portion of the area defined by the charge area information, namely the charge area, received from the notification control ECU 702 and saved in the internal memory, is included in the area displayed on the display device 724, the charge area is displayed in superposition (in half-tone dot meshing) over the area on the display screen. This additional display allows the driver to recognize area in which a charge is applied on the display screen of the display device 724. The notification control unit 702 is also a computer system centered around a microprocessor (CPU) and provided with an input/output interface (an electric or electronic circuit). The CPU is able to exchange transmissions of various types of information with the notification station 730 via the antenna ANTt, the telephone unit 708, and the modem 707. The extension serial input/output board 706 performs the serial input and output of data, as well as serial/parallel conversion input and output.

The voice of the driver that is input using the microphone MIC is converted into digital data indicating letters of words via a voice recognition unit 709, and is input into the CPU of the notification control ECU 702. Furthermore, the CPU notifies (aurally informs) the driver when necessary of messages (output information) using the in-vehicle speaker SP via the voice synthesizing unit 710 and the switching switch SW711. When voice data is output from the CPU, the switching switch SW711 switches the between the in-vehicle audio and the speakers SP to a connection between the voice synthesizing unit 710 and the speakers SP. At this time, the CPU simultaneously displays the message conveyed to the driver by voice via the vehicle speaker SP alphabetically on the display unit 704. As a result, the driver is able to confirm a message from the CPU both aurally and visually.

A card reader 705 for reading and writing data on an IC card CRD is connected to the notification control ECU 702. When an IC card CRD is inserted into a card insertion slot, the card reader 705 reads the data stored on the card CRD and transmits it to the notification control ECU 702. When the card reader 705 receives writing data from the notification control ECU 702, it overwrites (i.e. replaces previous data with this new writing data) this data in the IC card CRD. The information stored on the IC card is shown in Table 10. In the example shown in Table 10, the amount for a single issue of a card is ¥10,000. The balance of the card is ¥10,000 (i.e. the card is unused) and the card ID allocated by the issuer of the card is MYCAR003. The classification of the vehicle for which the card is applied for is a light vehicle and the vehicle ID (in this example, the number displayed on the vehicle number plate) is A123B568. The data in the charge table is for the charge area which the driver requests (applies for) directly after the issue of the card, and this data is written on the card by the issuer in accordance with the driver's application. If there is no such application (i.e. writing request), then there is no such writing.

TABLE 10

Data stored on card

| Item of information | Content of information |
| --- | --- |
| Card ID | MYCAR003 |
| Card balance | ¥10000 |
| Vehicle classification | Light vehicle |
| Vehicle ID | A123B568 |
| Charge table | ***(Table 11) |

Figure 58:
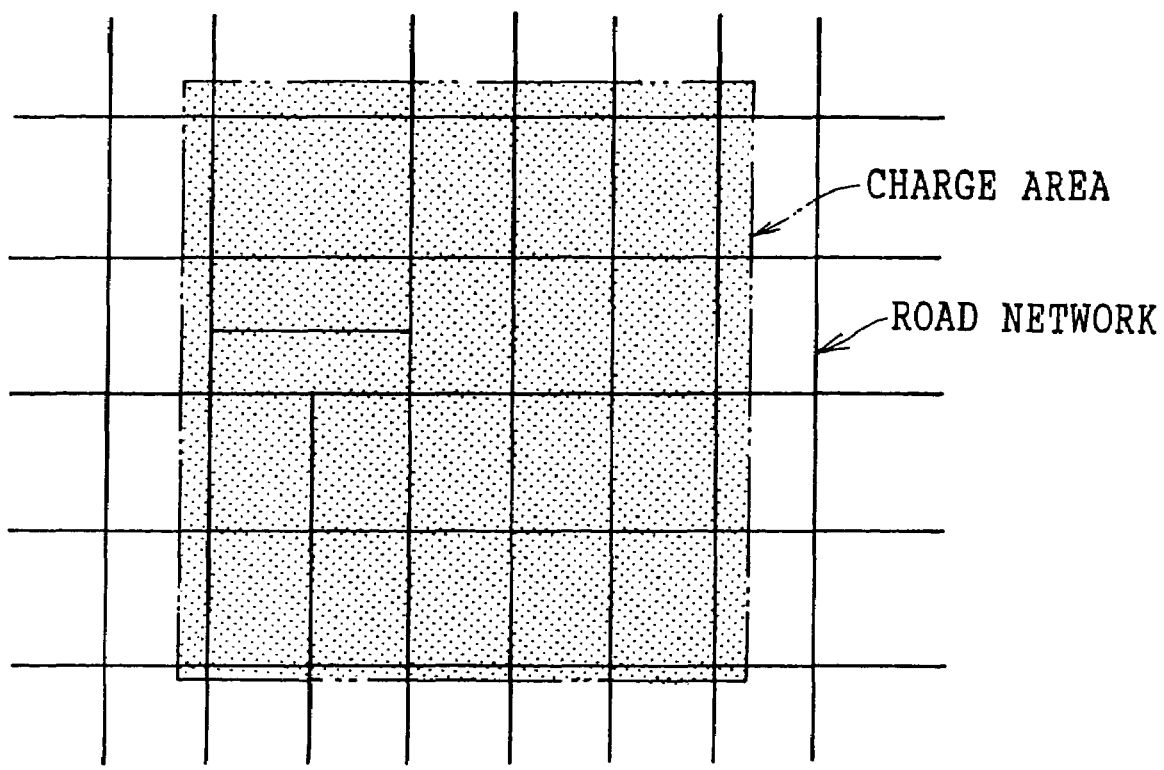
FIG. 58 is a plan view showing a charge area set in a road network.

An example of the data in a charge table is shown in Table 11, shown in FIG. 74. The data of one set (one point) of the charge area information in Table 11 is positional information indicating one point on an outline of the charge area. When there are only date of two sets (data of two points), date of each set means the positions of opposite corners in a rectangle (square), and the charge area is rectangular. An example thereof is shown in FIG. 58.

When there are date of more than or equal to three sets, the positions (point) indicated by date of each set are joined in order of the writing of the data sets, and the polygonal area that emerges when the last point is joined with the first point indicates the charge area. Because there are two sets of position (point) data in the example shown in Table 11, the charge area is quadrangular (square). The toll information is differentiated by time slot and by type of vehicle. The term of validity of the table indicates the term of validity of the data. The table valid area information shows an outline that is shaped substantially the same as the charge area extended by approximately 600 meters outside the outline of a charge area prescribed in the charge area information. When a plurality of charge areas are set, this table valid area information is for allowing a charge table of a charge area that is near to it to be selected in the vehicle.

The card issuing and toll settlement spots (card issuing and toll settlement booths) 771–773 issue IC cards CRD. These spots (service centers) are provided in locations that provide easy access for a driver and that are as close as possible to areas where the charge areas are set, such as in the vicinity of the notification station 730, in the catchment area of the notification station 730, outside the catchment area of the notification station 730, or the like. For example, they may be provided in local government buildings or branches thereof in the area in which the charge area is set.

In these spots, new IC cards can be issued, lost or damaged cards can be reissued, unpaid tolls (card balances in arrears) can be settled, and prepaid deposits can be increased (i.e. card balances increased) in accordance with the wishes of a driver by a service operator or by an automatic machine. When these processings are performed, the processing data is transmitted to the notification station 730 via a public phone network and an exchange 760. In accordance with the received processing data, the notification station 730 updates the data in the observation database WDB when a new card is issued, a lost or damaged card is reissued, or a prepaid deposit is increased, and updates the data in the arrears database CDB when an unpaid toll is settled.

Figure 54:
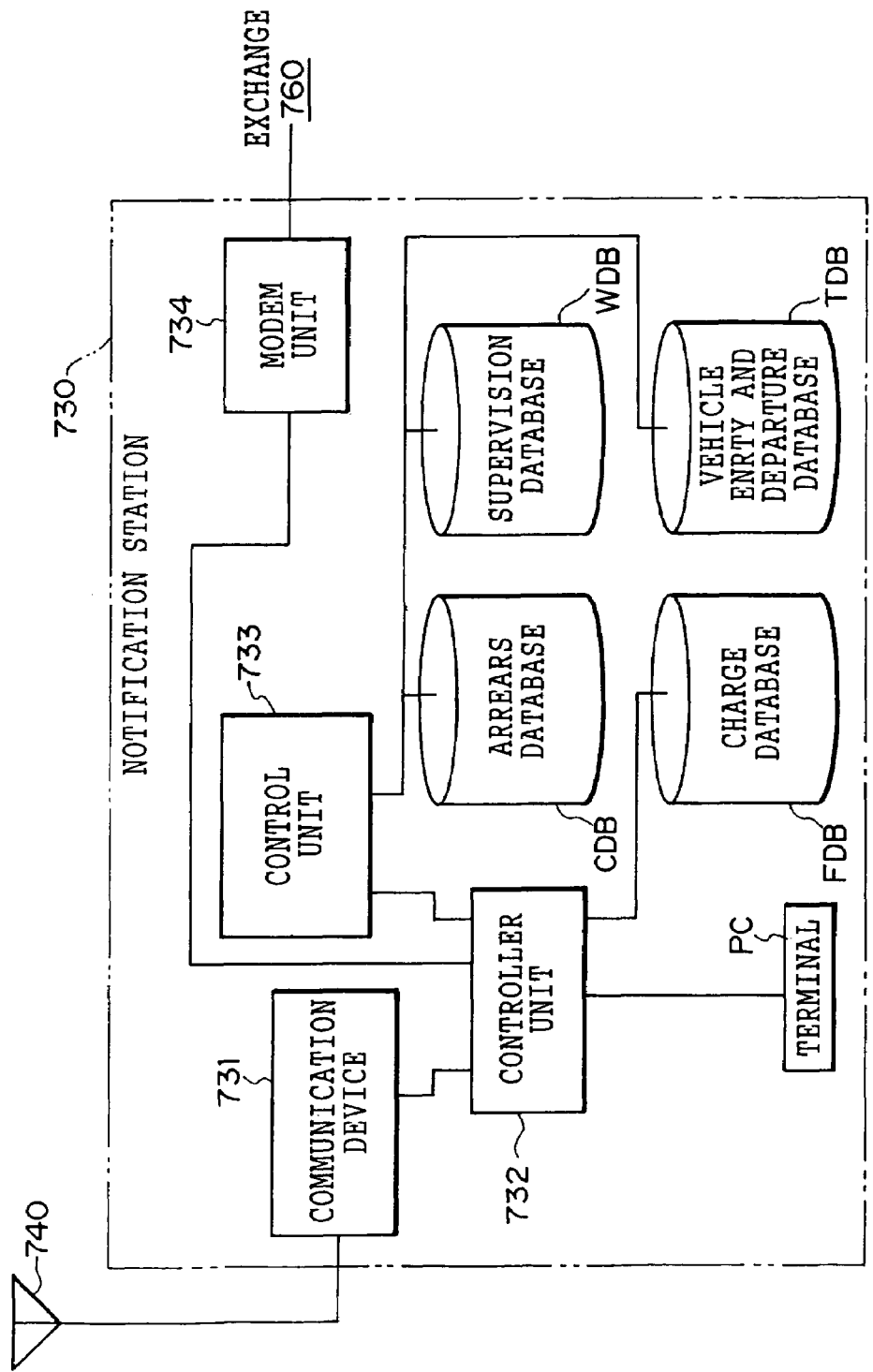
FIG. 54 is a block diagram showing the structure of the notification station shown in FIG. 52.

The structure of the notification station 730 is shown in FIG. 54. In the notification station 730 there is a wireless communication device 731 that modulates transmission data from a controller 732 into radio wave signals and sends it to an antenna 740, and also receives radio waves via the antenna 740, demodulates the received data and feeds it to the controller 732. The controller 732 is a computer system that is centered around a microprocessor (MPU) and is provided with an input/output interface. A terminal PC (a complete set comprising a personal computer, display unit, keyboard, mouse, printer), a charge database (memory) FDB, and an information control unit 733 are connected to the controller 732. The arrears database CDB, the observation database WDB, and the entry/exit vehicle database TDB are connected to the information control unit 733.

A modem 734 is connected to the controller 732. The controller 732 is able to perform sound and data transmission with the control center 50 (FIG. 52) via this modem and the public communication circuit exchange 760 (FIG. 52).

Figure 55:
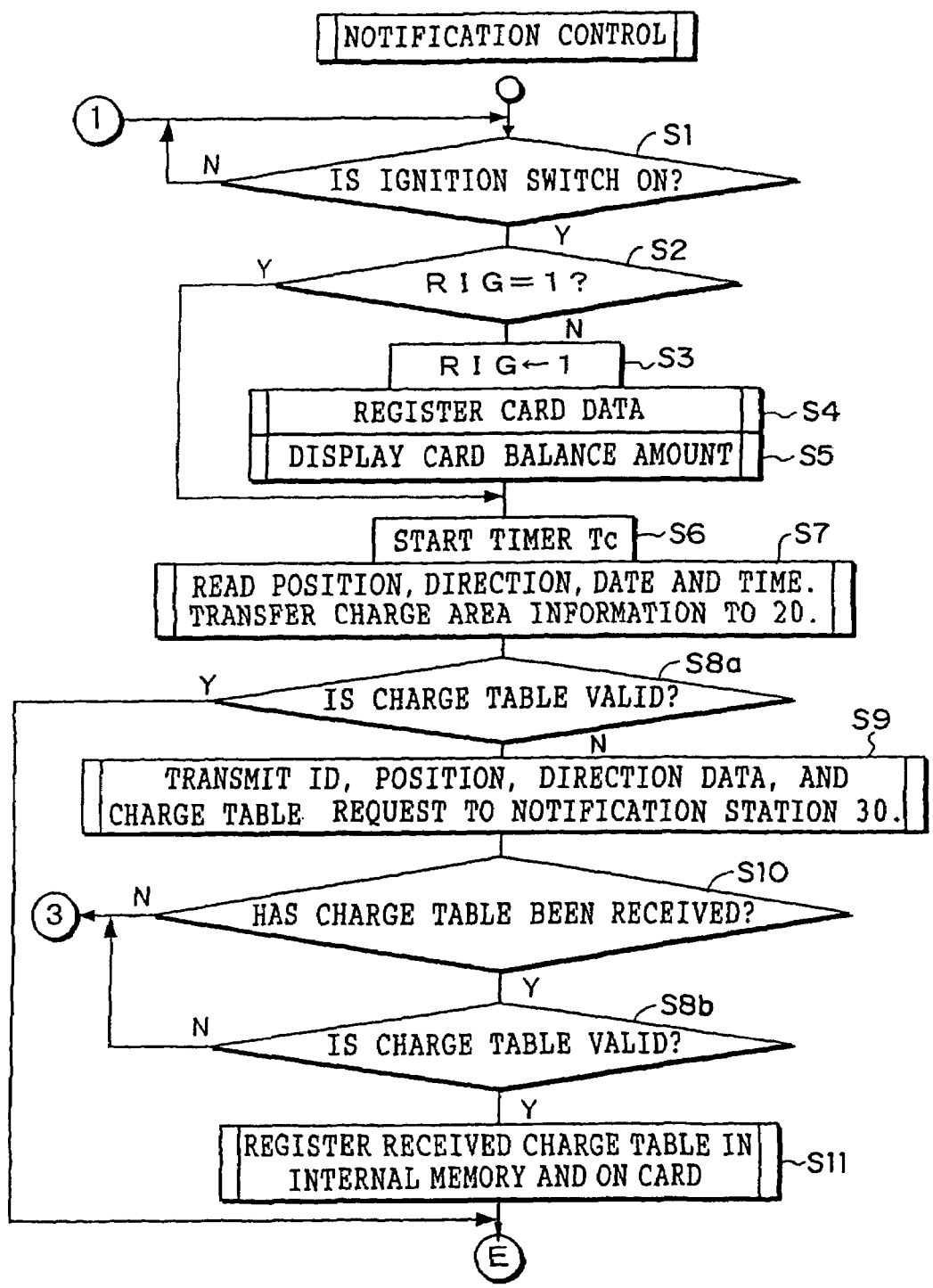
FIGS. 55 A and 55 B are a flow chart showing a portion of the notification control operation of the notification control ECU shown in FIG. 53.
Figure 55:
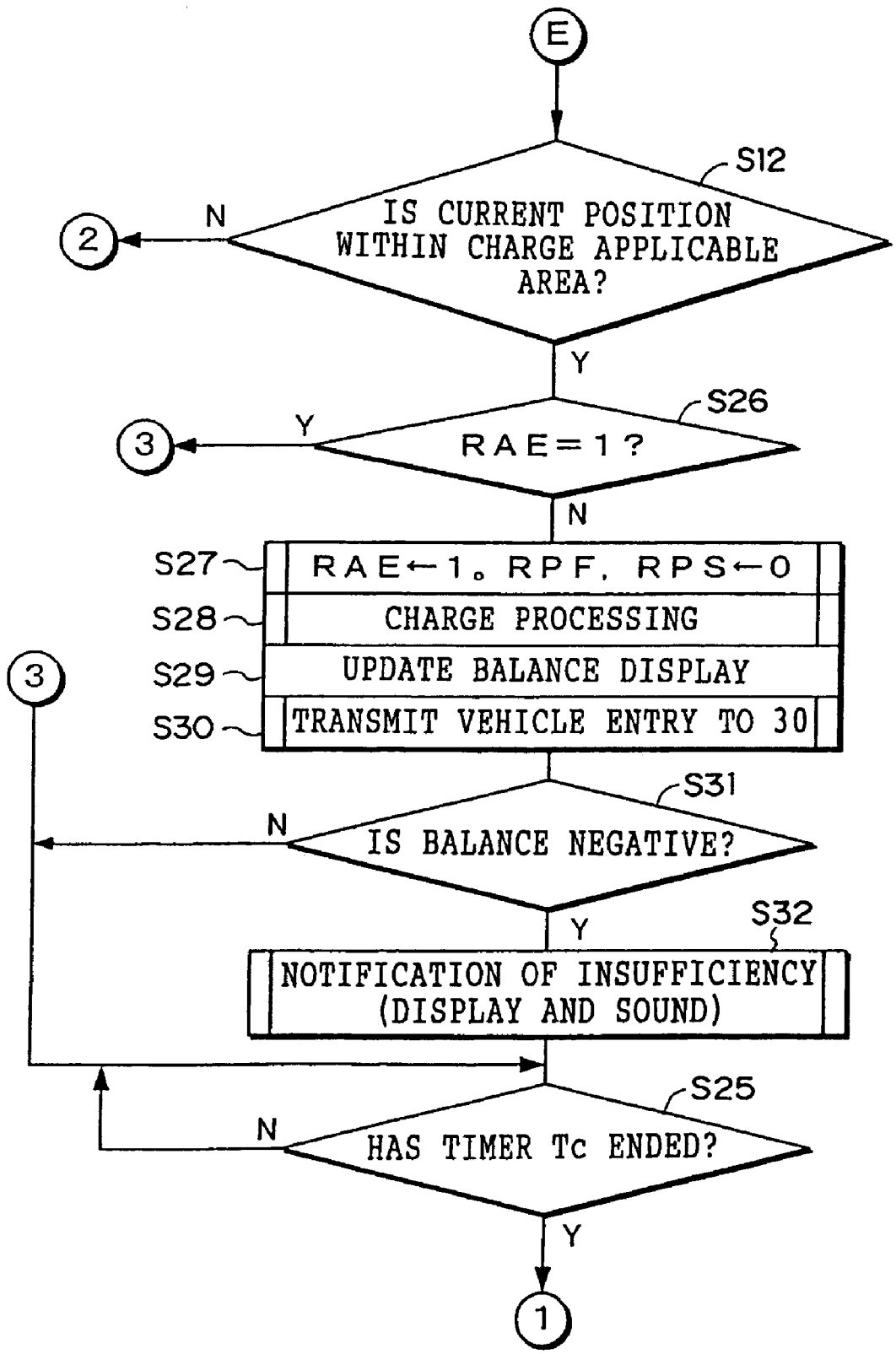
Figure 56:
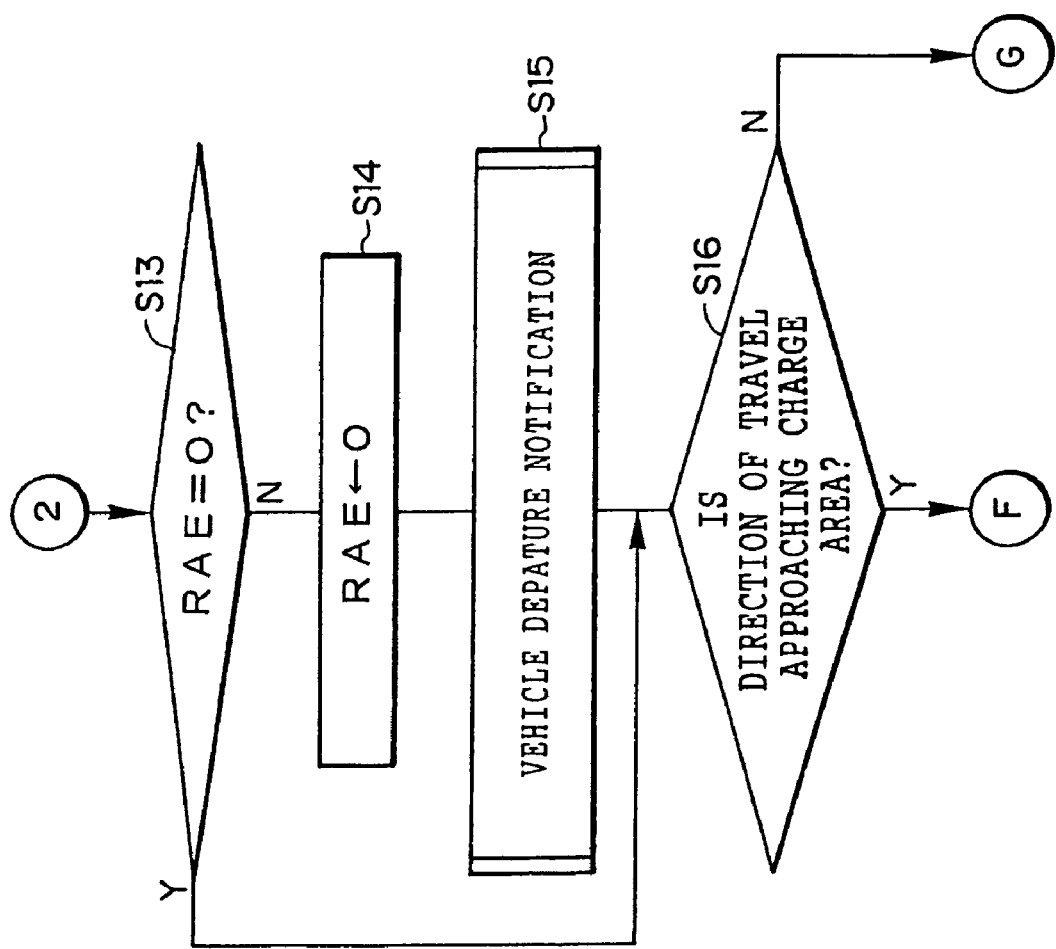
FIGS. 56 A and 56 B are a flow chart showing the remaining portions of the notification control operation of the notification control ECU shown in FIG. 53.
Figure 56:
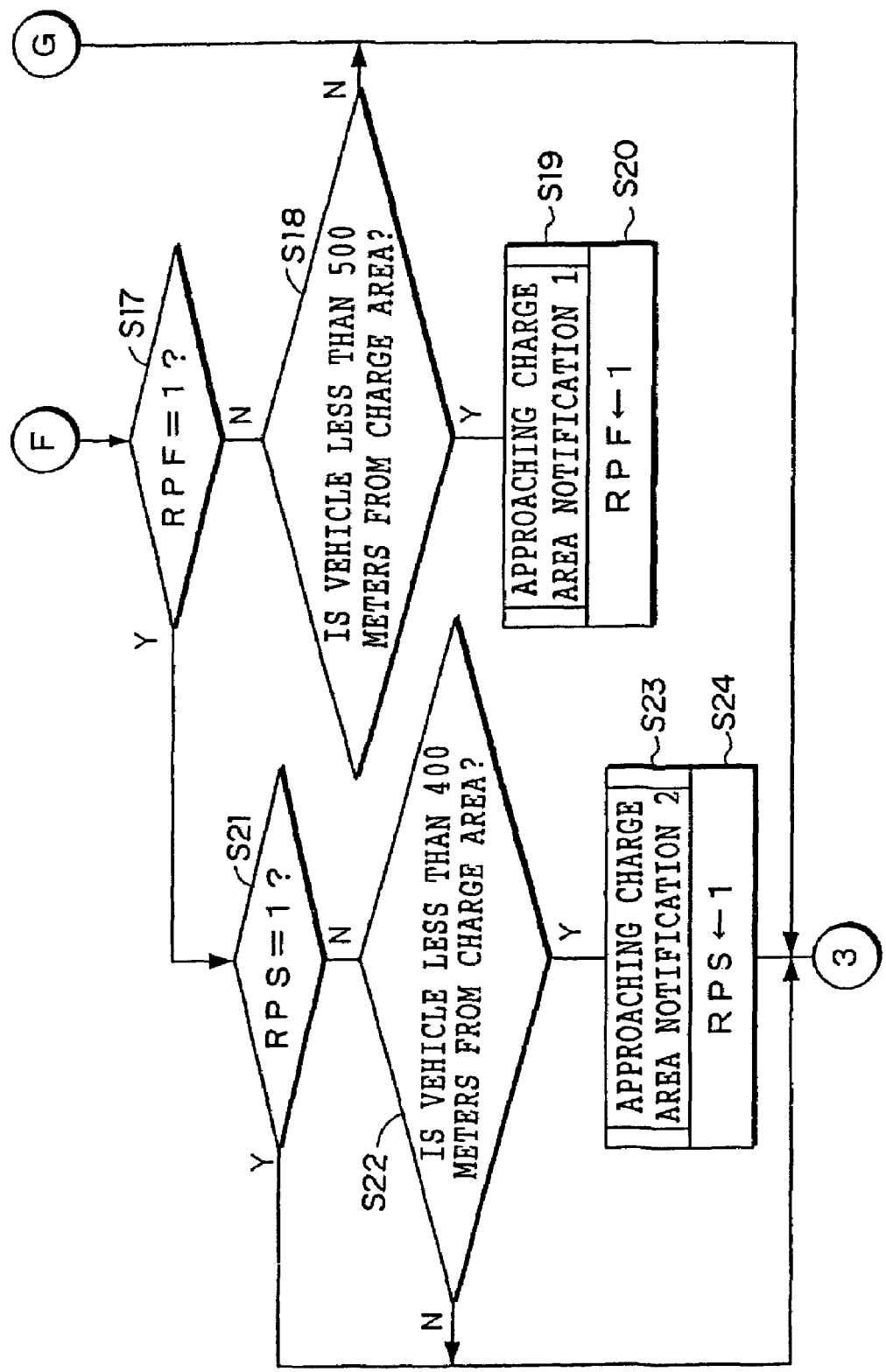

FIGS. 55 A and 55 B and FIGS. 56 A and 56 B show outlines of the notification control operation of the (CPU of the) notification control ECU 702. FIGS. 55 A and 55 B will be looked at first. The notification control ECU 702 waits for the ignition switch IGsw to be closed (Si: H), and when the ignition switch is closed, the notification control ECU 702 registers the data of the card CRD in its internal memory via the card reader 705 (steps S1 to S4). If no card CRD has been loaded, the notification control ECU 702 waits for a card to be loaded and then registers the data of the card CRD in internal memory. Note that, in the description below, inside the brackets the word "step" has been omitted with only the step number and the letter S denoted.

Next, the card balance in the read card data is displayed on the display unit 704 (S5). Next, the notification control ECU 702 starts the timer Tc for the time limit Tc (S6). A data transmission request is then made to the GPS information processing ECU 720, and data of the current position (ground position), the direction of travel, and the date and time is received from the GPS information processing ECU 720 and written to internal memory. The charge area information in the card data registered in internal memory is also sent to the GPS information processing ECU 720 (S7). When this charge area information is received, the GPS information processing ECU 720 adds the charge area display (half tone dot meshing) to the corresponding area of the map displayed on the display device 724 that corresponds to the charge area indicated by the charge area information.

Next, the notification control ECU 702 checks whether the date and time received from the GPS information processing ECU 720 are within the period in which the table is valid in the charge table registered in internal memory, or whether the current position received from the GPS information processing ECU 720 is within the area in which the table is valid (the table valid area) shown in the information of the area in which the table is valid (the table valid area information) in the charge table registered in internal memory (S8a). If the date and time are outside the period in which the table is valid, or if the current position is outside the area in which the table is valid, then in this case, the charge table does not fit the current area. Therefore, a charge table request is transmitted via the antenna ANTt (S9). At this time, the charge table request is transmitted together with the vehicle ID and card ID in the card data, the direction date and the position obtained from the GPS information processing ECU 720. When the notification station 730 receives the charge table request, it saves the card ID, the vehicle ID, the position, and the direction data in internal memory, and transmits the charge table (Table 11) in the charge database FDB (S41–S44 in FIG. 47).

When it receives this charge table, the notification control ECU 702 checks whether the date and time are within the period in which the table is valid in the charge table, or whether the current position received from the GPS information processing ECU 720 is within the area in which the table is valid shown in the information of the area in which the table is valid (S8b). If the date and time are within the period in which the table is valid, and if the current position is within the area in which the table is valid, the notification control means 702 registers (replaces with new data) the received charge table in internal memory and in the IC card CRD (S10–S11).

Next, looking at FIG. 56, thereafter the notification control ECU 702 checks at the time cycle Tc whether the current position is within a charge area indicated by the charge area information in the charge table or outside the charge areas (S12, S13, . . . S25–S1–S2–S6 to S8a–S12, S13). If it is outside a charge area, and if the direction of travel is one that is approaching a charge area, then when the position is within 500 meters from the charge area, "charge area 500 meters ahead" is displayed on the display device 704 along with charge table information (Table 11; however, the charge area information and the information of the area in which the table is valid are excluded). At the same time, notification such as "charge area is 500 meters ahead" is made by voice synthesis via the voice synthesizing unit 710 and the speaker SP (S13–S16 to S20). Moreover, when the current position is within 400 meters from the charge area, the display "charge area 500 meters ahead" on the display device 704 is altered to "charge area 400 meters ahead", and a notification of "charge area is 400 meters ahead" is also made (S13–S16–S17–S21 to S24).

Note that the charge area is displayed in superposition on the map displayed on the display device 724 in the step S7 repeated in the cycle Tc. Moreover, because the current position of the vehicle is shown on the displayed map as a direction attached index, the driver can recognize the position of the vehicle relative to the charge area and the direction of travel from the display on the display device 724.

When the vehicle enters a charge area, the notification control ECU 702 writes "1" in the register (internal memory) so as to show that the vehicle has entered the area in which a charge is applied, and clears the information showing that the vehicle is within 500 meters of the charge area, and is within 400 meters of the charge area (RPF and RPS data in the register) (S27), and performs "charge processing" (S28).

In the charge processing (S28), the notification control ECU 702 extracts the toll for the vehicle classification in the card data from the charge tables registered in the internal register, and the card balance in the card data in the internal memory is updated to a value reduced by the amount of the toll, and also similarly updates the data of the IC card CRD (S28). The balance displayed (displayed in S5) on the display unit 704 is also updated (S29). The notification control ECU 702 then transmits the vehicle entry notification data showing that the vehicle has entered the charge area to the notification station 730. At this time, the vehicle ID and the card ID in the card data, as well as the current direction and position obtained from the information processing ECU 720, and the card balance are transmitted (S30). When the notification station 730 receives this vehicle entry notification, the card ID, the vehicle ID, the position, the direction, and the card balance are saved in the internal memory, and the information in the database is updated correspondingly to the contents of these sets of data. These contents are described below. The notification control ECU 702 checks whether the card balance is a negative value (insufficient toll payment) (S31), and if the card balance is a negative value, displays "insufficient payment—settlement required" on the display device 704. Notification such as "card balance is insufficient. Please settle debt" by voice synthesizer is also made using the voice synthesizing unit 710 and the speaker SP (S32).

After the above described "charge processing" has been executed when a vehicle has entered the charge area, the data in the register RAE is set at 1, therefore, because the routine proceeds from step 26 to step 25, there is no repetition of the "charge processing" within the same charge area. When the (position of the) vehicle departs from the charge area, the notification control ECU 702 advances from step S12 to S13, and in step S14, the data in the register RAE is altered to 0 to indicate an area outside the charge area. Vehicle departure notification (i.e. that the vehicle has departed from the charge area) is then made to the notification station (S15). Namely, vehicle departure data showing that the vehicle has departed from the charge area is transmitted to the notification station 730. At this time, the vehicle ID and the card ID in the card data, as well as the current direction and position obtained from the GPS information processing ECU 720 are transmitted (S15). When the notification station 730 receives this vehicle departure notification, the card ID, the vehicle ID, the position, and the direction are saved in the internal memory, and the information in the database is updated correspondingly to the contents of these sets of data. These contents are described below.

After the vehicle departure notification (S15), because the direction in which the vehicle is traveling is now a direction moving away from the charge area which the vehicle has just transited, the notification control ECU 702 advances from step S16 to step S25, and the relative distance notification relating to the charge area (S17 to S24) is not performed.

When the vehicle transits one charge area (the first charge area) as described above and travels towards another charge area (the second charge area), when the (current position of the) vehicle leaves the area in which the table is valid that is indicated by the table valid area information of the first charge table representing the first charge area, the notification control ECU 702 moves from step S8a to S9 and transmits a charge table request. This transmission wave is received by a first notification station (S30) addressed in the first charge area, and the first notification station transmits the first charge table. When the notification control ECU 702 receives the first charge table, in step S8b, the charge table received is determined to be invalid. As a result, even if the notification control ECU 702 receives the first charge table after the vehicle has left the area in which the table is valid that is indicated by the table valid area information of the first charge table representing the first charge area, this is not written on the IC card CRD or the internal memory.

When the (current position of the) vehicle enters the table valid area of the second charge area, the notification control ECU 702 writes the second charge table transmitted by the second notification station in internal memory and on the IC card CRD, and notification control is performed in the manner described above according to the data.

As described above, when a vehicle reaches a point 500 meters before a charge area, that fact is notified to the driver via the display device 704 and the speaker SP, and information on the charge area is displayed on the display device 704. In addition, a notification is again made when the vehicle reaches a point 400 meters before the charge area. Therefore, the driver has enough time decide whether or not to enter a charge area, and has enough time to choose a detour route.

Figure 57:
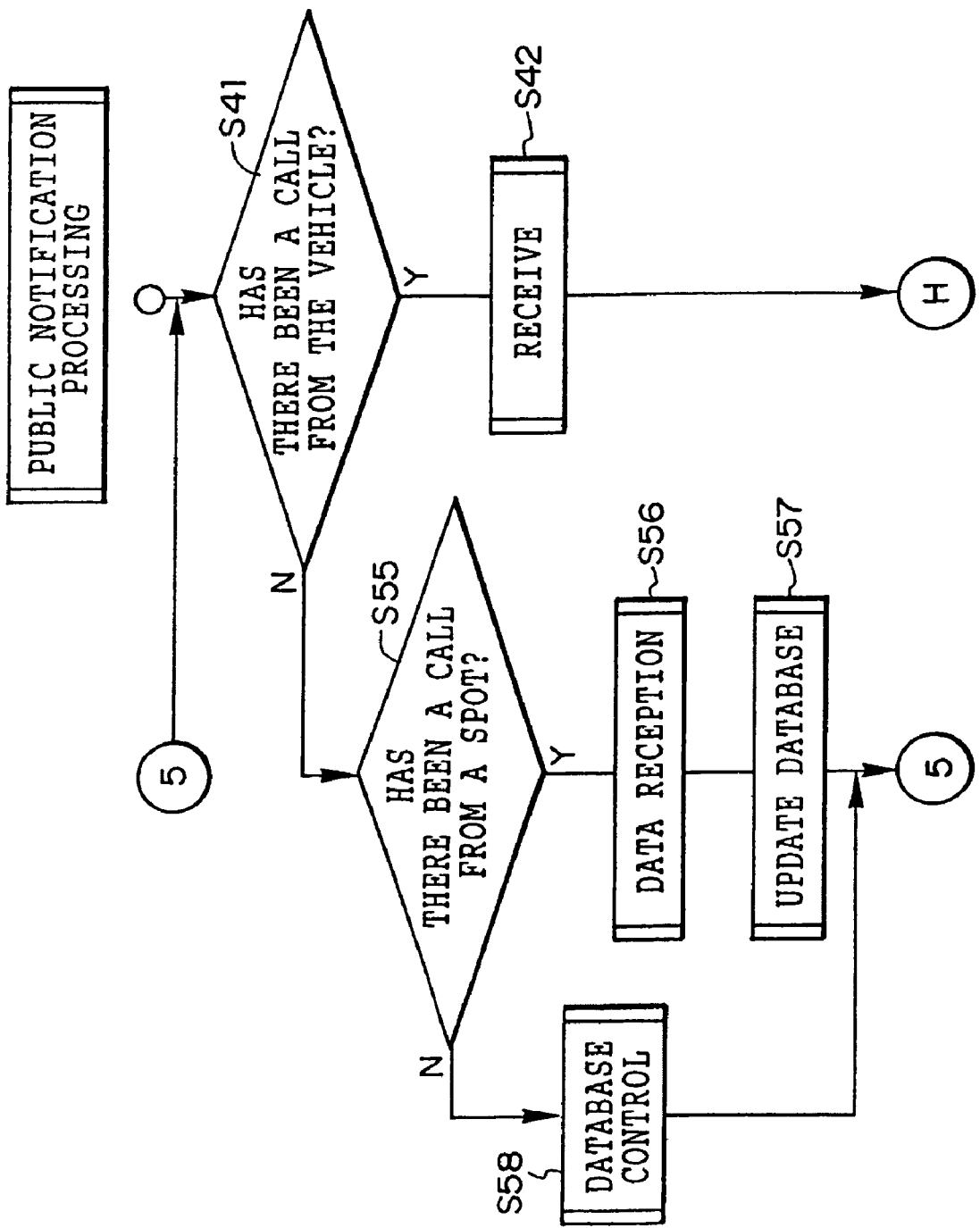
FIGS. 57 A and 57 B are a flow chart showing the operation of the public notification processing of the controller 32 shown in FIG. 54.
Figure 57:
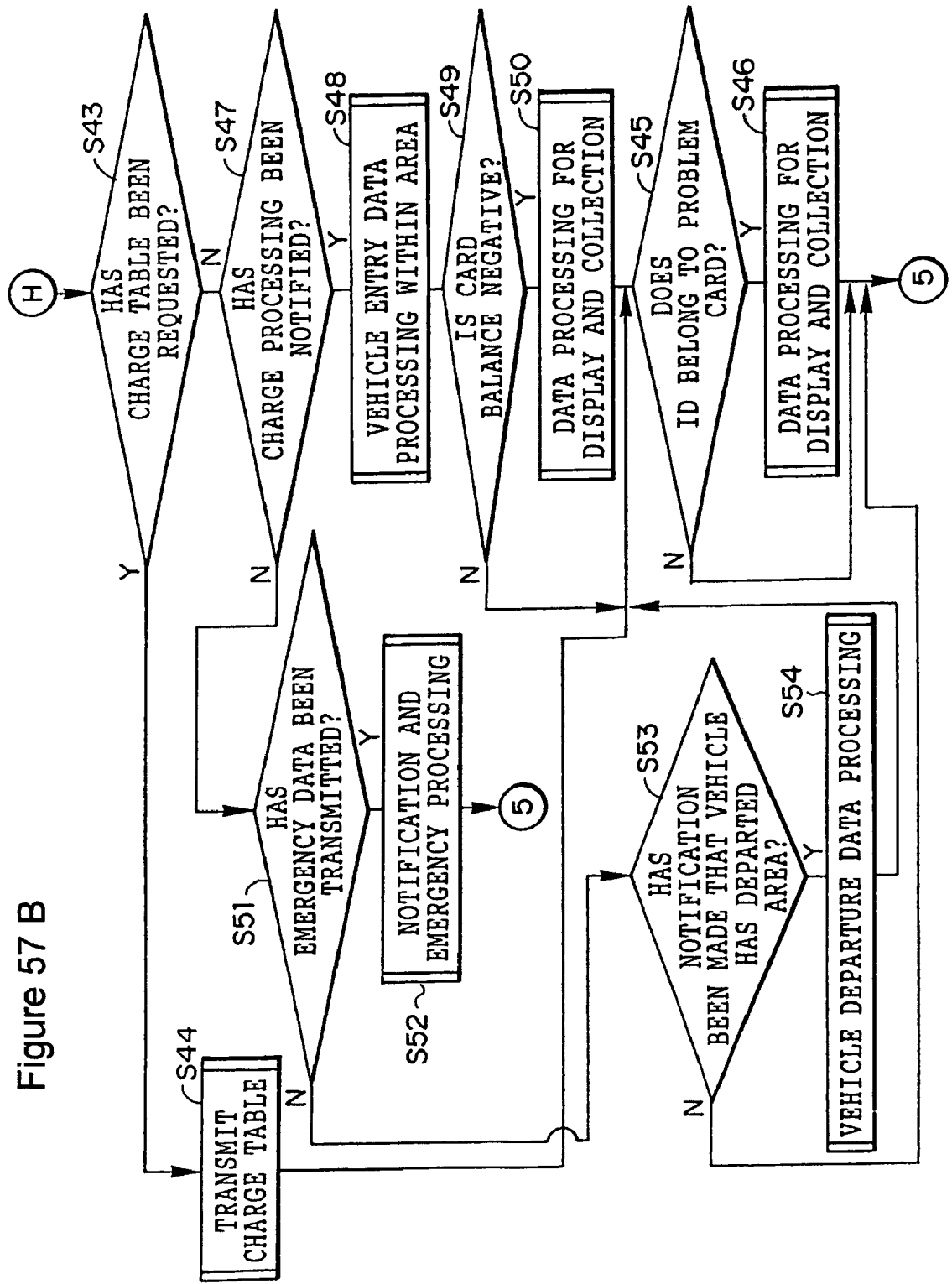

FIGS. 57 A and 57 B show an outline of the notification processing of the controller 732 of the notification station 730 shown in FIG. 54. When the notification control ECU 702 of the in-vehicle notification device 701 of the vehicle transmits a charge table request in step S9 including the card ID, the vehicle ID, the position, and the direction, the controller 732 of the notification station 730 receives the request and saves data representing the card ID, vehicle ID, position, and direction in internal memory, and in response to this request (S41, S42), transmits a charge table in the database FDB via the antenna 740 (S44). A search is then made (S45) via the control unit 733 as to whether or not the received card ID or vehicle ID is the ID of a vehicle that has been in a collision, or has been stolen, or whether the card is a problem card (i.e. lost or damaged, stolen, scrapped through reissue, or illegally copied) stored in the observation database WDB. If the card ID or vehicle ID is one of the above, the card ID, the vehicle ID=vehicle No . . . , the contents of the problem, the current position (reception data), and the current time are displayed on the terminal PC display unit and printed out as an observation data set, and are also transmitted to the control center 750 and card issuing and toll settlement booths 771 to 773. These are able to perform data registration or take action in accordance with the content of the problem.

The notification control ECU 702 of the in-vehicle notification device 701 transmits vehicle entry notification data showing that a vehicle has entered a charge area. When the controller 732 of the notification station 730 receives this, the controller 732 saves the card ID, the vehicle ID, the current position, the direction, and the card balance in internal memory, specifies the entry road (the entrance/exit to the area) based on the position data, and increments by one the number of vehicles that have entered at this entry road in the entry and departure vehicle database TDB (S48). A check is then made as to whether or not the card balance is negative (minus) (S49). If the card balance is negative, the data (card ID, vehicle ID, current position, direction, and card balance) is supplied to the terminal PC and displayed on the display and printed out. A check is then made via the control unit 733 as to whether the card ID or vehicle ID are in the arrears database CDB. If they are in the arrears database, the card balance of the relevant item in the arrears database CDB is updated to the new value. If they are not in the arrears database, this newly acquired data (card ID, vehicle ID, current position, direction, and card balance) is registered for the first time in the arrears database CDB (S50). The ID check and the like described above (S45, S46) are then performed.

The notification control ECU 702 of the in-vehicle notification device 701 transmits vehicle departure notification data showing that a vehicle has departed from a charge area. When the controller 732 of the notification station 730 receives this (S53), the controller 732 saves the card ID, the vehicle ID, the current position and the direction in internal memory, specifies the departure road (the entrance/exit to the area) based on the position data, and increments by one the number of vehicles that have departed at this departure road in the entry and departure vehicle database TDB (S54). The ID check and the like described above (S45, S46) are then performed.

When the transmitted settlement data (the card ID, the vehicle ID and the card balance) is sent from the card issuing and toll settlement spots 771 to 773, if the received card balance is positive, the controller 732 erases the data of the relevant ID in the arrears database CDB (erases the arrears register). If the card balance is still negative (minus), the card balance of the relevant ID is updated to the received card balance.

The data of the databases CDB, FDB, WDB, and TDB can be controlled (i.e. read, transferred, output, written, and erased) by the terminal PC and the control center 750. When the terminal PC or control center 750 accesses the controller 732, the controller 732 performs data processing (i.e. reading, transferring, outputting, writing, and erasure) in accordance with the instruction thereof (S58). The control center 750 is intended to carry out traffic control and charge collection control inside and outside the charge area, as well as observation and tracking of problem cards and vehicles. In order to carry out traffic control, the control center 750 regularly, and when appropriate, refers to the data in the vehicle entry and departure database TDB, and calculates the number of vehicles present within the charge area (the sum of the number of vehicles that have entered each charge area minus the number of vehicles that have exited each charge area) and differential values thereof (congestion trends, easing trends) for predetermined time spots so as to ascertain the trends in the traffic volume. The control center 750 publicly reports traffic information over short time periods, and over long time periods corrects or abolishes the charge tables. In the toll collection control, the task of collecting an unpaid toll from (the owner of) the vehicle for which the absolute value of the negative value of the card balance in the arrears database CDB is the large is performed. Data of the observation database WDB is used for finding problem cards and vehicles.

An emergency notification switch is formed in an operation/display board 703 connected to the notification control ECU 702 of the in-vehicle notification device 701. When the driver operates this switch, the notification control ECU transmits in a predetermined cycle emergency data that includes the vehicle ID, the current position, and the direction via the antenna ANTt. When it receives this, the notification station 730 displays the fact that an emergency has occurred, the vehicle ID, the current position, and the direction on the terminal PC and also prints out this information. It also transmits the emergency data to the control center 750 (S51, S52).

The example described above is a charge system in which the inner side of each interchange in a highway road network (i.e. on the highway), intermediate points, specific areas in a surface road network, and the like are set as charge areas, and a charge is made on vehicle transiting these locations. However, the present invention is not limited only to a charge system, and may also be implemented in a traffic information system for reporting information on traffic regulations in specific areas, or congestion information or the like, or in an automatic notification system for giving guidance and warnings (i.e. comments on areas, guidance, items of caution within an area, entry prohibitions, danger warnings) relating to specific areas.

Ninth Embodiment

In the present embodiment, the present invention is applied to an automatic charge system for performing the charge processing of a toll facility (area in which a charge is applied) automatically. Note that, because the present embodiment is substantially the same as the above embodiments, the same portions are given the same descriptive symbols and a detailed description thereof is omitted.

The conceptual structure according to the present embodiment is the same as that structure shown in FIG. 52. Note that, in the present embodiment, because the charge processing device 701 also functions as a charge processing device incorporated into a vehicle, in the description below, the charge processing device 701 in FIG. 53 is described as the in-vehicle charge device 701.

The in-vehicle charge device 701 serving as a charge processing device incorporated into a vehicle communicates with the notification station 730 via the in-built telephone unit 708 and the antenna ANTt so as to exchange data therewith. Moreover, radio waves are received from satellites via the GPS antenna ANTg enabling the position and direction of travel of the vehicle to be recognized using the inbuilt GPS position measuring device (720 to 728: described below), and these are displayed together with a map displaying the area being transited. When the number of receivable satellites is insufficient or when the wave reception from the satellite is insufficient, the missing information is supplemented by calculating the vehicle position by detecting the direction using a gyro and estimating the traveling speed. Alternatively, vehicle position recognition is performed.

Next, the in-vehicle charge device 701 will be described. Note that the structure of the in-vehicle charge device 701 is the same as the structure in FIG. 53. Direct current voltage +B from the battery in the vehicle is constantly supplied to the in-vehicle charge device 701. A power supply circuit PSC supplies operating voltage to the CPUs of the GPS information processing ECU 720 and the charge control ECU 2. As a result, data is constantly held (stored) in the internal memory of the CPU of the charge control ECU 702 and in the internal memory that is outside the CPU but is inside the charge control ECU 702.

When the vehicle ignition switch (interruption instruction means) IGsw is closed (i.e. the vehicle power supply is turned on), the power supply circuit PSC supplies operating voltage to all circuits of the in-vehicle charge device 701. The opening of the ignition switch IGsw (Si=L) instructs that the measuring of the length of time elapsed with the vehicle staying inside the charge area is to be ended (interrupted). The closing of the ignition switch IGsw (Si=H) instructs that the measuring of the length of time elapsed with the vehicle staying inside the charge area is to be continued.

The GPS position measuring device (720–728) is provided with a receiving antenna ANTg, a GPS receiver 721, a GPS demodulator 722, a display device 724, a piezoelectric vibrating gyro 725, an altitude sensor 726, a GPS information processing ECU (Electronic Control Unit) 720, an operating board 723, a map search engine 727, and a map database 728. The 1.57542 GHz radio waves transmitted from each of the GPS satellites are received by the GPS receiver 721 via the receiving antenna ANTg, and the information contained in the radio waves, namely, information such as a function indicating the orbit of the satellites and the time and the like is demodulated by the GPS demodulator 722, and input into the GPS information processing ECU 720. The GPS information processing ECU 720 is a computer system based on mainly a microprocessor (CPU) and provided with almanac data memory and memory for a data buffer as well as an input/output interface (an electric or electronic circuit). The CPU generates information indicating the position of its host vehicle (latitude, longitude, altitude) based on the information transmitted from the GPS satellites, and the search engine 727 reads map data of a page (screen) that includes the position from the map database 728 and displays this on the display device 724. The current position index that also shows the direction of travel is also displayed as well as the current position on the display unit.

The basic structures of the reception antenna ANTg, the GPS receiver 721, the GPS demodulator 722, and the display device 724, as well as the basic operation of the GPS information processing ECU 720 are the same as the structural elements of known devices already available on the market.

However, in order to implement the present invention, a program is added to the operating program of the GPS information processing ECU 720 that performs the following. Namely, the current position (ground position) of a vehicle (i.e. the in-vehicle charge device 701), the direction of travel, and the current time are transmitted to the charge control ECU 702 in response to a data transmission request from the charge control ECU 702. The charge control ECU 702 reads the transmitted charge area information and stores it in internal memory. The charge area is then displayed in superposition (as a half-tone dot meshing) in the area defined by the charge area information, namely, the charge area on the map displayed on the display device 724.

Analog signals output by the piezoelectric vibrating gyro 725 and the altitude sensor 726 are each input into the GPS information processing ECU 720, and the CPU of the ECU 720 reads the signals after converting them into digital data via an A/D converter. Information output from the GPS demodulator 722 and information for controlling the GPS demodulator 722 is input into or output from the CPU via the I/O port of the GPS information processing ECU 720.

The GPS information processing ECU 720 calculates three-dimensional coordinates Ux, Uy, Uz of the position of its host vehicle with a "3 satellite position measuring calculation" or a "4 satellite position measuring calculation".

In the "3 satellite position measuring calculation", in a predetermined three dimension simultaneous equation three sets of data received from three satellites are each substituted as parameters, and by solving this simultaneous equation, any error in the clock on the receiving side, latitude and longitude of the reception point, which are unknown numbers, are determined. The altitude of the reception point is determined, in this example, by calculation from the signal output from the altitude sensor 726, and is substituted into the simultaneous equation as known data. In the "4 satellite position measuring calculation", in a predetermined four dimension simultaneous equation four sets of data received from four satellites are each substituted as parameters, and by solving this simultaneous equation, any error in the clock on the receiving side, latitude, longitude, and altitude of the reception point, which are unknown numbers, are determined. In addition, because any error in the clock on the receiving side can be determined by performing the position measuring calculation of any of these, the time of the internal clock can be corrected based on this error information.

When the ground position information is calculated by GPS position measurement, the GPS information processing ECU 720 calculates the direction in which the vehicle is traveling by a comparison with the previously calculated ground position. On the basis of this time calculated ground position, map data of the one page (one screen) that includes the current position is read from the map data memory 728 and is displayed on the display device 724. A current position index that also shows direction of travel is displayed at the current position on the display. In addition, when at least a portion of the area defined by the charge area information, namely the charge area, received from the charge control ECU 702 and saved in the internal memory is included in the area displayed on the display device 724, the charge area is displayed in superposition (in half-tone dot meshing) over the area on the display screen. This additional display allows the driver to recognize area in which a charge is applied on the display screen of the display device 724.

The charge control ECU 702 is also a computer system centered around a microprocessor (CPU) and provided with an input/output interface (an electric or electronic circuit). The CPU is able to exchange transmissions of various types of information with the notification station 730 via the antenna ANTt, the telephone unit 708, and the modem 707. The extension serial input/output board 706 performs the serial input and output of data, as well as serial/parallel conversion input and output.

The voice of the driver that is input using the microphone MIC is converted into digital data indicating letters of words via a voice recognition unit 709, and is input into the CPU of the charge control ECU 702. Furthermore, the CPU notifies (aurally informs) the driver when necessary of messages (output information) using the in-vehicle speaker SP via the voice synthesizing unit 710 and the switching switch SW711. When voice data is output from the CPU, the switching switch SW711 switches the connection between the in-vehicle audio and the speakers SP to a connection between the voice synthesizing unit 710 and the speakers SP. At this time, the CPU simultaneously displays the message conveyed to the driver by voice via the vehicle speaker SP alphabetically on the display unit 704. As a result, the driver is able to confirm a message from the CPU both aurally and visually.

A card reader 705 for reading and writing data on an IC card CRD is connected to the charge control ECU 702. When an IC card CRD is inserted into a card insertion slot, and when the charge control ECU 702 requests a data transmission, the card reader 705 reads the data stored on the card CRD and transmits it to the charge control ECU 702. When the card reader 705 receives writing data from the charge control ECU 702, it overwrites (i.e. replaces previous data with this new writing data) this data in the IC card CRD.

The information stored on the IC card is shown in Table 12. In the example shown in Table 12, the amount for a single issue of a card is ¥10,000. The balance of the card is ¥10,000 (i.e. the card is unused) and the card ID allocated by the issuer of the card is MYCAR003. The classification of the vehicle for which the card is applied for is a light vehicle and the vehicle ID (in this example, the number displayed on the vehicle number plate) is A123B568. The data in the charge table is for the charge area which the driver requests (applies for) directly after the issue of the card, and this data is written on the card by the issuer in accordance with the driver's application. If there is no such application (i.e. a writing request), then there is no such writing.

TABLE 12

| Data stored on card | |
|---|---|
| Item of information | Content of information |
| Card ID | MYCAR003 |
| Card balance | ¥10000 |
| Vehicle classification | Light vehicle |
| Vehicle ID | A123B568 |
| Charge table | ***(Table 13) |

Three examples of charge table data are shown in Tables 13 (FIG. 75), 14 (FIG. 76), and 15 (FIG. 77). The charge table in the time units shown in FIG. 75 is used for charging the vehicle in the charge area indicated by the charge area information a toll that corresponds to the length of time that the vehicle is inside the area except parking not parked. The charge table in the distance units shown in FIG. 76 is used for charging a toll that corresponds to the distance traveled by a vehicle inside an area. The charge table charging for each entry shown in FIG. 77 is used for charging a toll that corresponds to the number of entries (uses).

The data of one set (one point) of the charge area information in the charge tables is positional information indicating one point on an outline of the charge area. When there are only date of two sets (data of two points), date of each set means the positions of opposite corners in a rectangle (square), and the charge area is rectangular (an example thereof is the same as that shown in FIG. 58).

When there are date of more than or equal to three sets, the positions (points) indicated by date of each set are joined in order of the writing of the data sets, and the polygonal area that emerges when the last point is joined with the first point indicates the charge area. Because there are two sets of position (point) data in the examples shown in Tables 13 to 15, the charge area is quadrangular (square). The toll information is differentiated by time slot and by type of vehicle.

The term of validity of the table indicates the term of validity of the data. The information of the area in which the table is valid shows an outline that is shaped substantially the same as the charge area extended by approximately 600 meters outside the outline of a charge area prescribed in the charge area information. When a plurality of charge areas are set, this information of the area in which the table is valid is for allowing a charge table of a charge area that is near to it to be selected in the vehicle.

The card issuing and toll settlement spots (card issuing and toll settlement booths) 771–773 (see FIG. 52) issue IC cards CRD. These spots (service centers) are provided in locations that provide easy access for a driver and that are as close as possible to areas where the charge areas are set, such as in the vicinity of the notification station 730, in the catchment of the notification station 730, outside the catchment area of the notification station 730, or the like. For example, they may be provided in local government buildings or branches thereof in the area in which the charge area is set. In these spots, new IC cards can be issued, lost or damaged cards can be reissued, unpaid tolls (card balances in arrears) can be settled, and prepaid deposits can be increased (i.e. card balances increased) in accordance with the wishes of a driver by a service operator or by an automatic machine. When these processings are performed, the processing data is transmitted to the notification station 730 via a public phone network and an exchange 760. In accordance with the received processing data, the notification station 730 updates the data in the observation database WDB when a new card is issued, a lost or damaged card is reissued, or a prepaid deposit is increased, and updates the data in the arrears database CDB when an unpaid toll is settled.

The structure of the information station 730 is shown next. Note that the structure of the information station 730 is the same as the structure shown in FIG. 54. In the notification station 730 there is a wireless communication device 731 that modulates transmission data from a controller 732 into radio wave signals and sends it to an antenna 740, and also receives radio waves via the antenna 740, demodulates the received data and feeds it to the controller 732. The controller 732 is a computer system that is centered around a microprocessor (MPU) and is provided with an input/output interface. A terminal PC (a complete set comprising a personal computer, display unit, keyboard, mouse, printer), a charge database (memory) FDB, and an information control unit 733 are connected to the controller 732. The arrears database CDB, the observation database WDB, and the entry/exit vehicle database TDB are connected to the information control unit 733.

A modem 734 is connected to the controller 732. The controller 732 is able to perform sound and data transmission with the control center 50 (FIG. 52) via this modem and the public communication circuit exchange 760 (FIG. 52).

Figure 59:
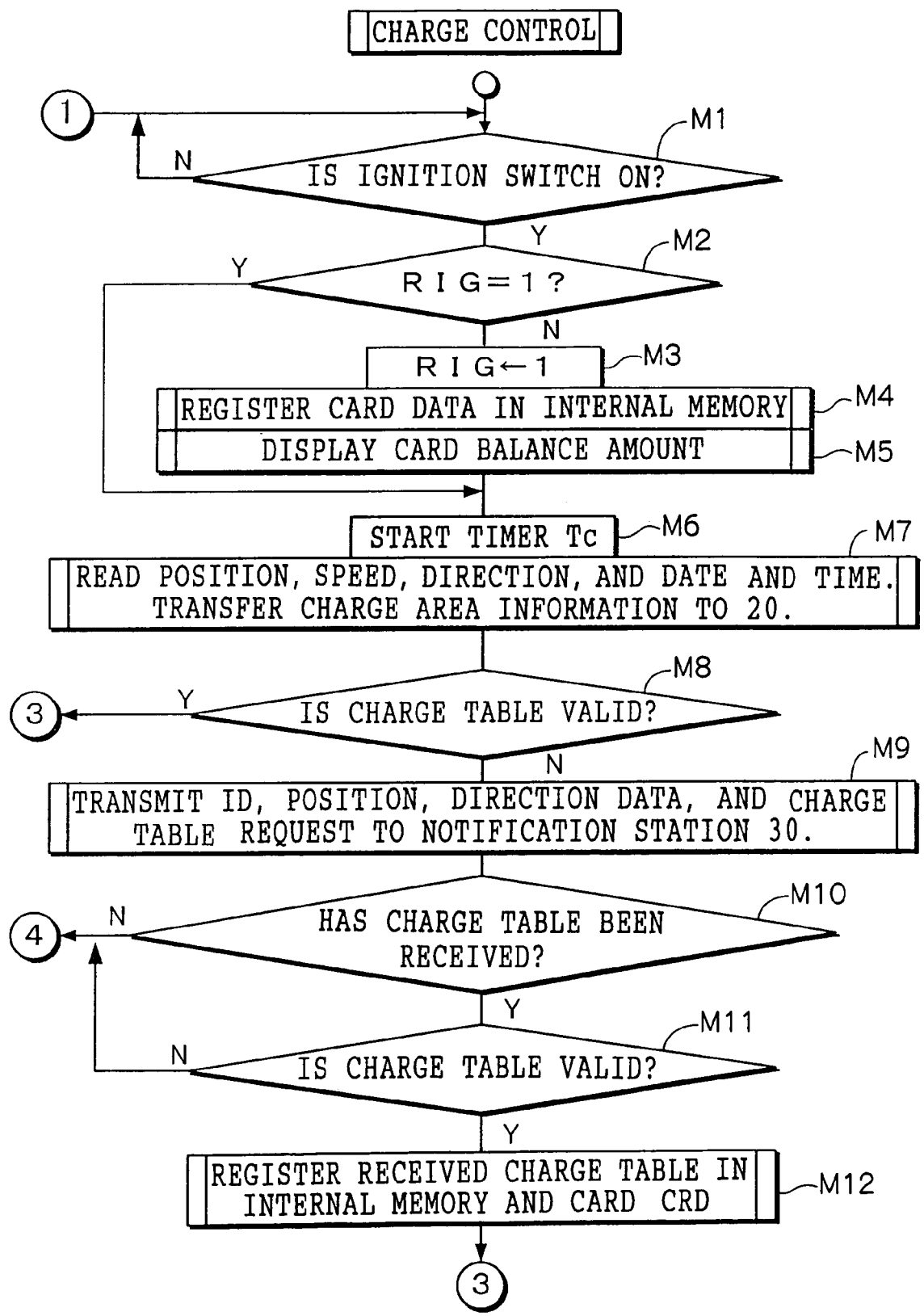
FIG. 59 is a flow chart showing a portion of the charge control operation of a charge control ECU of the ninth embodiment.
Figure 60:
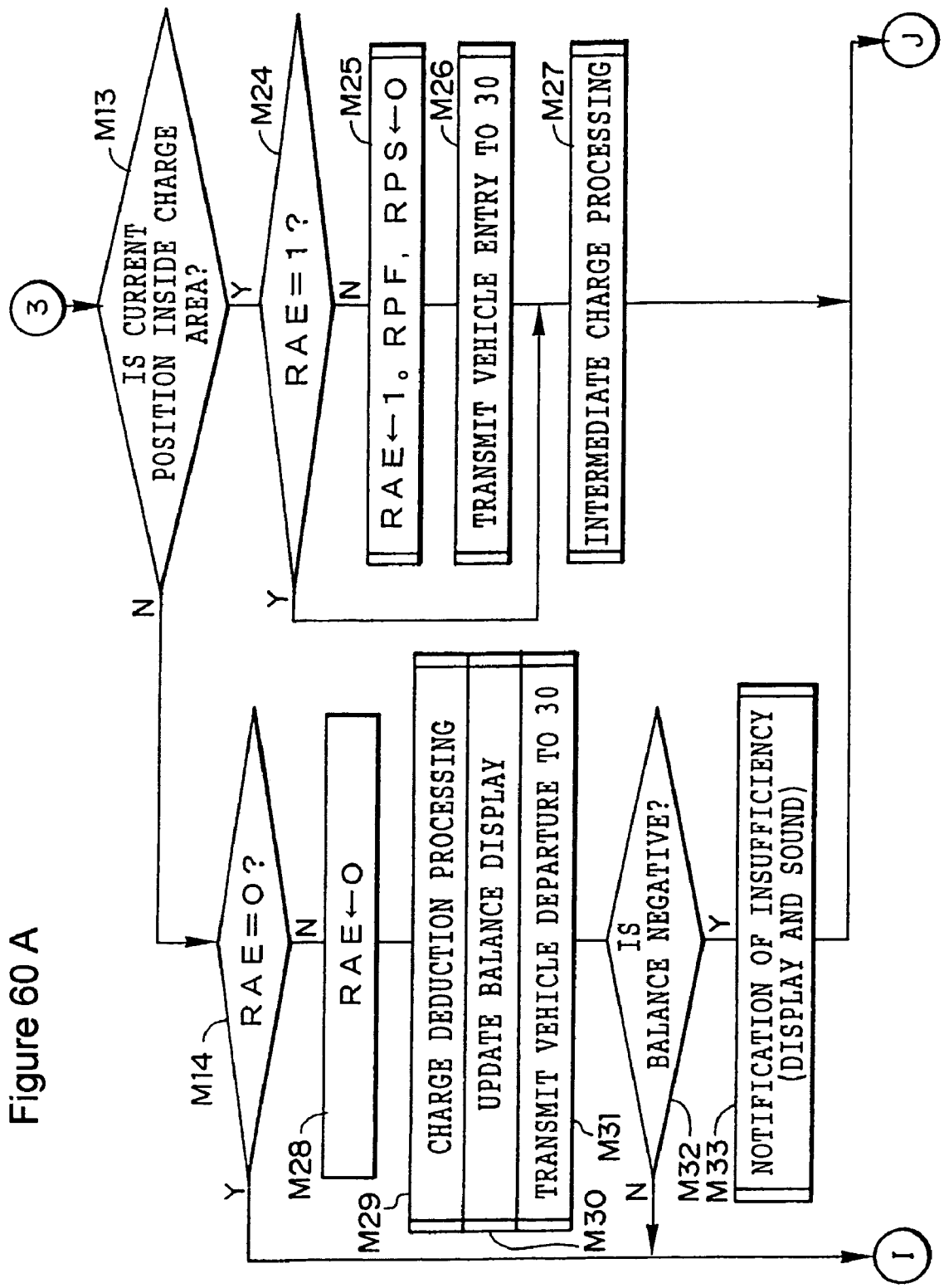
FIGS. 60 A and 60 B are a flow chart showing the remaining portion of the charge control operation of the charge control ECU.
Figure 60:
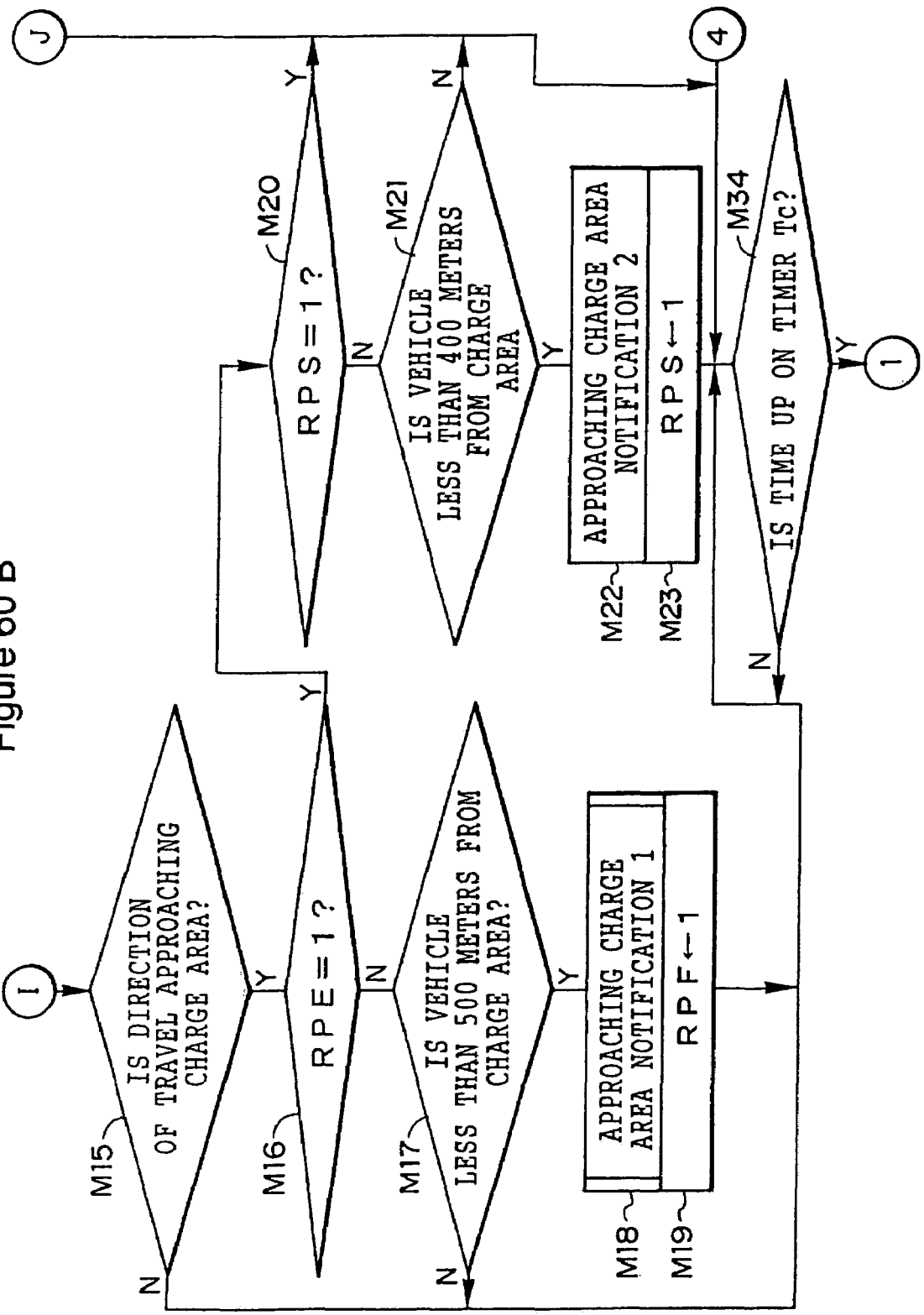

An outline of the charge control operation of the (CPU of the) charge control ECU 702 is shown in FIGS. 59 and 60 A and 60 B. FIG. 59 will be looked at first. The charge control ECU 702 waits for the ignition switch IGsw to be closed (Si: H), and when the ignition switch is closed, the charge control ECU 702 registers the data of the card CRD in its internal memory via the card reader 705 (steps M1 to M4). If no card CRD has been loaded, the charge control ECU 702 waits for a card to be loaded and then registers the data of the card CRD in internal memory. Note that, in the description below, inside the brackets the word "step" has been omitted with only the step number and the letter M denoted.

Next, the card balance in the read card data is displayed on the display unit 704 (M5). Next, the charge control ECU 702 starts the timer Tc for the time limit Tc (M6). A data transmission request is then made to the GPS information processing ECU 720, and data of the current position (ground position), the direction of travel, and the date and time is received from the GPS information processing ECU 720 and written to internal memory. The charge area information in the card data registered in internal memory is also sent to the GPS information processing ECU 720 (M7). When this charge area information is received, the GPS information processing ECU 720 adds the charge area display (half tone dot meshing) to the corresponding area of the map displayed on the display device 724 that corresponds to the charge area indicated by the charge area information.

Next, the charge control ECU 702 checks whether the date and time received from the GPS information processing ECU 720 are within the period in which the table is valid in the charge table registered in internal memory, or whether the current position received from the GPS information processing ECU 720 is within the area in which the table is valid shown in the information of the area in which the table is valid in the charge table registered in internal memory (M8). If the date and time are outside the period in which the table is valid, or if the current position is outside the area in which the table is valid, then in this case, the charge table does not fit the current area. Therefore, a charge table request is transmitted via the antenna ANTt (M9). At this time, the charge table request is transmitted together with the vehicle ID and card ID in the card data, the position obtained from the GPS information processing ECU 720, and the direction data. When the notification station 730 receives the charge table request, it saves the card ID, the vehicle ID, the position, and the direction data in internal memory, and transmits the charge table (Table 13, 14, or 15) in the charge database FDB (M41–M44 in FIG. 61).

When it receives this charge table, the charge control ECU 702 checks whether the date and time are within the period in which the table is valid in the charge table, or whether the current position received from the GPS information processing ECU 720 is within the area in which the table is valid shown in the information of the area in which the table is valid (M10, M11). If the date and time are within the period in which the table is valid, and if the current position is within the area in which the table is valid, the charge control ECU 702 registers (replaces with new data) the received charge table in internal memory and in the IC card CRD (M12).

Next, as seen in FIG. 59, thereafter the charge control ECU 702 checks at the time cycle Tc whether the current position is within a charge area indicated by the charge area information in the charge table or outside the charge areas (M13 to M34–M1 to M11–M13). If it is outside a charge area, and if the direction of travel is one that is approaching a charge area, then when the position is within 500 meters from the charge area, "charge area 500 meters ahead" is displayed on the display device 704 along with charge table information (however, the charge area information and the information of the area in which the table is valid are excluded). At the same time, notification such as "charge area is 500 meters ahead" is made by voice synthesis via the voice synthesizing unit 710 and the speaker SP (M13 to M19).

Moreover, when the current position is within 400 meters from the charge area, the display "charge area 500 meters ahead" on the display unit 704 is altered to "charge area 400 meters ahead", and a notification of "charge area is 400 meters ahead" is also made (M13 to M16–M20 to M23).

Note that the charge area is displayed in superposition on the map displayed on the display device 724 in the step M7 repeated in the cycle Tc. Moreover, because the current position of the vehicle is shown on the displayed map as a direction attached index, the driver can recognize the position of the vehicle relative to the charge area and the direction of travel from the display on the display unit 724.

When the vehicle enters a charge area, the charge control ECU 702 writes "1" in the register (internal memory) so as to show that the vehicle has entered the area in which a charge is applied, and clears the information showing that the vehicle is within 500 meters of the charge area, and is within 400 meters of the charge area (RPF and RPS data in the register) (13, 24, 25), and notifies the notification station 730 that a vehicle has entered the charge area (M26). At this time, an entry report with data indicating the vehicle ID and the card ID in the card data, as well as the current position and direction obtained from the GPS information processing ECU 720, and the card balance attached thereto is transmitted to the notification station 730. When the notification station 730 receives this vehicle entry notification, the card ID, the vehicle ID, the position, the direction, and the card balance are saved in the internal memory, and the information in the database that corresponds to the contents of these sets of data is updated. These contents are described below.

While the current position is inside the charge area, the charge control ECU 702 repeatedly executes the "intermediate charge processing" (M27) at a cycle Tc. In this "intermediate processing" (M27), the toll information in the charge tables (=charge tables of the IC card CRD) in internal memory is referred to and a check is made as to whether the charge table is for a time charge (Table 13), for a distance traveled (Table 14), or for a charge per transit (use) (Table 15). If the charge table is for a charge per transit, the routine proceeds to the next step M34.

When the charge table is for a time charge (Table 13), the toll Ft/hour for the current time for the vehicle classification (light, medium, heavy) registered in the IC card CRD is extracted from the charge table and the time toll AFA for the time Tc (seconds) is calculated as follows:

$$AFA = Tc \text{ (secs)} \times Ft/3600.$$

The sum (RAF+AFt), the value RAF of the toll accumulation thus far, as indicated by the data in the toll accumulation register RAF allocated in the internal memory of the charge control ECU 702, is calculated, and this sum (RAF+AFt) is updated in the toll accumulation register RAF (M27).

When the charge table is for a distance traveled charge (Table 14), the toll Fd/Km for the current time for the vehicle type classification (light, medium, heavy) registered in the IC card CRD is extracted from the charge table and the travel toll AFd for the time Tc (seconds) is calculated as follows:

$$AFd = Tc \text{ (secs)} \times \text{speed } (KM/h) \times Ft/3600.$$

The sum (RAF+AFd), the value RAF of the toll accumulation thus far, as indicated by the data in the toll accumulation register RAF allocated in the internal memory of the charge control ECU 702, is calculated, and this sum (RAF+AFd) is updated in the toll accumulation register RAF (M27).

If the (current position of the) vehicle departs from the charge area, the charge control ECU 702 advances from steps M13 and M14 to step M28. Ij step M28, the data in the register RAE is altered to "0" which indicates that the vehicle has left the charge area, and the "charge deduction processing" (M29) is performed.

In the "charge deduction processing" (M29), the charge control ECU firstly refers to the charge information in the charge table in internal memory and checks whether or not the charge table is one for when a charge is made for each single transit. If this is the case, the toll that corresponds to the vehicle type classification in the card data in the charge table is extracted and the card balance in the card data in the internal memory is updated to a value from which this toll amount has been deducted. In the same way, the data of the IC card CRD is also updated. The data in the toll accumulation register RAF is then cleared.

If the charge table is not one for when a charge is made for each single transit, the card balance in the card data in internal memory is updated to a value from which the value of the toll accumulation register RAF has been deducted. In the same way, the data of the IC card CRD is also updated. The data in the toll accumulation register RAF is then cleared.

Next, the charge control ECU 702 updates the balance displayed (displayed in step M5) on the display device 704 (M30) and transmits the vehicle departure notification data to the notification station 730. At this time, the vehicle ID and the card ID in the card data, as well as the current position and direction obtained from the GPS information processing ECU 720, and the card balance are also transmitted (M31). When it receives this vehicle departure notification, the notification station 730 saves the card ID, the vehicle ID, the position, the direction, and the card balance in internal memory, and the information in the database is updated correspondingly to the contents of these sets of data. These contents are described below.

The charge control ECU 702 checks whether or not the card balance is a negative value (insufficient toll payment) (M32), and if the card balance is a negative value, displays "insufficient payment—settlement required" on the display device 704. Notification such as "card balance is insufficient. Please settle debt" by voice synthesizer is also made using the voice synthesizing unit 710 and the speaker SP (M33).

After the vehicle departure notification (M31), because the direction in which the vehicle is traveling is a direction away from the charge area just transited, the charge control ECU 702 advances from step M15 to step M32 and does not execute the relative distance notification for the charge area (M16 to M23).

When the vehicle transits one charge area (the first charge area) as described above and travels towards another charge area (the second charge area), when the (current position of the) vehicle leaves the area in which the table is valid that is indicated by the table valid area information of the first charge table representing the first charge area, the charge control ECU 702 moves from step M8 to M9 and transmits a charge table request. This transmission wave is received by a first notification station (M30) addressed in the first charge area, and the first notification station transmits the first charge table. When the charge control ECU 702 receives the first charge table, the charge table received in step M10 is determined to be invalid. As a result, even if the charge control ECU 702 receives the first charge table after the vehicle has left the area in which the table is valid that is indicated by the table valid area information of the first charge table representing the first charge area, this is not written on the IC card CRD or the internal memory. When the (current position of the) vehicle enters the table valid of the second charge area, the charge control ECU 702 writes the second charge table transmitted by an unillustrated second notification station in internal memory and on the IC card CRD, and notification control is performed in the manner described above according to the data.

As described above, when a vehicle reaches a point 500 meters before a charge area, that fact is notified to the driver via the display device 704 and the speaker SP, and information on the charge area is displayed on the display device 704. In addition, a notification is again made when the vehicle reaches a point 400 meters before the charge area. Therefore, the driver has enough time to decide whether or not to enter a charge area, and has enough time to choose a detour route.

The check in step M1 as to whether or not the ignition key switch IGsw is closed (Si=H) is intended to determine whether or not the vehicle is parked. When the vehicle enters a charge area in which the above described time toll charge table (Table 13) is applied, then when the ignition key switch IGsw is open (Si=L: an interrupt instruction to interrupt the timing for the charging), the charge control ECU 702 waits for the ignition key switch IGsw to be closed (Si=H: an instruction for the timing for the charging), and does not perform the "intermediate charge processing" of step M27 while waiting. Therefore, the time the vehicle is parked inside the charge area does not fall within the length of time the vehicle has stayed inside the charge area for a charge amount for a two hour toll to be calculated.

Figure 61:
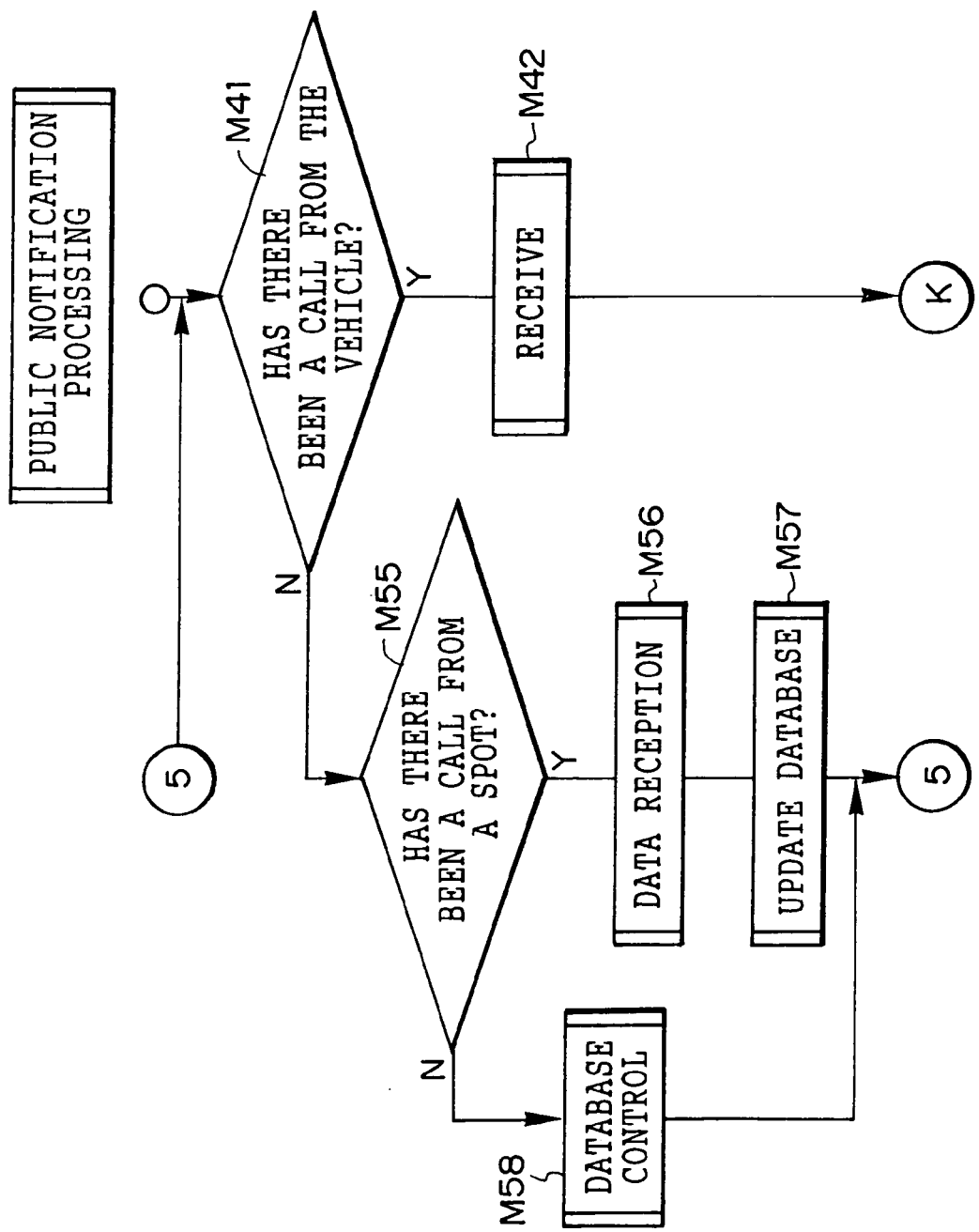
FIG. 61 is a flow chart showing the operation of public notification processing of a controller.
Figure 61:
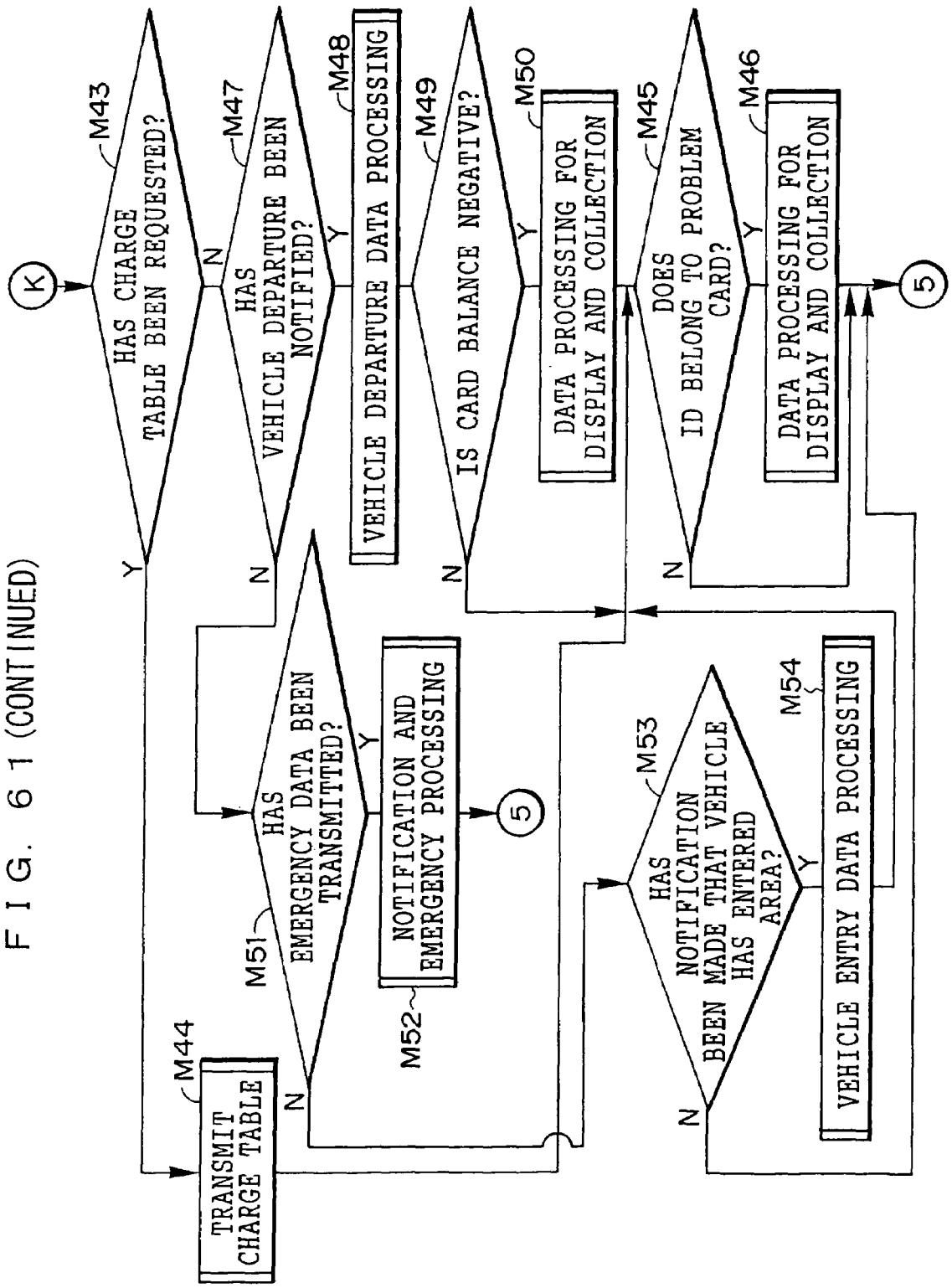

FIG. 61 shows an outline of the notification processing of the controller 732 of the notification station 730 (see FIG.

54). When the charge control ECU 702 of the in-vehicle charge device 701 of the vehicle transmits a charge table request in step M9 that includes the card ID, the vehicle ID, the position, and the direction, the controller 732 of the notification station 730 receives the request and saves data representing the card ID, vehicle ID, position, and direction in internal memory, and in response to this request (M41, M42) transmits a charge table in the database FDB via the antenna 740 (M44). A search is then made (M45) via the control unit 733 as to whether or not the received card ID or vehicle ID is the ID of a vehicle that has been in a collision, or has been stolen, or whether the card is a problem card (i.e. lost or damaged, stolen, scrapped through reissue, or illegally copied) stored in the observation database WDB. If the card ID or vehicle ID is one of the above, the card ID, the vehicle ID=vehicle No . . . , the contents of the problem, the current position (reception data), and the current time are displayed on the terminal PC display unit and printed out as an observation data set, and are also transmitted to the control center 750 and card issuing and toll settlement booths 771 to 773. These establishments are able to perform data registration or take action in accordance with the content of the problem.

The charge control ECU 702 of the in-vehicle charge device 701 transmits vehicle departure notification data showing that a vehicle has departed from a charge area. When the controller 732 of the notification station 730 receives this, the controller 732 saves the card ID, the vehicle ID, the current position, the direction, and the card balance in internal memory, specifies the departure road (the entrance/exit to the area) based on the position data, and increments by one the number of vehicles that have departed at this entry road in the entry and departure vehicle database TDB (M48). A check is then made as to whether or not the card balance is negative (minus) (M49). If the card balance is negative, the data (card ID, vehicle ID, current position, direction, and card balance) is supplied to the terminal PC and displayed on the display unit and printed out. A check is then made via the control unit 733 as to whether the card ID or vehicle ID are in the arrears database CDB. If they are in the arrears database, the card balance of the relevant item in the arrears database CDB is updated to the new value. If they are not in the arrears database, this newly acquired data (card ID, vehicle ID, current position, the direction, and card balance) is registered for the first time in the arrears database CDB (M50). The ID check and the like described above (M45, M46) are then performed.

The charge control ECU 702 of the in-vehicle charge device 701 transmits vehicle entry notification data showing that a vehicle has entered a charge area. When the controller 732 of the notification station 730 receives this (M53), the controller 732 saves the card ID, the vehicle ID, the current position and the direction in internal memory, specifies the entry road (the entrance/exit to the area) based on the position data, and increments by one the number of vehicles that have entered at this entry road in the entry and departure vehicle database TDB (M54). The ID check and the like described above (M45, M46) are then performed.

When the transmitted settlement data (the card ID, the vehicle ID and the card balance) insert from the card issuing and toll settlement spots 771 to 773, if the received card balance is positive, the controller 732 erases the data of the relevant ID in the arrears database CDB (erases the arrears register). If the card balance is still negative (minus), the card balance of the relevant ID is updated to the received card balance.

The data of the databases CDB, FDB, WDB, and TDB can be controlled (i.e. read, transferred, output, written, and erased) by the terminal PC and the control center 750. When the terminal PC or control center 750 accesses the controller 732, the controller 732 performs data processing (i.e. reading, transferring, outputting, writing, and erasure) in accordance with the instruction thereof (M58). The control center 750 is intended to carry out traffic control and charge collection control inside and outside the charge area, as well as observation and tracking of problem cards and vehicles. In order to carry out traffic control, the control center 750 regularly, and when appropriate, refers to the data in the vehicle entry and departure database TDB, and calculates the number of vehicles present within the charge area (the sum of the number of vehicles that have entered each charge area minus the number of vehicles that have exited each charge area) and differential values thereof (congestion trends, easing trends) for predetermined time spots so as to ascertain the trends in the traffic volume. The control center 750 publicly reports traffic information over short time periods, and over long time periods corrects or abolishes the charge tables. In the toll collection control, the task of collecting an unpaid toll from (the owner of) the vehicle for which the absolute value of the negative value of the card balance in the arrears database CDB is the largest is performed. Data of the observation database WDB is used for finding problem cards and vehicle.

An emergency notification switch is formed in an operation/display board 703 connected to the charge control ECU 702 of the in-vehicle charge device 701. When the driver operates this switch, the charge control ECU transmits in a predetermined cycle emergency data that includes the vehicle ID, the current position, and the direction via the antenna ANTt. When it receives this, the notification station 730 displays the fact that an emergency has occurred, the vehicle ID, the current position, and the direction on the terminal PC and prints out this information. It also transmits the emergency data to the control center 750 (M51, M52).

The embodiment described above is a charge system in which charges are levied in area units in a road network, and it is possible to set either a portion or all of a highway road network, or specific areas of a general road network as charge areas and to charge vehicles that transit those areas. However, the present invention is not limited only to a road network charge system, and may also be implemented in a tourist area, an event area or the like as an entry fee collection system.

Tenth Embodiment

In the present embodiment, the present invention is applied to an automatic charge system for performing the charge processing of a toll facility (area in which a charge is applied) automatically. Note that, because the present embodiment is substantially the same as the above embodiments, the same portions are given the same descriptive symbols and a detailed description thereof is omitted.

The conceptual structure according to the present embodiment is the same as that structure shown in FIG. 52. Note that, in the present embodiment, because the charge processing device 701 also functions as a charge processing device incorporated into a vehicle, in the description below, the charge processing device 701 in FIG. 53 is described as the in-vehicle charge device 701.

The in-vehicle charge device 701 built into a vehicle communicates with the notification station 730 (control station) via the in-built telephone unit 708 and the antenna ANTt so as to exchange data therewith. Moreover, radio waves are received from satellites via the GPS antenna ANTg enabling the position and direction of travel of the vehicle to be recognized using the inbuilt GPS position measuring device (720 to 728) and these are displayed together with a map displaying the area being transited. When the number of receivable satellites is insufficient or when the wave reception from the satellite is insufficient, the missing information is supplemented by calculating the vehicle position by detecting the direction using a gyro and estimating the traveling speed. Alternatively, vehicle position recognition is performed.

Next, the in-vehicle charge device 701 will be described. Note that the structure of the in-vehicle charge device 701 is the same as the structure in FIG. 53. Direct current voltage +B from the battery in the vehicle is constantly supplied to the in-vehicle charge device 701. A power supply circuit PSC supplies operating voltage to the CPUs of the GPS information processing ECU 720 and the charge control ECU 702. As a result, data is constantly held (stored) in the internal memory of the CPU of the charge control ECU 702 and in the internal memory that is outside the CPU but is inside the charge control ECU 702.

When the vehicle ignition switch (interruption instruction means) IGsw is closed (i.e. the vehicle power supply is turned on), the power supply circuit PSC supplies operating voltage to all circuits of the in-vehicle charge device 701. The opening of the ignition switch IGsw (Si=L) instructs that the measuring of the length of time elapsed with the vehicle staying inside the charge area is to be ended (interrupted). The closing of the ignition switch IGsw (Si=H) instructs that the measuring of the length of time elapsed with the vehicle staying inside the charge area is to be continued.

The GPS position measuring device (720–728) is provided with a receiving antenna ANTg, a GPS receiver 721, a GPS demodulator 722, a display device 724, a piezoelectric vibrating gyro 725, an altitude sensor 726, a GPS information processing ECU (Electronic Control Unit) 720, an operating board 723, a map search engine 727, and a map database 728. The 1.57542 GHz radio waves transmitted from each of the GPS satellites are received by the GPS receiver 721 via the receiving antenna ANTg, and the information contained in the radio waves, namely, information such as a function indicating the orbit of the satellites and the time and the like is demodulated by the GPS demodulator 722, and input into the GPS information processing ECU 720. The GPS information processing ECU 720 is a computer system based on mainly a microprocessor (CPU) and provided with almanac data memory and memory for a data buffer as well as an input/output interface (an electric or electronic circuit). The CPU generates information indicating the position of its host vehicle (latitude, longitude, altitude) based on the information transmitted from the GPS satellites, and calculates the direction in which the vehicle is traveling and the traveling speed based on a time series estimation using the position information. The search engine 727 reads map data of a page (one screen) that includes the position from the map database 728 in accordance with the position information generated by the CPU, and displays this on the display unit 724. The current position index that also shows the direction of travel is displayed on the current position on the display device.

The basic structures of the reception antenna ANTg, the GPS receiver 721, the GPS demodulator 722, and the display device 724, as well as the basic operation of the GPS information processing ECU 720 are the same as the structural elements of known devices already available on the market.

However, in order to implement the present invention, a program is added to the operating program of the GPS information processing ECU 720 that performs the following. Namely, the current position (ground position) of a vehicle (i.e. the in-vehicle charge device 701), the direction of travel, the speed of travel, and the current time are transmitted to the charge control ECU 702 in response to a data transmission request from the charge control ECU 702. The charge control ECU 702 reads the incoming charge area information transmission and stores it in internal memory. The charge area is then displayed in superposition (as a half-tone dot meshing) in the area stipulated by the charge area information, namely, the charge area on the map displayed on the display unit 724.

Analog signals output by the piezoelectric vibrating gyro 725 and the altitude sensor 726 are each input into the GPS information processing ECU 720, and the CPU of the ECU 720 reads the signals after converting them into digital data via an A/D converter. Information output from the GPS demodulator 722 and information for controlling the GPS demodulator 722 is input into or output from the CPU via the I/O port of the GPS information processing ECU 720.

The GPS information processing ECU 720 calculates three-dimensional coordinates Ux, Uy, Uz of the position of its host vehicle using a "3 satellite position measuring calculation" or a "4 satellite position measuring calculation".

In the "3 satellite position measuring calculation", in a predetermined three dimension simultaneous equation three sets of data received from three satellites are each substituted as parameters, and by solving this simultaneous equation, any error in the latitude and longitude of the reception point, which are unknown numbers, as well as in the clock on the receiving side is determined. The altitude of the reception point is determined, in this example, by calculation from the signal output from the altitude sensor 726, and is substituted into the simultaneous equation as known data. In the "4 satellite position measuring calculation", in a predetermined four dimension simultaneous equation four sets of data received from four satellites are each substituted as parameters, and by solving this simultaneous equation, any error in the latitude, longitude, and altitude of the reception point, which are unknown numbers, as well as in the clock on the receiving side is determined. In addition, because any error in the clock on the receiving side can be determined by performing the position measuring calculation of any of these, the time of the internal clock can be corrected based on this error information.

When the ground position information is calculated by GPS position measurement, the GPS information processing ECU 720 calculates the direction in which the vehicle is traveling and the speed at which the vehicle is traveling by a comparison with the previously calculated ground position. On the basis of this time calculated ground position, map data of the one page (one screen) that includes the current position is read from the map data memory 728 and is displayed on the display unit 724. A current position index that also shows direction of travel is displayed at the current position on the display. In addition, when at least a portion of the area defined by the charge area information, namely the charge area, received from the charge control ECU 702 and saved in the internal memory is included in the area displayed on the display unit 724, the charge area is displayed in superposition (in half-tone dot meshing) over the area on the display screen. This additional display allows the driver to recognize area in which a charge is applied on the display screen of the display unit 724.

The charge control ECU 702 is also a computer system centered around a microprocessor (CPU) and provided with an input/output interface (an electric or electronic circuit). The CPU is able to exchange transmissions of various types of information with the notification station 730 via the antenna ANTt, the telephone unit 708, and the modem 707. The extension serial input/output board 706 performs the serial input and output of data, as well as serial/parallel conversion input and output.

The voice of the driver that is input using the microphone MIC is converted into digital data indicating letters of words via a voice recognition unit 709, and is input into the CPU of the charge control ECU 702. Furthermore, the CPU notifies (aurally informs) the driver when necessary of messages (output information) using the in-vehicle speaker SP via the voice synthesizing unit 710 and the switching switch SW711. When voice data is output from the CPU, the switching switch SW711 switches the connection between the in-vehicle audio and the speakers SP to a connection between the voice synthesizing unit 710 and the speakers SP. At this time, the CPU simultaneously displays the message conveyed to the driver by voice via the vehicle speaker SP alphabetically on the display unit 704. As a result, the driver is able to confirm a message from the CPU both aurally and visually.

A card reader 5 (read/write means) for reading and writing data on an IC card CRD (storage means) is connected to the charge control ECU 702. When an IC card CRD is inserted into a card insertion slot, and when the charge control ECU 702 requests a data transmission, the card reader 705 reads the data stored on the card CRD and transmits it to the charge control ECU 702. When the card reader 705 receives writing data from the charge control ECU 702, it overwrites (i.e. replaces previous data with this new writing data) this data in the IC card CRD.

The information stored on the IC card is shown in Table 16. In the example shown in Table 16, the amount for a single issue of a card is ¥10,000. The balance of the card is ¥10,000 (i.e. the card is unused) and the card ID allocated by the issuer of the card is MYCAR003. The classification of the vehicle for which the card is applied for is a light vehicle and the vehicle ID (in this example, the number displayed on the vehicle number plate) is A123B568. The data in the charge table is for the charge area which the driver requests (applies for) directly after the issue of the card, and this data is written on the card by the issuer in accordance with the driver's application. If there is no such application (i.e. writing request), then there is no such writing.

TABLE 16

Data stored on card

| Item of information | Content of information |
|---|---|
| Card ID | MYCAR003 |
| Card balance | ¥10000 |
| Vehicle classification | Light vehicle |
| Vehicle ID | A123B568 |
| Charge table | ***(Table 17) |

Three examples of charge table data are shown in Tables 17, 18, and 19. The charge table in the time units shown in FIG. 17 is used for charging the vehicle in the charge area shown by the charge area information a toll that corresponds to the length of time that the vehicle is inside the area excepted parking not parked. The charge table in the distance units shown in FIG. 18 is used for charging a toll that corresponds to the distance traveled by a vehicle inside an area. The charge table charging for each entry shown in FIG. 195 is used for charging a toll that corresponds to the number of entries (times used).

The data of one set (one point) of the charge area information in the charge tables is positional information indicating one point on an outline of the charge area. When there are only date of two sets (data of two points), date of each set means the positions of opposite corners in a rectangle (square), and the charge area is rectangular (an example thereof is shown in FIG. 58).

When there are data of more than or equal to three sets, the positions (points) indicated by date of each set of data are joined in order of the writing of the data sets, and the polygonal area that emerges when the last point is joined with the first point indicates the charge area. Because there are two sets of position (point) data in the examples shown in Tables 17 to 19, the charge area is quadrangular (square). The toll information is differentiated by time slot and by type of vehicle.

The term of validity of the table means the term of validity of the data. The information of the area in which the table is valid shows an outline that is shaped substantially the same as the charge area extended by approximately 600 meters outside the outline of a charge area prescribed in the charge area information. When a plurality of charge areas are set, this information of the area in which the table is valid is used to allow a charge table of a charge area that is near to it to be selected in the vehicle.

The card issuing and toll settlement spots (card issuing and toll settlement booths) 771–773 (see FIG. 52) issue IC cards CRD. These spots (service centers) are provided in locations that provide easy access for a driver and that are as close as possible to areas where the charge areas are set, such as in the vicinity of the notification station 730, in the area under the jurisdiction of the notification station 730, outside the area under the jurisdiction of the notification station 730, or the like. For example, they may be provided in local government buildings or branches thereof in the area in which the charge area is set. In these spots, new IC cards can be issued, lost or damaged cards can be reissued, unpaid tolls (card balances in arrears) can be settled, and prepaid deposits can be increased (i.e. card balances increased) in accordance with the wishes of a driver by a service operator or by an automatic machine. When these processings are performed, the processing data is transmitted to the notification station 730 via a public phone circuit and an exchange 760. In accordance with the received processing data, the notification station 730 updates the data in the observation database WDB when a new card is issued, a lost or damaged card is reissued, or a prepaid deposit is increased, and updates the data in the arrears database CDB when an unpaid toll is settled.

The information station 730 will be described next. Note that the structure of the information station 730 is the same as the structure shown in FIG. 54. In the notification station 730 there is a wireless communication device 731 that modulates transmission data from a controller 732 into radio wave signals and sends it to an antenna 740, and also receives radio waves via the antenna 740, demodulates the received data and feeds it to the controller 732. The controller 732 is a computer system that is centered around a microprocessor (MPU) and is provided with an input/output interface. A terminal PC (a complete set comprising a personal computer, display unit, keyboard, mouse, printer), a charge database (memory) FDB, and an information control unit 733 are connected to the controller 732. The arrears database CDB, the observation database WDB, and the entry/exit vehicle database TDB are connected to the information control unit 733.

A modem 734 is connected to the controller 732. The controller 732 is able to perform sound and data transmission with the control center 50 (FIG. 52) via this modem and the public communication circuit exchange 760 (FIG. 52).

Figure 62:
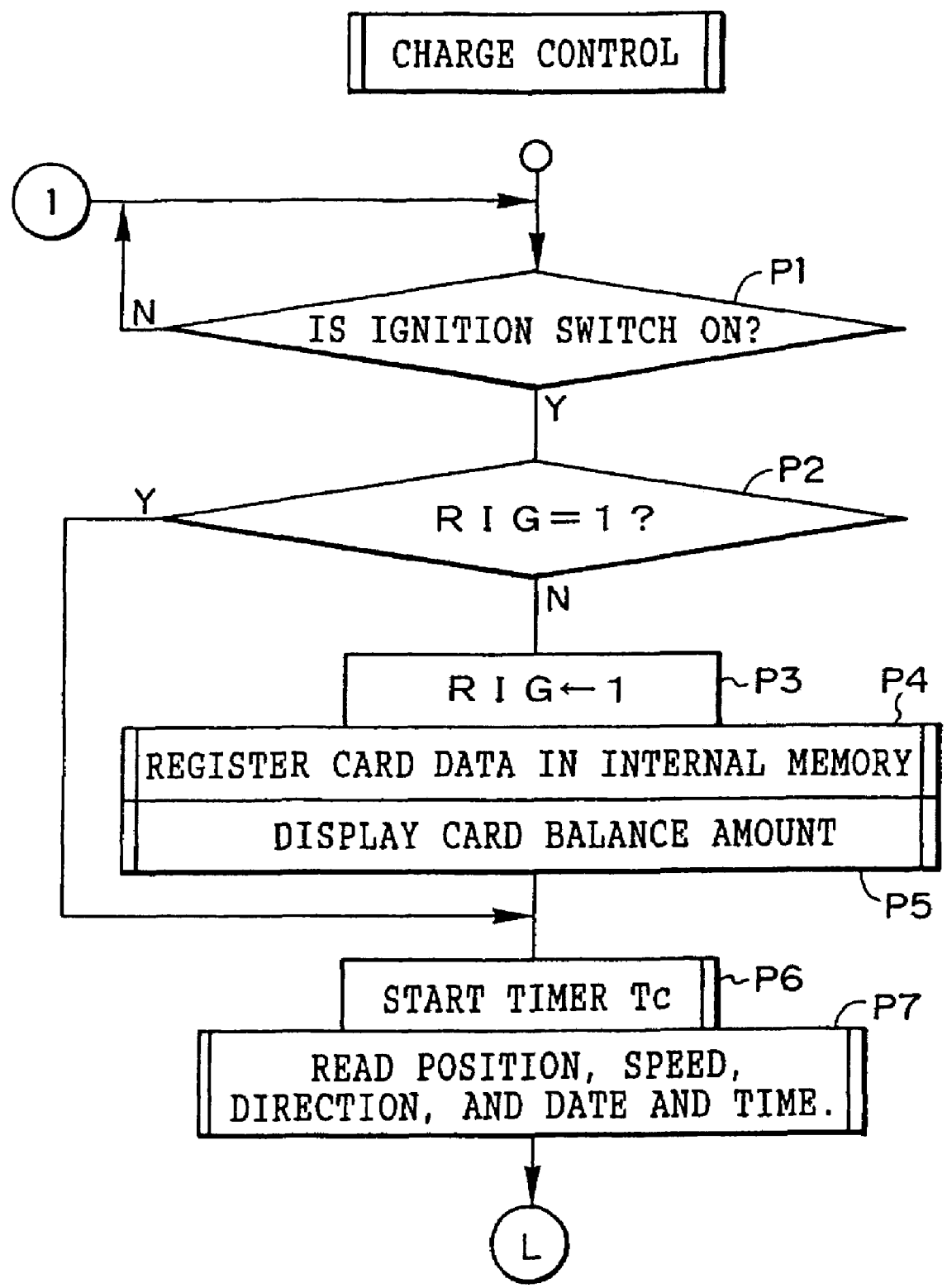
FIGS. 62 A and 62 B are a flow chart showing a portion of the charge control operation of a charge control ECU according to the tenth embodiment of the present invention.
Figure 62:
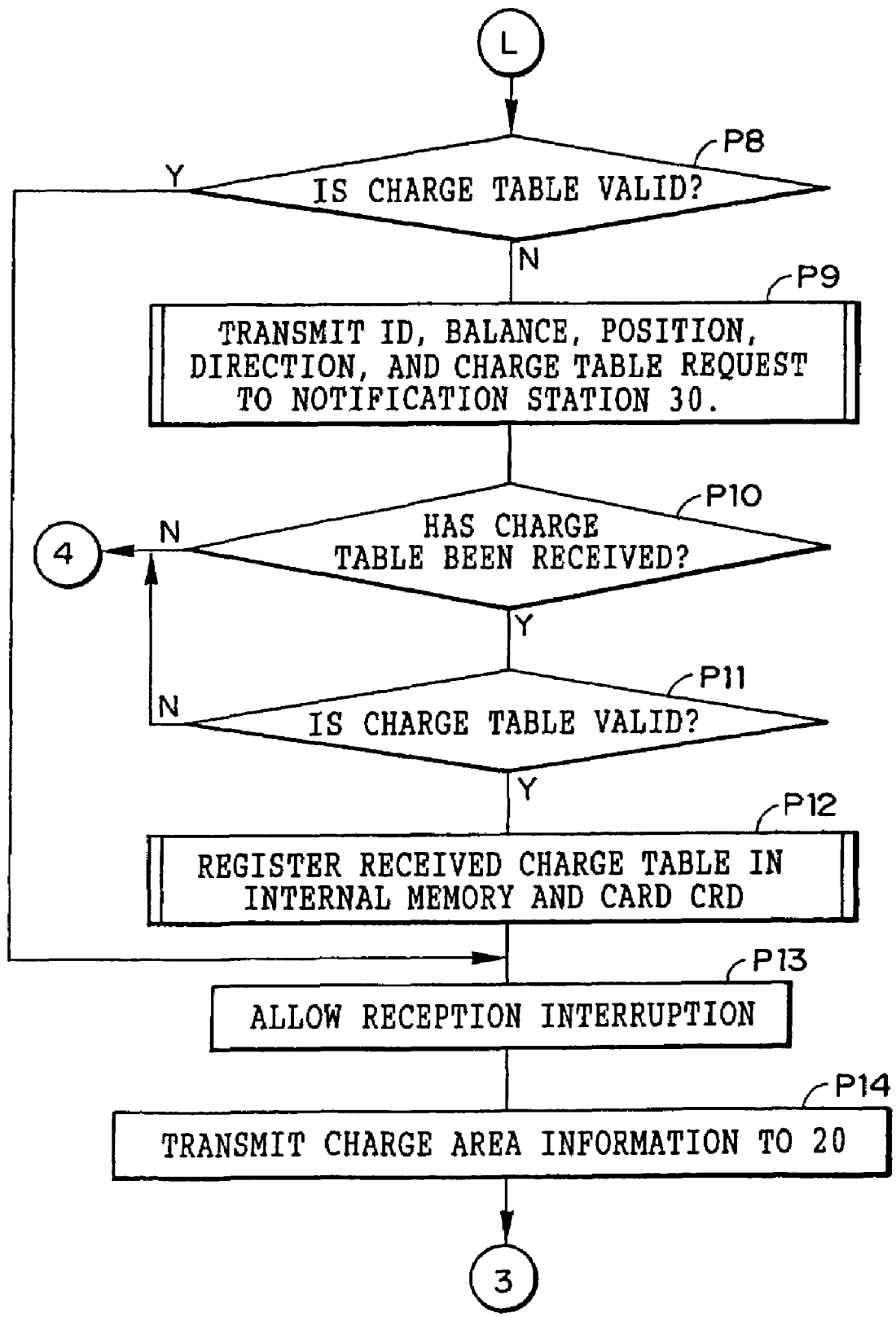

An outline of the charge control operation of the (CPU of the) charge control ECU 702 is shown in FIGS. 62 A and 62 B and 63. FIGS. 62 A and 62 B will be looked at first. The charge control ECU 702 waits for the ignition switch IGsw to be closed (Si: H), and when the ignition switch is closed, the charge control ECU 702 registers the data of the card CRD in its internal memory via the card reader 705 (steps P1 to P4). If no card CRD has been loaded, the charge control ECU 702 waits for a card to be loaded and then registers the data of the card CRD in internal memory. Note that, in the description below, inside the brackets the word "step" has been omitted with only the step number and the letter P denoted.

Next, the card balance in the read card data is displayed on the display unit 704 (P5). Next, the charge control ECU 702 starts the timer Tc for the time limit Tc (P6). A data transmission request is then made to the GPS information processing ECU 720, and data of the current position (ground position), the direction of travel, the speed of travel, and the date and time is received from the GPS information processing ECU 720 and written to internal memory (M7).

Next, the charge control ECU 702 checks whether the date and time received from the GPS information processing ECU 720 are within the period in which the table is valid in the charge table registered in internal memory, or whether the current position received from the GPS information processing ECU 720 is within the area in which the table is valid shown in the information of the area in which the table is valid in the charge table registered in internal memory (P8). If the date and time are outside the period in which the table is valid, or if the current position is outside the area in which the table is valid, then in this case, the charge table does not fit the current area. Therefore, a charge table request is transmitted via the antenna ANTt (P9). At this time, the charge table request is transmitted together with the vehicle ID, the balance (credit information), and card ID in the card data, as well as the current position (ground position) and the movement direction data obtained from the GPS information processing ECU 720. When the notification station 730 receives the charge table request, it saves the card ID, the balance, and the vehicle ID, the current position, and the movement direction in internal memory at the card ID address, and transmits the charge table (Table 17, 18, or 19) in the charge database FDB (P41–P44 in FIGS. 68 A and 68 B).

When it receives this charge table, the charge control ECU 702 checks whether the date and time are within the period in which the table is valid in the charge table, or whether the current position received from the GPS information processing ECU 20 is within the area in which the table is valid shown in the information of the area in which the table is valid (P10, P11). If the date and time are within the period in which the table is valid, and if the current position is within the area in which the table is valid, the charge control ECU 702 registers (replaces with new data) the received charge table in internal memory and in the IC card CRD (P12). Interruption of the reception is also permitted (P13).

The "reception interruption" is executed in reply when a radio wave signal arrives in the antenna ANTt, and an unillustrated receiver in the telephone unit 708 generates a transmission arrival signal showing that a transmission has arrived (i.e. that it has received a signal). The contents thereof are described below with reference made to FIGS. 67 A and 67 B. When permission is given to interrupt reception, the charge control ECU 702 supplies charge area information from the charge tables to the GPS information processing ECU 720 (P14). When it receives this charge area information, the GPS information processing ECU 720 adds the charge area display (half tone dot meshing) to the corresponding area of the map displayed on the display unit 724 that corresponds to the charge area indicated by the received charge area information.

Figure 63:
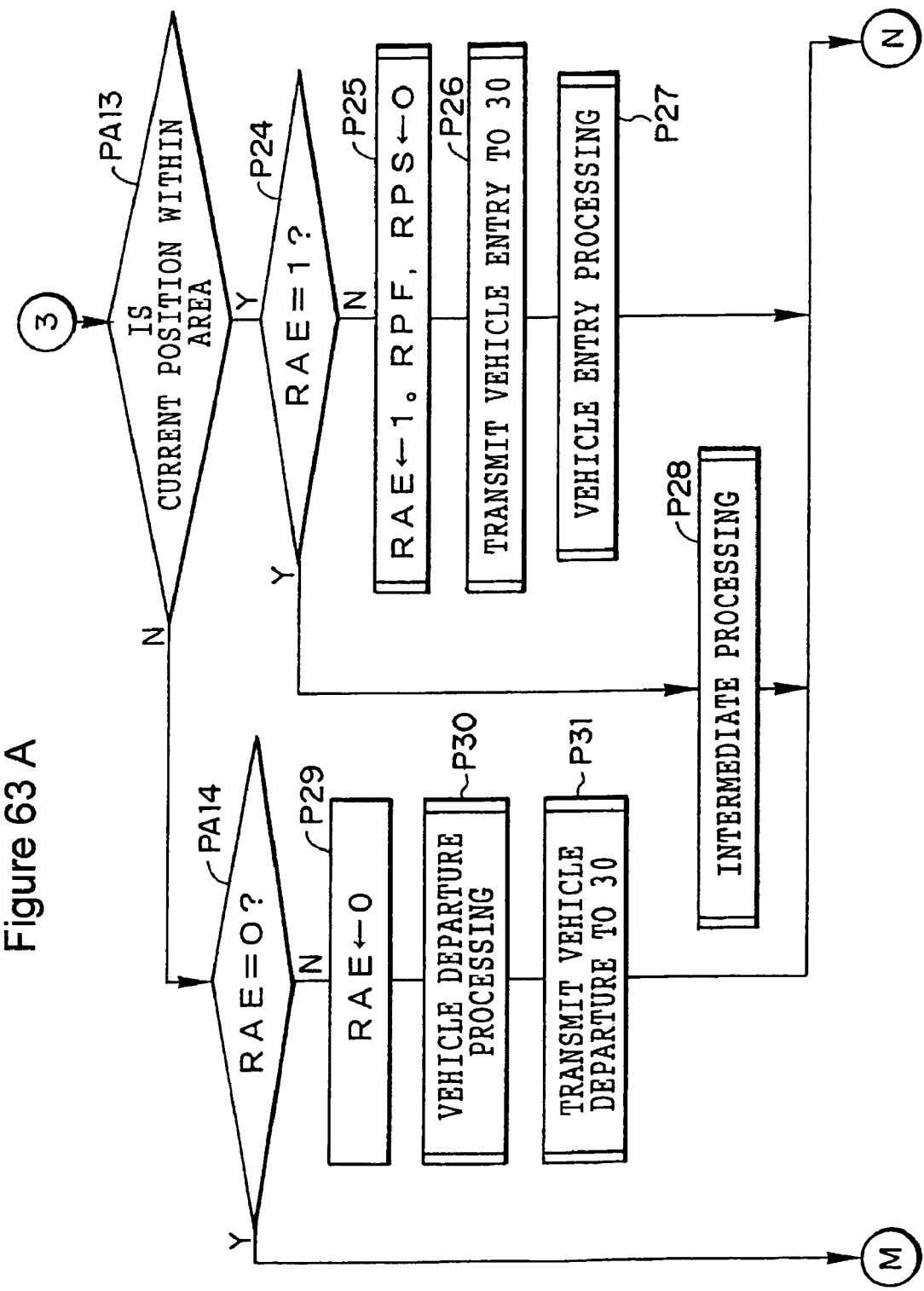
FIGS. 63 A and 63 B are a flow chart showing the remaining portion of the charge control operation of the charge control ECU according to the tenth embodiment of the present invention.
Figure 63:
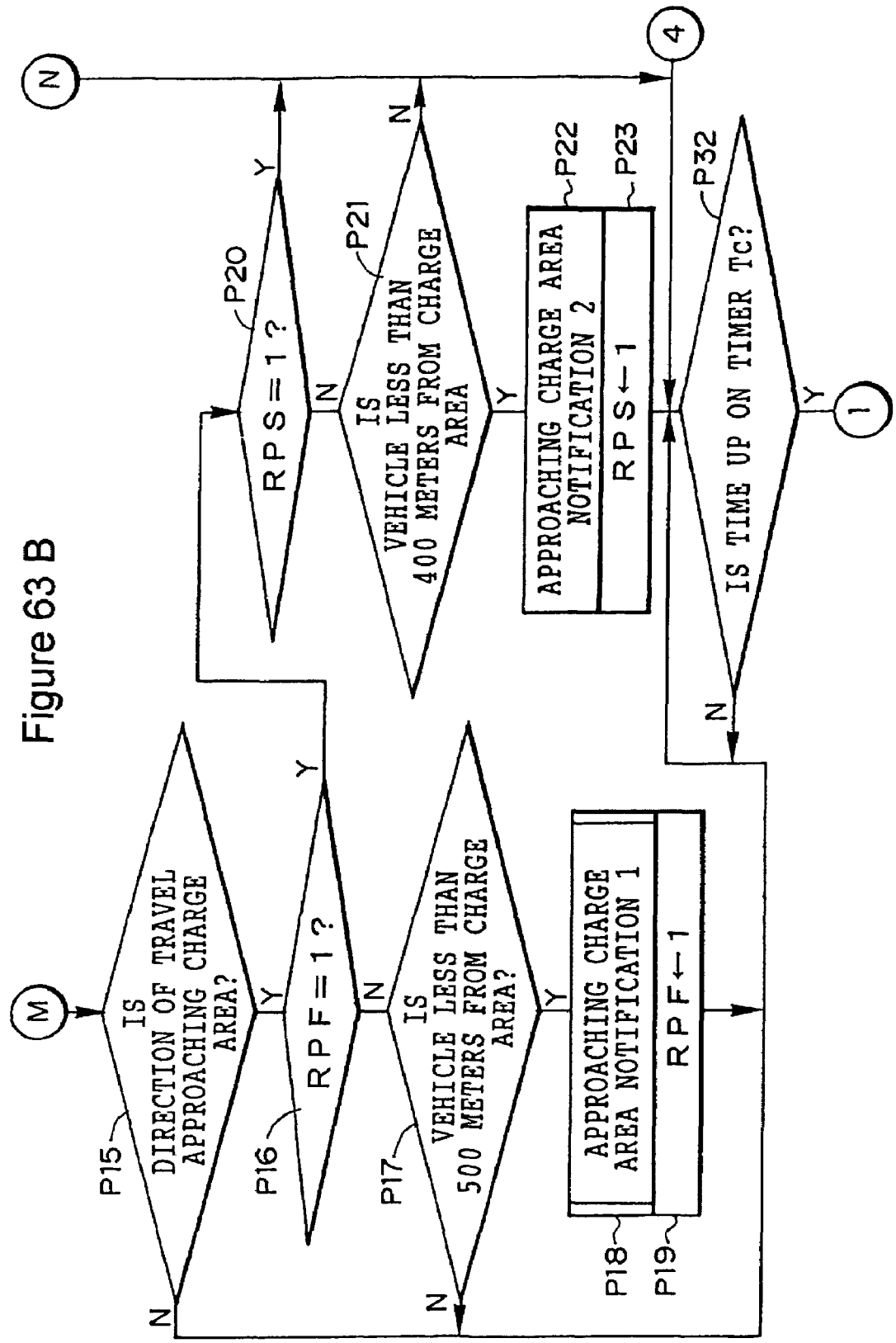

Next, as seen in FIGS. 63 A and 63 B, thereafter the charge control ECU 702 checks at the time cycle Tc whether the current position is within a charge area indicated by the charge area information in the charge table or outside the charge areas (PA13 to P32–P1 to P11–P13A). If it is outside a charge area, and if the direction of travel is one that is approaching a charge area, then when the position is within 500 meters from the charge area, "charge area 500 meters ahead" is displayed on the display unit 704 along with charge table information (however, the charge area information and the information of the area in which the table is valid are excluded). At the same time, notification such as "charge area is 500 meters ahead" is made by voice synthesis via the voice synthesizing unit 710 and the speaker SP (PA13 to P19).

Moreover, when the current position is within 400 meters from the charge area, the display "charge area 500 meters ahead" on the display unit 704 is altered to "charge area 400 meters ahead", and a notification of "charge area is 400 meters ahead" is also made (P13A to P16–P20 to P23).

Note that the charge area is displayed in superposition on the map displayed on the display device 724 in the step P14 repeated in the cycle Tc. Moreover, because the current position of the vehicle is shown on the displayed map as a direction attached index, the driver can recognize the position of the vehicle relative to the charge area and the direction of travel from the display on the display device 724.

When the vehicle enters a charge area, the charge control ECU 702 writes "1" in the register (internal memory) so as to show that the vehicle has entered the area in which a charge is applied, and clears the information showing that the vehicle is within 500 meters of the charge area, and is within 400 meters of the charge area (RPF and RPS data in the register) (PA13, P24, P25), and notifies "vehicle the entry" to the notification station 730, namely, notifies that a vehicle has entered the charge area (P26). At this time, a vehicle entry notification is transmitted to the notification station 730 with the data representing each of the vehicle ID, the balance, and card ID, as well as the date and time, the current position, and the movement direction data obtained from the GPS information processing ECU 720 attached thereto. When the notification station 730 receives this vehicle entry notification, it saves the date and time, the card ID, the balance, the vehicle ID, the position, and the direction in internal memory, and creates a control station movement history table corresponding to the card ID in the vehicle entry and departure database TDB in which it writes the above data.

Figure 64:
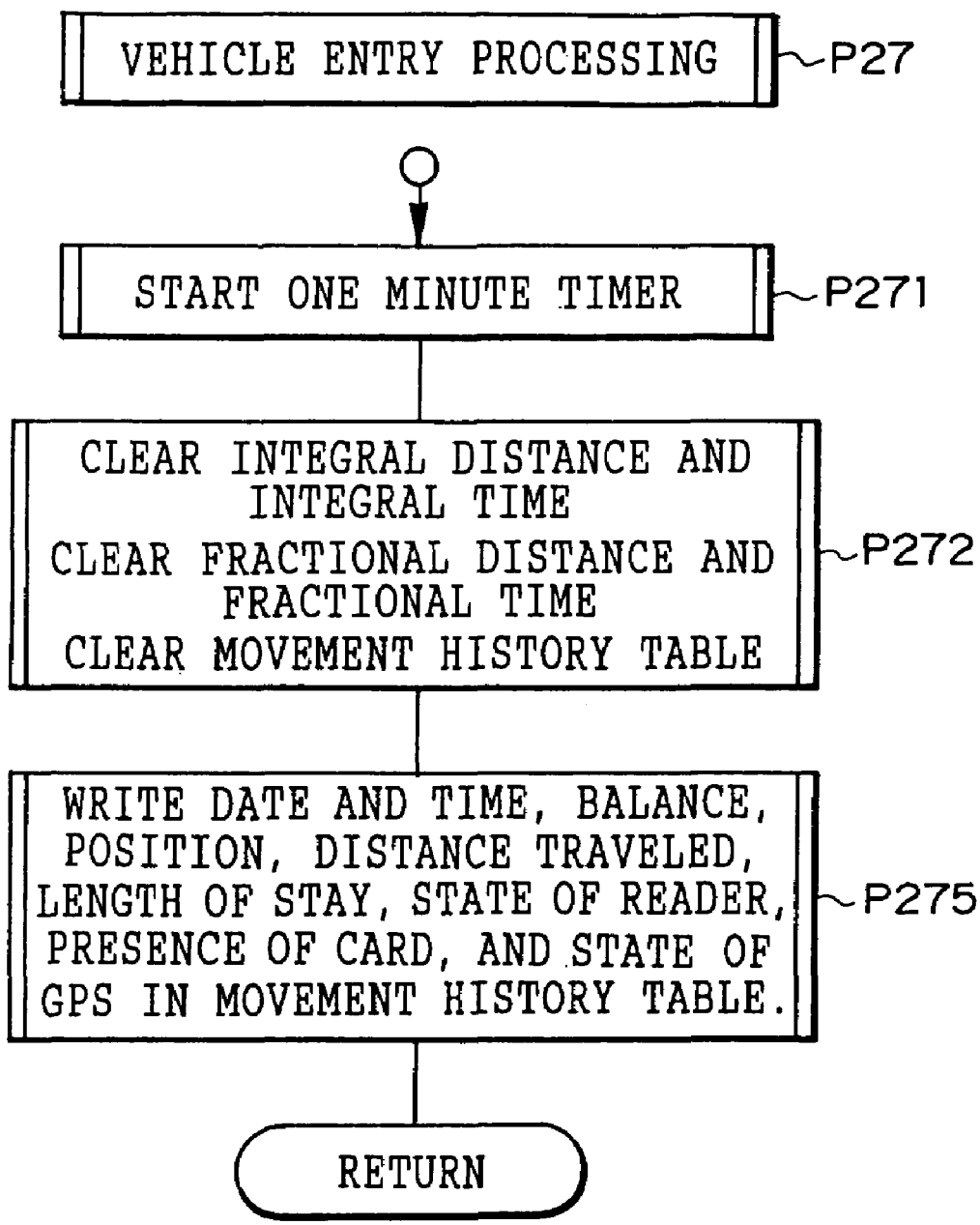
FIG. 64 is a flow chart showing the contents of vehicle entry processing.

The charge control ECU 702 next executes "vehicle entry processing" (P27). The contents thereof are shown in FIG. 64. Firstly, a one minute timer for setting the sampling cycle of the movement history data is started (P271). Next, the integral distance register, the fractional distance register, the integral distance register, the fractional distance register, and the movement history table are cleared (P272). Thereafter, the time, balance, position, distance traveled (the data in the integral distance register and fractional distance register), the length of time of stay (the data in the integral time register and fractional time register), the state of the card reader 705 (i.e. ready: normal, not ready: abnormal), the existence or otherwise of a card CRD loaded in the card reader 705, and the state of the GPS (i.e. whether or not position data has been generated) are written in the movement history table. Note that, as is described below, after the writing, this writing is performed in cycles of one minute while the vehicle is in the charge area. One example of the movement history table is shown in Table 20.

FIGS. 63A and 63B will now be referred to again. After a vehicle has entered a charge area and notification of a "vehicle entry" is transmitted to the notification station 730, the charge control ECU 702 repeatedly performs the "intermediate processing" (P28) at the cycle Tc while the vehicle is inside the charge area. The contents of this "intermediate processing" (P27) are shown in FIG. 65.

Figure 65:
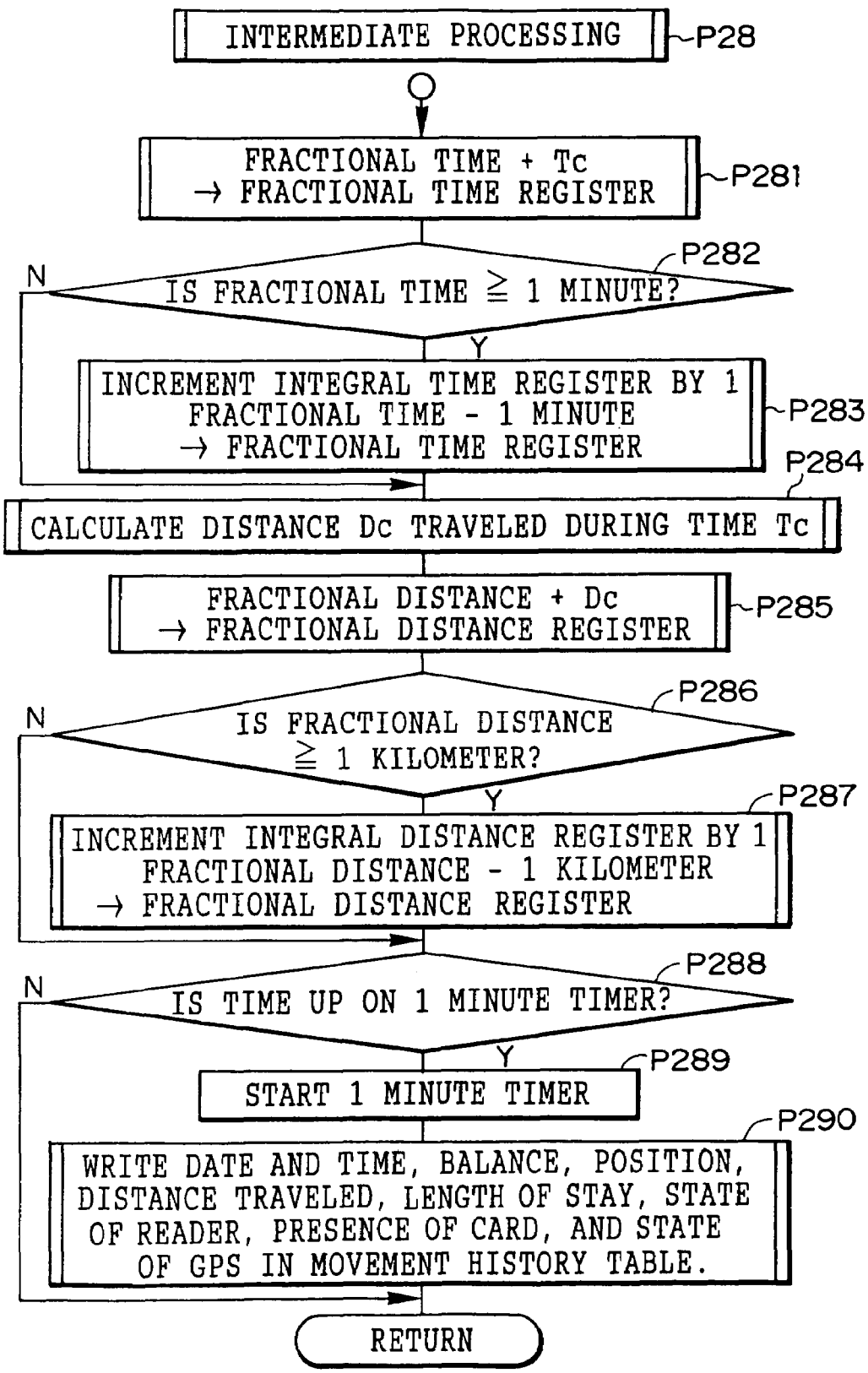
FIG. 65 is a flow chart showing the contents of intermediate processing.

When the routine advances to the "intermediate processing" (P27) shown in FIG. 65, the charge control ECU 702 firstly updates the data of the fractional time register (fractional value) to a value larger by the amount of the elapsed time Tc (P281). It then checks whether the updated fractional value is now greater than one minute (P282). If it is greater than one minute, the data in the integral time register is incremented by one, and the data of the fractional time register is updated to a value that is smaller by one minute (P283). Next, the distance traveled during the time Tc, namely, $$Dc = Tc \text{ (seconds)} \times \text{speed } (Km/h)/3600 \text{ } (Km)$$

is calculated (P285). The data of the fractional distance register (fractional value) is then updated to a value larger by the amount of the distance traveled Dc during Tc (P285). A check is then made as to whether the updated fractional value is now greater than one kilometer (P286). If it is greater than one kilometer, the data in the integral distance register is incremented by one, and the data of the fractional distance register is updated to a value that is smaller by one kilometer (P287).

A check is next made as to whether the one minute timer shows the time over (P288). If the time has elapsed, the one minute timer is restarted (P289), and the time, balance, position, distance traveled (the data in the integral distance register and fractional distance register), the length of stay (the data in the integral time register and fractional time register), the state of the reader (i.e. ready: normal, not ready: abnormal), the existence or otherwise of a card (i.e. loaded or not loaded), and the state of the GPS (i.e. whether or not position data has been generated) at that instant are written (P290). By repeating this intermediate processing (P28), and by writing data to the movement history table at one minute cycles, data indicating the state at one minute intervals is stored in the movement history table, as is shown in Table 20.

Figure 66:
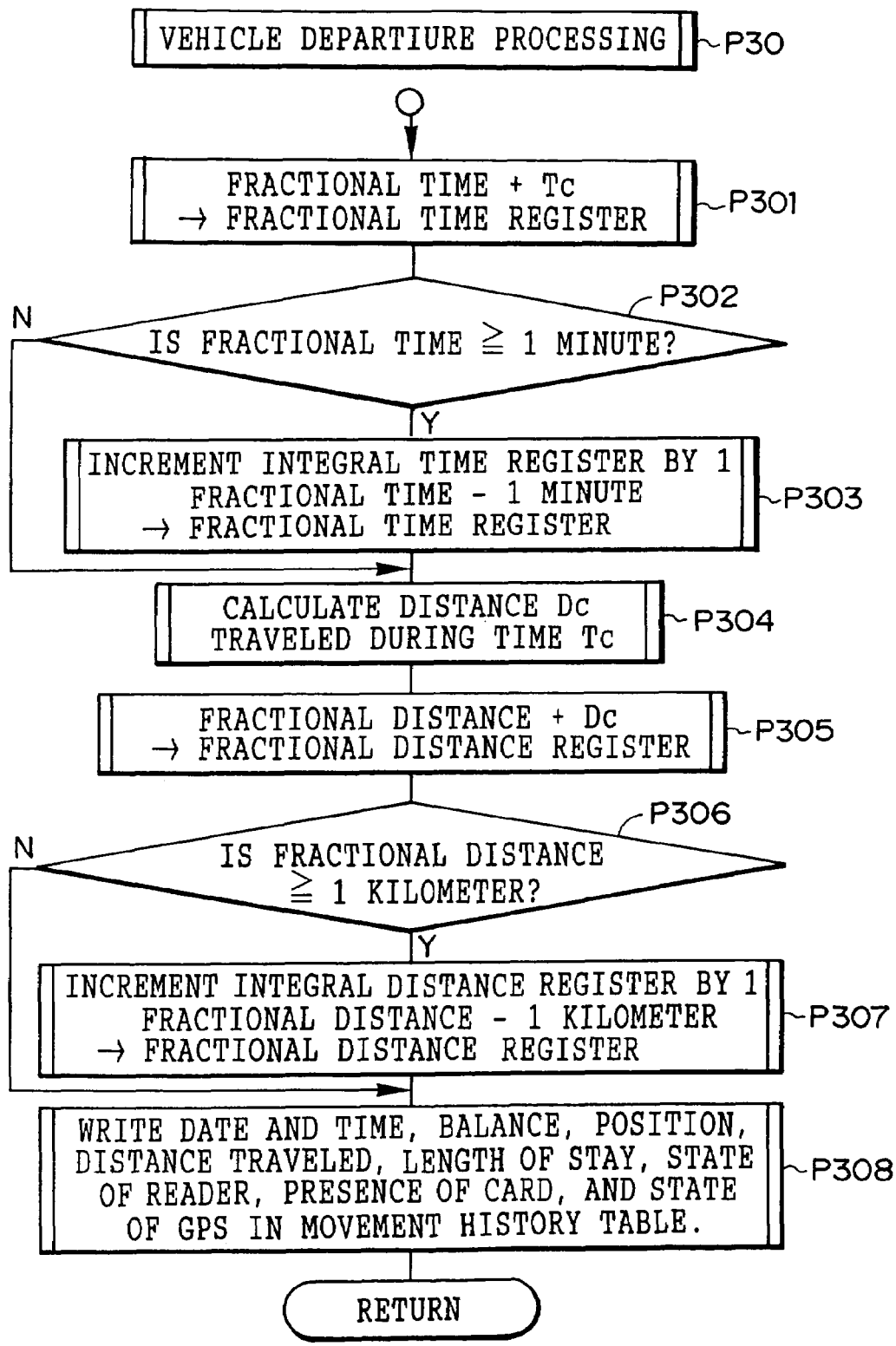
FIG. 66 is a flow chart showing the contents of vehicle exit processing.

FIGS. 63A and 63B will now be looked at once again. When the (current position of the) vehicle departs from the charge area, the charge control ECU 702 advances from steps PA13 and PA14 to step P29 where the data of the register RAE is altered to "0" to indicate that the vehicle is outside the charge area and the "vehicle departure processing" (P30) is performed. The contents of the "vehicle departure processing" (P30) are shown in FIG. 66. In the same way as the above "intermediate processing" (P28), the "vehicle departure processing" (P30) accumulates the timing values of the elapsed time during the period Tc (P301 to 303) and accumulates the traveling distances of the distance traveled during the time Tc (P305 to 307), and writes the final history inside the area in the movement history table (P308).

Referring again to FIGS. 63A and 63B, when the above "vehicle departure processing" (P30) has ended, the charge control ECU 702 transmits "vehicle departed", which means that the vehicle has left the charge area, to the notification station 730 (P31). At this time, the vehicle ID, the balance and the card ID in the card data, as well as the data of the movement history table are also transmitted to the notification station 730. The notification station 730 adds the received history data to the control history table of the vehicle entry and departure database TDB, which table was allocated to the card ID at the time of the "vehicle entry", and checks the charge process state. These contents are described below.

After the vehicle departure notification (P31), because the direction in which the vehicle is traveling is now a direction moving away from the charge area which the vehicle has just transited, the notification control ECU 702 advances from step P15 to step P32, and the relative distance notification relating to the charge area (P16 to P23) is not performed.

When the vehicle transits one charge area (the first charge area) as described above and travels towards another charge area (the second charge area), when the (current position of the) vehicle leaves the area in which the table is valid that is indicated by the table valid area information of the first charge table representing the first charge area, the charge control ECU 702 moves from step P8 to P9 and transmits a charge table request. This transmission wave is received by a first notification station (S30) addressed in the first charge area, and the first notification station transmits the first charge table. When the charge control ECU 702 receives the first charge table, the charge table received in step SP10 is determined to be invalid. As a result, even if the charge control ECU 702 receives the first charge table after the vehicle has left the area in which the table is valid that is indicated by the table valid area information of the first charge table representing the first charge area, this is not written on the IC card CRD or the internal memory. When the (current position of the) vehicle enters the table valid area of the second charge area is valid, the charge control ECU 702 writes the second charge table transmitted by an unillustrated second notification station in internal memory and on the IC card CRD, and charge control is performed in the manner described above according to the data.

As described above, when a vehicle reaches a point 500 meters before a charge area, that fact is notified to the driver via the display unit 704 and the speaker SP, and information on the charge area is displayed on the display unit 704. In addition, a notification is again made when the vehicle reaches a point 400 meters before the charge area. Therefore, the driver has enough time to decide whether or not to enter a charge area, and has enough time to choose a detour route.

The check in step P1 as to whether or not the ignition key switch IGsw is closed (Si=H) is intended to determine whether or not the vehicle is parked. When the vehicle enters a charge area in which the time toll charge table (Table 17) is applied, then when the ignition key switch IGsw is open (Si=L: an interrupt instruction to interrupt the timing for the charging), the charge control ECU 702 waits for the ignition key switch IGsw to be closed (Si=H: an instruction for the timing for the charging), and does not perform the "intermediate processing" of step P28 while waiting. Therefore, the time that the vehicle is parked inside the charge area does not fall within the length of time that the vehicle has stayed inside the charge area in order for a charge amount for a time toll to be calculated.

When the notification station 730 receives the charge table request from the in-vehicle charge device 701, it transmits a "charge table" to the ID. Furthermore, in a fixed cycle of approximately several minutes, it transmits a "charge request" to all vehicle. It then transmits a "movement history request" either in a fixed cycle of approximately several minutes or in an irregular cycle to each ID in sequence, and collects the data of the movement history tables from each ID. Moreover, when a "vehicle departure" notification is received, when there is uncharged traveling distance or staying time, a charge request is transmitted to the ID of the charge device ID (card ID) that supplied the "vehicle departure" notification. Furthermore, a check for errors in the charge processing is made when the "vehicle departure" notification is received and, if charge errors are discovered, these are pointed out and message data urging measures to deal with them is transmitted to the relevant.

Figure 67:
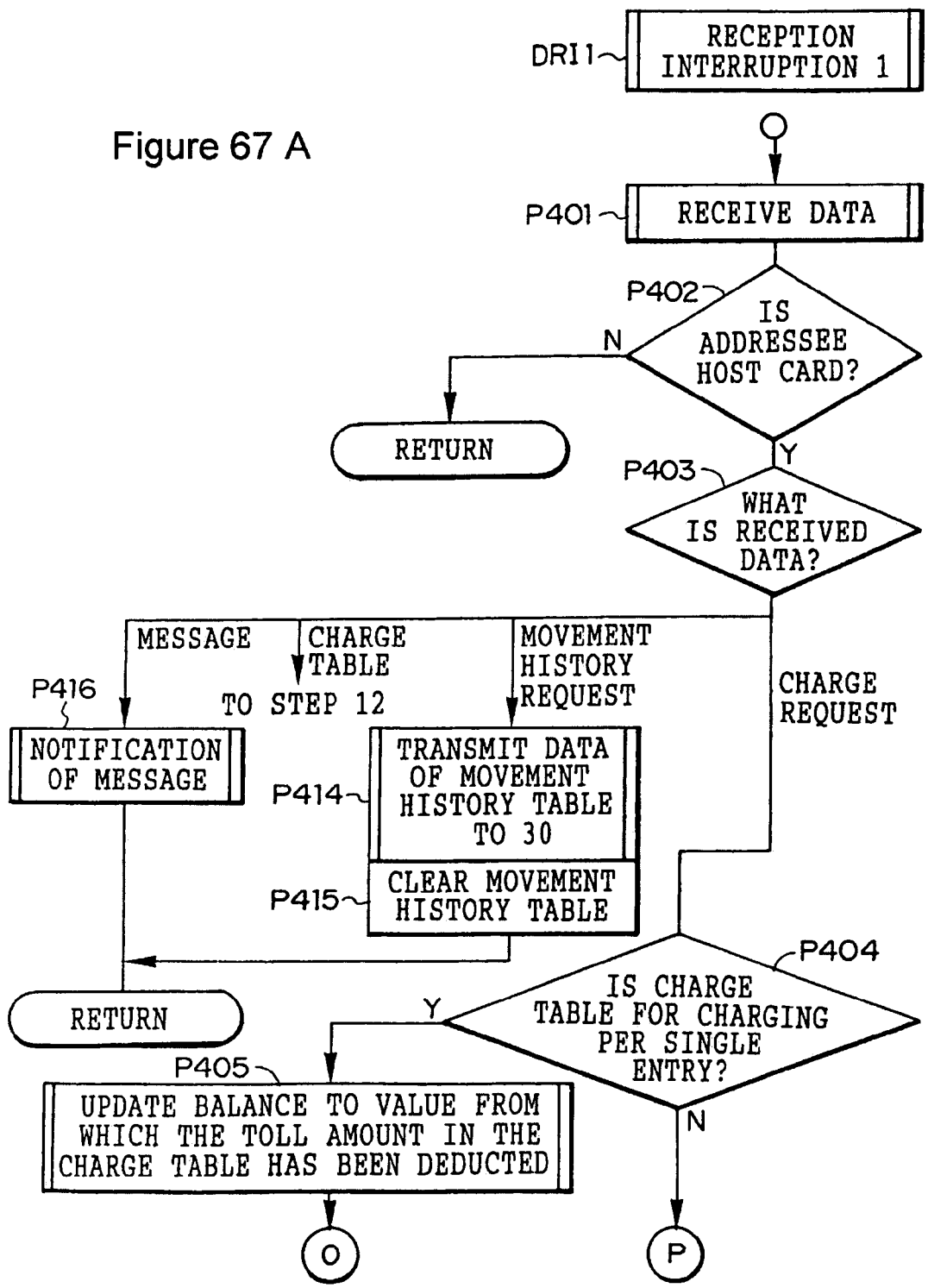
FIGS. 67 A and 67 B are a flow chart showing the contents of interrupt processing in response to wave signal reception of a charge control ECU.
Figure 67:
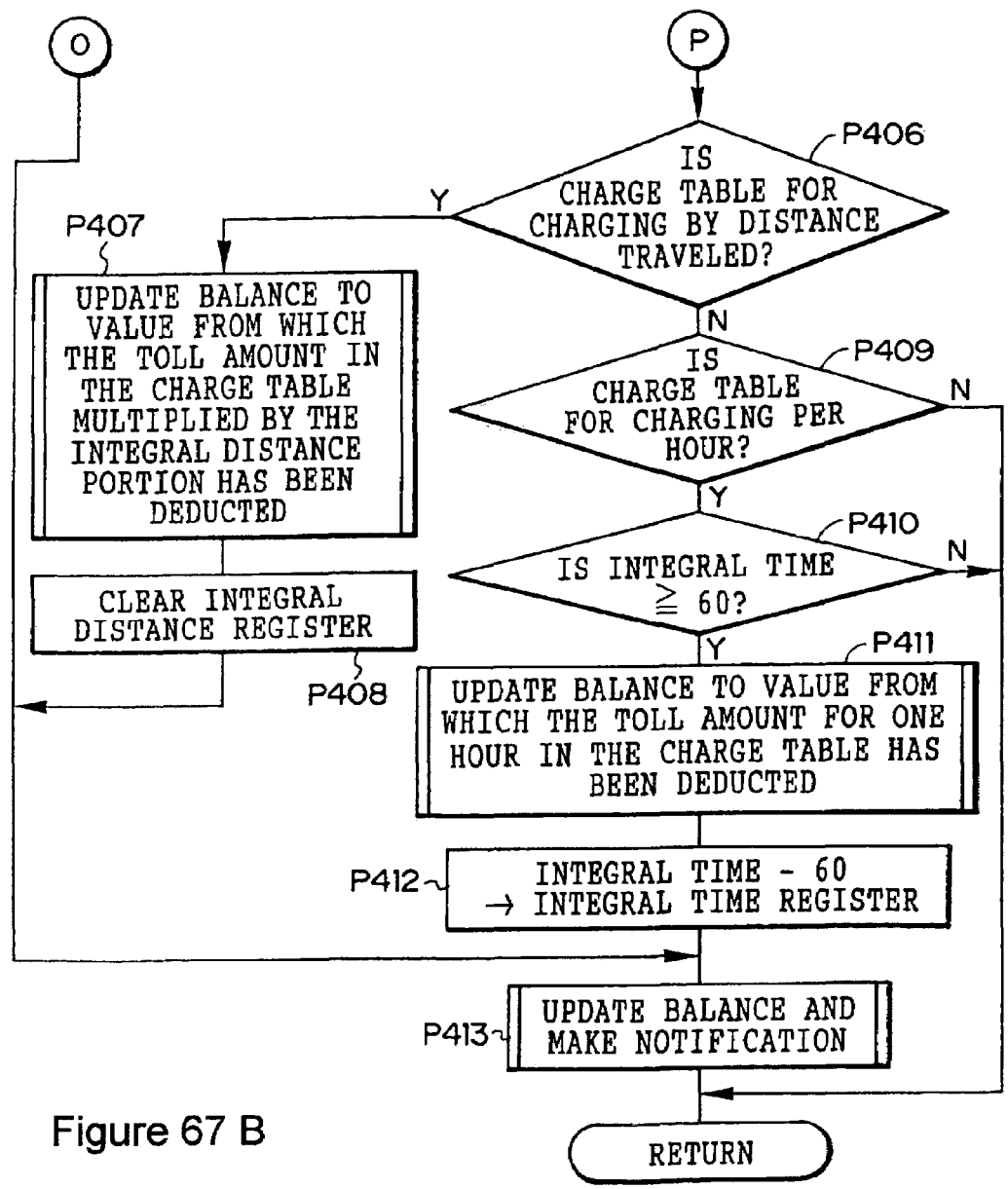

FIGS. 67 A and 67 B show the contents of "reception interruption 1" DRI1 executed by the charge control ECU 702 as a response when a radio wave signal arrives in the antenna ANTt, and an unillustrated receiver in the telephone unit 708 generates a transmission arrival signal showing that a transmission has arrived (i.e. that it has received a signal). When the charge control ECU 702 proceeds to the reception interruption DRI1, it checks whether address belongs to the host card ID (received date is for the own card ID)(including when all vehicles are specified) (P402). If this is the case, a determination is made as to whether the received data is a charge request, a movement history request, a charge table, or a message (P403).

If the received data is a charge request, then if the charge table of the card CRD is one for charging for each entry (Table 19), the charge control ECU 702 extracts the toll corresponding to the vehicle type classification from among the card data, and updates the card balance in the card data in internal memory to a value from which the toll amount has been deducted (P404, P405). In the same way, the data of the IC card CRD is also updated, and the updated balance is displayed on a display unit. A check is then made as to whether or not the card balance is a negative value (insufficient toll payment, and if the card balance is a negative value, displays "insufficient payment—settlement required" on the display device 704. Notification such as "card balance is insufficient. Please settle debt" by voice synthesizer is also made using the voice synthesizing unit 710 and the speaker SP (P413). If the charge table of the card CRD is one for charging for distance traveled (Table 18), the charge control ECU 702 extracts the toll per kilometer corresponding to the vehicle type classification from among the card data in the charge table, multiplies this by the value of the integral distance register, and updates the card balance in the card data in internal memory to a value from which the obtained value has been deducted (P406, P407). The integral distance register is then cleared (P408) and, in the same way, the data of the IC card CRD is also updated, and the updated balance is displayed on a display unit (P413).

If the charge table of the card CRD is one for charging for length of time of stay (Table 17), whether value of the date in the integral time register is more than or equal to 60 (1 hour) is checked (P410). If value of the date in the integral time register is more than or equal to 60 (1 hour), toll per unit time corresponding to the vehicle type classification from among the card data in the charge table is extracted, and updates the card balance in the card data in internal memory to a value from which the obtained value has been deducted (P409~P411). The integral time register is then updated to a value from which 60 has been deducted (P412), and, in the same way, the data of the IC card CRD is also updated, and the updated balance is displayed on a display unit (P413).

When the received data is a "movement history request", the charge control ECU 702 transmits the data in the movement history table to the notification station 730 (P414), and the movement history table is cleared (P415). When the received data is a "charge table", the routine advances to the updating of the card data explained in step P12 above (FIGS. 62 A and 62 B). If the received data is a "message", that message is displayed on a display and reported by voice synthesis.

If the charge table is for charging for each entry, then when a charge request is transmitted, the notification station 730 writes that the charge has been completed in the control station movement history table generated for each card ID in the vehicle entry and departure database TDB at the time the "vehicle entry" notification is made, and thereafter, charge requests are transmitted only to those ID at which no charge completion has been written, and no charge request is transmitted to the charge completed IDs. If the charge table is for charging for distance traveled, the notification station 730 transmits charge requests repeatedly to all IDs in a cycle of several minutes or in an irregular cycle. When the value of the integral distance register is greater than or equal to 1 (Km), the charge device that receives the charge request performs charge processing by multiplying that value by the toll per kilometer, and then clears the integral distance register. Therefore, each time the notification station 730 generates a charge request, the charge device only performs charge processing for the integral value (kilometer units) portion from among the distance traveled from the time the previous charge request was received until the current charge request is received. Fraction distance is handled next. In the same way, if the charge table is for charging for length of stay, the notification station 730 transmits charge requests repeatedly to all IDs in a cycle of several minutes or in an irregular cycle. When the value of the integral time register is greater than or equal to 60 (1 hour), the charge device that receives the charge request performs charge processing for the toll for periods of one hour, and then updates the data in the integral time register to a value that is smaller by 60 minutes. Therefore, each time the notification station 730 generates a charge request, the charge device only performs charge processing for the integral time portion from among the time lapsed since the time the previous charge request was received until the current charge request is received. Fraction time is handled next.

In the case of a "vehicle departure", because the timing thereof and the timing of the charge request do not match, even if the charge table is for charging in distance units or time units, it is possible for there to be a "vehicle departure" when there is an integral distance or integral time to be charged. When the notification station 730 receives a "vehicle departure" notification, it checks the integral distance data or the integral time data, and if that is greater than or equal to 1 (Km) or 60 (1 hour), it transmits a charge request to the ID that made the notification of the "vehicle departure".

Figure 68:
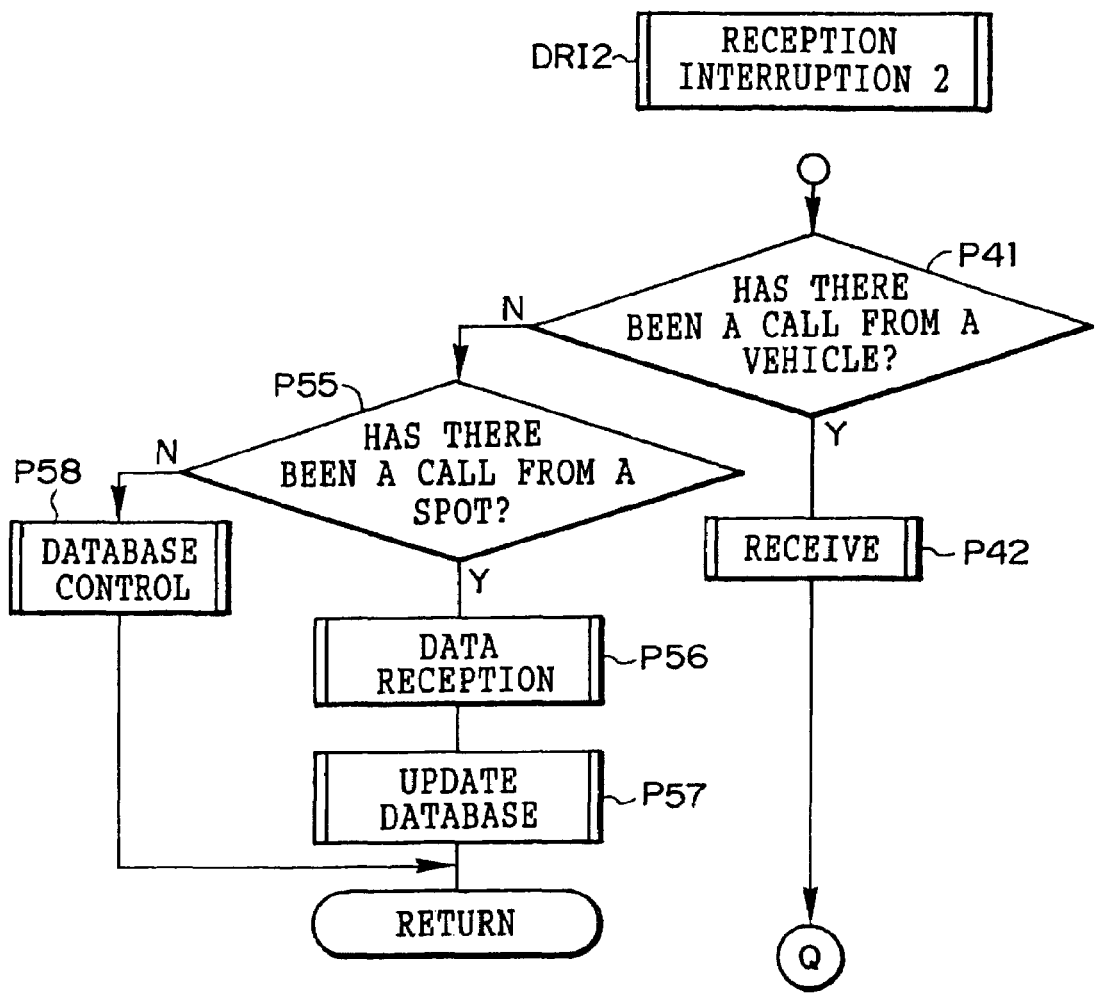
FIGS. 68 A and 68 B are a flow chart showing the contents of interrupt processing in response to an incoming signal from a communication device or modem unit of the controller unit.
Figure 68:
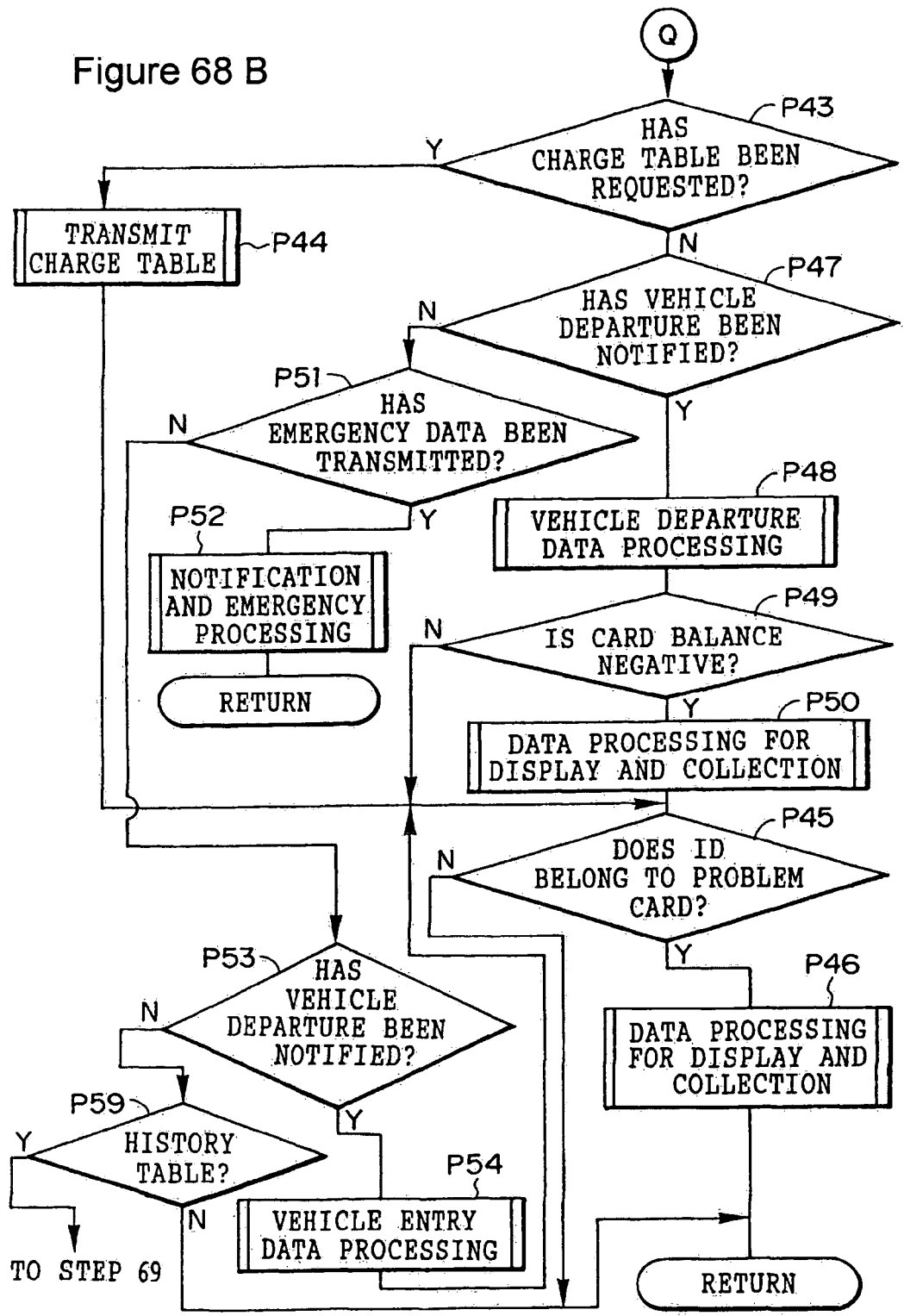

FIGS. 68 A and 68 B show the contents of interrupt processing of the controller unit 732 of the notification station 730. This interrupt processing DRI2 is executed in response to the arrival of a message in the modem unit 734 or the detection of the arrival (incoming) a radio wave signal in the antenna 740 in the communication device 731. When the incoming message is received, if the message is from the charge control ECU 702 of the in-vehicle charge device 701 of a vehicle, the unit 732 receives the message (P42), and, if it is a charge table request, saves the data indicating the date and time, the card ID, the balance, the vehicle ID, the position, and the direction that is attached to the message in internal memory, and, in response to the request, transmits the charge tables in the database FDB via the antenna 740 (P41 to P44). A search is then made (P45) via the control unit 733 as to whether or not the received card ID or vehicle ID is the ID of a vehicle that has been in a collision, or has been stolen, or whether the card is a problem card (i.e. lost or damaged, stolen, scrapped through reissue, or illegally copied) stored in the observation database WDB. If the card ID or vehicle ID is one of the above, the card ID, the vehicle ID=vehicle No . . . , the contents of the problem, the current position (reception data), and the current time are displayed on the terminal PC display unit and printed out as an observation data set, and are also transmitted to the control center 750 and card issuing and toll settlement booths 771 to 773. These establishments are able to perform data registration or take action in accordance with the content of the problem.

Figure 69:
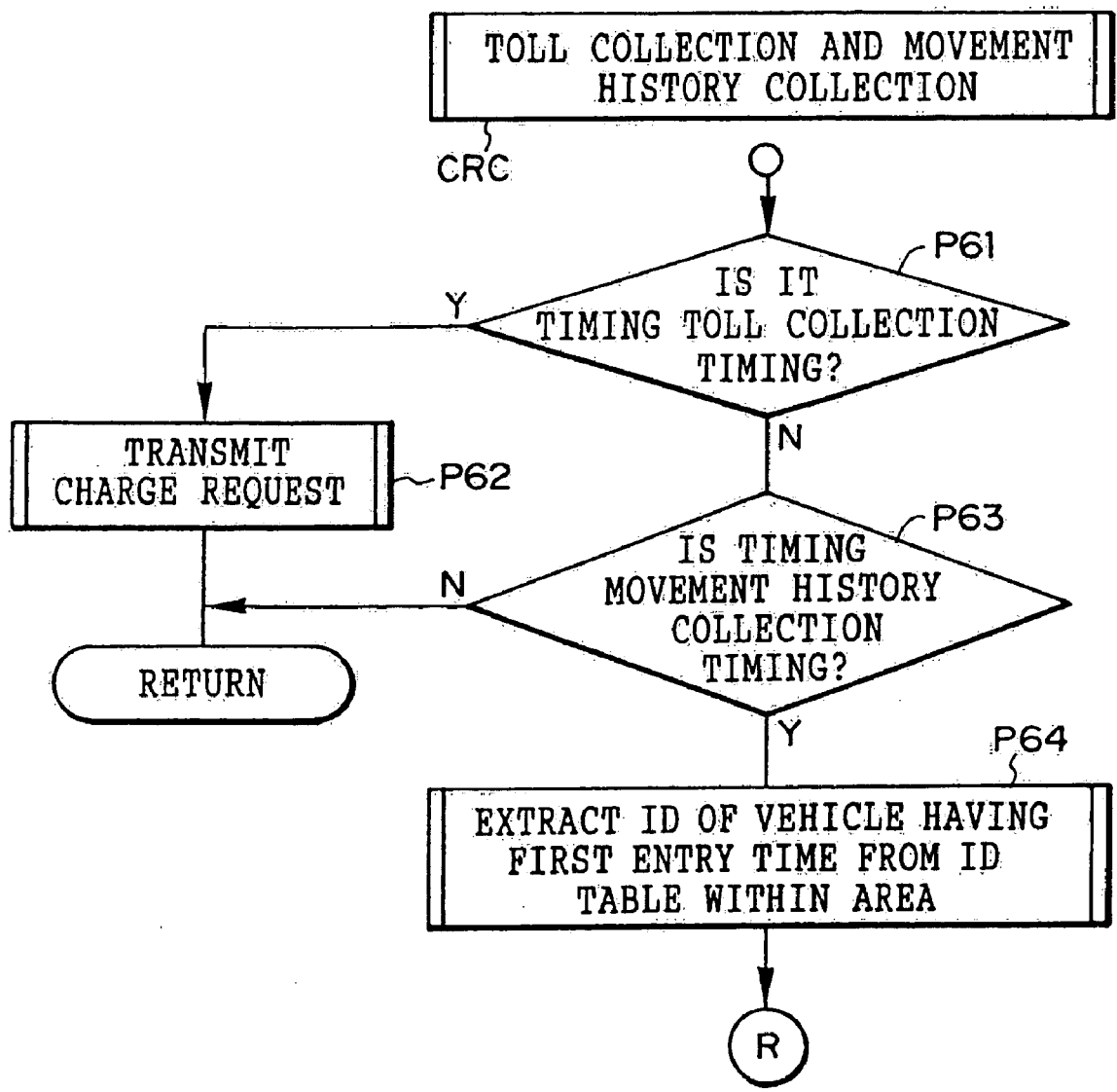
FIGS. 69 A and 69 B are a flow chart showing the contents of repeatedly executed "fare collection and movement history collection" of the controller unit.
Figure 69:
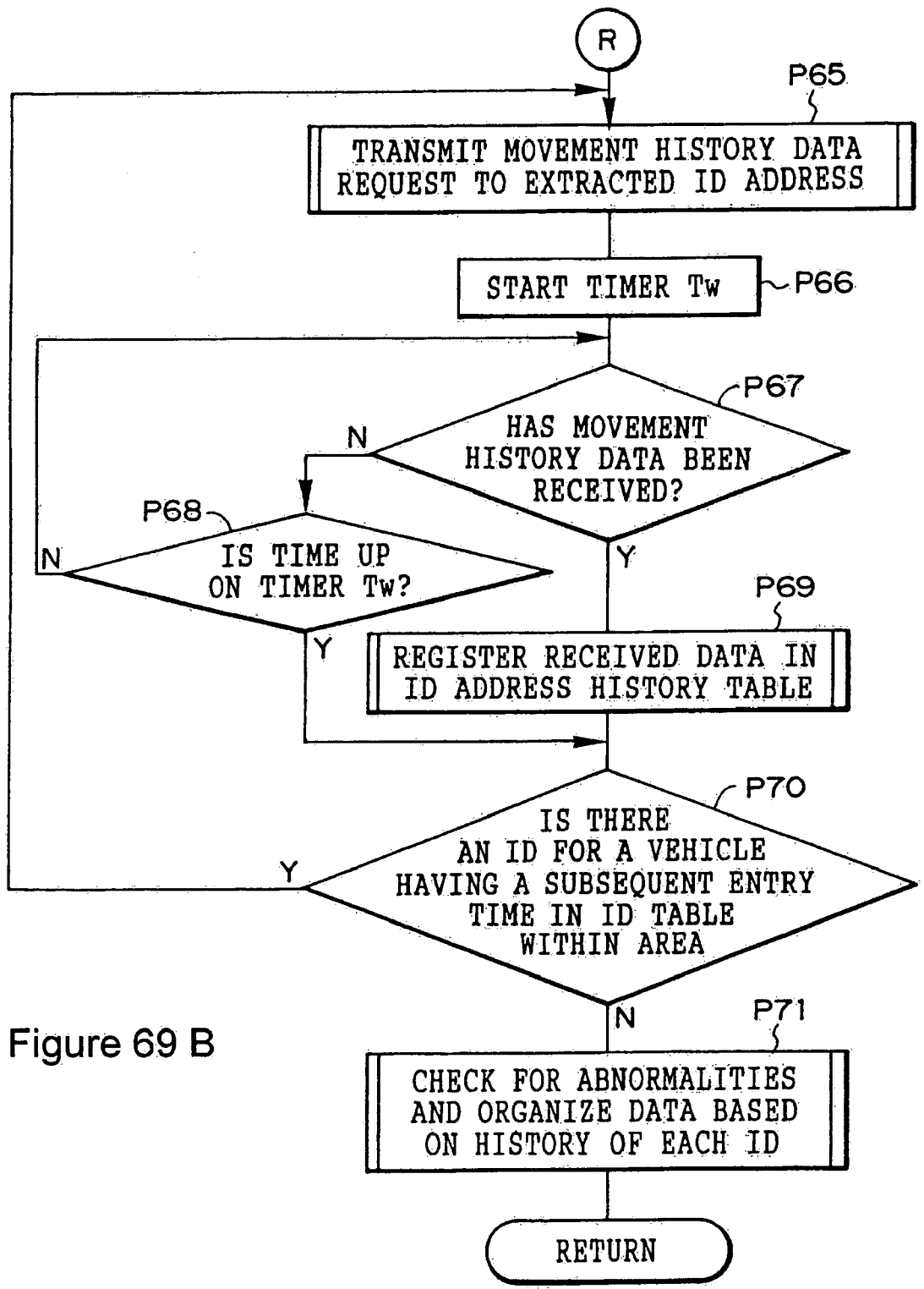

The charge control ECU 702 of the in-vehicle charge device 701 transmits vehicle departure notification data showing that a vehicle has departed from a charge area. When the controller 732 of the notification station 730 receives this, the controller 732 saves the date and time, the card ID, the vehicle ID, the current position, the distance traveled (the portion that has not been charge processed), the length of time of stay (the portion that has not been charge processed), the direction, and the card balance in internal memory. When the charge table is for charging for distance traveled, the controller 732 checks whether or not the distance traveled is greater than or equal to one kilometer and, if the distance is greater than or equal to one kilometer, transmits a charge request to the card ID. When the charge table is for charging for length of time of stay, the controller 732 checks whether or not the length of time of stay is greater than or equal to sixty minutes and, if the length of time of stay is greater than or equal to sixty minutes, transmits a charge request to the card ID. A check is then made as to whether or not there is any usage error information for the charge device in the history table on the control side (the control history table) at the relevant ID in the vehicle entry and departure database TDB, or whether or not the card balance is negative (minus). If there is no usage error information and if the card balance is positive, the history table on the control side at the relevant ID is erased. Note that the usage error information is written in the control history tables in the "Toll collection and movement history collection" CRC (FIGS. 69 A and 69 B) described below, based on the history data in the control history table when that shows a usage error. Next, a departure road (area entry/exit) is specified based on the position data, and the number of departed vehicles at the relevant departure road in the vehicle entry and departure database TDB is incremented by one (P48).

If the card balance is negative (–), this data (card ID, vehicle ID, current position, direction, and card balance) is supplied to the terminal PC and displayed on the display and printed out. A check is then made via the control unit 733 as to whether the card ID or vehicle ID are in the arrears database CDB. If they are in the arrears database, the card balance of the relevant item in the arrears database CDB is updated to the new value. If they are not in the arrears database, this newly acquired data (card ID, vehicle ID, current position, direction, and card balance) is registered for the first time in the arrears database CDB (P49, P50). The ID check and the like described above (P45, P46) are then performed.

An emergency notification switch is formed in an operation/display board 703 connected to the charge control ECU 702 of the in-vehicle charge device 701. When the driver operates this switch, the charge control ECU transmits in a predetermined cycle emergency data that includes the vehicle ID, the current position, and the direction via the antenna ANTt. When it receives this, the notification station 730 displays the fact that an emergency has occurred, the vehicle ID, the current position, and the direction on the terminal PC and prints out this information. It also transmits the emergency data to the control center 750 (P51, P52).

The charge control ECU 702 of the in-vehicle charge device 701 transmits vehicle entry notification data showing that a vehicle has entered a charge area. When the controller 732 of the notification station 730 receives this (P53), the controller 732 generates the control movement history table addressed at the card ID of the in-vehicle charge device 701 in the vehicle entry/departure database TDB, and writes therein the received date and time, the balance, the position, the distance traveled (0), the length of time of stay (0), the state of the reader, the existence or otherwise of a card, and the state of the GPS. It then specifies the entry road (the entrance/exit to the area) based on the position data, and increments by one the number of vehicles that have entered at this entry road in the entry and departure vehicle database TDB (P54). The ID check and the like described above (P45, P46) are then performed.

When the transmitted settlement data (card ID, vehicle ID, and card balance) arrives from the card issuing and toll settlement spots 771 to 773, if the received card balance is positive, the controller 732 erases the data of the relevant ID in the arrears database CDB (erases the arrears register). If the card balance is still negative (minus), the card balance of the relevant ID is updated to the received card balance (P41, P55 to P57).

The data of the databases CDB, FDB, WDB, and TDB can be controlled (i.e. read, transferred, output, written, and erased) by the terminal PC and the control center 750. When the terminal PC or control center 750 accesses the controller 732, the controller 732 performs data processing (i.e. reading, transferring, outputting, writing, and erasure) in accordance with the instruction thereof (P58). The control center 750 is intended to carry out traffic control and charge collection control inside and outside the charge area, as well as observation and tracking of problem cards and vehicles. In order to carry out traffic control, the control center 750 regularly, and when appropriate, refers to the data in the vehicle entry and departure database TDB, and calculates the number of vehicles present within the charge area (the sum of the number of vehicles that have entered minus the number of vehicles that have exited at entrance and exit of each charge area) and differential values thereof (congestion trends, easing trends) for predetermined time spots so as to ascertain the trends in the traffic volume. The control center 750 publicly reports traffic information over short time periods, and over long time periods corrects or abolishes the charge tables. In the toll collection control, the task of collecting an unpaid toll from (the owner of) the vehicle for which the absolute value of the negative value of the card balance in the arrears database CDB is the largest is performed. Data of the observation database WDB is used for finding problem cards and vehicles.

The controller unit 732 of the notification station 730 executes the "Toll collection and movement history collection" CRC shown in FIGS. 69A and 69B in a fixed cycle when the reception interruption 2 (DRI2) do not start up. When the routine advances to this processing, the unit 732 transmits charge requests via the communication device 731 and the antenna 740 at a toll collection timing that is set either in a fixed cycle (of approximately several minutes) or in a cycle that is not fixed but does have a pitch of approximately several minutes in order to make it more difficult for a fraudulent user to avoid a charge (P61, P62). Furthermore, at a movement history collection timing that is set either in a fixed cycle or in a non-fixed cycle, in the same way as above, movement history data requests are transmitted in sequence to each ID for which ID a control movement history table is generated in the vehicle entry/departure database TDB. The movement history data of each ID is received in sequence and written in the movement history table on the control side at each ID (P64 to P70). Namely, control side movement history tables of each ID are generated in "vehicle entry" date and time sequence in the vehicle entry and departure database TDB. The movement history data request is transmitted to the ID address having the earliest date and time (P64, P65), and the timer Tw is started (P66). A reply (i.e. the history table on the movement side) is then awaited from the ID (P57, P68) until the time on the timer is up. If a reply is received, it is added to the movement history table on the control side in the ID address (P69). Once this is completed, or if time is up on the timer without a reply being received, a movement history data request is transmitted to the ID address having the next earliest writing date and time. (P70, P65). In this way, when data requests and reception (namely, polling) has been completed for all IDs in which control side movement history tables are generated in the vehicle entry and departure database TDB, a check is made as to whether or not there are any charge device usage errors in each ID (card ID) (P71), based on the data of the control side movement history tables at each ID in the vehicle entry and departure database TDB.

Namely, for example, immediately after an ID (charge device 1) has made a "vehicle entry" into a charge area, data (date and time, balance, position and direction) at the time of "vehicle entry", namely, data that has been transmitted to the notification station 730 in step P26 in FIGS. 63A and 63B, is present in (the first column of) the control side movement history table of the ID address until the first movement history collection is performed. Moreover, in the first movement history collection, when the history data shown in Table 20, for example, is collected, that history data is written in the (second column and thereafter of the) control side movement history table. If the balance is negative, the card reader not operating normally, there is no card present, or the GPS is not operating normally, that usage error information is written in the control side movement history table. Moreover, a check is made as to whether there are any changes or any lack of changes that do not occur in normal charge processing by a comparative calculation, which corresponds to the type of charge table (Table 17, 18, or 19), of the progress of data of identical items with the data of other items in the order in which they appear (column No.) in the movement history table on the control side. If there are these usage errors, the usage error information is written in the control side movement history table. If there are none of these usage errors, the data of the history table on the movement side just read is left as it is, and the data recorded before that is erased from the movement history table on the control side. If there is usage error information present, it is accumulated by being recorded in the control movement history table each time it is collected without a data erasure such as that above being performed. When the relevant vehicle (card ID) becomes a "vehicle departure", the control movement history table at the ID is transferred to the observation database WDB and is removed from the vehicle entry and departure database. TDB.

The embodiment described above is a charge system in which charges are levied in area units in a road network, and it is possible to set either a portion or all of a highway road network, or specific areas of a general road network as charge areas and to charge vehicles that transit those areas. However, the present invention is not limited only to a road network charge system, and may also be implemented in a tourist area, an event area or the like as an entry fee collection system.

POSSIBLE INDUSTRIAL APPLICATIONS

As described above, the charge processing device, a charge processing system, and charge processing card of the present invention are preferably used in a device for transferring information such as the receipt of money or the like between a moving body such as a vehicle and the ground, and for performing processing associated with the charge processing relating to the user of the moving body, and may be used, for example, in a device for performing charge processing, a device for leaving charge processing as it is, and a device for charge processing constructed so as to be portable.

What is claimed is:

1. A charge processing device comprising:
    detecting means for detecting position information indicating a position where a moving body is located on the basis of a received signal from a satellite;
    matching means for matching the position information with predetermined map information;
    setting means for, based on the map information, setting an area where a charge is applied which area corresponds to a predetermined area in the map information;
    receiving means for receiving toll data from a ground station including charge data, for each of a plurality of different moving body types determined on the basis of a size of the moving body type, relating to the area where a charge is applied;
    deciding means for, based on a result of a matching by the matching means, deciding an entry state indicating whether or not the moving body has at least entered into the area where a charge is applied; and
    generating means for generating, based on a result of a deciding by the deciding means, charge information for the moving body, by using the received toll data, wherein the area where a charge is applied is divided into sub-areas by substantially concentric circles, and a charge amount for each sub-area is set such that the closer a sub-area is to the center of the area where a charge is applied, the higher the charge amount becomes.

2. The charge processing device according to claim 1, the charge processing device further comprising location information detecting means for detecting, based on the position information, location information indicating date and time the moving body is located in the area in which a charge is applied, wherein the deciding means decides, based on the result of the matching by the matching means and a result of a detection by the location information detecting means, the entry state including a location state of the moving body within the area in which a charge is applied.

3. The charge processing device according to claim 1, wherein the generating means decides the entry state including a congestion state caused by moving bodies located in the area in which a charge is applied.

4. The charge processing device according to claim 1, wherein the generating means is further provided with storage means in which predetermined toll data corresponding to the entry state is stored in advance, and the generating means generates the charge information using the toll data in the storage means.

5. The charge processing device according to claim 1, wherein the toll data further includes charge data for each of a plurality of time zones.

6. The charge processing device according to claim 1, wherein the receiving means for receiving toll data receives said toll data at a time when the moving body is proximate to the area where a charge is applied.

7. The charge processing device according to claim 1, wherein said ground station is in charge of a geographical area.

8. A charge processing device comprising:
   detecting means for detecting position information indicating a position where a moving body is located on the basis of a received signal from a satellite;
   a toll card capable of being inserted and removed for storing a predetermined geographical area in which a charge is applied which geographical area is set based on predetermined map information in correspondence with a predetermined area in the map information;
   generating means for, at a predetermined period, generating charge information for the moving body based on a result of a detection by the detecting means and the area in which a charge is applied stored in a loaded storage means, and
   wherein area information of the predetermined geographical area where a charge is applied is stored in the toll card and includes toll data showing that the predetermined geographical area where a charge is applied is divided into sub-areas by substantially concentric circles and a charge amount for each sub-area is set such that the closer a sub-area is to the center of the predetermined geographical area, the higher the charge amount becomes.

9. The charge processing device according to claim 8, wherein the generating means is provided with a reading means for reading a result of a detection by the detecting means and the area in which a charge is applied stored in the loaded storage means, and generates charge information from the read position information and the area in which a charge is applied.

* * * * *